(12) United States Patent
Kim et al.

(10) Patent No.: US 8,887,223 B2
(45) Date of Patent: Nov. 11, 2014

(54) APPARATUS AND METHOD FOR PROCESSING AN INTERACTIVE SERVICE

(71) Applicant: LG Electronics Inc., Seoul (KR)

(72) Inventors: Kyungho Kim, Seoul (KR); Minsoo Lee, Seoul (KR); Jangwoong Park, Seoul (KR); Seungryul Yang, Seoul (KR); Jinpil Kim, Seoul (KR); Kyoungsoo Moon, Seoul (KR); Janghun Bae, Seoul (KR); Jaekoo Lee, Seoul (KR); Younghwan Kwon, Seoul (KR); Seungjoo An, Seoul (KR); Hyeonjae Lee, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/056,343

(22) Filed: Oct. 17, 2013

(65) Prior Publication Data

US 2014/0115644 A1 Apr. 24, 2014

Related U.S. Application Data

(60) Provisional application No. 61/715,317, filed on Oct. 18, 2012, provisional application No. 61/718,679, filed on Oct. 25, 2012, provisional application No. 61/721,007, filed on Oct. 31, 2012.

(51) Int. Cl.
| | |
|---|---|
| *H04N 7/173* | (2011.01) |
| *G06F 15/16* | (2006.01) |
| *H04N 21/435* | (2011.01) |
| *H04L 29/08* | (2006.01) |
| *H04N 21/235* | (2011.01) |
| *H04L 12/24* | (2006.01) |

(52) U.S. Cl.
CPC .......... *H04L 41/5058* (2013.01); *H04N 21/435* (2013.01); *H04L 67/16* (2013.01); *H04N 21/235* (2013.01)
USPC ........... 725/109; 725/110; 725/112; 725/115; 725/116; 709/204

(58) Field of Classification Search
USPC ....................................... 725/109
See application file for complete search history.

(56) References Cited

U.S. PATENT DOCUMENTS

| | | | | |
|---|---|---|---|---|
| 2002/0056112 | A1* | 5/2002 | Dureau et al. | 725/78 |
| 2002/0188958 | A1* | 12/2002 | Miller | 725/112 |
| 2003/0229899 | A1* | 12/2003 | Thompson et al. | 725/87 |
| 2004/0034875 | A1* | 2/2004 | Bulkowski et al. | 725/136 |
| 2005/0022226 | A1* | 1/2005 | Ackley et al. | 725/23 |
| 2008/0010342 | A1* | 1/2008 | Gebhardt et al. | 709/204 |
| 2008/0010664 | A1* | 1/2008 | Pelizza et al. | 725/134 |
| 2008/0244661 | A1* | 10/2008 | Koster | 725/59 |

(Continued)

FOREIGN PATENT DOCUMENTS

| | | |
|---|---|---|
| KR | 20090083274 A | 8/2009 |
| KR | 20120038304 A | 4/2012 |

*Primary Examiner* — Mushfikh Alam
(74) *Attorney, Agent, or Firm* — McKenna Long & Aldridge LLP

(57) ABSTRACT

A method of processing an interactive service and an apparatus thereof are disclosed. The present invention includes sending a discovery message to a second screen application, receiving a request for descriptions of the second screen support services, sending a response with the descriptions, receiving a trigger, and delivering the trigger to the second device using a trigger service.

24 Claims, 66 Drawing Sheets

| Segment of Show A | Ad 1 | Ad 2 | Segment of Show B | Ad 3 | Ad 4 | Segment of Show B | Ad 5 |
|---|---|---|---|---|---|---|---|
| | | | | | | | |

(56) References Cited

U.S. PATENT DOCUMENTS

2010/0098074 A1* 4/2010 Kokernak et al. .............. 370/389
2010/0169943 A1* 7/2010 Shannon et al. .............. 725/106
2011/0087539 A1* 4/2011 Rubinstein et al. ........ 705/14.41
2011/0088075 A1* 4/2011 Eyer .............................. 725/114
2011/0138290 A1* 6/2011 Park et al. ..................... 715/734
2011/0307920 A1* 12/2011 Blanchard et al. .............. 725/32
2011/0314493 A1* 12/2011 Lemire et al. ................... 725/32

* cited by examiner

FIG. 1

| Segment of Show A | Ad 1 | Ad 2 | Segment of Show B | Ad 3 | Ad 4 | Segment of Show B | Ad 5 |

FIG. 4

```
Trigger     = locator_part [ "?" terms ]

locator_part = hostname "/" path_segments hostname    = *( domainlabel "." ) toplabel
domainlabel = alphanum | alphanum *( alphanum | "-" ) alphanum
toplabel    = alpha | alpha *( alphanum | "-" ) alphanum path_segments = segment *( "/" segment )
segment     = 1*alphanum terms       = ( event_time | media_time ) [ "&" spread ] [ "&" others ]
event_time  = "e=" 1*digit [ "&t=" 1*7hexdigit ]
media_time  = "m=" 1*7hexdigit
others      = other [ "&" other ]
other       = resv_cmd "=" 1*alphanum
spread      = "s=" 1*digit
resv_cmd    = <any alphanum except "c", "e", "E", "m", "M", "s", "S", "t", or "T"> alphanum    = alpha | digit
alpha       = lowalpha | upalpha lowalpha = "a" | "b" | "c" | "d" | "e" | "f" | "g" | "h" | "i" |
           "j" | "k" | "l" | "m" | "n" | "o" | "p" | "q" | "r" |
           "s" | "t" | "u" | "v" | "w" | "x" | "y" | "z"
upalpha  = "A" | "B" | "C" | "D" | "E" | "F" | "G" | "H" | "I" |
           "J" | "K" | "L" | "M" | "N" | "O" | "P" | "Q" | "R" |
           "S" | "T" | "U" | "V" | "W" | "X" | "Y" | "Z"
digit    = "0" | "1" | "2" | "3" | "4" | "5" | "6" | "7" |
           "8" | "9"
hexdigit = "0" | "1" | "2" | "3" | "4" | "5" | "6" | "7" |
           "8" | "9" | "a" | "b" | "c" | "d" | "e" | "f"
```

FIG. 5

Table 8.1 TDO Parameters Table Structure

| Element/Attribute (with @) | No. allowed | Data Type | Description & Value |
|---|---|---|---|
| TPT | | | |
| @majorProtocolVersion | 1 | Integer, range 0..15 | Major Protocol Version |
| @minorProtocolVersion | 0..1 | integer, range 0..15 | Minor Protocol version |
| @id | 1 | anyURI | segment_id = domain_name/program_id |
| @tptVersion | 1 | unsignedByte | Data version of this TPT |
| @expireDate | 0..1 | dateTime | Date after which this TPT will not be used |
| @updatingTime | 0..1 | unsignedShort | Time interval to check for TPT updates |
| @serviceID | 0..1 | unsignedShort | NRT service_id |
| @baseURL | 0..1 | anyURI | Base URL for all relative URLs in TPT |
| Capabilities | 0..1 | nrt:CapabilitiesType | Essential capabilities for the segment associated with this TPT |
| LiveTrigger | 0..1 | | Info on Internet live trigger delivery |
| @URL | 1 | anyURI | URL of server for live triggers |
| @pollPeriod | 0..1 | unsignedByte | Short polling period in seconds |
| TDO | 1..N | | TDO (app) for the segment associated with this TPT |
| @appID | 1 | unsignedShort | Application ID of this app, unique within the scope of this TPT |
| @appType | 0..1 | integer, range 0-15 | Application type (default: 1="TDO") |
| @appName | 0..1 | string | Display name (for viewer launch consent) |
| @globalID | 0..1 | anyURI | Globally unique app ID |
| @appVersion | 0..1 | unsignedByte | Version of this app |
| @cookieSpace | 0..1 | unsignedByte | Persistent storage needed; default=0 |
| @frequencyOfUse | 0..1 | integer, range 0..15 | code values per Table 8.2 |
| @expireDate | 0..1 | dateTime | Expire date for caching this app |

FIG. 6

| | | | | |
|---|---|---|---|---|
| | @testTDO | 0..1 | boolean | Flag for test app; default="false" |
| | @availInternet | 0..1 | boolean | Default="true" |
| | @availBroadcast | 0..1 | boolean | Default="true" |
| | URL | 1..N | anyURI | App URL(s) |
| | | @entry | 0..1 | boolean | Indicator of entry point; default = "false" |
| | Capabilities | 0..1 | nrt:CapabilitiesType | Essential capabilities to present this app |
| | ContentItem | 0..N | | Content item used by this app |
| | | URL | 1..N | anyURI | URL(s) of content item |
| | | | @entry | 0..1 | boolean | Indicator of entry point ; default = "false" |
| | | @updatesAvail | 0..1 | boolean | Default="false" |
| | | @pollPeriod | 0..1 | unsignedByte | Short polling period in seconds |
| | | @size | 0..1 | 24-bit integer | Size of content item, in kilobytes |
| | | @availInternet | 0..1 | boolean | Default="true" |
| | | @availBroadcast | 0..1 | boolean | Default="true" |
| | Event | 1..N | | Event targeted to this TDO |
| | | @eventID | 1 | unsignedShort | Unique identifier of this Event element within the scope of the TDO element. |
| | | @action | 1 | string | Allowed values are "prep", "exec", "susp", and "kill" |
| | | @destination | 0..1 | unsignedByte | Device to which the event is directed (primary screen, second screen, or both) |
| | | @diffusion | 0..1 | unsignedByte | Period for applying diffusion, in seconds |
| | | Data | 0..N | base64Binary | Data to be used for this event |
| | | | @dataID | 1 | unsignedShort | Unique identifier of this Data element within the scope of the Event element. |

FIG. 7

Table 8.2 Meaning of Frequency of Use attribute values

| "frequencyOfUse" value | Meaning |
|---|---|
| 0 | One-time use only |
| 1 | Hourly |
| 2 | Daily |
| 3 | Weekly |
| 4 | Monthly |
| 5-15 | Reserved |

FIG. 8

Table 8.3 Meaning of "destination" attribute values

| "destination" value | Meaning |
|---|---|
| 0 | reserved |
| 1 | primary device only |
| 2 | one or more secondary devices only |
| 3 | Primary device and/or one or more secondary devices |

FIG. 9

| Syntax | No. Bits | Format |
|---|---|---|
| binary_tdo_parameters_table { | | |
|    reserved | 2 | '11' |
|    expire_date_included | 1 | bslbf |
|    segment_id_length | 5 | uimsbf |
|    segment_id | var | bslbf |
|    base_URL_length | 8 | uimsbf |
|    base_URL | var | bslbf |
|    If (expire_date_included=='1') { | | |
|       expire_date | 32 | usmsbf |
|    } | | |
|    trigger_server_URL_length | 8 | uimsbf |
|    trigger_server_URL | var | bslbf |
|    If (trigger_server_URL_length != 0) { | | |
|       reserved | 7 | '1111' |
|       trigger_delivery_type | 1 | uimsbf |
|       if (trigger_delivery_type == 0) { | | |
|          poll_period | 8 | uimsbf |
|       } | | |
|    } | | |
|    num_apps_in_table | 8 | uimsbf |
|    for (k=0; k< num_apps_in_table; k++) { | | |
|       app_id | 16 | uimsbf |
|       app_type_included | 1 | bslbf |
|       app_name_included | 1 | bslbf |

FIG. 10

| | | |
|---|---|---|
| global_id_included | 1 | bslbf |
| app_version_included | 1 | bslbf |
| cookie_space_included | 1 | bslbf |
| frequency_of_use_included | 1 | bslbf |
| expire_date_included | 1 | bslbf |
| reserved | 1 | '1' |
| If(app_type_included=='1') { | | |
|     app_type | 8 | uimsbf |
| } | | |
| If(app_name_included == '1') { | | |
|     app_name_length | 8 | uimsbf |
|     app_name | Var | bslbf |
| } | | |
| If (global_id_included == '1') { | | |
|     global_id_length | 8 | uimsbf |
|     global_id | Var | bslbf |
| } | | |
| If (app_version_included=='1') { | | |
|     app_version | 8 | uimsbf |
| } | | |
| If (cookie_space_included=='1') { | | |
|     cookie_space | 8 | uimsbf |
| } | | |
| if (frequency_of_use_included) { | | |
|     frequency_of_use | 8 | uimsbf |

FIG. 11

| | | |
|---|---|---|
| } | | |
| if (expire_date_included) { | | |
|    expire_date | 32 | uimsbf |
| } | | |
| test_app | 1 | bslbf |
|    available_on_internet | 1 | bslbf |
|    available_in_broadcast | 1 | bslbf |
| reserved | 1 | '1' |
| number_URLs | 4 | |
| for (j=0; j<number_URLs; j++) { | | |
|    URL_length | 8 | uimsbf |
|    URL | var | |
| } | | |
| number_content_items | 8 | uimsbf |
| for (j=0; j<number_content_items;j++) { | | |
|    updates_avail | 1 | bslbf |
|    avail_internet | 1 | bslbf |
|    avail_broadcast | 1 | bslbf |
|    content_size_included | 1 | bslbf |
|    number_URLs | 4 | uimsbf |
|    for (i=0; i<number_URLs; i++) { | | |
|      URL_length | 8 | uimsbf |
|      URL | var | bslbf |
|    } | | |
|    if (content_size_included) { | | |

FIG. 12

| | | |
|---|---|---|
| content_size | 24 | uimsbf |
| } | | |
| num_content_descriptors | 8 | uimsbf |
| for (i=0; i<num_content_descriptors; i++) { | | |
|    content_descriptor() | var | bslbf |
| } | | |
| } | | |
| number_events | 16 | uimsbf |
| for (i=0; i<num_events; i++) { | | |
|    event_id | 16 | uimsbf |
|    action | 5 | uimsbf |
|    destination_included | 1 | bslbf |
|    diffusion_included | 1 | bslbf |
|    data_included | 1 | bslbf |
|    If (destination_included == ?? { | | |
|      destination | 8 | |
|    } | | |
|    If (diffusion_included == ?? { | | |
|      diffusion | | |
|    } | | |
|    If (data_included == ? ? { | | |
|      data_size | 8 | |
|      data_bytes | var | bslbf |
|    } | 8 | uimsbf |
| } | | |

FIG. 13

| | | |
|---|---|---|
| num_app_descriptors | 8 | uimsbf |
| for (i=0; i<num_app_descriptors; i++) { | | |
|     app_descriptor() | var | bslbf |
| } | | |
| } | | |
| num_TPT_descriptors | 8 | uimsbf |
| for (i=0; i<num_TPT_descripto+) { | | |
|     TPT_descriptor() | var | bslbf |
| } | | |
| } | | |

FIG. 14

Table 8.4 Activation Messages Table Structure

| Element/Attribute (with @) | No. allowed | Data Type | Description & Value |
|---|---|---|---|
| AMT | | | |
|   @majorProtocolVersion | 1 | integer 0-15 | Major protocol version |
|   @minorProtocolVersion | 0..1 | Integer 0-15 | Minor protocol version |
|   @segmentId | 1 | anyURI | domain_name/program_id = segment id |
|   @beginMT | 0..1 | unsignedInt | Start time of this segment time scope |
|   Activation | 1..N | | Activation message |
|     @targetTDO | 1 | unsignedShort | appID of target TDO |
|     @targetEvent | 1 | unsignedShort | eventID of target Event in target TDO |
|     @targetData | 0..1 | unsignedShort | dataID of target Data in target Event |
|     @startTime | 1 | unsignedInt | Start time of action period |
|     @endTime | 0..1 | unsignedInt | End time of action period |

FIG. 15

Table 8.5 URL List Structural Diagram

| Element/Attribute (with @) | | No. allowed | Data Type | Description & Value |
|---|---|---|---|---|
| UrlList | | | | List of potentially useful URLs |
| | TptUrl | 0..N | anyURI | URL of TPT for future segment |
| | NrtSignalingUrl | 0..1 | anyURI | URL of NRT Signaling Server |
| | UrsUrl | 0..1 | anyURI | URL of Usage Reporting Server |
| | PdiUrl | 0..1 | anyURL | URL of PDI-Q table |

FIG. 16

| Syntax | No. Bits | Format |
|---|---|---|
| tpt_section () { | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         sequence_number | 8 | uimsbf |
|     } | | |
|     reserved | 2 | '11' |
|     TPT_data_version | 5 | uimsbf |
|     current_next_indicator | 1 | '1' |
|     section_number | 8 | uimsbf |
|     last_section_number | 8 | uimsbf |
|     service_id | 16 | uimsbf |
|     tpt_bytes() | var | bslbf |
| } | | |

FIG. 17

```
<?xml version="1.0" encoding="UTF-8"?>
<xs:schema xmlns:xs="http://www.w3.org/2001/XMLSchema">
  <xs:element name="UrlList">
    <xs:complexType>
      <xs:sequence>
        <xs:element name="TptUrl" type="xs:anyURI" minOccurs="0" maxOccurs="unbounded"/>
        <xs:element name="NrtSignalingUrl" type="xs:anyURI" minOccurs="0"/>
      </xs:sequence>
    </xs:complexType>
  </xs:element>
</xs:schema>
```

FIG. 18

| Void addTriggerEventListener(Number eventId, EventListener listener) | | |
|---|---|---|
| Description | Add a listener for the Event designated by eventId within the scope of the currently executing TDO in the TPT. When this Event is activated by an Activation Trigger, the listener shall be called, and an object of type TriggerEvent type shall be passed to it. | |
| Arguments | eventId | The eventId of the Event element in the TPT |
| | listener | The listener for the event |

FIG. 19

| Void removeTriggerEventListener(Number eventId, EventListener listener) | | |
|---|---|---|
| Description | Remove the designated listener for the Event designated by eventId. | |
| Arguments | eventId | The eventId of the Event element in the TPT |
| | listener | The listener for the event |

FIG. 20

```
Interface EventListener {
    handleEvent(in TriggerEvent event);
};
```

FIG. 21

| Interface TriggerEvent : Event {<br>    readonly attribute String eventId;<br>    readonly attribute String data;<br>    readonly attribute DOMString status;<br>} | | |
|---|---|---|
| Properties | eventId | The eventId of the Event element in the TPT |
| | data | The data for this activation of the event, in hexadecimal |
| | status | Status of the event, equal to "trigger" when the Event is activated in response to an Activation Trigger, or "error" when some kind of error occurred. |

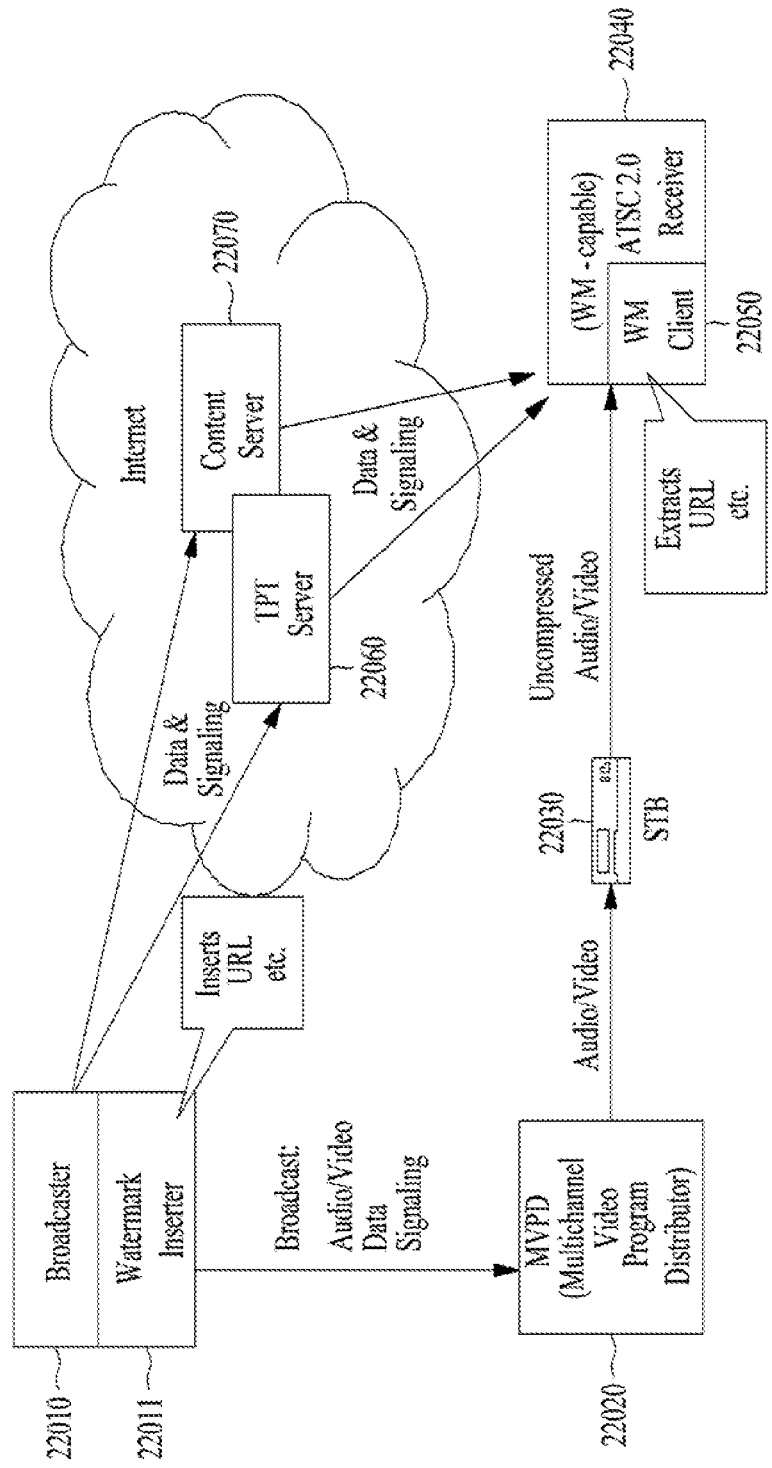

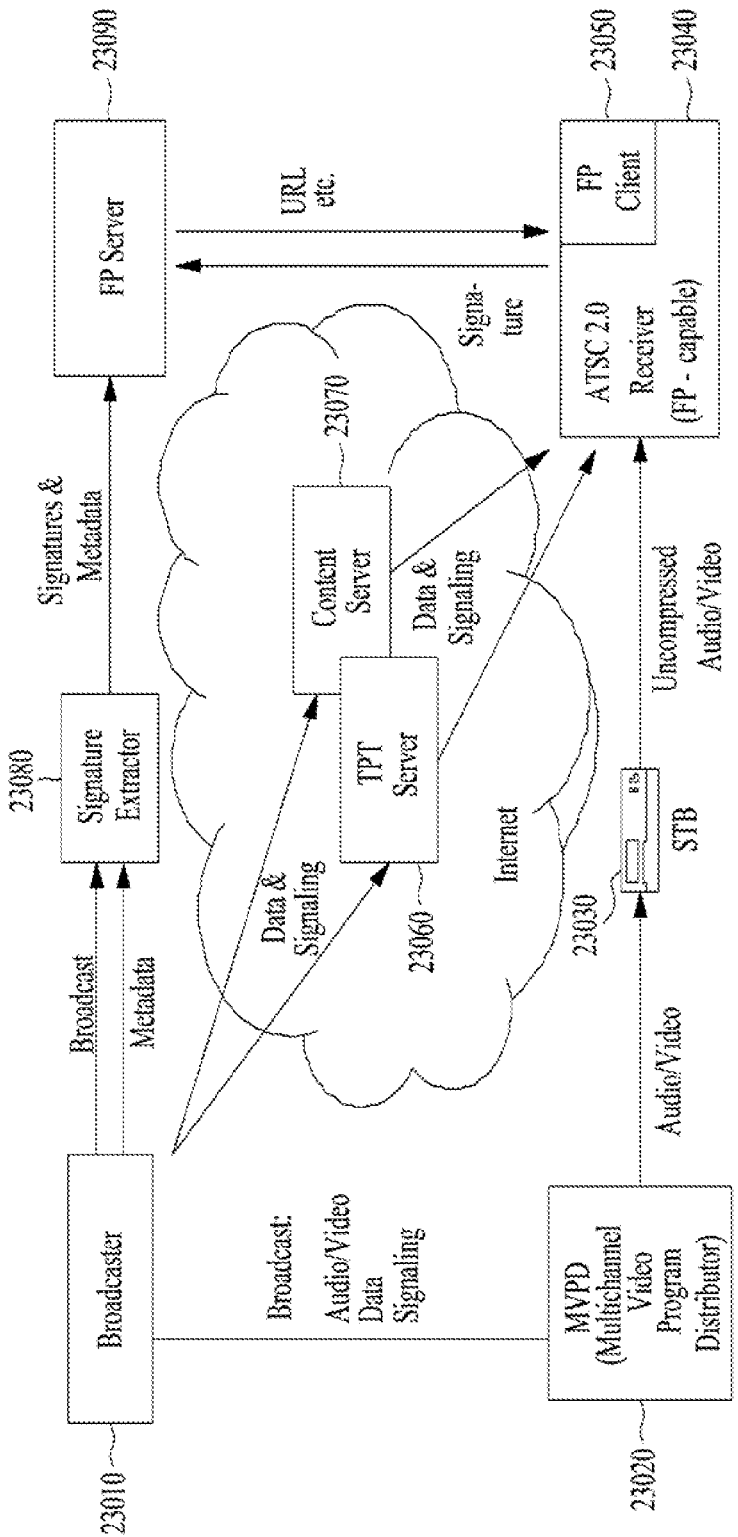

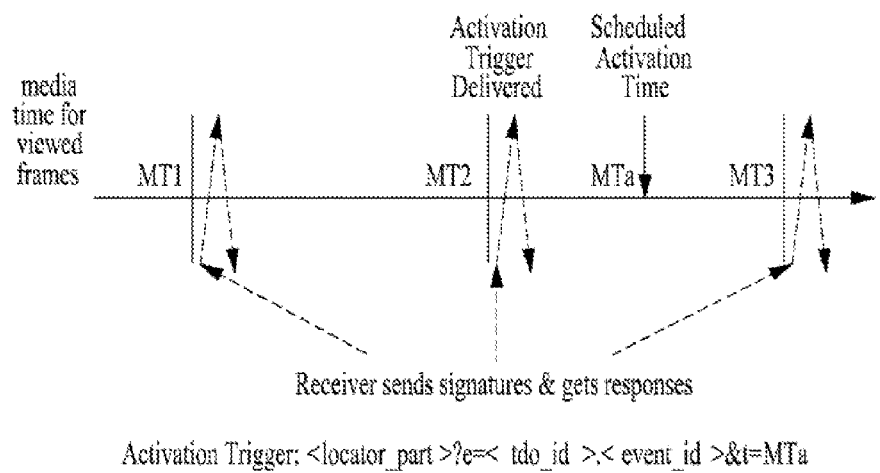
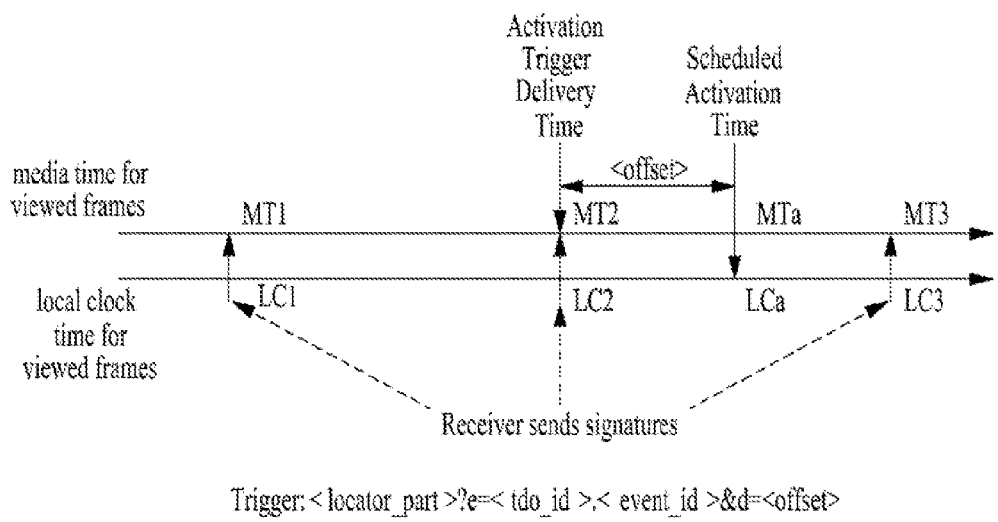

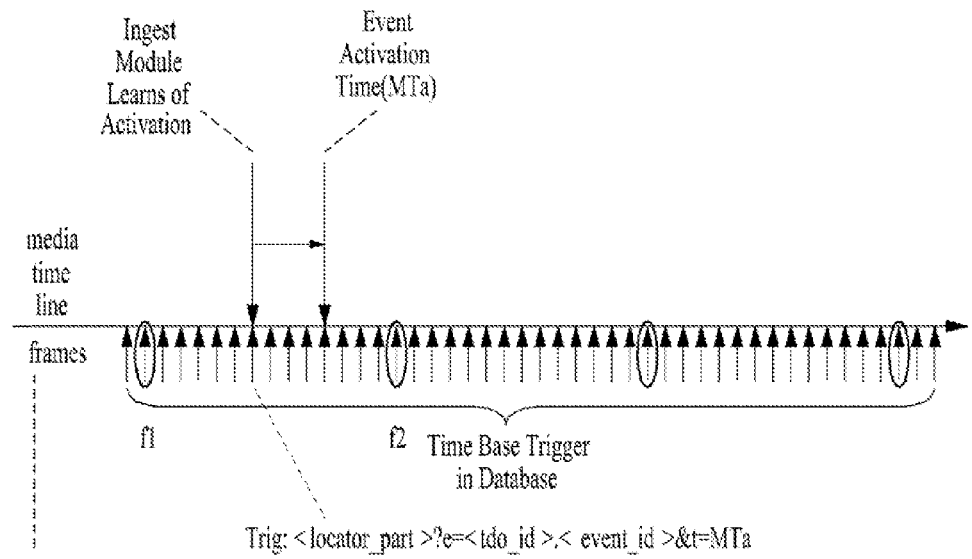
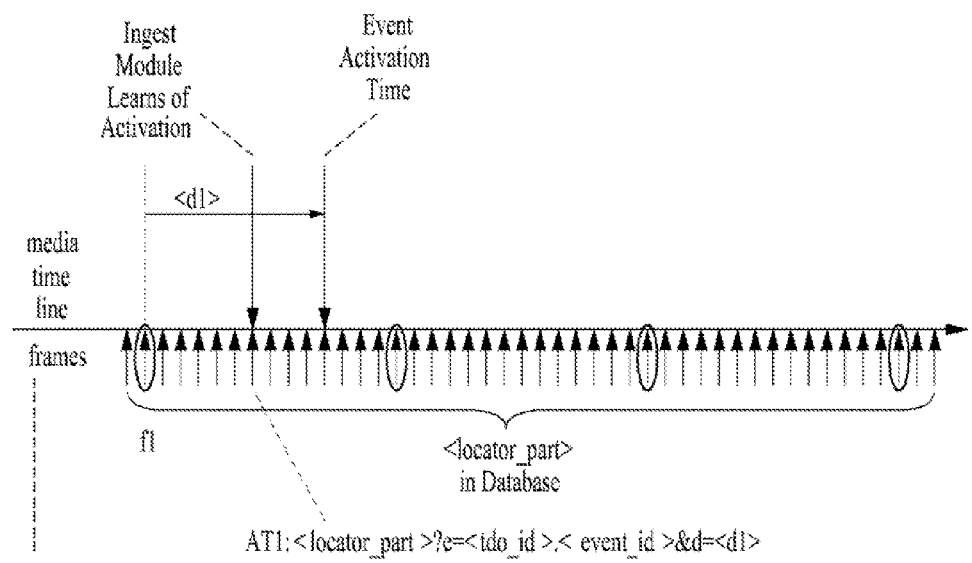

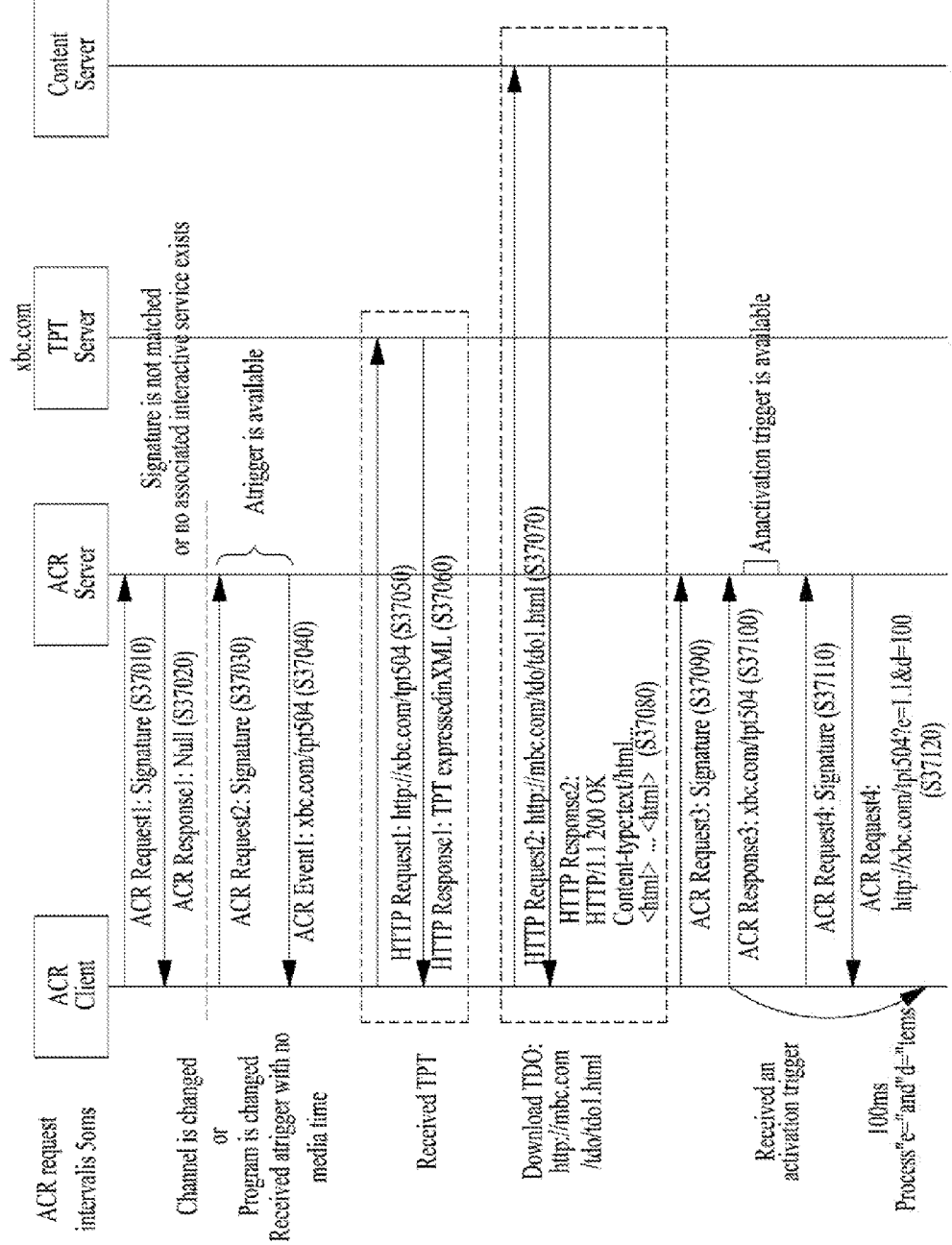

FIG. 39

| Action Name | Description |
| --- | --- |
| Connection / Disconnection | Return current connections |
| GetCurrentConnection | Return current connection list |
| GetDeviceProfile | Return 'DeviceProfile' as expressed in XML |
| GetUIListing | Return 'compatibleUIs' as expressed in XML |
| AddUIListing / RemoveUIListing | Add URL of Remote UI and Remove it from UI Listing in a device |
| ProcessInput | Send a data to RemoteUI Client Service |
| DisplayMessage | Display a message on a device which includes RemoteUI Client Service |

FIG. 47

| Second Screen Application Lifecycle Managing Entity | Transmission Sequence | Transmission Data | | |
|---|---|---|---|---|
| | | URIString (DTVCC) | URL | @Data |
| Receiver | Broadcaster → Receiver(RemoteUI Server service, TDO URL ) ← → Second Screen Service Application | x | o | x |
| Receiver | Broadcaster → Receiver → Second Screen Service Application(Remote UI Client Service, AddUIListing, TDO URL) | x | o | x |
| Second Screen Service Application | Broadcaster → Receiver ← → Second Screen Service Application(RemoteUI Client Service, ProcessInput, Regenerating XML from TPT for Second Screen) | x | x | o |
| Second Screen Service Application | Broadcaster → Receiver → Second Screen Service Application(Remote UI Client Service, AddUIListing, DTVCC URIString) | o | x | x |
| Second Screen Service Application | Broadcaster → Receiver(RemoteUI Server Service, UIUpdate Event, DTVCC URIString) → Second Screen Service Application | o | x | x |

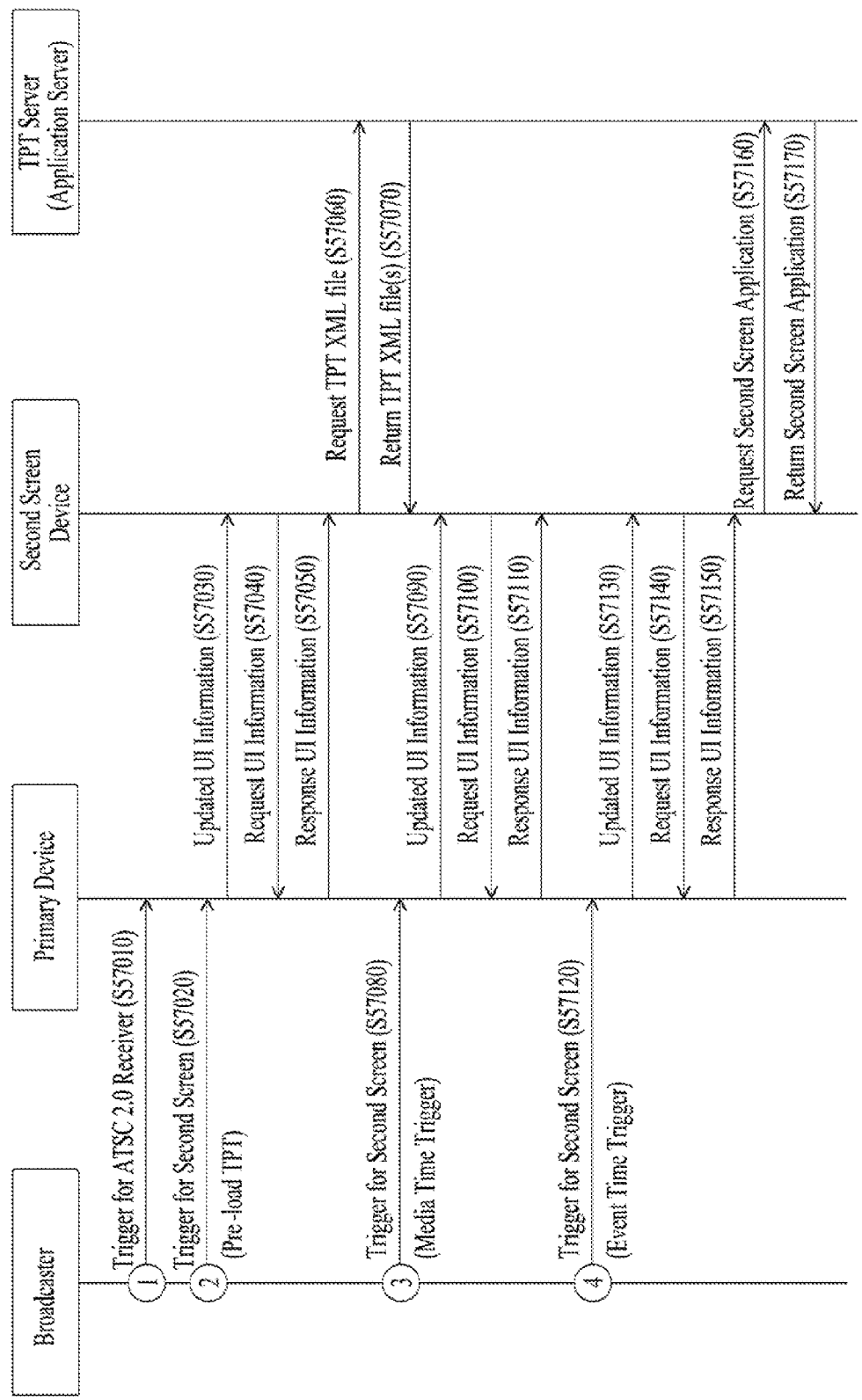

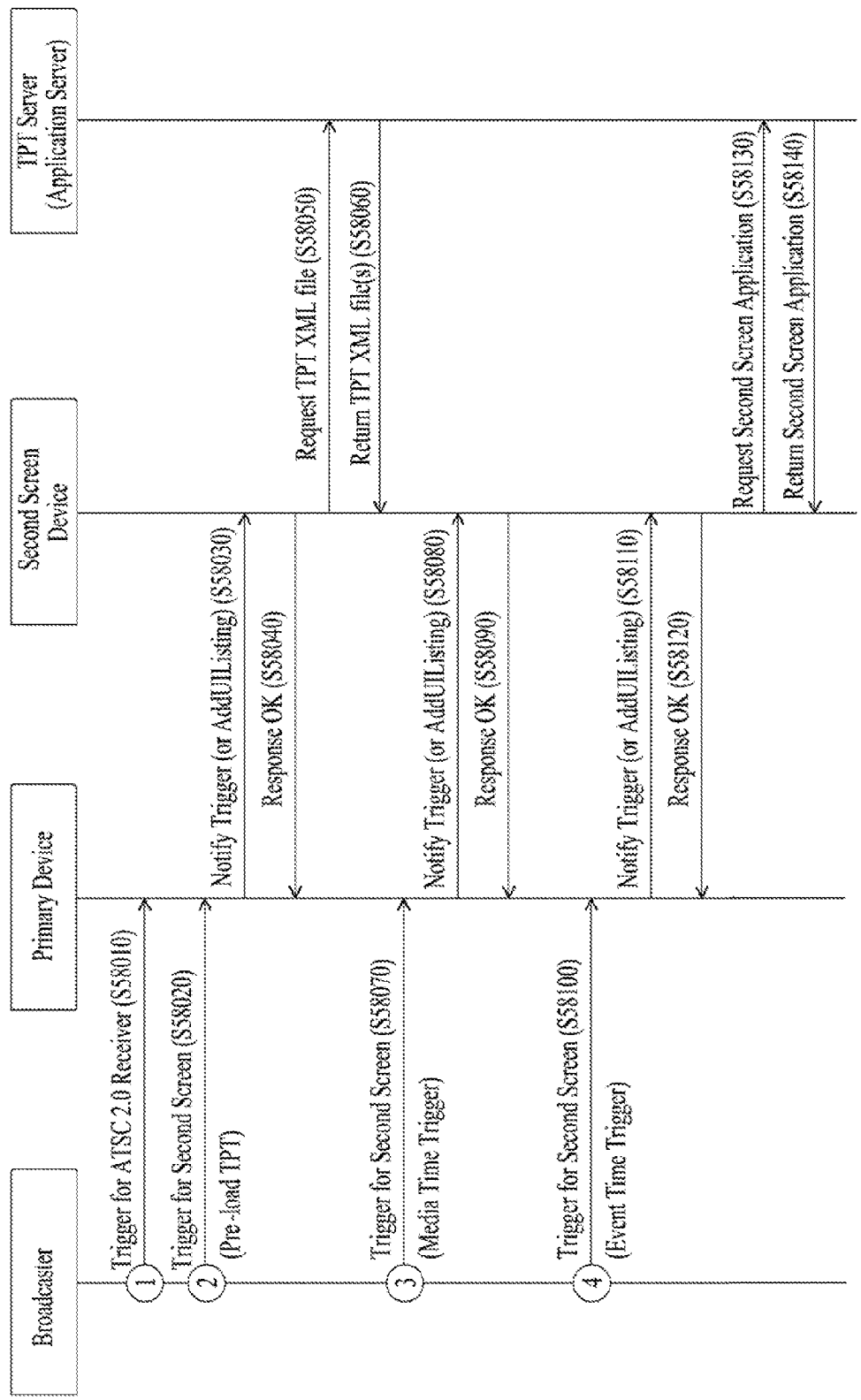

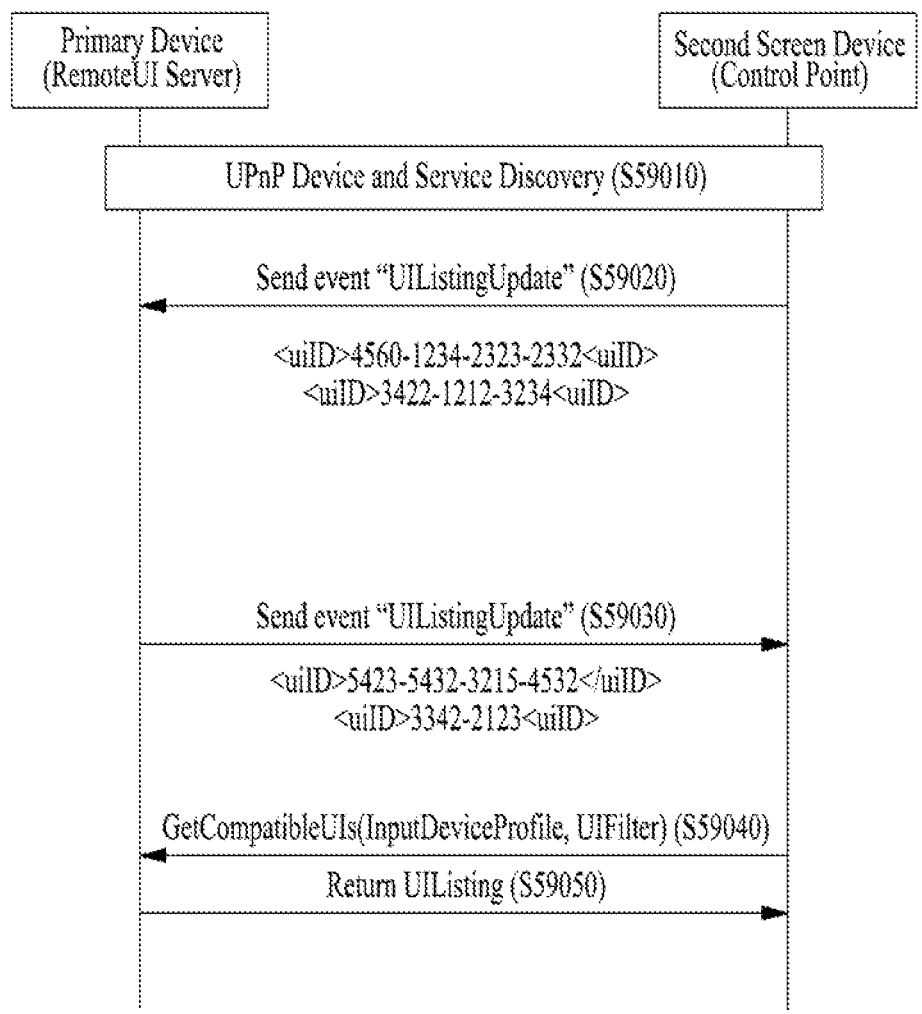

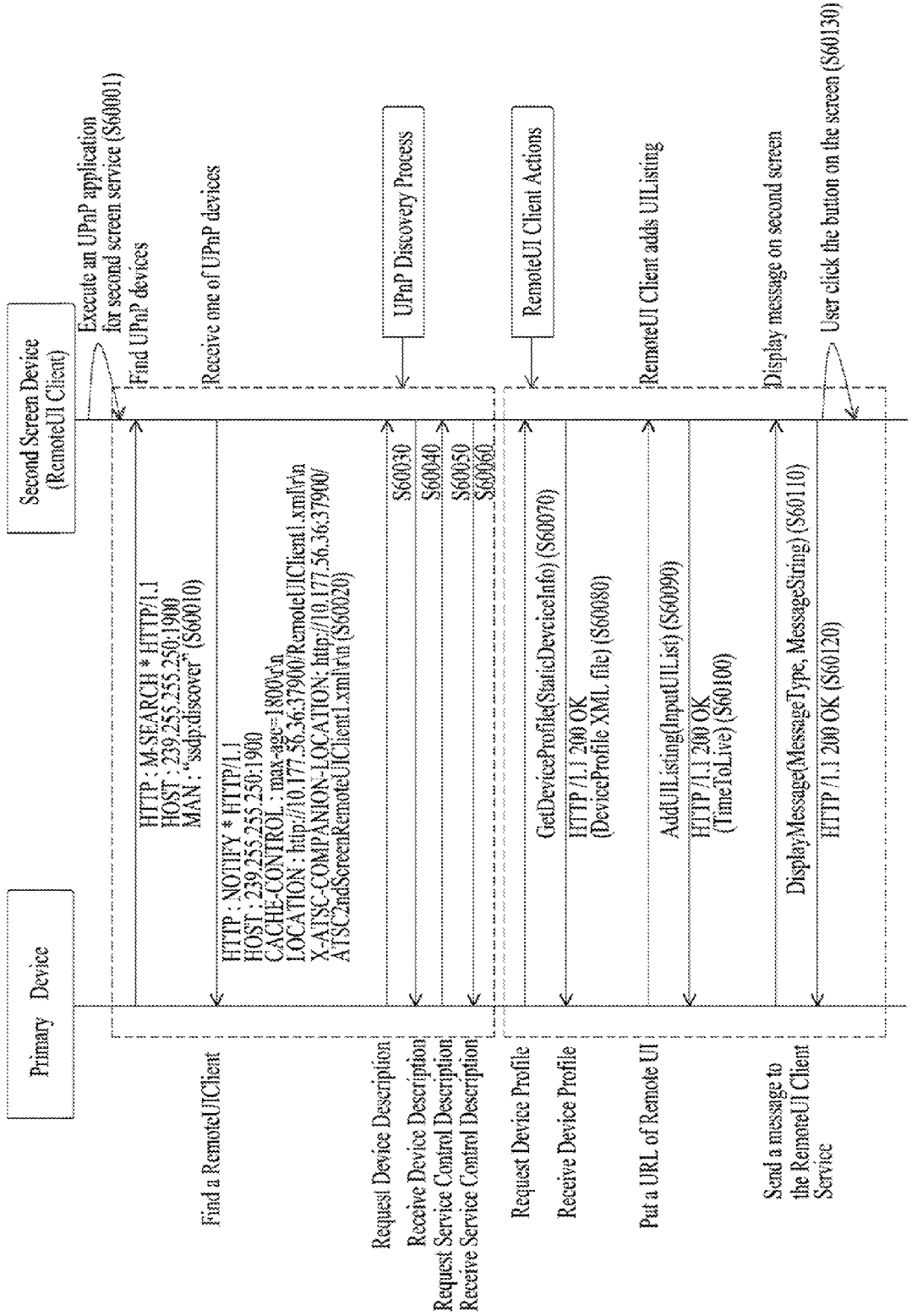

FIG. 61

```xml
<?xml version="1.0" encoding="UTF-8"?>
<xs:schema xmlns="urn:schemas-upnp-org:remoteui:devprofile-1-0"
xmlns:xs="http://www.w3.org/2001/XMLSchema" elementFormDefault="qualified"
attributeFormDefault="unqualified" id="deviceprofile">
    <xs:element name="deviceprofile">
        <xs:complexType>
            <xs:sequence>
                <xs:element name="maxHoldUI" type="xs:unsignedInt" default="0" minOccurs="0"/>
                <xs:element name="protocol" maxOccurs="unbounded">
                    <xs:complexType>
                        <xs:sequence>
                            <xs:element name="protocolInfo" type="xs:anyType" nillable="true" minOccurs="0"/>
                        </xs:sequence>
                        <xs:attribute name="shortName" type="xs:string" use="required" form="unqualified"/>
                    </xs:complexType>
                </xs:element>
            </xs:sequence>
        </xs:complexType>
    </xs:element>
</xs:schema>
```

FIG. 62

```xml
<?xml version="1.0" encoding="UTF-8"?>

<deviceprofile xsi:noNamespaceSchemaLocation="DeviceProfile.xsd"
xmlns:xsi="http://www.w3.org/2001/XMLSchema-instance">

<maxHoldUI>0</maxHoldUI>

<protocol shortName="HTTP/HTML">

<protocolInfo>version=1.0,displayWidth=640,displayHeight=480,
imageEncoding=*,serviceProfile=atsc2.0, serviceType=SecondScreenApplication, browserProfile=HTML4,
supportTDO=No,tptVersion=1.0</protocolInfo>

</protocol>

</deviceprofile>
```

FIG. 63

| Tag name | Type of variable | Definition | Description |
|---|---|---|---|
| version | String | Protocol version | This shows a version of profile of second screen services. The value can be changed when at least one of the profile is updated. UI can be compatible with lower version of protocol. |
| displayWidth | Unsigned integer | Width(Number of pixel) | Width resoluion of Second Screen |
| displayHeight | Unsigned integer | Height(number of pixel) | Height resoluion of Second Screen |
| imageEncoding | String | MIME Type or file extension | Images that can be received and displayed by Second Screen Device. |
| serviceProfile | String | Name of a supporting standard profile (ATSC 2.0, ATSC 2.1,...) | Profile that can be supported by the name of Second Screen Profile. |
| serviceType | String | Second Screen Application, Usage Measurement, etc. | It tells whether this is a second screen service or not. |
| tptVersion | String | Supporting TPT version | Version of TPT which can be supported by Second Screen. |
| browserProfile | String | Supporting Browser version | Version of HTML4, CSS, EMCAScript can be stated by using browser profile supported by Second screen. |
| supportTDO | Boolean | Whether there is a second screen able to operate TDO (Yes, No) | It can be stated that whether Second Screen is capable to operate and process TDO. |
| enableTriggerClient | Boolean | Whether there is a Trigger Client Module which can process Triggers.(Yes, No) | It can be stated that whether Second Screen has a module which can process Trigger Syntax, Parameter and TDO Parameter Table. |

FIG. 64

```xml
<?xml version="1.0" encoding="UTF-8"?>
<uilist xsi:noNamespaceSchemaLocation="A_ARG_TYPE_CompatibleUIs.xsd"
    xmlns:xsi="http://www.w3.org/2001/XMLSchema-instance">
    <ui>
        <uiID>4560-23233267-7642</uiID>
        <name> ATSC 2.0 Second Screen Service </name>
        <description>ATSC 2.0 Second Screen Appliaction </description>
        <iconList>
            <icon>
                <mimetype>image/png </mimetype>
                <width>160</width>
                <height>160</height>
                <depth>24</depth>
                <url>icon160.png </url>
            </icon>
        </iconList>
        <lifetime>-1</lifetime>
        <protocol shortName="HTTP/HTML">
            <uri> http://1.8.7.2:333/SecondScreen/XBC/programA.html </uri>
            <protocolInfo>
serviceProfile=ATSC2.0,serviceType=SecondScreen,displayWidth=640,displayheight=480,version=1.0
            </protocolInfo>
        </protocol>
    </ui>
</uilist>
```

FIG. 68

| Element/Attribute (with @) | No. allowed | Data Type | Description @Value |
|---|---|---|---|
| TDO | | | |
| @appID | 0...1 | Unsigned int | Unique Identifier of Second Screen Application for reference by Trigger |
| @mediaTime | 1 | unsignedInt | Media time of playing content in Receiver |
| URL | 1...N | anyURI | TDO URL(s) |
| Event | 0...N | Complex Type | Event Triggered to this TDO |
| @eventID | 1 | Unsigned short | Event ID for reference by trigger |
| @action | 1 | Unsigned Byte | Action Code (e.g, Register, Execute, Terminate and so on) |
| Data | 0...1 | Base64Binary | Data to be used by this TDO for stream event |
| @startTime | 1 | unsignedInt | Indicate the start of the valid time period for the event of Second Screen Service, which is relative to @mediaTime |
| @endTime | 0...1 | unsignedInt | Indicate the end of the valid time period for the event of Second Screen Service, which is relative to @mediaTime |

FIG. 69
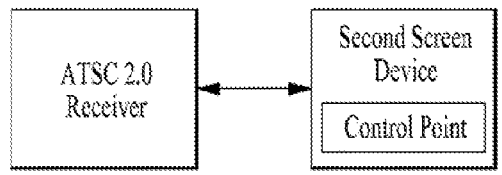
FIG. 70
| Service | Service Type | Service ID |
|---|---|---|
| Trigger | atsc2.0trig:1 | urn:atsc.org:serviceId:atsc2.0trig1 |
| Two-Way Communication | atsc2.0twcomm:1 | urn:atsc.org:serviceId:atsc2.0twcomm1 |
| AppURL | atsc2.0urls.1 | urn:atsc.org:serviceID:atsc2.0urls1 |
| HTTP Proxy Server | atsc2.0hps:1 | urn:atsc.org:serviceId:atsc2.0hps1 |
FIG. 71
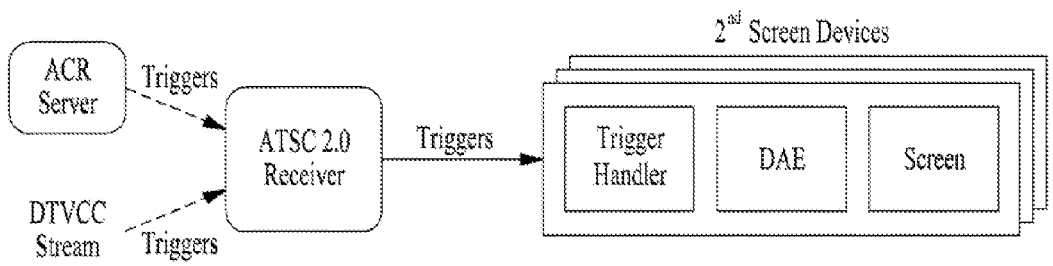
FIG. 72
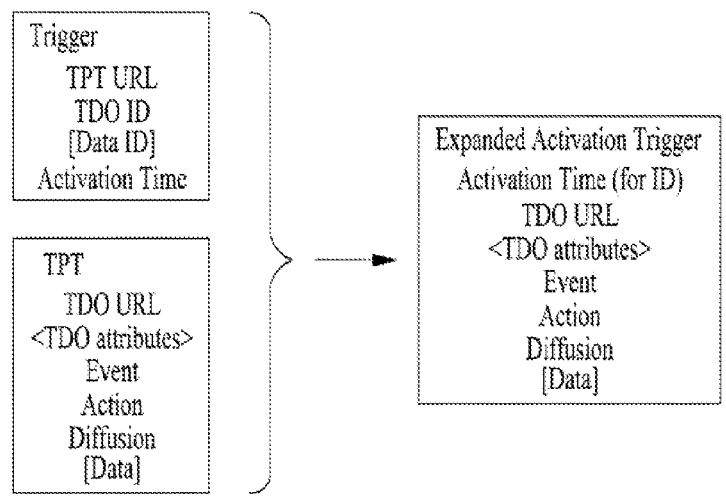

FIG. 73

| XML Element/Attribute | | Card-inality | XML data type | Description |
|---|---|---|---|---|
| AugmentedTrigger | | 1 | | |
| | @interactionModel | 1 | unsignedByte | Interaction model associated with the Trigger |
| | @appURL | 1 | anyURI | URI of app identified in Trigger |
| | @cookieSpace | 0..1 | unsignedByte | Persistent storage space needed |
| | Capabilities | 0..1 | nrt:Capabilitiestype | Capabilities needed to present app |
| | Event | 1 | | Event identified in Trigger |
| | @action | 1 | unsignedByte | Action field of Event |
| | @destination | 0..1 | unsignedByte | Type of device targeted by Event |
| | @diffusion | 0..1 | unsignedByte | Time spread for activation of Event |
| | @data | 0..1 | base64Binary | Data identified in Trigger (in any) |

FIG. 74

| XML Element/Attribute | | Card-inality | XML data type | Description |
|---|---|---|---|---|
| Trigger | | 1 | | |
| | @interactionModel | 0..1 | unsignedByte | Interaction model associated with the Trigger |
| | @triggerString | 1 | string | Trigger string |

FIG. 75

| Element/Attribute | | Cardinality | XML datatype | Description |
|---|---|---|---|---|
| AugmentedTrigger | | 1 | | |
| | @activationTime | 1 | unsignedInt | Activation time, on media time scale |
| | @tdoURL | 1 | anyURI | URI of TDO identified in Trigger |
| | @cookieSpace | 0..1 | unsignedByte | Persistent storage space needed |
| | Capabilities | 0..1 | nrt:Capabilitiestype | Capabilites needed to Present TDO |
| | Event | 1 | | Event identified in Trigger |
| | | @action | 1 | unsignedByte | Action field of Event |
| | | @destination | 0..1 | unsignedByte | Type of device targeted by Event |
| | | @diffusion | 0..1 | unsignedByte | Time spread for activation of Event |
| | | Data | 0..1 | base64Binary | Data identified in Trigger (in any) |

FIG. 76

| Element/Attribute | | Cardinality | XML datatype | Description |
|---|---|---|---|---|
| AugmentedTrigger | | 1 | | |
| | @activationTime | 1 | unsignedInt | Activation time, on media time scale |
| | @tdoURL | 1 | anyURI | URI of TDO identified in Trigger |
| | @cookieSpace | 0..1 | unsignedByte | Persistent storage space needed |
| | @availInternet | 0..1 | boolean | Default="true" |
| | @availBroadcast | 0..1 | boolean | Default="true" |
| | Capabilities | 0..1 | nrt:Capabilitiestype | Capabilites needed to present TDO |
| | Event | 1 | | Event identified in Trigger |
| | | @action | 1 | unsignedByte | Action field of Event |
| | | @destination | 0..1 | unsignedByte | Type of device targeted by Event |
| | | @diffusion | 0..1 | unsignedByte | Time spread for activation of Event |
| | | Data | 0..1 | base64Binary | Data identified in Trigger (in any) |

FIG. 77

| Element/Attribute | | | Cardinality | XML datatype | Description |
|---|---|---|---|---|---|
| AugmentedTrigger | | | 1 | | |
| | @activationTime | | 1 | unsignedInt | Activation time, on media time scale |
| | @tdoURL | | 1 | anyURI | URI of TDO identified in Trigger |
| | @cookieSpace | | 0..1 | unsignedByte | Persistent storage space needed |
| | Capabilities | | 0..1 | nrt:Capabilitiestype | Capabilites needed to present TDO |
| | ContentItem | | 0..N | | Content item used by this TDO |
| | | URL | 1..N | anyURI | URL(s) of content items |
| | | @updatesAvail | 0..1 | boolean | Default="false" |
| | | @pollPeriod | 0..1 | unsignedByte | Short polling period in seconds |
| | | @size | 0..1 | 24 - bit integer | Size of content item, in kilobytes |
| | | @availInternet | 0..1 | boolean | Default="true" |
| | | @availBroadcast | 0..1 | boolean | Default="true" |
| | Event | | 1 | | Event identified in Trigger |
| | | @action | 1 | unsignedByte | Action field of Event |
| | | @destination | 0..1 | unsignedByte | Type of device targeted by Event |
| | | @diffusion | 0..1 | unsignedByte | Time spread for activation of Event |
| | | Data | 0..1 | base64Binary | Data identified in Trigger (in any) |

FIG. 78

| Activation time | | | 1 | unsignedInt | Activation time of the event |
|---|---|---|---|---|---|
| TDO | | | 1 | | TDO for this segment |
| | @appID | | 1 | unsignedShort | Application ID, for reference by trigger |
| | @appType | | 0..1 | integer, range 0-15 | Application type (default: 1 ="TDO") |
| | @appName | | 0..1 | string | Display name (for viewer launch consent) |
| | @globalId | | 0..1 | anyURI | Globally unique app ID |
| | @appVersion | | 0..1 | unsignedByte | Version of this app |
| | @cookieSpace | | 0..1 | unsignedByte | Persistent storage needed; default=0 |
| | @frequencyOfUse | | 0..1 | integer, range 0..15 | code values TBD |
| | @expireDate | | 0..1 | dateTime | Expire date for caching |
| | @testTDO | | 0..1 | boolean | Flag for test TDO; default= "false" |
| | @availInternet | | 0..1 | boolean | Default="true" |
| | @availBroadcast | | 0..1 | boolean | Default="true" |
| | URL | | 1..N | anyURI | TDO URL(s) -- first URL is entry point |
| | Capabilities | | 0..1 | nrt:CapabilitiesType | Essential capabilities to present this TDO |
| | ContentItem | | 0..N | | Content item used by this TDO |
| | | URL | 1..N | anyURI | URL(s) of content items |
| | | @updatesAvail | 0..1 | boolean | Default="false" |
| | | @pollPeriod | 0..1 | unsignedByte | Short polling period in seconds |
| | | @size | 0..1 | 24-bit integer | Size of content item, in kilobytes |
| | | @availInternet | 0..1 | boolean | Default="true" |
| | | @availBroadcast | 0..1 | boolean | Default="true" |
| | Event | | 1 | | Event targeted to this TDO |
| | | @action | 1 | unsignedByte | "register", etc.; code values TBD |
| | | @diffusion | 0..1 | unsignedByte | Period for applying diffusion, in seconds |
| | | Data | 0..1 | base64Binary | Data to be used by this TDO for stream-event |

FIG. 79

| Variable Name | Req./Opt | Data Type | Evented? | Moderated Event | Min Event Interval |
|---|---|---|---|---|---|
| LatestUnfilteredTrigger | Req. | string | No | N/A | N/A |
| LatestFilteredTrigger | Req. | string | No | N/A | N/A |
| UnfilteredTriggerDeliveryTime | Req. | dateTime | Yes | No | N/A |
| FilteredTriggerDeliveryTime | Req. | dateTime | Yes | No | N/A |

FIG. 80

| Variable Name | Req/Opt | Data Type | Evented | Moderated Event | Min Event Interval |
|---|---|---|---|---|---|
| CurrentTrigger | Required | string | yes | yes | 1 second |

FIG. 81

| Name | Required/Optional |
|---|---|
| GetLatestUnfilteredTrigger | Required |
| GetLatestFilteredTrigger | Required |

FIG. 82

| Argument | Direction | Related State Variable |
|---|---|---|
| LatestUnfilteredTrigger | OUT | LatestUnfilteredTrigger |

FIG. 83

| Argument | Direction | Related State Variable |
|---|---|---|
| LatestFilteredTrigger | OUT | LatestFilteredTrigger |

FIG. 84

SetTrigger()

| Argument | Direction | relatedStateVariable |
|---|---|---|
| CurrentTrigger | IN | ATSCTrigger |

SetExpandedTrigger()

| Argument | Direction | relatedStateVariable |
|---|---|---|
| CurrentTrigger | IN | ATSCExpandedTrigger |

GetTrigger()

| Argument | Direction | relatedStateVariable |
|---|---|---|
| CurrentTrigger | OUT | ATSCTrigger |

GetExpandedTrigger()

| Argument | Direction | relatedStateVariable |
|---|---|---|
| CurrentTrigger | OUT | ATSCExpandedTrigger |

FIG. 85

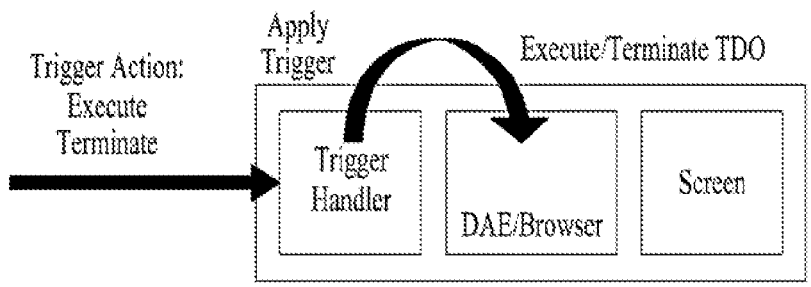

| Variable Name | Req/Opt | Data Type | Evented? | Moderated Event | Min Event Interval |
|---|---|---|---|---|---|
| AppURL | Required | string | yes | N/A | N/A |
| AppName | Required | string | yes | N/A | N/A |

| Name | Required/Optional |
|---|---|
| GetAppURL | Required |

| Argument | Direction | Related State Variable |
|---|---|---|
| AppURL | OUT | AppURL |
| AppName | OUT | AppName |

| Variable Name | Req/Opt | Data Type | Evented? | Moderated Event | Min Event Interval |
|---|---|---|---|---|---|
| ProxyServerURL | Required | string | no | N/A | N/A |

| Name | Required/Optional |
|---|---|
| GetProxyURL | Required |

| Argument | Direction | Related State Variable |
|---|---|---|
| ProxyURL | OUT | ProxyServerURL |

| Argument | Direction | relatedStateVariable |
|---|---|---|
| FileList | IN | ATSCFileList |

APPARATUS AND METHOD FOR PROCESSING AN INTERACTIVE SERVICE

This application claims the benefit of U.S. Provisional Application No. 61/715,317, filed on Oct. 18, 2012, U.S. Provisional Application No. 61/718,679, filed on Oct. 25, 2012 and U.S. Provisional Application No. 61/721,007, filed on Oct. 31, 2012, which are hereby incorporated by reference as if fully set forth herein.

BACKGROUND OF THE INVENTION

1. Field of the Invention

The present invention relates to a method and apparatus for providing, receiving and processing a broadcast service, and more particularly, to a method and apparatus for providing a supplementary service related to broadcast content.

2. Discussion of the Related Art

TVs first appeared at the end of the 19th century and have become the most popular information delivery apparatus since the end of the 20th century as a screen display method or design thereof has been continuously developed. However, TVs generally enable viewers to receive unidirectional information from a broadcast station. Such TV limitations have become problematic as personal computers (PCs) and the Internet have come into widespread use since the 1990s. Therefore, TVs have been developed to be able to provide an interactive service.

However, currently, there is no system for providing an interactive service between a content provider and a viewer. In particular, in order to provide such an interactive service, there is a need for a method of executing an application related to broadcast content, which is currently being broadcast, at a specific time and providing related information to a viewer through special information processing.

SUMMARY OF THE INVENTION

Accordingly, the present invention is directed to an apparatus and method for processing an interactive service that substantially obviates one or more problems due to limitations and disadvantages of the related art.

An object of the present invention devised to solve the problem lies on supplementary information related to broadcast content at an appropriate time during a period when the broadcast content is played back.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing an interactive service at a first device according to the present invention includes sending a discovery message to a second screen application running in a second device, wherein the discovery message advertises second screen support services that the first device can provide, receiving a request for descriptions of the second screen support services from the second screen application, sending a response with the descriptions to the second screen application, receiving a trigger from a broadcast stream or an internet server and delivering the trigger to the second device using a trigger service, wherein the trigger service is one of the second screen support services, wherein the trigger service is for delivering the trigger, wherein the trigger is a signaling element whose function is to identify signaling and establish timing of playout of interactive events targeted to applications for a segment described by an application parameter table, wherein the trigger is one of a time base trigger, an activation trigger, an interaction trigger or a channel change trigger, wherein the time base trigger is used to establish a time base for the event, wherein the activation trigger sets an activation time for the event, wherein the interaction trigger is used for interaction models other than a Triggered Declarative Object interaction model, wherein the channel change trigger is delivered whenever a channel is changed.

Preferably, the method further comprising, receiving a searching message for searching devices including the first device that offer the second screen support services before the sending the discovery message.

Preferably, the trigger service offers an unfiltered stream option, and the unfiltered stream option is an option that delivering all types of the trigger.

Preferably, the first device delivers the all types of the trigger as soon as the trigger is received by the first device.

Preferably, the delivering the trigger includes, combining information from the activation trigger with information from the application parameter table to generate an augmented activation trigger and sending the generated augmented activation trigger to the second screen application.

Preferably, the trigger service offers a filtered stream option, and the filtered stream option is an option that delivering the trigger which is one of the augmented activation trigger, the interaction trigger or the channel change trigger.

Preferably, the augmented activation trigger includes an application URL information having same value with an URL element of an application element in the application parameter table, the URL element identifies a file which is part of the application, and the application element is identified by the activation trigger.

Preferably, the augmented activation trigger further includes an event information representing an event element in the application parameter table, wherein the event element identified by the activation trigger represents the event for the application, wherein the event information includes an action information having same value with an action attribute of the event element identified by the activation trigger, and wherein the action attribute indicates type of an action to be applied when the event is activated.

Preferably, the first device delivers the augmented activation trigger at the activation time of the augmented activation trigger, wherein the first device delivers the interaction trigger when the interaction trigger is received by the first device, and wherein the first device delivers the channel change trigger when the channel is changed.

In another aspect of the present invention, a method of processing an interactive service at a second screen application running in a second device according to the present invention includes receiving a discovery message from a first device, wherein the discovery message advertise second screen support services that the first device can provide, sending a request for descriptions of the second screen support services to the first device, receiving a response with the descriptions from the first device, accessing a trigger service using information given in the descriptions and receiving a trigger from the first device using the trigger service, wherein the trigger service is one of the second screen support services, wherein the trigger is a signaling element whose function is to identify signaling and establish timing of playout of interactive events targeted to applications for a segment described by an application parameter table, wherein the trigger is one of a time base trigger, an activation trigger, an interaction trigger or a channel change trigger, wherein the time base trigger is used to establish a time base for the event, wherein the activation trigger sets an activation time for the event, wherein the interaction trigger is used for interaction models other than a Triggered Declarative Object interaction model, wherein the channel change trigger is delivered whenever a channel is changed.

Preferably, the method further comprising, multicasting a searching message for searching devices including the first device that offer the second screen support services before the receiving the discovery message.

Preferably, the trigger service offers an unfiltered stream option, and the unfiltered stream option is an option that delivering all types of the trigger.

Preferably, the all types of the trigger is delivered as soon as possible.

Preferably, the receiving the trigger includes, receiving an augmented activation trigger generated by combining information from the activation trigger with information from the application parameter table.

Preferably, the trigger service offers a filtered stream option, and the filtered stream option is an option that delivering the trigger which is one of the augmented activation trigger, the interaction trigger or the channel change trigger.

Preferably, the augmented activation trigger includes an application URL information having same value with an URL element of an application element in the application parameter table, wherein the URL element identifies a file which is part of the application, and wherein the application element is identified by the activation trigger.

Preferably, the augmented activation trigger further includes an event information representing an event element in the application parameter table, wherein the event element identified by the activation trigger represents the event for the application, wherein the event information includes an action information having same value with an action attribute of the event element identified by the activation trigger, and wherein the action attribute indicates type of an action to be applied when the event is activated.

Preferably, the augmented activation trigger is delivered at the activation time of the augmented activation trigger, the interaction trigger is delivered as soon as possible, and the channel change trigger is delivered when the channel is changed.

In another aspect of the present invention, provided herein is an apparatus for processing an interactive service as a first device according to the present invention includes a first module configured to receive a trigger from a broadcast stream or an internet server and a second module configured to send a discovery message to a second screen application running in a second device, wherein the discovery message advertises second screen support services that the first device can provide, receive a request for descriptions of the second screen support services from the second screen application, send a response with the descriptions to the second screen application, and deliver the trigger to the second device using a trigger service, wherein the trigger service is one of the second screen support services, wherein the trigger service is for delivering the trigger, wherein the trigger is a signaling element whose function is to identify signaling and establish timing of playout of interactive events targeted to applications for a segment described by an application parameter table, wherein the trigger is one of a time base trigger, an activation trigger, an interaction trigger or a channel change trigger, wherein the time base trigger is used to establish a time base for the event, wherein the activation trigger sets an activation time for the event, wherein the interaction trigger is used for interaction models other than a Triggered Declarative Object interaction model, wherein the channel change trigger is delivered whenever a channel is changed.

Preferably, the second module further configured to receive a searching message for searching devices including the first device that offer the second screen support services before sending the discovery message.

Preferably, the trigger service offers an unfiltered stream option, and wherein the unfiltered stream option is an option that delivering all types of the trigger.

Preferably, the second module delivers the all types of the trigger as soon as the trigger is received by the first module.

Preferably, the second module further configured to combine information from the activation trigger with information from the application parameter table to generate an augmented activation trigger and send the generated augmented activation trigger to the second screen application.

Preferably, the trigger service offers a filtered stream option, and wherein the filtered stream option is an option that delivering the trigger which is one of the augmented activation trigger, the interaction trigger or the channel change trigger.

Preferably, the augmented activation trigger includes an application URL information having same value with an URL element of an application element in the application parameter table, wherein the URL element identifies a file which is part of the application, and wherein the application element is identified by the activation trigger.

Preferably, the augmented activation trigger further includes an event information representing an event element in the application parameter table, wherein the event element identified by the activation trigger represents the event for the application, wherein the event information includes an action information having same value with an action attribute of the event element identified by the activation trigger, and wherein the action attribute indicates type of an action to be applied when the event is activated.

Preferably, the second module delivers the augmented activation trigger at the activation time of the augmented activation trigger, the second module delivers the interaction trigger when the interaction trigger is received by the first module, and the second module delivers the channel change trigger when the channel is changed.

In another aspect of the present invention, provided herein is an apparatus for processing an interactive service as a second screen application running in a second device according to the present invention includes a first module configured to receive a discovery message from a first device, wherein the discovery message advertise second screen support services that the first device can provide, send a request for descriptions of the second screen support services to the first device, and receive a response with the descriptions from the first device and a second module configured to access a trigger service using information given in the descriptions, and receive a trigger from the first device using the trigger service, wherein the trigger service is one of the second screen support services, wherein the trigger is a signaling element whose function is to identify signaling and establish timing of playout of interactive events targeted to applications for a segment described by an application parameter table, wherein the trigger is one of a time base trigger, an activation trigger, an interaction trigger or a channel change trigger, wherein the time base trigger is used to establish a time base for the event, wherein the activation trigger sets an activation time for the event, wherein the interaction trigger is used for interaction models other than a Triggered Declarative Object interaction model, wherein the channel change trigger is delivered whenever a channel is changed.

Preferably, the first module further configured to multicast a searching message for searching devices including the first device that offer the second screen support services before receiving the discovery message.

Preferably, the trigger service offers an unfiltered stream option, and wherein the unfiltered stream option is an option that delivering all types of the trigger.

Preferably, the all types of the trigger is delivered as soon as possible.

Preferably, the second module further configured to receive an augmented activation trigger generated by combining information from the activation trigger with information from the application parameter table.

Preferably, the trigger service offers a filtered stream option, and wherein the filtered stream option is an option that delivering the trigger which is one of the augmented activation trigger, the interaction trigger or the channel change trigger.

Preferably, the augmented activation trigger includes an application URL information having same value with an URL element of an application element in the application parameter table, wherein the URL element identifies a file which is part of the application, and wherein the application element is identified by the activation trigger.

Preferably, the augmented activation trigger further includes an event information representing an event element in the application parameter table, wherein the event element identified by the activation trigger represents the event for the application, wherein the event information includes an action information having same value with an action attribute of the event element identified by the activation trigger, and wherein the action attribute indicates type of an action to be applied when the event is activated.

Preferably, the augmented activation trigger is delivered at the activation time of the augmented activation trigger, wherein the interaction trigger is delivered as soon as possible, and wherein the channel change trigger is delivered when the channel is changed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram showing an embodiment of a typical broadcast stream;

FIG. 4 is a diagram showing an embodiment of trigger syntax;

FIG. 5 is a diagram showing an embodiment of a TDO parameter table;

FIG. 6 is a diagram showing an embodiment of a TDO parameter table;

FIG. 7 is a diagram showing the meaning of "Frequency of Use" attribute values;

FIG. 8 is a diagram showing the meaning of "destination" attribute values;

FIG. 9 is a diagram showing an embodiment of the syntax of binary form of a TDO Parameters Table;

FIG. 10 is a diagram showing an embodiment of the syntax of the binary form of a TDO Parameters Table;

FIG. 11 is a diagram showing an embodiment of the syntax of the binary form of a TDO Parameters Table;

FIG. 12 is a diagram showing an embodiment of the syntax of the binary form of a TDO Parameters Table;

FIG. 13 is a diagram showing an embodiment of the syntax of the binary form of a TDO Parameters Table;

FIG. 14 is a diagram showing an embodiment of an activation message table structure;

FIG. 15 is a diagram showing an embodiment of a URL List structural diagram;

FIG. 16 is a diagram showing an embodiment of the binary format for the private sections containing TPTs;

FIG. 17 is a diagram showing an embodiment of a list of URLs encoded as an XML document;

FIG. 18 is a diagram showing an embodiment of addTriggerEventListener;

FIG. 19 is a diagram showing an embodiment of removeTriggerEventListener;

FIG. 20 is a diagram showing an embodiment of the definition of the EventListener type;

FIG. 21 is a diagram showing an embodiment of the definition of the TriggerEvent type;

FIG. 22 is a diagram showing an embodiment of an architecture for a WM approach;

FIG. 23 is a diagram showing an embodiment of an architecture for an FP approach;

FIG. 24 is a diagram showing an embodiment of static activation in a request/response ACR case;

FIG. 25 is a diagram showing an embodiment of static activation in a request/response ACR case;

FIG. 35 is a diagram showing an embodiment of dynamic activation triggers delivered at last minute;

FIG. 36 is a diagram showing an embodiment of dynamic activation triggers delivered at last minute;

FIG. 37 is a sequence diagram between an ACR client and other servers in a request/response case;

FIG. 39 is a diagram showing an embodiment of an Action List of a UPnP RemoteUI Client Service;

FIG. 47 is a diagram showing a table showing a difference between a transmission order according to Second Screen Application Lifecycle management and transmitted data;

FIG. 57 is a diagram showing an embodiment of a method of, at a second screen device, accessing a TPT and Second Screen Application;

FIG. 58 is a diagram showing an embodiment of a method of, at a second screen device, accessing a TPT and Second Screen Application;

FIG. 59 is a diagram showing another embodiment of Broadcast Signaling for a RemoteUI server service;

FIG. 60 is a diagram showing an embodiment of Device Discovery and Device Capability Exchange for a Second Screen Service;

FIG. 61 is a diagram showing an embodiment of the DeviceProfile XML Schema of UPnP Forum;

FIG. 62 is a diagram showing an embodiment of a device profile of a Second Screen device;

FIG. 63 is a diagram showing an embodiment of a description of ProtocolInfo for a Second Screen Service;

FIG. 64 is a diagram showing an embodiment of UIListing while an AddUIListing and RemoteUIListing action are being executed in a second screen device;

FIG. 68 is a diagram showing an embodiment of "EventInfo" information delivered to a second screen device by a ProcessInput action;

FIG. 69 is a diagram showing the configuration between a receiver and a second screen device;

FIG. 70 is a diagram showing an embodiment of Service Types and Service IDs of Services;

FIG. 71 is a diagram showing the operational concept of a trigger delivery service;

FIG. 72 is a diagram showing an embodiment of a process of generating an expanded activation trigger;

FIG. 73 is a diagram showing an embodiment of an XML Schema Description for an Augmented Activation Trigger;

FIG. 74 is a diagram showing an embodiment of an XML Schema Description for Triggers that are not augmented;

FIG. 75 is a diagram showing an embodiment of a format of an Augmented Activation Trigger;

FIG. 76 is a diagram showing an embodiment of a format of an Augmented Activation Trigger;

FIG. 77 is a diagram showing an embodiment of a format of an Augmented Activation Trigger;

FIG. 78 is a diagram showing an embodiment of a format of an Augmented Activation Trigger;

FIG. 79 is a diagram showing an embodiment of trigger service state variables;

FIG. 80 is a diagram showing an embodiment of trigger service state variables;

FIG. 81 is a diagram showing an embodiment of Trigger Service Actions;

FIG. 82 is a diagram showing an embodiment of Argument of a GetLatestUnfilteredTrigger Action;

FIG. 83 is a diagram showing an embodiment of Argument of a GetLatestFilteredTrigger Action;

FIG. 84 is a diagram showing an embodiment of Trigger Service Actions;

FIG. 85 is a diagram showing an embodiment of an operation on a second screen when acquiring a trigger via a trigger delivery service;

DETAILED DESCRIPTION OF THE INVENTION

Figure 2:
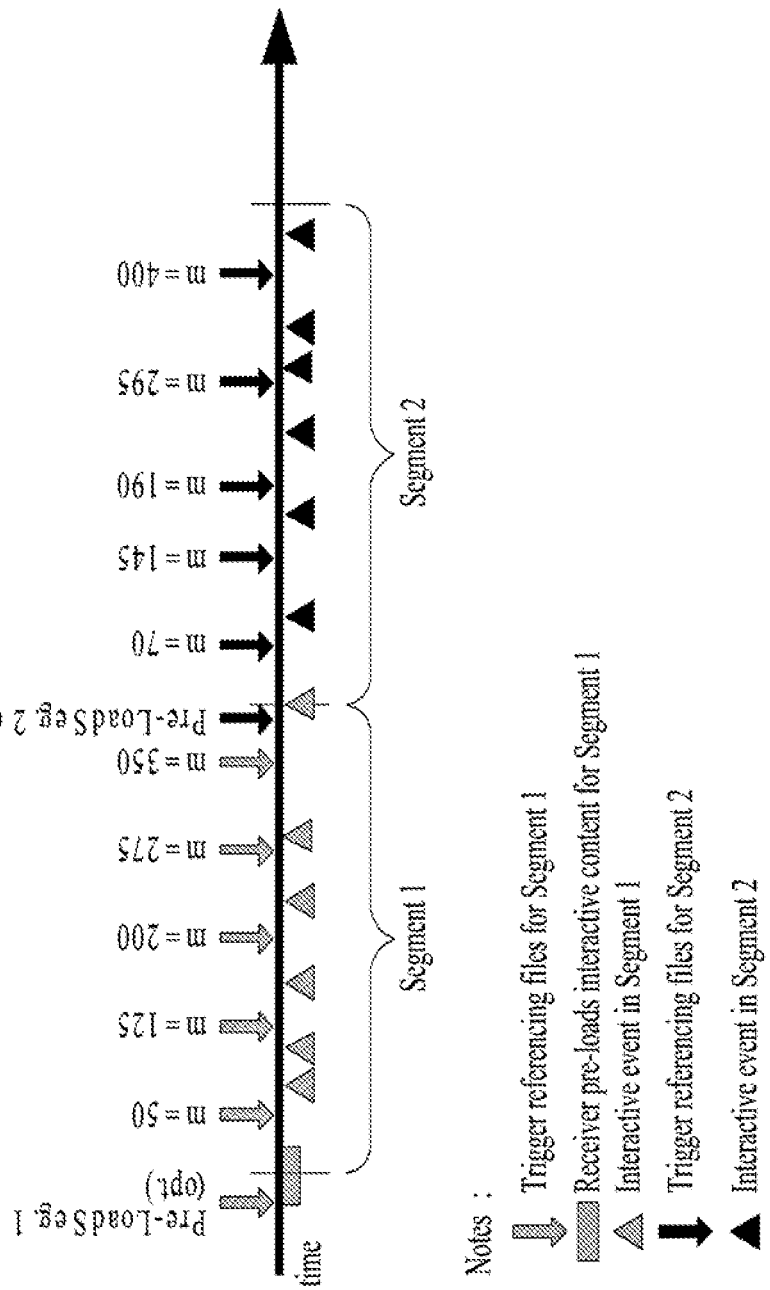
FIG. 2 is a diagram showing an embodiment of trigger timing in case of pre-produced content.

Although the terms used in the present invention are selected from generally known and used terms, terms used herein may be variable depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

In the present specification, the term media time stands for a parameter referencing a point in the playout of an audio/video or audio content item. ACR stands for Automatic Content Recognition. AMT stands for Activation Messages Table. API stands for Application Programming Interface. DAE stands for Declarative Application Environment. DO stands for Declarative Object. FLUTE stands for File Delivery over Unidirectional Transport. GPS stands for Global Positioning System. HTTP stands for Hypertext Transfer Protocol. IP stands for Internet Protocol. IPTV stands for Internet Protocol Television. iTV stands for Interactive Television. MIME stands for Internet Media Type. NDO stands for NRT Declarative Object. NRT stands for Non-Real Time. SMT stands for Service Map Table. SSC stands for Service Signaling Channel. TDO stands for Triggered Declarative Object. TPT stands for TDO Parameters Table. UDO stands for Unbound Declarative Object. UPnP stands for User Plug and Play. URI stands for Uniform Resource Identifier. URL stands for Uniform Resource Locator. XML stands for eXtensible Markup Language. TFT stands for Text Fragment Table. Details thereof will be described below.

In this specification, DO, TDO, NDO, UDO, Link and Packaged App have the following meanings.

DO (Declarative Object) can be a collection constituting an interactive application. (For example, HTML, JavaScript, CSS, XML and multimedia files)

The term "Triggered Declarative Object" (TDO) is used to designate a Declarative Object that has been launched by a Trigger in a Triggered interactive adjunct data service, or a DO that has been launched by a DO that has been launched by a Trigger, and so on iteratively.

The term "NRT Declarative Object" (NDO) is used to designate a Declarative Object that has been launched as part of an NRT service that is not a Triggered interactive data service.

The term "Unbound Declarative Object" (UDO) is used to designate a Declarative Object that is not bound to a service, such as a Packaged App or a DO launched by a Link, or a DO that has been launched by such a DO, and so on iteratively.

The "Link" is a broadcaster-provided URL that points to a web site which provides on-line information or functionality related to the current TV programming or NRT service.

The "Packaged App" is a broadcaster-provided Declarative Object (DO) that provides information or functionality which the broadcaster wants to offer viewers, and that is packaged up into a single file for viewers to download and install.

Details thereof will be described below.

In this specification, a time base message includes a time base trigger and an equivalent thereof. Accordingly, the term "time base message" may be used interchangeably with the term "time base trigger".

In this specification, an activation message includes all information delivery causing activation, such as an activation element in an AMT and/or an activation trigger.

FIG. 1 is a diagram showing an embodiment of a typical broadcast stream.

A typical broadcast stream includes a sequence of TV programs. Each TV program includes an underlying show, which is typically broken up into blocks separated by ads and/or other interstitial material.

In FIG. 1, Segment of Show A, Ad1, Ad2, Segment of Show B, etc. are sequentially included in the broadcast stream. Segments configuring each show may be referred to as show content and Ads may be referred to as interstitial content.

Each show or piece of interstitial material might or might not have an interactive adjunct data service associated with it.

The term "interactive service segment," or just "segment," will be used in this specification to refer to a portion of an interactive adjunct service that is treated by the broadcaster as an integrated unit. An interactive service segment is typically, but not necessarily, associated with a single show or a single piece of interstitial material.

In order to execute such an interactive adjunct data service, there are two models: Direct execution model and triggered declarative object (TDO) model.

In the direct execution model, a declarative object (DO) can be launched automatically as soon as the virtual channel is selected. It can communicate over the Internet with a back-end server to get detailed instructions for providing interactive features—creating displays in specific locations on the screen, conducting polls, launching other specialized DOs, etc., all synchronized with the audio-video program.

In the TDO model, signals can be delivered in the broadcast stream or via the Internet in order to initiate TDO events, such as launching a TDO, terminating a TDO, or prompting some task by a TDO. These events can be initiated at specific times, typically synchronized with the audio-video program. When a TDO is launched, it can provide the interactive features it is programmed to provide.

A basic concept behind the TDO model is that the files that make up a TDO, and the data files to be used by a TDO to take some action, all need some amount of time to be delivered to a receiver, given their size. While the user experience of the interactive elements can be authored prior to the broadcast of the content, certain behaviors must be carefully timed to coincide with events in the program itself, for example the occurrence of a commercial advertising segment.

The TDO model separates the delivery of declarative objects and associated data, scripts, text and graphics from the signaling of the specific timing of the playout of interactive events.

The element that establishes the timing of interactive events is the Trigger.

The information about the TDOs used in a segment and the associated TDO events that are initiated by Triggers is provided by a data structure called the "TDO Parameters Table" (TPT).

FIG. 2 is a diagram showing an embodiment of trigger timing in case of pre-produced content.

Trigger is a signaling element whose function is to identify signaling and establish timing of playout of interactive events.

The trigger includes a time base trigger which serves to indicate a media time of a segment related to an interactive service and an activation trigger which serves to indicate an event occurrence time of an application related to an interactive service.

Triggers can perform various timing-related signaling functions in support of interactive services. Triggers can be multi-functional; depending on their structure, a particular Trigger instance can perform one or more of the following functions:

1. Signal the location of a TPT (accessible via a FLUTE session in the emission stream, via an Internet server, or both);
2. Indicate that interactive content for an upcoming program segment is available to be pre-loaded;
3. Indicate the current Media Time of associated audio/video or audio-only content;
4. Reference a particular interactive event in a TPT and signal that the event is to be executed now or at a specified future Media Time;
5. Indicate that accesses to an Internet server are to be spread out randomly over a specified time interval in order to avoid a peak in demand.

FIG. 2 illustrates Triggers delivered in association with two programming segments. In this example, both segments are "pre-produced," meaning that the content is not from a live broadcast; interactive elements have been added in post-production.

As shown, a short time prior to the occurrence of programming segment 1, a "pre-load" Trigger can be delivered to allow receivers an opportunity to acquire the TPT and interactive content associated with programming segment 1. If a pre-load Trigger is not transmitted, receivers can be expected to use the first Trigger they see within the segment to acquire the content.

Triggers can be sent throughout segment 1, as shown, to indicate the current Media Time (labeled "m" in the figure) relative to the segment. Periodic delivery of Media Time Triggers can be necessary to allow receivers who are just encountering the channel to synchronize and acquire the interactive content.

Just prior to the beginning of segment 2, a pre-load Trigger for that upcoming segment is sent.

In the case of pre-produced content (non-live), the TPT that the receiver can acquire after processing the first Trigger can define the timing of all elements of the interactive experience for that segment. All that is needed for the receiver and TDO to play out the interactive elements can be the knowledge of the media timing; the TPT can describe interactive events relative to Media Time.

Figure 3:
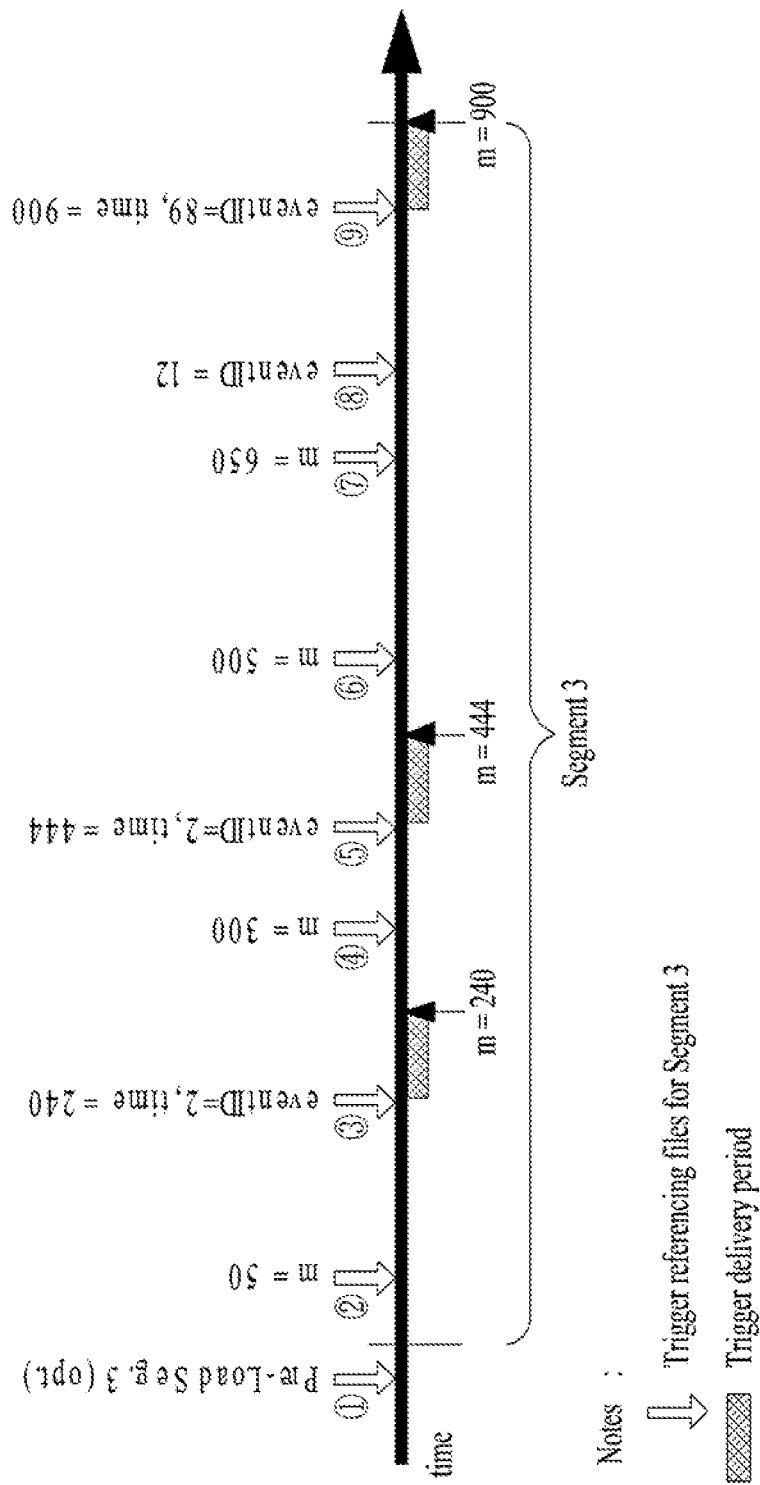
FIG. 3 is a diagram showing an embodiment of trigger timing in case of live content.

FIG. 3 is a diagram showing an embodiment of trigger timing in case of live content.

For the case of live content, the TPT still contains data and information pertinent to different interactive events, however the timing of playout of those events cannot be known until the action in the program unfolds during the broadcast. For the live case, the "event-timing" function of the Trigger is utilized. In this mode, the Trigger can signal that a specified interactive event is to be re-timed to a specified new value of Media Time. Alternatively, the Trigger can indicate that a certain event is to be executed immediately.

In FIG. 3, the functions of triggers of segment 3 will now be described.

A first trigger is a pre-load trigger, which refers to a directory capable of files of segment 3.

A second trigger is a media time trigger which is used to indicate the playout timing of segment 3.

A third trigger is an event re-timing trigger and indicates that the event with eventID=2 in the TPT is to be re-timed to occur at Media Time 240. The hatched area indicates the time interval prior to 240 over which Trigger #3 may be delivered to receivers.

A fourth trigger is a media time trigger.

A fifth trigger is an event re-timing trigger and indicates that the event with eventID=5 in the TPT is to be re-timed to occur at Media Time 444.

A sixth and seventh triggers are media time triggers.

An eighth trigger is an event Trigger and indicates that the event with eventID=12 in the TPT is to be executed immediately.

A ninth trigger is an event re-timing Trigger and indicates that the event with eventID=89 in the TPT is to be re-timed to occur at Media Time 900.

Hereinafter, the life cycle, state and state changing event of the TDO will be described.

A TDO can exist in four different states: Released, Ready, Active and Suspended. A number of different factors can cause a transition from one state to another (trigger, user action, changing channels, etc.).

The TDO may include the following four states. The four states are Ready, Active, Suspended and Released. Ready state means that TDO is downloaded and prepared for execution, but not yet executing. Active state means that TDO is executing. Suspended state means that TDO is temporarily suspended from execution, with its state saved. Released state means that TDO is not Ready, Active or Suspended.

The followings are some of the events that can cause a change of state for a TDO:

1. Trigger "prepare"—Device receives a trigger (in the currently selected primary virtual channel) which requests that the TDO be prepared to execute (allocate resources, load into main memory, etc.)
2. Trigger "execute"—Device receives a trigger (in the currently selected primary virtual channel) which requests that the TDO be activated
3. Trigger "suspend"—Device receives a trigger (in the currently selected primary virtual channel) which directs that the TDO be suspended
4. Trigger "kill"—Device receives a trigger (in the currently selected primary virtual channel) which directs that the TDO be terminated FIG. 4 is a diagram showing an embodiment of trigger syntax.

Both Activation messages and Time Base messages can have the general "Trigger" format under certain delivery circumstances.

The syntactic definition here is described using the Augmented Backus-Naur Form (ABNF) grammar, except that the vertical bar symbol "|" is used to designate alternatives. Rules are separated from definitions by an equal "=", indentation is used to continue a rule definition over more than one line, literals are quoted with " ", parentheses "(" and ")" are used to group elements, optional elements are enclosed in "[" and "]" brackets, and elements may be preceded with <n>* to designate n or more repetitions of the following element; n defaults to 0. And elements may be preceded with <n>*<m> designate n or more repetitions and m or less repetitions of the following element.

This Trigger syntax is based on the Uniform Resource Identifier (URI): Generic Syntax, excluding the <scheme> and "://" portion, with additional restrictions.

The trigger may include locator_part and terms. Terms may be omitted. If terms are present, locator_part and terms may be connected by '?'.

The locator_part may include a hostname part and a path_segments part, which may be connected by '/'.

The hostname may include domainlabel and toplabel, and domainlabel may be repeated 0 times or more along with '.'. That is, hostname may include repeated domainlabel connected with toplabel or include only toplabel.

domainlabel may include one alphanum or include alphanum or "-" repeatedly inserted between alphanum and alphanum 0 times or more.

Here, alphanum may mean alpha or digit.

Here, alpha may be one of lowalpha or upalpha.

Here, lowalpha may be one of a, b, c, d, e, f, g, h, i, j, k, l, m, n, o, p, q, r, s, t, u, v, w, x, y, and z.

Here, upalpha may be one of A, B, C, D, E, F, G, H, I, J, K, L, M, N, O, P, Q, R, S, T, U, V, W, X, Y, and Z.

Here, digit may be one of 0, 1, 2, 3, 4, 5, 6, 7, 8, and 9.

toplabel includes one alpha or include alphanum or "-" repeatedly inserted between alpha and alphanum 0 times or more.

path_segments includes one segment, which is followed by segment repeated 0 times or more. At this time, segments may be connected by '/'.

Here, segment includes alphanum which is repeated once or more.

Terms may include one of event_time or media_time, which may be followed by spread or others. Spread and others may be omitted. If spread and others are present, '&' may be placed ahead of spread and others and spread and others may be placed after event_time or media_time.

Here, spread may include digit repeated once or more after 's='.

Event_time may include digit repeated once or more after 'e=' or include hexdigit repeated once or more or seven times or less after '&t='. '&t=' and the back part thereof may be omitted.

Here, hexdigit may be one of 0, 1, 2, 3, 4, 5, 6, 7, 8, 9, a, b, c, d, e and f.

Media_time may include hexdigit repeated once or more or less than seven times after 'm='.

Others may include one "other" or "other" followed by '&' and "other".

Here, other may include resv_cmd and alphanum which are repeated once or more and are connected by '='.

Here, resv_cmd may be alphanum excluding 'c', 'e', 'E', 'm', 'M', 's', 'S', 't', and 'T'.

The length of the trigger may not exceed 52 bytes. In addition, the hostname portion of the Trigger can be a registered Internet domain name.

A Trigger can be considered to include three parts.
<domain name part>/<directory path>[?<parameters>]

The <domain name part> can be a registered domain name, <directory path> can be a path as it would appear in a URI.

The <domain name part> can reference a registered Internet domain name. The <directory path> can be an arbitrary character string identifying a directory path under the control and management of the entity who owns rights to the identified domain name.

In the TDO model, the combination of <domain name part> and <directory path> can uniquely identify a TPT that can be processed by a receiver to add interactivity to the associated content.

The combination of <domain name part> and <directory path> can be the URL of an Internet location where the TPT for the current segment can be obtained.

That is, the trigger may identify the TPT using <domain name part> and <directory path>. Through <domain name part> and <directory path>, it is possible to confirm the TPT to which the trigger applies. The role performed by applying the trigger to the TPT depends on <parameters>.

Hereinafter, <parameters> will be described.

<parameters> may include one or more of "event_time", "media_time", or "spread"

Next, "event_time", "media_time" and "spread" of the syntax shown in FIG. 4 will be described.

event_time="e=" 1*digit ["&t=" 1*7hexdigit]
media_time="m=" 1*7hexdigit
spread="s=" 1*digit The "event_time" term can be used in an Activation trigger to identify the targeted event ("e=" term) and the time the event should be activated ("t=" term). When the "t=" term is absent, that means the event should be activated at the time the trigger arrives.

That is, "e=", which is an interactive event ID term, can reference the appID in the associated TPT of the TDO targeted by the event, the eventID of the specific event, and the dataID of the Data element to be used for this event activation.

"t=", which is an optional timing value term, can indicate a new media timing for the designated event. If the "t=" part is not present, that can mean the timing for the designated event is the arrival time of the Trigger.

The "media_time" term ("m=" term) can be used in a Time base trigger to identify the current time relative to the time base represented by the Time base trigger. Content identifier information ("c=" term) for identifying currently displayed content may be further included in media_time. For "c=" term, the direct execution model will be described below.

That is, "m=", which is a media timestamp term, followed by a character string of 1 to 8 characters in length representing a hexadecimal number, can indicate the current Media Time.

The "spread" term can be used to indicate that any action taken in response to a Time base trigger (such as retrieving a TPT from a server) or an Activation trigger (such as causing a TDO to access a server) should be delayed a random amount of time, to spread out the workload on the server.

"s=" term can indicate the number of seconds of time over which all receivers should attempt to access the Internet server identified in the Trigger. Each individual receiver can be expected to derive a random time within the designated interval and delay the access request by that amount, thereby spreading in time the peak in demand that might otherwise occur at the first appearance of a Trigger at the receiver.

A Trigger containing a <media time> parameter can be called a Time base trigger, since it is used to establish a time base for event times.

A Trigger containing an <event time> parameter can be called an Activation Trigger, since it sets an activation time for an event.

FIG. 5 and FIG. 6 are diagrams showing an embodiment of a TDO parameter table.

A TDO Parameters Table (TPT) contains metadata about the TDOs of a segment and the Events targeted to them.

Hereinafter, fields included in the table will be described. The sizes of the fields and the types of the fields included in the table may be added or changed according to designer's intention.

The detailed semantics of the fields in the TPT structure is as follows.

TDO parameter table(TPT) may include @majorProtocolVersion, @minorProtocolVersion, @id, @tptVersion, @expireDate, @updatingTime, @serviceID, @baseURL attributes, Capabilities, LiveTrigger, and/or TDO element.

TPT is the root element of the TPT. One TPT element describes all or a portion (in time) of one programming segment.

MajorProtocolVersion which can be 4-bit attribute can indicate the major version number of the table definition. The major version number can be set to 1. Receivers are expected to discard instances of the TPT indicating major version values they are not equipped to support.

When present, @MinorProtocolVersion which can be 4-bit attribute can indicate the minor version number of the table definition. When not present, the value defaults to 0. The minor version number can be set to 0. Receivers are expected to not discard instances of the TPT indicating minor version values they are not equipped to support. In this case they are expected to ignore any individual elements or attributes they do not support.

@id, which is URI, can uniquely identify the interactive programming segment which This TPT element pertains to. @id serves as an identifier of a segment. Accordingly, after a receiver parses the TPT, a trigger, an AMT, etc. related to one segment may match the TPT having @id for identifying the segment using @id information. Accordingly, a segment to which the trigger and the AMT will apply may be found. The details of the AMT will be described below.

@tptVersion, which can be 8-bit integer, can indicate the version number of the TPT element identified by the id attribute. The tptVersion can be incremented whenever any change is made to the TPT.

When present, @expireDate attribute of the TPT element can indicate the date and time of the expiration of the information included in this TPT instance. If the receiver caches the TPT, it can be re-used until the expireDate.

When present, @updatingTime which can be 16-bit element can indicate that the TPT is subject to revision, and it gives the recommended interval in seconds to download the TPT again and check whether the newly downloaded TPT is a new version.

When present, @serviceID which can be 16-bit integer can indicate the NRT service_id associated with the interactive service described in this TPT instance. This is needed for receivers to get FLUTE parameters from the Service Map Table when files for this interactive service are delivered in the broadcast stream.

When present, @baseURL attribute can give a base URL which, when concatenated onto the front of any relative URLs that appear in this TPT. It can give the absolute URLs of the files.

When present, Capabilities element can indicate capabilities that are essential for a meaningful presentation of the interactive service associated with this TPT. Receivers that do not have one or more of the required capabilities are expected not to attempt to present the service.

LiveTrigger element presents if and only if delivery of Activation Triggers via Internet is available. When present, it can provide information needed by a receiver to obtain the Activation Triggers. The child element and attribute of LiveTrigger will be described below.

TDO which is a child element of the TPT element can represent an application (for example, a TDO), that provides part of the interactive service during the segment described by this TPT instance. The child element and attribute of TDO will be described below.

LiveTrigger element may include @URL and/or @pollPeriod attribute.

As described above, LiveTrigger element presents if and only if delivery of Activation Triggers via Internet is available. When present, it can provide information needed by a receiver to obtain the Activation Triggers.

@URL, which is an attribute of the LiveTrigger element, can indicate the URL of a server that can deliver Activation Triggers via Internet. Activation Triggers can be delivered via Internet using HTTP short polling, HTTP long polling, or HTTP streaming, at the option of the interactive service provider.

When present, @pollPeriod, which is an attribute of the LiveTrigger element, can indicate that short polling is being used to deliver Activation Triggers, and the value of the pollPeriod attribute can indicate the recommended time in seconds for the receiver to use as a polling period.

If LiveTrigger element is present, the receiver may parse the TPT and obtain information used to deliver the activation trigger using the Internet. The URL of the server which may receive the activation trigger may be used using @URL information. Through @pollPeriod information or information indicating that @pollPeriod attribute is not present, a method of delivering the activation trigger via the Internet and information about the polling period may be obtained. @pollPeriod will be described in detail below.

TDO element may include @appID, @appType, @appName, @globalID, @appVersion, @cookieSpace, @frequencyOfUse, @expireDate, @testTDO, @availInternet, @availBroadcast attribute, URL, Capabilities, Contentitem, and/or Event element.

As described above, TDO which is a child element of the TPT element can represent an application (for example, a TDO), that provides part of the interactive service during the segment described by this TPT instance.

@appID, which can be 16-bit integer, can identify the application uniquely within the scope of the TPT. An Activation Trigger identifies the target application for the Trigger by means of a reference to the appID. @appID is an identifier of an application. One TPT may include several applications (such as TDO). Accordingly, after parsing the TPT, the application may be identified using @appID information. The trigger, AMT, etc. which will apply to one application may match an application having @appID for identifying the application. Accordingly, the application to which the trigger and the AMT will apply may be found. The AMT will be described in detail below.

@appType, which can be 8-bit integer, can indicate the application format type. The default value can be 1, which can represent a TDO. Other values can represent other formats.

@appName, which is attribute of the TDO element, can be a human readable name which can be displayed to a viewer when a viewer's permission is sought to launch the application.

@globalID, which is attribute of the TDO element, can be a globally unique identifier of the application. In many cases a receiver will cache an app that is going to be used again before too long. In order for this to be useful, the receiver must be able to recognize the app the next time it appears. A globalID is needed for the receiver to be able to recognize the app when it appears again in a new segment.

@appVersion, which is attribute of the TDO element, can be the version number of the application. The appVersion value can be incremented whenever the application (as identified by the globalID) changes. The appVersion attribute cannot be present if the globalID attribute is not present.

@cookieSpace, which can be 8-bit integer, can indicate how much space the application needs to store persistent data between invocations.

@frequencyOfUse, which can be 4-bit integer, can indicate approximately how frequently the application will be used in the broadcast, to provide guidance to receivers on managing their application code cache space. '@frequencyOfUse' will be described in detail below.

@expireDate, which is attribute of the TDO element, can indicate a date and time after which the receiver can safely delete the application and any related resources.

When present with value "true", @testTDO, which is Boolean attribute, can indicate that the application is for testing purposes only, and that it can be ignored by ordinary receivers.

The value "true" for @availInternet attribute can indicate that the application is available for downloading over the Internet. The value "false" can indicate that the application is not available for downloading over the Internet. When the attribute is not present, the default value can be "true".

The value "true" for @availBroadcast attribute can indicate that the application is available for extraction from the broadcast. The value "false" can indicate that the application is not available for extraction from the broadcast. When the attribute is not present, the default value can be "true".

Each instance of URL, a child element of the TDO element, can identify a file which is part of the application. URL element may include @entry attribute. @entry, an attribute of the URL element, has value "true", that can indicate that the URL is an entry point for the application—i.e., a file that can be launched in order to launch the application. When it has value "false", that can indicate that the URL is not an entry point for the application. The default value when the attribute does not appear can be "false". The URL element which is the child element of the TDO element identifies a file configuring the application as described above. The receiver parses the TPT to obtain URL information, accesses the server using the URL information, and downloads an application indicated by the URL information.

When present, Capabilities, which is child element of the TDO element, can indicate capabilities that are essential for a meaningful presentation of this application. Receivers that do not have one or more of the required capabilities are expected not to attempt to present launch the application.

ContentItem, a child element of the TDO element, can indicate a content item including one or more data files that are needed by the application. ContentItem element has information about data files required by an application indicated by the TDO element to which this element belongs. The receiver may download data files required by the application using URL information, etc. of ContentItem, if the ContentItem element is present after parsing. The child element and attribute of ContentItem will be described below.

Event, a child element of the TDO element can represent an event for the application. Event element indicates an event of an application to which this element belongs. The event element contains information indicating which events are present, which data is present, which action is present, etc. The receiver may parse the event element to obtain information about the event of the application. The child element and attribute of the event will be described below.

The receiver may receive and parse the TPT to obtain the child element of the TDO and the information about attributes.

ContentItem element which is the child element of the TDO element may include @updateAvail, @pollPeriod, @size, @availInternet, @availBroadcast attribute and/or URL element.

Here, URL element may include @entry attribute. Each instance of URL, a child element of the ContentItem element, can identify a file which is part of the content item. URL element may include @entry attribute. @entry, an attribute of the URL element, has value "true", that can indicate that the URL is an entry point for the content item—i.e., a file that can be launched in order to launch the content item. When it has value "false", that can indicate that the URL is not an entry point for the content item. The default value when the attribute does not appear can be "false". The receiver may download data files required by the application using URL information of ContentItem after parsing. In this process, the information such as the above-described other attributes may be used.

@updatesAvail, which is a boolean attribute of the ContentItem element, can indicate whether or not the content item will be updated from time to time—i.e., whether the content item includes static files or whether it is a real-time data feed. When the value is "true" the content item will be updated from time to time; when the value is "false" the content item will not be updated. The default value when this attribute does not appear can be false.

@pollPeriod, which is an attribute of the ContentItem element, may be present only when the value of the updatesAvail attribute is "true". The presence of the pollPeriod attribute can indicate that short polling is being used to deliver Activation Triggers, and the value of the pollPeriod attribute can indicate the recommended time in seconds for the receiver to use as a polling period.

@Size, which is an attribute of the ContentItem element, can indicate the size of the content item.

The value "true" for @availInternet attribute can indicate that the content item is available for downloading over the Internet. The value "false" can indicate that the content item is not available for downloading over the Internet. When this attribute is not present, the default value can be "true."

The value "true" for @availBroadcast attribute can indicate that the content item is available for extraction from the broadcast. The value "false" can indicate that the content item is not available for extraction from the broadcast. When this attribute is not present, the default value can be "true."

The event element contains information about the event of the application indicated by the TDO element to which the event element belongs. The receiver may parse the event element to obtain information about the event.

The event element which is the child element of the TDO element may include @eventID, @action, @destination, @diffusion attribute and/or Data element. Here, the data element may include @dataID attribute.

@eventID, which can be a 16-bit integer attribute of the Event element, can identify the event uniquely within the scope of the TDO element containing it. An Activation Trigger (or activation element in AMT) can identify the target application and event for the Trigger by the combination of appID and eventID. When an event is activated, receivers pass the event in to the application. @eventID serves as an identifier of an event. Using @eventID information, a trigger, AMT, etc. for activating the event may match an application having @eventID for identifying the event. That is, an Activation Trigger (or activation element in AMT) can identify the target application and event for the Trigger by the combination of appID and eventID. When an event is activated, receivers pass the event in to the application. The AMT will be described in detail below.

@action, which is an attribute of the Event element, can indicate the type of action to be applied when the event is activated. Allowed values can be "prep", "exec", "susp", and "kill".

"prep" can correspond to the "Trig prep" action. If the state of the targeted application is "Released," this action can cause a state change to "Ready."

"exec" can correspond to the "Trig exec" action. The state of the targeted application can become "Active" upon reception of this trigger.

"susp" can correspond to the "Trig susp" action. If the state of the targeted application is "Active," the state can change to "Suspended" upon reception of this trigger, otherwise there is no change.

"kill" can correspond to the "Trig kill" action. The state of the targeted application can become "Released" upon reception of this trigger.

@action can indicate the type of action to be applied when the event is activated.

@destination, which is an attribute of the Event element, can indicate the target device for the event. @destination will be described in detail below.

When present, @diffusion, which can be an 8-bit integer attribute of the Event element, can represent a period T of time in seconds. The purpose of the diffusion parameter is to smooth peaks in server loading. The receiver can be expected to compute a random time in the range 0-T, in increments of 10 milliseconds, and delay this amount before accessing an Internet server to retrieve content referenced by URLs in the TPT.

When present, Data which is a child element of the Event element can provide data related to the event. Different activations of the Event can have different Data elements associated with them. The data element may include @dataID attribute. @dataID, which is a 16-bit integer attribute, can identify the Data element uniquely within the scope of the Event element containing it. When an activation of an event has data associated with it, the Activation Trigger can identify the Data element by the combination of AppID, EventID, and DataID. The data element indicates data used for the event. One event element may have several data elements. Data is identified using @dataID attribute of the data element. In the receiver, if the event related to the data is activated, the Activation Trigger (or activation element in AMT) can identify the Data element by the combination of AppID, EventID, and DataID. AMT will be described in detail below.

FIG. 7 is a diagram showing the meaning of "Frequency of Use" attribute values.

The "Meaning" column indicates the frequency of occurrence of segments that contain this application. (An attribute can appear multiple times within a single segment, of course.) The frequencyOfUse attribute cannot be present if the globalID attribute is not present. If the app is going to be cached and used again later, the receiver needs to recognize that it is the same app when it appears again. This requires the globalId attribute.

FIG. 8 is a diagram showing the meaning of "destination" attribute values.

As shown in FIG. 8, the destination attribute value of 0 indicates "reserved", the destination attribute value of 1 indicates primary device only, the destination attribute value of 2 indicates one or more secondary devices only 2, and the destination attribute value of 3 indicates Primary device and/or one or more secondary devices.

FIG. 9, FIG. 10, FIG. 11, FIG. 12 and FIG. 13 are diagrams showing an embodiment of the syntax of binary form of a TDO Parameters Table.

This is the binary format of the above-described TPT structure. This structure is a format necessary when the TPT is transmitted in NRT and is made such that the XML structure of the TPT is suitably transmitted in NRT.

The following elements and/or attributes contained in the XML version of the TPT can be omitted from the binary version, since they can be provided by the encapsulation header for delivering the binary table in the broadcast stream: @protocolVersion (major/minor), @serviceID and/or @tpt-Version.

The semantics of the fields are as follows. Fields of the binary format of TDO parameter table of FIG. 9, FIG. 10, FIG. 11, FIG. 12 and FIG. 13 will be sequentially described.

expire_date_included, which can be 1-bit field, can indicate whether the expire_date field is included. The value '1' can mean it is included; the value '0' can mean it is not included.

segment_id_length, which can be a 5-bit field, can indicate the length in bytes of the segment_id field.

segment_id, which is a variable length field, can contain the bytes of the segment id, which can have the same semantics as the "id" attribute of the TPT XML format.

base_URL_length, which can be a 8-bit field, can indicate the length in bytes of the base_URL field.

base_URL, which is a variable length field, can contain the bytes of the base URL, which can have the same semantics as the baseURL attribute of the TPT XML format.

When present, expire_date, which can be a 32-bit field, can indicate the date and time of the expiration of the information included in this TPT instance. If the receiver caches the TPT, it can be re-used until the expireDate. The unsigned integer can be interpreted as the number of GPS seconds since 00:00:00 UTC, 6 Jan. 1980, minus the GPS-UTC_offset. The GPS UTC offset can be an 8-bit unsigned integer that defines the current offset in whole seconds between GPS and UTC time standards.

trigger_server_URL_length, which can be an 8-bit field, can indicate the length in bytes of the trigger_server_URL field. When the value of this field is 0, it can indicate that internet delivery of individual Activation Triggers is not available.

trigger_server_URL, when the value of the trigger_server_URL_length field is not 0, can contain the bytes of the Trigger Server URL, which can have the same semantics as the URL attribute of the LiveTrigger element of the TPT XML format.

trigger_delivery_type, which can be a 1-bit field, can indicate the delivery mode of individual Activation Triggers over the Internet. The value '0' can indicate that HTTP short polling is being used; the value '1' can indicate that either HTTP long polling or HTTP streaming is being used.

poll_period, which can be an 8-bit integer, can indicate the recommended number of seconds between polls, when HTTP short polling is being used.

num_apps_in_table, which can be an 8-bit field, can indicate the number of applications (TDOs) described in this TPT instance.

app_id, which can be a 16-bit field, can contain an identifier for this application (the application described in this iteration of the num_apps_in_table loop). It can be unique within this TPT instance.

app_type_included, which can be a 1-bit field, can indicate whether the app_type field is included for this application. The value '1' can mean it is included; the value '0' can mean it is not included.

app_name_included, which can be a 1-bit field, can indicate whether the app_name field is included for this application. The value '1' can mean it is included; the value '0' can mean it is not included.

global_id_included, which can be a 1-bit field, can indicate whether the global_id field is included for this application. The value '1' can mean it is included; the value '0' can mean it is not included.

app_version_included, which can be a 1-bit field, can indicate whether the app_version field is included for this application. The value '1' can mean it is included; the value '0' can mean it is not included.

cookie_space_included, which can be a 1-bit field, can indicate whether the cookie_space field is included for this application. The value '1' can mean it is included; the value '0' can mean it is not included.

frequency_of_use_included, which can be a 1-bit field, can indicate whether the frequency_of_use field is included for this application. The value '1' can mean it is included; the value '0' can mean it is not included.

expire_date_included, which can be a 1-bit field, can indicate whether the expire_date field is included for this application. The value '1' can mean it is included; the value '0' can mean it is not included.

When present, app_type, which can be an 8-bit field, can indicate the format type of this application. The value 0 can indicate that the application is a TDO. If this field is not present, the value can default to 0. Other values can represent other formats.

When present, app_name_length, which can be an 8-bit field, can indicate the length in bytes of the app_name field immediately following it. The value 0 for this field can indicate that no app_name field is present for this application.

When present, app_name, which is a variable length field, can have the same semantics as the appName attribute of the TDO element in the TPT XML format.

When present, global_id_length, which can be an 8-bit field, can indicate the length in bytes of the global_id field immediately following it. The value 0 for this field can indicate that no global_id field is present for this application.

When present, global_id, which is a variable length field, can have the same semantics as the globalId attribute of the TDO element in the TPT XML format.

When present, app_version, which can be an 8-bit field, has the same semantics as the appVersion attribute of the TDO element in the TPT XML format.

When present, cookie_space, which can be an 8-bit field, can have the same semantics as the cookieSpace attribute of the TDO element in the TPT XML format.

When present, frequency_of_use, which can be an 8-bit field, can have the same semantics as the frequencyOfUse attribute of the TDO element in the TPT XML format.

When present, expire_date, which can be an 8-bit field, can have the same semantics as the expireDate attribute of the TDO element in the TPT XML format.

test_app, which can be a 1-bit field, can indicate whether or not this application is a test application, intended to be ignored by ordinary receivers. The value '1' can mean it is a test application; the value '0' can mean it is not a test application.

available_on_internet, which can be a 1-bit field, can indicate whether or not this application is available via the Internet or not. The value '1' can mean it is available via the Internet; the value '0' can mean it is not available via the Internet.

available_in_broadcast, which can be a 1-bit field, can indicate whether or not this application is available via the broadcast or not. The value '1' can mean it is available via the broadcast; the value '0' can mean it is not available via the broadcast. number_URLs, which can be a 4-bit field, can indicate the number of files that comprise this application.

URL_length, which can be an 8-bit field, can indicate the length of the URL field following it.

URL, which is a variable length field, can have the same semantics as the URL attribute of the TDO element in the TPT XML format.

number_content_items, which can be an 8-bit field, can indicate the number of content items that are to be downloaded for use by this application.

updates_avail, which can be a 1-bit field, can indicate whether this content item will be updated from time to time—i.e., whether it a set of static files or a real-time data feed. The value '1' can indicate that it will be updated; the value '0' can indicate that it will not be updated.

avail_internet, which can be a 1-bit field, can indicate whether the file(s) that comprise this content item can be downloaded via the Internet or not. The value '1' can mean that they are available for downloading via the Internet; the value '0' can mean they are not available.

avail_broadcast, which can be a 1-bit field, can indicate whether the file(s) that comprise this content item can be downloaded via the broadcast or not. The value '1' can mean that they are available for downloading via the broadcast; the value '0' can mean they are not available.

content_size_included, which can be a 1-bit field, can indicate whether or not the content_size field is included or not for this application. The value '1' can mean it is included; the value '0' can mean it is not included.

number_URLs, which can be a 4-bit field, can indicate the number of files that comprise this content item.

URL_length, which can be an 8-bit field, can indicate the length of the URL field following it.

URL, which is a variable length field, can have the same semantics as the URL attribute of the ContentItem, child element of the TDO element in the TPT XML format.

content_size, which can be a 24-bit field, can have the same semantics as the contentSize attribute of the ContentItem child element of the TDO element in the TPT XML format.

num_content_descriptors, which can be an 8-bit field, can indicate the number of content descriptors in the descriptor loop immediately following it.

content_descriptor( ), which is a variable length field, can be a descriptor conforming to the MPEG-2 descriptor format (tag, length, data). It can provide additional information about this content item. Among the descriptors that may be included in this descriptor loop can be the Capabilities descriptor, indicating receiver capabilities needed for a meaningful presentation of this content item.

number_events, which can be an 8-bit field, can indicate the number of events defined for this TDO.

event_id, which can be a 16-bit field, can contain an identifier for this event (the event described in this iteration of the number_events loop). It can be unique within the scope of this application. The event can be referenced within Activation Triggers by the combination of app_id and event_id.

action, which can be a 5-bit field, can have the same semantics as the action attribute of the Event child element of the TDO element in the TPT XML format.

destination_included, which can be a 1-bit field, can indicate whether or not the destination field is included for this event. The value '1' can indicate that it is included; the value '0' can indicate that it is not included.

diffusion_included, which can be a 1-bit field, can indicate whether or not the diffusion field is included for this event. The value '1' can indicate that it is included; the value '0' can indicate that it is not included.

data_included, which can be a 1-bit field, can indicate whether or not the data_size and data_bytes fields are included for this event. The value '1' can indicate that they are included; the value '0' can indicate that they are not included.

When present, the semantics of destination field can be the same as the semantics of the destination attribute of the Event child element of the TDO element in the TPT XML format.

When present, the semantics of diffusion field can be the same as the semantics of the diffusion attribute of the Event child element of the TDO element in the TPT XML format.

When present, the data_size field can indicate the size of the data_bytes field immediately following it.

When present, the data_bytes field can provide data related to this event. Whenever the event is activated, the target application will be able to read the data and use it to help carry out the desired action. The content of this field can be identical to the content of the corresponding Data child element of the corresponding Event child element of the corresponding TDO element in the TPT XML format, except that this field can contain the raw binary value, and the Data element in the TPT XML format can contain a base64 encoding of the binary value.

num_app_descriptors, which can be an 8-bit field, can indicate the number of descriptors in the descriptor loop immediately following it.

app_descriptor( ), which is a variable length field, can be a descriptor conforming to the MPEG-2 descriptor format (tag, length, data). It can provide additional information about this application (TDO). Among the descriptors that may be included in this descriptor loop is the Capabilities descriptor, indicating receiver capabilities needed for a meaningful presentation of this application.

num_TPT_descriptors, which can be an 8-bit field, can indicate the number of descriptors in the descriptor loop immediately following it.

TPT_descriptor( ), which is a variable length field, can be a descriptor conforming to the MPEG-2 descriptor format (tag, length, data). It can provide additional information about this TPT. Among the descriptors that may be included in this descriptor loop is the Capabilities descriptor, indicating receiver capabilities needed for a meaningful presentation of the interactive service represented by this TPT.

FIG. 14 is a diagram showing an embodiment of an activation message table structure. Hereinafter, fields included in the table will be described. The sizes of the fields and the types of the fields included in the table may be added or changed according to designer's intention.

An Activation Messages Table (AMT) can contain the equivalent of the Activation Triggers for a segment. Under certain circumstances it can be delivered to receivers in lieu of Activation Triggers. A trigger can be delivered in the closed caption stream, by ACR servers, by a "live trigger" server, and via AMT.

The detailed semantics of the fields in the AMT structure is as follows:

An Activation Messages Table (AMT) may include @majorProtocolVersion, @minorProtocolVersion, @segmentId, @beginMT attribute and/or Activation element.

@majorProtocolVersion, which can be a 4-bit attribute of the AMT element, can indicate the major version number of the AMT definition. The major version number can be set to 1. Receivers can be expected to discard instances of the AMT indicating major version values they are not equipped to support.

When present, @minorProtocolVersion, which can be a 4-bit attribute of the AMT element, can indicate the minor version number of the AMT definition. When not present, the value can default to 0. The minor version number can be set to 0. Receivers can be expected to not discard instances of the AMT indicating minor version values they are not equipped to support. In this case they can be expected to ignore any individual elements or attributes they do not support.

@segmentID, which is an identifier of the AMT, matches the identifier of the TPT which contains the applications and events to which the Activations in this AMT apply. @segmentId may serve as an identifier of the AMT. Accordingly, the receiver may receive and parse the AMT to identify the AMT via @segmentId information. @segmentId contains information indicating to which segment the AMT applies, matches @id of the TPT related to the segment, and serves to connect the AMT and the TPT. Further, the segment may be identified to provide basic information necessary to identify the target TDO and the event of the activation element of the AMT.

When present, @beginMT, which is an attribute of the AMT element, can indicate the beginning Media Time of the segment for which this AMT instance provides activation times. @beginMT may indicate beginning of the media time with respect to a segment to which the AMT will apply. Therefore, it is possible to decide a criterion of a time when activation indicated by the activation element occurs. Accordingly, if @beginMT is present, @startTime attribute in the activation element may be influenced by the beginning of the media time indicated by @beginMT.

Each instance of Activation element of the AMT can represent a command to activate a certain event at a certain time, with certain data associated with the event. A plurality of activation elements may be present in the AMT. Each activation element performs a role similar to that of the activation trigger. The activation element may apply to the segment indicated by @segmentId in the AMT. Attributes of the activation element may contain information about in which application activation occurs, in which event activation occurs, when activation occurs, etc. Attributes of the activation element will be described in detail below.

The activation element may include @targetTDO, @targetEvent, @targetData, @startTime and/or @endTime attribute.

@targetTDO, which is an attribute of the Activation element, can match the appID attribute of a TDO element in the TPT with which the AMT is associated, thereby identifying the target application for the activation command. @targetTDO may contain information to which application the activation element of the AMT applies. The receiver may receive and parse the AMT to obtain @targetTDO and find @appID in the TDO element of the matching TPT to identify the application to which the activation element will apply.

@targetEvent, which is an attribute of the Activation element, can match the eventID attribute of an Event element contained in the TDO element identified by the targetTDO attribute, thereby identifying the target event for the activation command. @targetEvent may contain information to which event of which application the activation element of the AMT applies. The receiver may receive and parse the AMT to obtain @targetEvent and find @eventID in the TDO element of the matching TPT to identify the event to which the activation element will apply.

@targetData, which is an attribute of the Activation element, can match the dataID attribute of a Data element contained in the Event element identified by the targetTDO and targetEvent attributes, thereby identifying the Data that is to be associated with the target event when the activation command applies. @targetData may identify data related to the target event when the activation command applies. The receiver may receive and parse the AMT to obtain @targetData and find @dataID in the event element of the TPT.

@startTime, which is an attribute of the event element, can indicate the start of the valid time period for the event relative to Media Time. Receivers can be expected to execute the command when Media Time reaches the value in startTime, or as soon thereafter as possible. @startTime may indicate a start time when the event occurs. This start time is based on the media time. The receiver may parse the AMT to obtain @startTime information and confirm the time when the event occurs using @startTime. The receiver may activate the event if the media time reaches the startTime based on the media time of the segment identified by @segmentId. If startTime has been already elapsed, the event may be activated as soon as possible.

When present, @endTime, which is an attribute of the event element, can indicate the end of the valid time period for the event relative to Media Time. The receiver can be expected to not execute the command when Media Time is past the value in endTime. @endTime may indicate the end time of the event. If the media time reaches the endTime, the receiver may not perform the event.

The Activation elements in the AMT can appear in order of ascending startTime values.

When a receiver is activating events according to the Activations in an AMT, it can be expected to apply each activation at its startTime, or as soon thereafter as possible (for example, in the case when a receiver joins the service and receives the AMT at some time after the startTime and before the end-Time). If the "action" attribute of the event element in TPT is "exec", then the receiver can be expected to pass a Trigger-Event in to the target application. TriggerEvent will be described below in the part related to the API.

FIG. 15 is a diagram showing an embodiment of a URL List structural diagram.

A URL List can contain certain URLs of potential use to a receiver. The URL list may include the following URLs, etc.

1. URL for TPTs for one or more future segments, allowing a receiver to pre-download files.

2. URL of an NRT Signaling Server from which information about stand-alone NRT services in the broadcast stream can be retrieved, allowing a receiver to access those services even if it does not have access to delivery of NRT service signaling in the broadcast stream.

3. URL of a Usage Reporting Server to which usage reports can be sent for a virtual channel, allowing a receiver to send in such reports even if it does not have access to delivery of this URL in the broadcast stream.

4. URL of the PDI-Q Table for a virtual channel, allowing a receiver to personalize the viewing experience even if it does not have access to the PDI-Q Table delivered in the broadcast stream. (The PDI-Q Table is related to personalization for providing a service customized for the user in provision of the interactive service. It is possible to inquire the user about personalization via the PDI-Q table.)

Among others, the URL list may be made with respect to the UrsUrl element so as to further indicate the URL of the server for usage reporting, in order to use preferred data and the type of content viewed and consumed currently through the receiver in business. The UrsUrl element included in the URL list may be variously interpreted as follows.

First, in case of a usage reporting server, the receiver may perform the usage reporting function of the receiver by a predetermined protocol (e.g., data structure, XML file, etc.) with the URL of the usage reporting server.

Second, there may be a TDO executed on the web browser of the receiver. In this case, this indicates the location of the Usage Reporting TDO. In this case, the TDO may directly collect and report information about content stored in the receiver or consumed currently using the API (e.g., file APIs or usage reporting APIs) of the web browser of the receiver. The TDO may transmit the collected data using Javascript API called XMLHttpRequest.

URLlist may include UrlList, TptUrl, UrsUrl, and/or Pdi-Url. The semantics of these elements is as follows.

TptUrl, which is an element of the UrlList element, can contain the URL of a TPT for a future segment in the current interactive adjunct service. When multiple TptUrl elements are included, they can be arranged in order of the appearance of the segments in the broadcast.

NrtSignalingUrl, which is an element of the UrlList element, can contain the URL of a server from which receivers can obtain NRT signaling tables for all the virtual channels in the current transport stream.

UrsUrl, which is an element of the UrlList element, can contain the URL of a server to which receivers can send usage (audience measurement) reports for the current virtual channel.

PdiUrl, which is an element of the UrlList element, can contain the URL of the PDI-Q table for the current virtual channel.

FIG. 16 is a diagram showing an embodiment of the binary format for the private sections containing TPTs. FIG. 16 illustrates a case in which a TPT is delivered in a broadcast stream in a delivery mechanism which will be described below. Details are described later.

A description will be given of a delivery mechanism for delivering a trigger, a TPT, etc. Output from Interactive Service Creation, Delivery of Triggers in the Broadcast Stream, Delivery of Time base triggers via the Internet, Delivery of Activation Triggers via Internet (ACR Scenario), Delivery of TPTs in Broadcast Stream, Delivery of TPTs via Internet, Moving TDOs and Content Items, Combining Multiple Segments into One Segment will be sequentially described.

Hereinafter, Output from Interactive Service Creation will be described.

The process of service creation for a segment can result in folder containing all TDOs and other content items, TPT file in XML format and AMT file in XML format. The other results may be created.

Hereinafter, Delivery of Triggers in the Broadcast Stream will be described.

When delivered in the broadcast stream, Triggers can be delivered in the DTV Closed Caption channel, in Service #6, in the URLString command.

If the Trigger is less than or equal to 26 characters in length, it can be sent non-segmented (Type=11). If the Trigger is 27 to 52 characters in length, it can be sent in two segments (the first segment in a Type=00 segment and the second segment in a Type=10 segment).

The type of URI delivered in any given instance of the command can be given by an 8-bit parameter.

For interactive services using the TDO model, the URI type of the URI data structure can be set to 0 (Interactive TV Trigger for TDO model). This delivery mechanism includes both Time base triggers and Activation Triggers.

In the case in which the time base trigger is delivered via a broadcast stream (in closed caption service #6.), if "m=" term is absent, Time base triggers can simply deliver URL of Signaling Server. And if "m=" term is absent, then "t=" term must be absent from Activation triggers.

In the case in which the activation trigger is delivered via a broadcast stream (in closed caption service #6.), that is, in the case of "Trigger" format, with "e=" term, with or without "t=" term, if "t=" term is present, activation time can be the timestamp relative to a time base. And if "t=" term is absent, activation time can be the arrival time of the message.

In the case in which the time base trigger and the activation trigger are delivered via CC service #6, there can be three possible ways for broadcasters to handle Time Base and Activation triggers. The three ways are 'Segment mode without explicit time base', 'Segment mode with explicit time base' and 'Service mode with explicit time base'.

These can be mixed within a broadcast, on a segment by segment basis.

In segment mode without explicit time base, Activation messages include no time stamp, so that the activation time of each message can be the delivery time of the message, and Time Base messages also include no time stamp, so that their only purpose can be to provide the URL of the Signaling Server that can deliver TPT files. Time Base messages can even be omitted entirely in this mode, relying on the URL in the Activation messages to provide the URL of the Signaling Server, but then receivers will not be able to retrieve a TPT and start downloading TDOs until after the first Activation message appears, delaying the response to the first Activation message by quite a bit.

In this case Time Base messages that can appear in CC service #6 can contain the "locator_part" of the "Trigger" format and possibly the "spread" term, but no "media_time" term, and Activation messages that can appear in CC service #6 can contain the "locator_part" of the "Trigger" format, the "event_time" term, and possibly the "spread" term, but with no "t=" part in the "event_time" term. The "locator_part" of both Time Base and Activation messages can be the current segmentId. This URL can also be used to retrieve the TPT for the segment via the Internet.

In segment mode with explicit time base, Time Base messages include a time stamp, to define a time base, and Activation messages might include a time stamp, to define the activation time relative to the time base, or they might include no time stamp, indicating that the activation time is the arrival time of the message.

In this case Time Base messages that can appear in CC service #6 can contain the "locator_part" of the "Trigger" format, the "media_time" term, and possibly the "spread" term, and Activation messages that can appear in CC service #6 can contain the "locator_part" of the "Trigger" format, the "event_time" term, and possibly the "spread" term, with or without the "t=" part in the "event_time" term. The "locator_part" of both Time Base and Activation messages can be the current segmentId, and the time base is specific to the segment. This URL can also be used to retrieve the TPT for the segment via the Internet.

In service mode with explicit time base, Time Base messages include a time stamp, to define a time base, and Activation messages might or might not include a time stamp. The time base can extend across multiple segments, rather than being specific to a single segment. The "locator_part" of the Time Base messages can be an identifier of the time base, and also a URL that can be used to retrieve TPTs for the service via the Internet.

In any case the Trigger Insertion Server that inserts the triggers into CC service #6 should work from the AMT, translating the Activation messages from the XML format in the AMT into the trigger format specified for delivery in CC service #6. In the case of an Activation element with no endTime attribute, a single trigger can be inserted with activation time equal to the startTime attribute. In the case of an Activation element with both startTime and endTime elements, a sequence of triggers can be inserted with same target. The first trigger in the sequence can have activation time equal to the startTime attribute, the last trigger in the sequence can have activation time equal to the endTime attribute, and there can be a fixed time interval between the activation times of the triggers in the sequence (except that the interval between the next-to-last and last trigger in the sequence can be shorter). The length of this fixed time interval can be configurable.

When the Time Base and Activation messages are in segment mode, the time base can be specific to the segment. It can start with the "beginMT" value at the beginning of the segment, and run through the segment. The "startTime" and "endTime" values of individual Activations can be relative to the "beginMT" value. When the Time Base and Activation messages are in service mode, the time base can span segments, and the "beginMT" value for each segment can be adjusted to take account of the service time base and the broadcast schedule.

Hereinafter, Delivery of Time base triggers via the Internet will be described.

Internet delivery of Time base triggers can be useful in so-called Automatic Content Recognition (ACR) situations, where the recipient of the Time base triggers has no access to Closed Caption service #6. In these situations the receiver needs to use ACR in order to recognize video frames and synchronize the time base with them. In ACR situations Time Base messages can be obtained from watermarks or from ACR servers. In case of reception from the ACR server, the Time Base messages are delivered as responses from an ACR server.

Hereinafter, Delivery of Activation Triggers via Internet (ACR Scenario) will be described.

Activation messages can be delivered via short polling, long polling or streaming, but all of these can impose a lot of overhead on the receivers and the server. Activation messages can also be delivered in the form of an AMT, but this can provide a good deal of information about the length of segments, facilitating ad killers. There might be other alternatives.

In the case in which the activation message is delivered in the form of the activation trigger, that is, in case of "Trigger" format with "e=" term, with or without "t=" term, this may be delivered via HTTP short polling, long polling or streaming.

When delivered via Internet, Activation messages can be delivered using either or both of the mechanisms, Individual Activation Trigger Delivery mechanism and Bulk Activation Trigger Delivery mechanism.

Hereinafter, Individual Activation Trigger Delivery will be described.

As described above, when individual Activation Triggers are delivered via the Internet, they can be delivered using HTTP short polling, long polling or streaming. The format of the Activation Trigger can be exactly the same as when they are delivered via DTVCC service #6.

In case of short polling, the polling period must be specified. In this period, a short polling operation may be set using pollPeriod included in the TPT as described below.

When Internet delivery of Activation Triggers is available, the URL attribute of the LiveTrigger element in the TPT can indicate the Activation Trigger Server which can deliver activation trigger. If the pollPeriod attribute of the LiveTrigger element is present in the TPT, this can indicate that HTTP short polling is being used, and it can indicate the polling period a receiver should use. If the pollPeriod attribute of the LiveTrigger element is not present in the TPT, this can indicate that either HTTP long polling or HTTP streaming is being used.

Regardless of which protocol is being used, the receiver can be expected to issue an HTTP request to the Activation Trigger Server with the query term:

?mt=<media_time>
where <media_time> can be the current media time of the viewed content.

If short polling is being used, the response from the Activation Trigger Server can contain all the Triggers that have been issued within the time interval of length pollPeriod ending at <media_time>. If more than one Activation Trigger is returned, they can be separated by one or more white space characters. If no Activation Triggers are returned, the response can be empty.

If HTTP long polling or HTTP streaming is being used, the Activation Trigger Server can wait to return a response until the media time when an Activation Trigger would be delivered in the broadcast stream. At this time it can return the Activation Trigger.

If HTTP long polling is being used, the Activation Trigger Server can close the session after returning an Activation Trigger. The receiver can be expected to immediately issue another request, with an updated media time.

If HTTP streaming is being used, the Activation Trigger Server can keep the session open after returning each Activation Trigger, and it can deliver additional Activation Triggers over the session as the time arrives for them to be delivered.

In all cases the HTTP response can contain an HTTP Response Header Field of one of the following forms to signal the delivery mode:

ATSC-Delivery-Mode: ShortPolling [<poll-period>]
ATSC-Delivery-Mode: LongPolling
ATSC-Delivery-Mode: Streaming The <poll-period> parameter can indicate the recommended interval between polls for the succeeding polls. The <poll-period> can be omitted.

Hereinafter, Bulk Activation Trigger Delivery will be described.

When Activation Triggers are delivered via the Internet in bulk, the Activation Triggers for a segment can be delivered via HTTP along with the TPT for the segment, in the form of a multi-part MIME message, with the TPT as the first part of the message, and an Activation Messages Table (AMT) as the second part of the message.

Hereinafter, Delivery of TPTs in Broadcast Stream will be described.

When delivered in the broadcast stream, TPTs can be translated from their XML format into an equivalent binary NRT-style signaling table format and encapsulated in NRT-style private sections, one TPT per table instance. The TPT for the current segment is always present. TPTs for one or more future segments may also be present. The TPT instance is defined by the value of its segment_id field. For reference, the binary format of the TDO parameter table was described above. Here, NRT-style private section may correspond to tpt_section( ) of FIG. 16.

In summary, in order to transmit the binary structure of the TPT in NRT, the TPT may have a section structure suitable for NRT transmission. Hereinafter, this process will be described in detail.

Each TPT can be encapsulated in NRT-style private sections by dividing each TPT into blocks and inserting the blocks into the tpt_bytes( ) fields of sections that have a common value of table_id, protocol_version TPT_data_version and sequence_number fields. The blocks can be inserted into the sections in order of ascending section_number field values. The private sections can be carried in the Service Signaling Channel (SSC) of the IP subnet of the virtual channel to which the TPT pertains. Here, "Service Signaling Channel" is defined in the ATSC-NRT standard and means a channel having a specific IP address and a port number. The sequence_number fields in the sections can be used to distinguish different TPT instances carried in the same SSC.

Hereinafter, the fields of FIG. 16 will be described.

The private section (tpt_section( )) may include table_id, protocol_version, sequence_number, TPT_data_version, current_next_indicator, section_number, last_section_number, service_id, and/or tpt_bytes( ) information.

table_id, which can be an 8-bit field, can identify this table section as belonging to a TDO Parameters Table instance.

protocol_version may be divided into two parts. The high order 4 bits of this 8-bit unsigned integer field can indicate the major version number of the definition of this table and the TPT instance carried in it, and the low order 4 bits can indicate the minor version number. The major version number can be set to 1. Receivers can be expected to discard instances of the AMT indicating major version values they are not equipped to support. The minor version number can be set to 0. Receivers can be expected to not discard instances of the AMT indicating minor version values they are not equipped to support. In this case they can be expected to ignore any descriptors they do not recognize, and to ignore any fields that they do not support.

sequence_number can be an 8-bit field. The value of sequence_number can be the same as the sequence_number of all other sections of this TPT instance and different from the sequence_number of all sections of any other TPT instance in this Service Signaling Channel. Accordingly, this field may perform a role different from that of the other TPT instance. sequence_number field may indicate an IP subnet associated with a service signaling channel in this section. The values of the sequence_number fields of the different TPT instances can reflect the order in which the segments appear in the broadcast stream.

TPT_data_version, which can be a 5-bit field, can indicate the version number of this TPT instance, where the TPT instance can be defined by its segment_id. Since the TPT version is known in advance in order to determine whether the received TPT section data is a new version TPT, the TPT_data_version field may be present in the section table. The version number can be incremented by 1 modulo 32 when any field in the TPT instance changes.

current_next_indicator, which can be a 1-bit indicator, can always be set to '1' for TPT sections, indicating that the TPT sent is always the current TPT for the segment identified by its segment_id.

section_number, which can be an 8-bit field, can give the section number of this TPT instance section, where the TPT instance can be identified by its segment_id. The section_number of the first section in an TPT instance can be 0x00. The section_number can be incremented by 1 with each additional section in the TPT instance.

last_section_number, which can be an 8-bit field, can give the number of the last section (i.e., the section with the highest section_number) of the TPT instance of which this section is a part.

service_id, which can be a 16-bit field, can specify the service_id associated with the interactive service offering the content items described in this table instance.

tpt_bytes( ), which is a variable length field, can include a block of the TPT instance carried in part by this section. When the tpt_bytes( ) fields of all the sections of this table instance are concatenated in order of their section_number fields, the result can be the complete TPT instance.

That is, after the binary format of the TPT is used or the XML format is changed to a binary format, the TPT may be divided to be suitable for NRT transmission, included in tpt_bytes( ) field of the private section, and transmitted in NRT. At this time, if one TPT is divided into several private sections, the private section may have the same table_id, protocol_version TPT_data_version and sequence_number value. The divided TPT blocks may be inserted in order of section_number field values.

The receiver may parse the received private sections. In order to combine the private sections into one TPT again, the private sections having the same table_id, protocol_version TPT_data_version and sequence_number values may be used. At this time, order information capable of being obtained from section_number and last_section_number information may be used. If tpt_bytes( ) of all private sections having the same table_id, protocol_version TPT_data_version and sequence_number values are sequentially connected, one TPT may be created.

Delivery of TPTs via Internet will be described in detail with reference to FIG. 17.

Hereinafter, Moving TDOs and Content Items will be described.

Networks and stations will often need to provide their own HTTP servers for delivering TDOs and content items (files) used by TDOs. When this is done, the baseURL in the TPT can be adjusted to reflect the location of the server.

Hereinafter, Combining Multiple Segments into One Segment will be described.

In order to thoroughly obfuscate boundaries between segments, the TPTs and AMTs for multiple segments can be combined into a single TPT and AMT. The following steps may be performed.

1. Identify the set of segments to be combined.
2. Create a new TPT with a new segmentId.
3. If any of the segments being combined have live activations, provide a relay server that provides access to all of them, and put the parameters for this server in the "LiveTrigger" element.
4. Apply the baseURL for each segment as needed to get the full TDO and ContentItem URLs. (It may be possible to identify a shorter baseURL that is common to all the segments being combined, and retain that as a baseURL for the combined segment.)
5. Revise appId values as needed to remove conflicts.
6. Insert into the new TPT all the revised TDO elements for all the segments being combined.
7. Create a new AMT with segmentId equal to the new segmentId of the combined TPT.
8. Select an appropriate new "beginMT" value for the new AMT.
9. Adjust the targetId values of all the Activation elements in the AMT files for the segments being combined to reflect any changes in appId values.
10. Adjust the startTime and endTime values of all the Activation elements in the AMT files for the segments being combined to reflect the new "beginMT" value and the broadcast schedule for the segments being combined.
11. Insert all the revised Activation elements into the new AMT.

FIG. 17 is a diagram showing an embodiment of a list of URLs encoded as an XML document.

Hereinafter, Delivery of TPTs via Internet will be described.

When delivered over the Internet, TPTs can be delivered via HTTP. The URL of the TPT for the current segment can be the "<domain name part>/<directory path>" in Time Base messages. The response to a request for a TPT can include just the TPT, or it can include a 2-part MIME message, with the requested TPT in the first part and a list of URLs in the second part, encoded as an XML document. (The response to a request will always include the TPT for the current segment. It may include TPTs for one or more future segments as well.)

The URLs as the second part of the above-described response may have the format shown in FIG. 17.

The semantics of the elements of FIG. 17 will be described.

"UrlList" can contain a list of URLs that are useful to a receiver.

"TptUrl" can contain the URL of a TPT for a future segment. When multiple TptUrl elements are included, they can be arranged in order of the appearance of the segments in the broadcast.

"NrtSignalingUrl" can contain the URL of a server where receivers can obtain NRT signaling tables for all the virtual channels in the current broadcast stream.

FIG. 18 is a diagram showing an embodiment of addTriggerEventListener.

Hereinafter, ATSC JavaScript APIs for an environment for executing DO will be described.

In order to support synchronization of Declarative Object actions to broadcast programming, additional methods can be supported for the video/broadcast object.

If the TPT is received via the DTVCC or the Internet, several events for executing the TDO may be present in the TPT and these events may be activated by the activation trigger.

In order to process this event, a Listener function may be registered on a per eventID basis. Accordingly, as the above-described 'additional methods', the two functions, addTriggerEventListener and removeTriggerEventListener, for registering the Listener function may be present.

In FIG. 18, addTriggerEventListener is described and format, arguments, etc. are shown.

addTriggerEventListener function can register a callback function (listener function) for processing an event generated on a per eventId basis. The addTriggerEventListener function may receive the listener of EventListener type and eventId of Number type as argument. The eventListener type will be described below. The addTriggerEventListener function may not have a return value (void). Here, eventId argument may be event ID in the event element of the TPT. Here, listener argument may be a listener for the event.

The trigger processing module of the receiver may register the listener function on a per eventId basis using the "addTriggerEventListener" function as soon as the activation message is received. If the event is activated, the registered listener function may be called. At this time, the object of TriggerEvent type may be delivered to the listener function. TriggerEvent type will be described below.

FIG. 19 is a diagram showing an embodiment of removeTriggerEventListener.

In FIG. 19, removeTriggerEventListener is described and format, arguments, etc. are shown.

The removeTriggerEventListener function can cancel registration of a callback function (listener function) for processing an event generated on a per eventId basis. The removeTriggerEventListener function may receive the listener of EventListener type and eventId of Number type as argument. The eventListener type will be described below. The removeTriggerEventListener function may not have a return value (void). Here, eventId argument may be event ID in the event element of the TPT. Here, listener argument may be a listener for the event.

In the javascript program, if the event which may be generated on a per eventId basis is desired to be no longer received or if the program "DestroyWindow" is finished, the listener function registered using "removeTriggerEventListener" may be cancelled.

FIG. 20 is a diagram showing an embodiment of the definition of the EventListener type.

Here, the definition of the EventListener type conforms to Web Interface definition Language (Weg IDL). Web IDL can be used to describe interfaces that are intended to be implemented in web browsers. Web IDL is an IDL variant with a number of features that allow the behavior of common script objects in the web platform to be specified more readily.

EventListener may be an interface object. EventListener type may have an event of TriggerEvent type as an argument.

FIG. 21 is a diagram showing an embodiment of the definition of the TriggerEvent type.

TriggerEvent type may contain information about the event.

TriggerEvent type may have eventId, data and status as properties. Here, eventId may be eventID in the event element of the TPT. Here, data may be data for this activation of the event. Here, data may be hexadecimal. Here, status may mean the status of the event. Here, if the status value is "trigger", this means a status in which the event is activated by the activation trigger. If the status value is "error", this means a status in which error occurs.

TDO model has been described. Hereinafter, Direct Execution model will be described.

In the Direct Execution model, a Declarative Object (DO) can be launched automatically as soon as the virtual channel is selected. It can communicate over the Internet with a backend server to get detailed instructions for providing interactive features—creating displays in specific locations on the screen, conducting polls, launching other specialized DOs, etc., all synchronized with the audio-video program.

Hereinafter, the trigger operation in the direct execution model will be described.

The role, function and syntax of the trigger are not largely changed in the direct execution model.

Performance of the trigger is equal to that described above.

Trigger syntax is equal to that described above.

A Trigger can be considered to include three parts.

<domain name part>/<directory path>[?<parameters>]

In the direct execution model, the combination of <domain name part> and <directory path> can uniquely identify the DO to be launched.

<parameters> may include one or more of "event_time", "media_time", or "spread"

In the direct execution model, an application is launched automatically as soon as the virtual channel is selected. Application can communicate over the Internet with a backend server via a "Synchronized Content Protocol". The server can give detailed instructions for providing interactive feature, which is all synchronized with the audio-video program.

In case of the direct execution model, since an application is immediately executed, information may be delivered to the currently executed application as a time base trigger is delivered. In this model, the application needs to continuously deliver information about currently broadcast content to the server for synchronization. To this end, the time base trigger may further include special information different from that of the TDO model. This special information may be an identifier of currently broadcast content.

Similarly, the content identifier may be present in the parameter part of the trigger in the form of a parameter.

Similarly, the content identifier may be present in media_time of the trigger in the form of one term. The content identifier term, which can be called content_id, which can be designated by "c=" followed by a character string, can represent an identifier for the content currently being viewed.

The content_id term can be intended to support the Direct Execution model of interactive service implementation.

As described above, in this model, Time base triggers with content_id term can be passed in to the application after it is launched, and the application can deliver the content_id to the backend server in order to identify the context for the interaction. Detailed operation thereof will be described below.

The delivery mechanism of the trigger in the direct execution module is equal to that described above.

However, in case of Delivery of Triggers in the Broadcast Stream, Triggers can be delivered in the DTV Closed Caption channel, in Service #6, in the URLString command. And for interactive services using the Direct Execution model, the URI_type field can be set to 2 (Interactive TV Trigger for Direct Execution model).

Hereinafter, overall operation of the direct execution module will be described.

As one model for executing interactive service, in the direct execution model, an application can be launched automatically as soon as the virtual channel is selected. The application can communicate over the Internet with a backend server via a "Synchronized Content Protocol." The server can give detailed instructions for providing interactive features—creating displays in specific locations on the screen, conducting polls, launching other specialized DOs, etc., all synchronized with the audio-video program.

Operation may be performed as follows.

First of all, an application can be launched. Then, a time base trigger is received. The time base trigger is delivered to the application after the application has been executed. The content_id term of the time base trigger may include content identification information of currently displayed content. The application can deliver the content_id to the backend server in order to identify the context for the interaction, and in order to identify the content currently being viewed.

Direct Execution Model has been described.

FIG. 22 is a diagram showing Architecture for WM approach.

A description will be given of Delivery via other interfaces.

Protocols and architecture enabling acquisition of an interactive service in environments (for example, as received from a cable or satellite set-top box) in which only uncompressed video and audio are accessible) are defined. The architecture and protocols can be designed for use by receivers that have Internet connections and that only have access to the uncompressed audio and video from the broadcast stream. Of course, the architecture and protocols can be used successfully if the interactive service provider chooses to support the same.

The architecture can be designed to support two basic approaches to identifying the content being viewed, so that any associated interactive service data enhancements can be delivered via Internet. Two basic approaches can be watermarking and fingerprinting.

In both the watermarking and fingerprinting approaches, the intent can be to allow receivers to find out what programming is currently being watched and obtain a URL that can be used as the starting point to get additional information about interactive services for the programming.

FIG. 22 illustrates an architecture for a WM approach.

In an architecture for a WM approach, the architecture may include a broadcaster 22010, a watermark inserter 22011, an MVPD 22020, an STB 22030, a receiver 22040, a WM client 22050, a TPT server 22060 and/or a content server 22070.

The broadcaster 22010 may be a source outputting audio/video streams and interactive services related to the audio/video streams. A TV station may be an example of the broadcaster 22010. The broadcaster 22010 may be a broadcast content producer or distributor. The broadcaster 22010 can deliver broadcast streams, audio/video content, interactive data, broadcast schedules or AMT.

The watermark inserter 22011 can insert watermarks into broadcast audio/video frames. The watermark inserter 22011 may be integrated with the broadcaster 22010 or may be a separate module. Watermarks may be information necessary for receivers. Watermarks may be information such as URL. Watermarks will be described in detail later.

The MVPD 22020 is an abbreviation for multiprogram video program distributor. The MVPD 22020 may be a cable operator, a satellite operator or an IPTV operator. The MVPD 22020 can receive the broadcast stream from the Broadcaster/Watermark Inserter, with the watermarks inserted by the Watermark Inserter 22011 in the case of a watermarking ACR system. MVPD 22020 often strips out all the program elements other than audio and video tracks, and sends the resulting stream to set-top boxes (STBs) in customer premises.

The STB 22030 typically decodes (decompresses) the audio and video and sends the same to a TV set for presentation to viewers. The STB can send uncompressed audio/video content to the receiver 22040. The STB may be an external decoding unit according to an embodiment of the present invention.

The receiver 22040 may include the WM client 22050. The WM client 22050 may be disposed outside the receiver 22040. Here, the receiver may be watermark-capable. The structure of the receiver 22040 will be described later.

The WM Client 22050 can obtain Activation Triggers from the ACR Server (not shown) and passes the same into the main receiver code, using an API provided for such purpose. Normally the WM Client 22050 would be built into the receiver, but other configurations are possible. The WM client 22050 can extract inserted watermarks from uncompressed audio/video content. Watermarks may be information such as a URL.

The TPT server 22060 may be a server capable of downloading an application such as a TPT. The receiver 22040 transmits the extracted watermarks to the ACR server. When the watermarks are matched to watermarks stored in a database (not shown), the receiver 22040 can receive a trigger or triggers as a response. When the received trigger or triggers have the above-described new locator_part or a TPT or application parameter table of a new version is discovered, the receiver 22040 may request the TPT server 22060 to download a new TPT or application parameter table.

The content server 22070 may provide applications and TDO necessary to provide interactive services. When a new application or TDO is needed, the new application can be downloaded using a URL in a TPT or application parameter table.

In the watermarking (WM) approach the broadcaster/watermark inserter can insert watermarks into the broadcast audio or video frames. These watermarks can be designed to carry a modest amount of information to receivers, while being imperceptible or at least minimally intrusive to viewers. Such watermarks might provide directly the information that receivers need, or they might only provide a code value that receivers can send via an Internet connection to a remote server in order to get the information they need.

FIG. 23 is a diagram showing an embodiment of architecture for FP approach.

In the architecture for FP approach, the architecture may include a broadcaster 23010, an MVPD 23020, an STB 23030, a receiver 23040, an FP client 23050, a TPT server 23060, a content server 23070, a signature extractor 23080 and/or an FP server 23090.

The broadcaster 23010 may be a source outputting audio/video streams and interactive services related to the audio/video streams. A TV station may be an example of the broadcaster 22010. The broadcaster 22010 may be a broadcast content producer or distributor. The broadcaster 22010 can deliver broadcast streams, audio/video content, interactive data, broadcast schedules or AMT.

The MVPD 23020 is the abbreviation for multiprogram video program distributor. The MVPD 22020 may be a cable operator, a satellite operator or an IPTV operator. The MVPD 23020 often strips out all the program elements other than audio and video tracks, and sends the resulting stream to set-top boxes (STBs) on customer premises.

The STB 23030 typically decodes (decompresses) the audio and video and sends the same to a TV set for presentation to viewers. The STB can send uncompressed audio/video content to the receiver 23040. The STB 23030 may be an external decoding unit according to an embodiment of the present invention.

The receiver 23040 may include the FP client 23050. The FP client 23050 may be disposed outside the receiver 23040. Here, the receiver 23040 may be fingerprint-capable. The structure of the receiver 23040 will be described later.

The FP Client 23050 can obtain Activation Triggers from the FP Server 23090 and passes them into the main receiver code, using an API provided for such purpose. Normally the FP Client 23050 would be built into the receiver, but other configurations are possible. The FP client 23050 can extract a fingerprint from uncompressed audio/video content. The fingerprint will be described in detail later.

The TPT server 23060 may be a server capable of downloading an application such as a TPT. The receiver 23060 transmits the extracted fingerprint to the FP server 23090. When the fingerprint is matched to a signature of the signature extractor 23080, the receiver 23040 can receive a trigger or triggers as a response. When the received trigger or triggers have the above-described new locator_part or a TPT or application parameter table of a new version is discovered, the receiver 22040 may request the TPT server 23060 to download a new TPT or application parameter table.

The content server 23070 may provide applications and TDO necessary to provide interactive services. When a new application or TDO is needed, the new application can be downloaded using a URL in a TPT or application parameter table.

The signature extractor 23080 may receive metadata from the broadcaster 23010. The signature extractor 23080 may extract the signature of a frame from the received metadata. When the fingerprint transmitted to the FP server 23090 matches the signature of the signature extractor 23080, the signature extractor 23080 can deliver the metadata related to the signature to the FP server 23090.

The FP server 23090 may perform signature matching operation with the signature extractor 23080. The FP server 23090 can match the signature to the fingerprint received from the receiver 23040. When the signature is matched to the fingerprint, the FP server 23090 can receive the metadata related to the signature from the signature extractor 23080. The FP server 23090 can transmit the metadata to the receiver 23040.

In the fingerprinting (FP) approach, the FP Client 23050 can extract fingerprints (also can be called signatures) from audio or video frames and check the fingerprints against a database of fingerprints of broadcast frames from multiple broadcasters in the area to find the information the receivers 23040 need. Such checks can be done by signatures to a remote server and getting back a record with the desired information, or in some cases they can be done by checking against a database of signatures that has been downloaded into the receiver 23040. Here, the remote server may be the FP server 23090.

Although watermarking and fingerprinting can be distinct technologies, they are not necessarily exclusive of one another. Using a combination of the two technologies is quite conceivable. The term automatic content recognition (ACR) can be used to refer to either of these technologies separately or to any combination thereof.

An environment in which a receiver only has access to the uncompressed audio and video from the broadcast stream is called an "ACR environment."

In both WM and FP cases receivers can use the URL as a starting point to obtain interactive service content, including triggers.

In both WM and FP cases the timing information can be in the form of a timestamp relative to a broadcast side clock that is used for specification of the timing of time critical events for the channel, such as activation timestamps in triggers delivered over the Internet.

It is assumed that broadcasters can typically support delivery of interactive services directly in the broadcast stream, for the benefit of receivers that get TV signals from antennas, and also support delivery of interactive services over the Internet as described above, for the benefit of receivers that get uncompressed audio and video, but have an Internet connection. However, broadcasters can support either one of these two delivery mechanisms without the other.

A typical architecture for the watermarking approach in the case when the watermark provides only a code value would look something like a combination of the two architectures in FIG. 22 and FIG. 23. There would be a Watermark Inserter, as in FIG. 22, but it would insert a code, rather than the information needed by receivers. There would also be a WM Server, playing much the same role as the FP Server in FIG. 23. Receivers would send it codes, rather than signatures, and they would get back the information they need.

A description will be given of accessing interactive services.

Description of the accessing interactive services includes descriptions of Direct Execution Model, TDO Model with Activations Independent of ACR Server, TDO Model with Activations received from ACR Server. While the models are not shown, the models are not limited to the descriptions and may be changed according to the intention of a designer.

There are a number of different ways for a receiver in an ACR environment to access interactive services, depending on broadcaster choices and the nature of the ACR system. The interactive service model can be the Direct Execution model or the TDO model, and Activation In the case of the TDO model, Triggers can be delivered independently of the ACR Server, or they can be delivered by the ACR Server.

A description will be given of the Direct Execution Model.

An ACR process for a virtual channel that contains an interactive service which has the Direct Execution Model can provide to receivers viewing that channel the equivalent of Time Base Triggers that include the media_time ("m=") term and the content_id ("c=") term. These Triggers can be identified as Triggers for an interactive service with the Direct Execution model.

When a receiver first receives such a Trigger with a new locator_part, it can be expected to load into its browser the Declarative Object (DO) pointed to by the locator_part of the Trigger. Typically the DO will have been pre-installed or previously downloaded and cached. Otherwise the receiver can be expected to download the same, using an HTTP GET request.

Then, the DO can contact the appropriate back-end server and provide the interactive service as directed by the back-end server.

The receiver can be expected to make that initial Trigger and subsequent Triggers available to the DO as they are obtained until such time as it gets a Trigger from the ACR server that has a new locator_part and/or that is identified as a Trigger for an interactive service with the TDO model (either of which typically indicates a channel change).

A description will be given of the TDO Model with Activations Independent of ACR Server.

An ACR process for a virtual channel that can contain an interactive service which has the TDO model, and which provide event activations independently of the ACR Server, can provide to receivers viewing that channel the equivalent of Time Base Triggers that can include the media_time ("m=") term. These Triggers can be identified as Triggers for an interactive service with the TDO model.

When a receiver first receives such a Trigger with a new locator_part, it can be expected to retrieve the current TDO Parameters Table (TPT) from the TPT Server can be pointed to by the locator_part of the Trigger, and to use the media time in that Trigger and subsequent Triggers to establish a reference time base for event activations, relative to the audio or video frames can be identified by the ACR process.

If an (Activation Messages Table) AMT is delivered along with the TPT, the receiver can be expected to use the individual Activation elements in the table to activate events at the correct times relative to the time base established by the media-time terms in the Triggers. (These events can include loading and executing a TDO, causing a TDO to take a particular synchronized action, suspend a TDO, etc.)

If a LiveTrigger element is included in the TPT, the receiver can be expected to retrieve Activation Triggers from the Live Trigger Server identified by the URL in the LiveTrigger element, using the polling method signaled in the LiveTrigger element, and to use these Activation Triggers to activate events at the correct times relative to the time base established by the media-time terms in the Triggers.

Both an AMT and a Live Trigger Server can be used for the same service, typically with the former providing static activations and the latter providing dynamic activations. Alternatively, an AMT can be used alone when all activations for the segment are static, or a Live Trigger Server can be used alone to deliver both static and dynamic activations.

A description will be given of the TDO Model with Activations Received from the ACR server.

How activation triggers for a TDO interactive service model are delivered without a separate trigger server in an ACR environment is described.

Fingerprinting ACR systems can include an ACR server. Receivers can send frame signatures to an ACR server, and the ACR server can identify the frame represented by the signature and send back the information needed by the receivers. Watermarking ACR systems can include an ACR server in the case when the watermarks include no more that codes that can be sent to an ACR server to get the information needed by receivers. Watermarking ACR systems may not include an ACR server in the case when the watermarks themselves contain the information needed by receivers. In those ACR systems that include an ACR server, two different models can be used for communication between the ACR servers and receivers: a request/response model and an event-driven model.

It is assumed that the broadcaster supports the TDO interaction model.

Three cases of an ACR server using a request/response model, an ACR server using an event driven model and a watermarking ACR system inserting information directly may be assumed.

In the case of an ACR server, the ACR method could be fingerprinting, in which case receivers compute some sort of signature (or fingerprint) of audio or video frames and submit the same to an ACR server for identification, or it could be watermarking, in which case receivers extract codes in the form of watermarks from the audio or video frames and submit the codes to an ACR server for identification.

Terms of fingerprinting signatures are described for convenience. However, the system operates in the same manner as the case of watermarking codes and the present invention is not limited to fingerprinting.

FIG. 24 is a diagram showing an example of static activation in a request/response ACR case.

A description will be given of a case in which an ACR server uses the request/response model.

In the request/response ACR model, the receiver can be expected to generate signatures of the content periodically (e.g. every 5 seconds, which is merely exemplary and can be changed by a designer) and send requests containing the signatures to the ACR server. When the ACR server gets a request from a receiver, it can return a response. The communications session may not kept open between request/response instances. In this model, it may not be feasible for the ACR server to initiate messages to the client.

For an ACR server that is using this request/response model and is delivering Activation Triggers to receivers, each response from the ACR server can be one of Null, Time Base Trigger and Activation Trigger.

A Null response can indicate that the signature is not recognized, or (if the ACR Ingest Module includes signatures for frames in program segments with no interactive service) that the signature represents a frame which belongs to a segment that does not have an interactive service associated therewith. The ACR ingest module will be described below.

A Time Base Trigger response can indicate that no event activation is scheduled to take place before the client's next request. The client can be expected to use the Time Base Triggers to maintain a media-time clock.

An Activation Trigger response can indicate that an activation is due to take place soon, with the time of the activation indicated by the "t=" term in the Trigger.

Whenever a receiver gets a Trigger with a new locator_part, it can be expected to download the new TPT immediately, unless it has already retrieved the same using a URLList delivered with a previous TPT.

Whenever a receiver obtains an Activation Trigger, it can be expected to activate the event at the time indicated by the "t=" term in the Trigger, relative to the media time clock.

FIG. 24 illustrates how this scheme works for static activation (or for dynamic activation when the ACR system learns of the dynamic activation sufficiently ahead of time).

In FIG. 24, the receiver can send signatures for frames which the ACR server determines to have media times MT1, MT2 and MT3. For the frame with media time MT1 the receiver simply obtains a response that contains a Time Base Trigger. For the frame with media time MT2, a static activation is due at media_time MTa, so the receiver obtains a response that contains an Activation Trigger which has a "t=MTa" term. For the frame with media time MT3 the receiver just obtains a response that contains a Time Base Trigger.

It can happen that a receiver receives more than one Activation Trigger for the same event activation. However, the media times for each of them will be the same, so the receiver can identify them as duplicates, and only apply one of them.

FIG. 25 is a diagram showing an embodiment of static activation in a request/response ACR case.

A description will be given of a case in which the ACR server uses the request/response model.

In FIG. 25, the receiver can be sending signatures for frames viewed at local clock times LC1, LC2, LC3, etc. The media_time for the frame viewed at local clock time LC1 can be determined by the ACR server to be MT1, and the receiver just gets a response that contains a Trigger with no media_time or event_time. The media_time for the frame viewed at local clock time LC2 can be determined by the ACR server to be MT2, and the ACR server knows that a static activation is due at media_time MTa, so the ACR server sends a response that contains an Activation Trigger which has a "d=<offset>" term, meaning that the media_time MTa for the activation is <offset> time units after MT2. The receiver then adds the <offset> to time LC2 and gets LCa as the local time it should activate the event.

Figure 26:
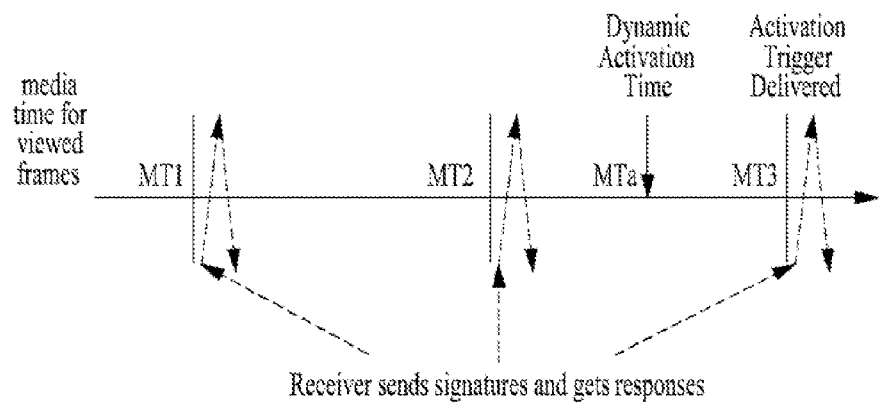
FIG. 26 is a diagram showing an embodiment of dynamic activation in a request/response case.

FIG. 26 is a diagram showing an embodiment of dynamic activation in a request/response ACR case.

A description will be given of a case in which dynamic activation occurs in the request/response ACR case.

For dynamic activations in situations when the ACR System does not learn of the event activation until it is too late to send the Trigger to the receiver ahead of time, the ACR Server needs to wait until the next request, and then sends an Activation Trigger. FIG. 26 illustrates this case. The effect of this is that dynamic activations can be delayed by as much as one request interval.

In FIG. 26, the receiver can be sending signatures for frames that the ACR server determines to have media times MT1, MT2 and MT3. For the frames with media times MT1 and MT2, the receiver just gets a response that contains a Time Base Trigger. When a dynamic activation with activation time MTa shows up at or shortly before media_time MTa, the ACR server cannot notify the receiver about it until the next request from the receiver, which occurs for the frame with media time MT3. At that time the ACR server response contains an Activation Trigger with activation time MTa (which is a little in the past). In this situation the receiver can be expected to apply the Activation Trigger as soon as it arrives.

Here again it is possible that a receiver receive more than one Activation Trigger for the same event activation. However, the media time for each of them will be the same, so the receiver can identify them as duplicates, and only apply one of them.

Figure 27:
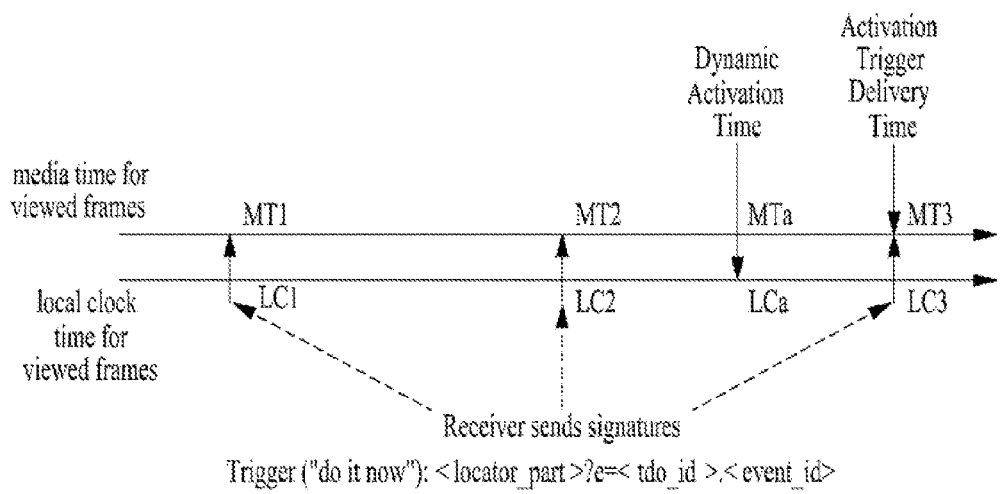
FIG. 27 is a diagram showing an embodiment of dynamic activation in a request/response case.

FIG. 27 is a diagram showing an embodiment of dynamic activation in a request/response ACR case.

A description will be given of a case in which dynamic activation occurs in the request/response ACR case.

In FIG. 27, the receiver can send signatures for frames viewed at local clock times LC1, LC2, LC3, etc. The media_time for the frame viewed at local clock time LC1 can be determined by the ACR server to be MT1, and the receiver just gets a response that contains a Trigger with no media_time or event_time. The media_time for the frame viewed at local clock time LC2 can be determined by the ACR server to be MT2, and the ACR server does not know that a dynamic activation will show up at media_time MTa, so the receiver just gets a response that contains a Trigger with no media_time or event_time. When a dynamic activation shows up at media_time MTa, the ACR server cannot notify the receiver about it until the next request from the receiver, which occurs at local time LC3. At that time the ACR server response can contain an Activation Trigger with a negative <offset> value or contains a "do it now" activation trigger.

A description will be given of an ACR server using an event driven model.

In the event driven ACR model the receiver can be expected to initiate a permanent connection to the ACR server, generate signatures of the content periodically (e.g., every 5 seconds), and submit the signatures over the connection. The ACR server does not respond to each signature. It can send a message to the receiver when a new segment is detected or when an event activation needs to be communicated to the receiver. In this model, it is possible for the ACR server to initiate messages to the client at any time.

For an ACR server that is using this event driven model and is delivering activations to receivers, the following rules can apply for messages from the ACR server.

First of all, when the ACR server receives a signature from a receiver that corresponds to a new segment, the ACR server can send a Time Base Trigger to the receiver immediately, just to enable the receiver to obtain the associated TPT.

Second of all, whenever an event is due to be activated, the ACR server can send an Activation Trigger to the receiver. If possible, it can send the Activation Trigger slightly ahead of the time when the receiver needs to apply the same. (This is very similar to the behavior in the request/response model.) If the ACR server learns of the activation so late that it cannot send an Activation Trigger very much ahead of time (which can happen in the case of a dynamic event activation), it still can send an Activation Trigger as soon as it can. In this latter case, it is possible that the client will get the message slightly after the activation time, because of message delays, in which case the receiver can be expected to activate the event immediately upon receipt of the message.

Whenever a receiver gets a Trigger with a new locator_part, it can be expected to download the new TPT immediately, unless it already retrieved it using a URLList delivered with a previous TPT.

A description will be given of a watermarking ACR system inserting information directly. While the watermarking ACR system is not shown, the watermarking ACR system is not limited to the following description and may be changed by a designer.

In the case of a watermarking system that inserts the information receivers need directly, the watermark associated with a frame can follow the same rules as stated above for what a request/response ACR server would return for that frame as follows. The request/response ACR server can return one of Null, Time Base Trigger and Activation Trigger.

A Null response can indicate that the signature is not recognized, or (if the ACR Ingest Module includes signatures for frames in program segments with no interactive service) that the signature represents a frame which belongs to a segment that does not have an interactive service associated with it.

A Time Base Trigger response can indicate that no event activation is scheduled to take place before the client's next request. The client can be expected to use the Time Base Triggers to maintain a media-time clock.

An Activation Trigger response can indicate that an activation is due to take place soon, with the time of the activation indicated by the "t=" term in the Trigger.

In the case of a watermarking ACR system that is delivering the information receivers need by including the same directly in the watermarks, so that no ACR server is needed, an Ingest Module can follow the same rules as described for the request/response server model above to determine the Trigger to associate with each frame, but then include the Trigger in the watermark for the frame, rather than associate the Trigger with the frame in a Database. The ingest module and database will be described later.

A description will be given of support of stand-alone NRT services. This is not shown but the present invention is not limited to the following description and may be changed by a designer.

In order for a receiver in an ACR environment to obtain access to stand-alone NRT services, the broadcaster may need to support Internet access to the NRT services, and the receiver may need to obtain the SMT and the NRT-IT instances for the services.

A description will be given of a query protocol for obtaining PSIP tables and NRT tables over the Internet.

If a broadcaster supports this protocol for a particular broadcast stream, then a receiver that knows the URL of the broadcaster's Signaling Server for that broadcast stream can take the following steps.

First, the receiver can issue a query for the "Basic NRT Set" of tables for the broadcast stream, for a specified future time interval (for example, the next 12 hours).

Second, This will produce the SMT and ILT for each of the stand-alone NRT virtual channels, and the NRT-IT and TFT instances covering the specified time interval.

One way a receiver can discover the URL of the Signaling Server for a broadcast stream can be that the provider of an interactive service segment in the broadcast stream can choose to provide the Signaling Server URL in a URLList element delivered along with the TPT.

Another way a receiver can discover URLs of Signaling Servers can be by pre-configuration. In the same way that a DTV receiver manufacturer can pre-configure a DTV receiver to know how to find an ACR Server covering any particular broadcast area, a DTV receiver manufacturer can pre-configure a DTV receiver to know how to find an "NRT Discovery Server" covering any particular broadcast area. Such an NRT Discovery Server would be able to give the receiver a list of the broadcast streams that contain stand-alone NRT services, along with the Signaling Server URL for each one.

Figure 28:
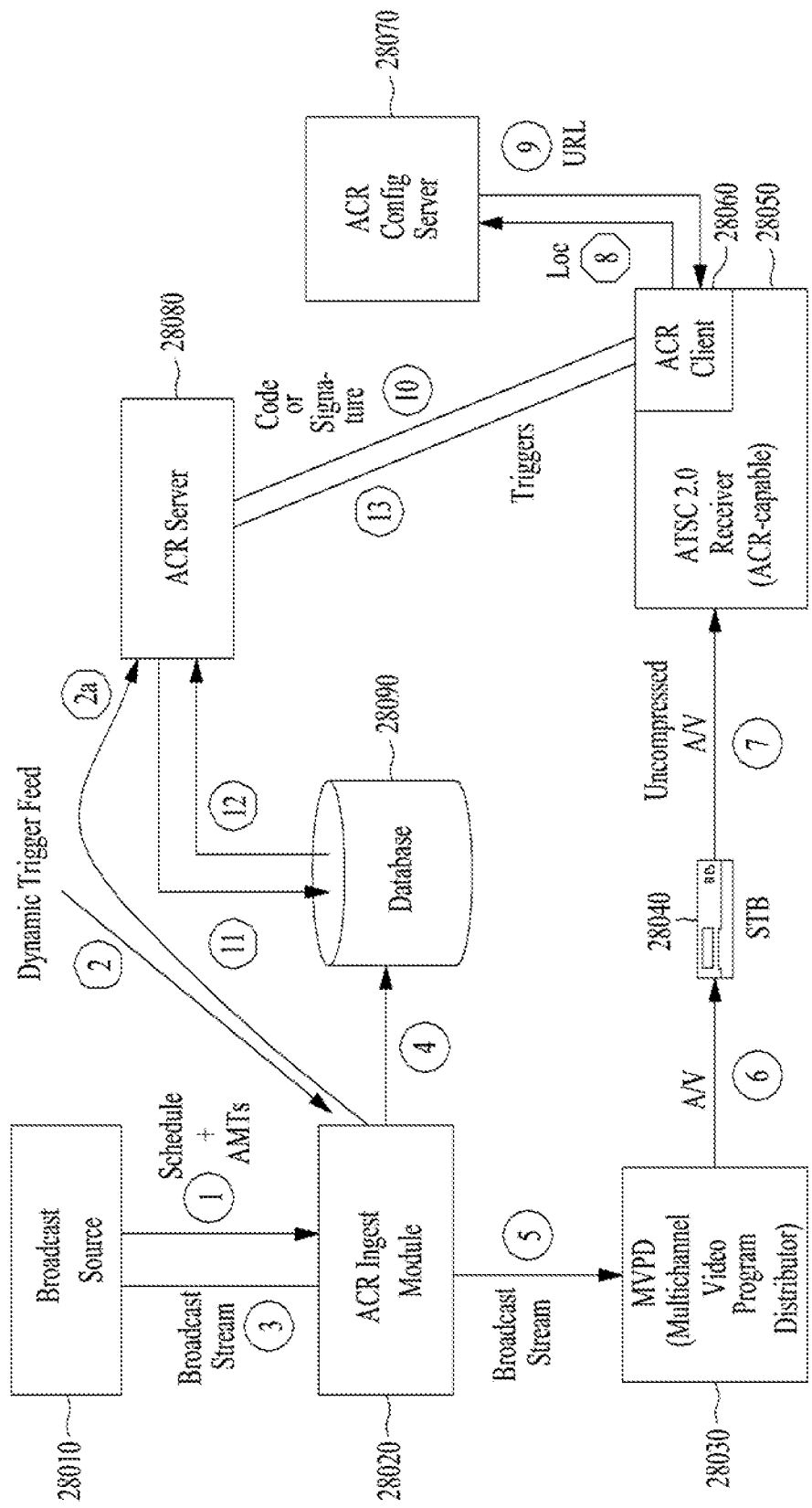
FIG. 28 is a diagram showing an embodiment of architecture for ACR server activations.

FIG. 28 is a diagram showing an embodiment of an architecture for ACR server activation.

Some ACR systems include an ACR server, and some ACR systems do not. In fingerprinting ACR systems, receivers can compute and send frame signatures to an ACR server, and the ACR server can send back the information needed by the receivers. Thus, fingerprinting ACR systems include an ACR server. In watermarking ACR systems, the watermarks may contain only codes that uniquely identify the frames, or the watermarks may contain the full information needed by receivers. When the watermarks contain only codes, receivers can extract the codes and send the same to an ACR server, and the ACR server sends back the information needed by the receivers. In the case when the watermarks include the full information, receivers can just extract the information they need directly from the watermarks, and no ACR server is needed.

In those ACR systems that include an ACR server, two different models can be commonly used for communication between the ACR servers and receivers: a request/response model and an event-driven model.

In the request/response ACR server model the receiver can be expected to compute signatures of, or extract codes from, the content periodically (e.g. every 5 seconds) and send requests containing the signatures or codes to an ACR server. When an ACR server gets a request from a receiver, it can return a response. The communications session is not kept open between request/response instances. In this model, it may not feasible for an ACR server to initiate messages to a receiver.

It is assumed that the broadcaster of the channel being processed is supporting the TDO interaction model.

There can be two general type of event activations: static activations in which the activation time is known before the broadcast of the segment begins, and dynamic activations in which the activation time in determined dynamically as the segment is being broadcast. In pre-recorded segments all of the event activations can be static. In segments that are broadcasting live shows, some or all of the event activations can be dynamic. Static activations are typically listed in the Activation Messages Table (AMT), although they might be delivered to receivers in the form of Activation Triggers. Dynamic activations can be delivered in the form of Activation Triggers, since their timing is not known at the time the AMT is generated.

FIG. 28 shows an architecture to support ACR systems that use an ACR server. This is a logical block diagram, not an implementation architecture. For example, the ACR Ingest Module could be co-located with the broadcast source, or it could be in a separate location.

In the architecture to support ACR systems that use an ACR server, the architecture may include a broadcast source 28010, an ACR ingest module 28020, an MVPD 28030, an STB 28040, a receiver 28050, an ACR client 28060, an ACR configuration server 28070, an ACR server 28080 and/or a database 28090.

The Broadcast Source 28010 can be a point from which the A/V stream and associated interactive services are transmitted, for example a network distribution point or a TV station.

The ACR Ingest Module 28020 can compute signatures (fingerprints) of frames, in the case of a fingerprinting ACR system, or insert watermarks including codes into frames, in the case of a watermarking ACR system that is based on codes. It can store in the database 28090 the media_time of each frame associated with a signature or code, together with other metadata. The ACR Ingest Module 28020 could handle a single channel in a broadcast stream, or an entire broadcast stream, or multiple broadcast streams, or any combination thereof. For the purposes, it is assumed that the ACR Ingest Module 28020 processes frames for program segments that contain an interactive service. However, it is possible to have ACR systems in which all frames are processed, but those that are not part of a segment with an interactive service have an indication in their database 28090 entry that they are not part of a segment with an interactive service.

A Multiprogram Video Program Distributor (MVPD) 28030 is typically a cable operator, satellite operator, or IPTV operator. It can receive the broadcast stream from the Broadcast Source in some way, with the watermarks inserted by the ACR Ingest Module 28020 in the case of a watermarking ACR system, such a system often strips out all the program elements other than audio and video tracks, and sends the resulting stream to set-top boxes (STBs) 28040 on customer premises.

The STB 28040 typically decodes (decompresses) the audio and video and sends the same to a TV set for presentation to viewers. We are assuming that DTV Closed Caption service #6, which contains interactive service Triggers, is not available to the TV Set.

The receiver 28050 may include the ACR client 28060. The ACR client 28060 may be disposed outside the receiver 28050. The structure of the receiver 28050 will be described later.

The ACR Client 28060 in the receiver 28050 can obtain Activation Triggers from the ACR Server 28080 and pass the same to the main receiver code, using an API provided for that purpose. Normally the ACR client 28060 would be built into the receiver 28050, but other configurations are possible.

The ACR Configuration Server 28070 can provide a way for ACR clients 28060 to determine the location of a suitable ACR Server 28080. This discovery process can be achieved in other ways.

The ACR Server 28080 can obtain signatures or codes from receivers and return Activation Triggers at appropriate times.

The database 28090 can be a data store of some kind, not necessarily a database in the strict sense of the term, in which information about audio or video frames (or both) is stored for the use of ACR servers 28080.

The architecture of an ACR system that uses direct delivery of information in watermarks could have no Database and no ACR Server. The ACR Ingest Module could insert information directly into the frames in the broadcast stream, in the form of watermarks, instead of inserting, into a database records that contain identifiers of frames and the information associated with the same. Receivers could then extract this information from the frames in the broadcast, instead of obtaining the same from an ACR server.

A description will be given of delivery of activation triggers via request/response ACR servers step by step. This is an embodiment of the present invention and a step may be omitted or new steps may be added or a sequence may be changed.

An efficient way to implement this ACR Server behavior is to follow the process described below, where the numbers of the actions in the process correspond to the numbers in the architecture diagram above, as shown in FIG. 28.

1) The broadcast schedule for the interactive service segments and the AMTs or their equivalents for each segment can be delivered to the ACR Ingest Module ahead of the time the segments are broadcast. The broadcast schedule can contain the segment ID, GPS start time and GPS end time of each segment that can contain an interactive service associated with it. If there are any last-minute changes to the broadcast schedule, the ACR Ingest Module can be notified of these changes immediately. The broadcast schedule could also contain the version number of the TPT for each segment, and the ACR Ingest Module could get notification in real time of any unscheduled changes in a TPT version, so that it can insert "version" ("v=") terms into Triggers when needed. The Ingest Module could also be configured to insert "spread" ("s=") terms into Triggers at suitable times, such as during a specified interval at the beginning of each segment (when many receivers are likely to be requesting new TPTs at the same time).

2) If there are any dynamic activations, links can be set up from sources of dynamic activations to the ACR Ingest Module.

3) The broadcast stream can be routed to the ACR Ingest Module.

4) The ACR Ingest Module can extract signatures from the frames (in the case of a fingerprint ACR system) or insert codes into the frames (in the case of a watermark ACR system), for all frames contained in segments that have an interactive service associated with them. (The ACR Ingest Module can determine whether a frame is in such a segment by using a GPS clock and the start times and end times of segments in the broadcast schedule.) For each such frame the ACR Ingest Module can insert a record in the Database that can include a Trigger and the signature or code associated with the frame. The rules for what Trigger gets inserted are described at the end of this list of actions in the process.

5) Broadcast Stream can continue on to the MVPD.

6) MVPD can route the Broadcast Stream to the STB at a subscriber's location (typically stripping out all of the interactive content first).

7) STB can decode the A/V and send the uncompressed A/V to the DTV receiver.

8) When the receiver is first turned on, it can send its location to an ACR Configuration Server. (The URL of the ACR Configuration Server can be built into the receiver.)

9) The ACR Configuration Server can send back the URL of an ACR Server for the receiver to use.

10) The ACR Client in the receiver can start extracting fingerprint signatures or watermark codes and sending them to the ACR Server.

11) When the ACR Server receives a signature or code, it can attempt to match it in the Database.

12) If the signature or code does not match any signature or code in the Database, then the ACR Server can get back a "no match" indicator. If the signature or code does match a signature or code in the Database, then the ACR Server can get back the record for the frame that has the matching signature or code. In the latter case the record in the Database can contain a Time Base Trigger, and/or it can contain one or more Activation Triggers, depending on what was inserted into the record for the frame by the ACR Ingest Module.

13) If the ACR Server gets back a "no match" indicator from the Database, it can return a NULL response to the ACR Client. Otherwise the ACR Server can return to the ACR Client the Trigger or Triggers it obtained.

The following rules can be used to determine what Trigger or Triggers the ACR Ingest Module inserts into each frame record in the Database.

Figure 29:
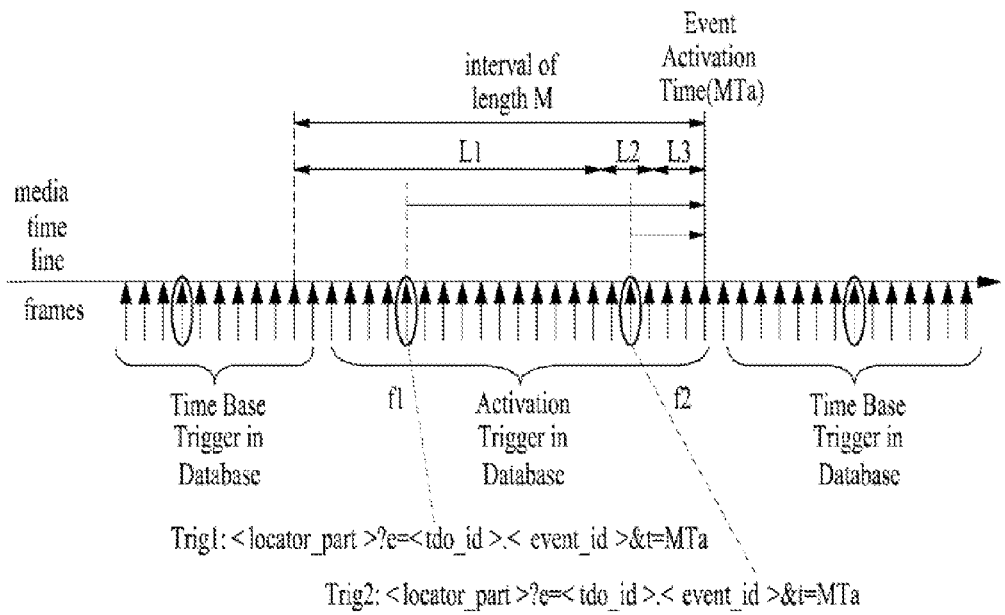
FIG. 29 is a diagram showing an embodiment of activation triggers in case (b) and case (a) without EndTime.

FIG. 29 is a diagram showing an embodiment of activation triggers in case (b) and case (a) without EndTime.

It can be assumed that there is some upper bound L1 on the length of the request intervals used by individual ACR clients in receivers. (It is not important whether the ACR clients know what this bound is, as long as they operate within it in practice.) Let L2 be the length of time it takes a typical ACR client to compute the signature or extract the watermark associated with a frame, counting from the time the frame arrives at the receiver. Let L3 be the typical round-trip time for a message to go from an ACR client to an ACR server and back. Let M=L1+L2+L3. (A slightly larger value of M could also be used—the advantage of a slightly larger value is that receivers get a little extra time to react to Activation Triggers; the disadvantage is that receivers are a little more likely to get multiple Activation Triggers for the same Event activation—which is not much of a problem, since they will be able to detect that they are duplicates, as explained below, and only apply the activation once.)

The ACR Ingest Module can insert only a Time Base Trigger in the record associated with a frame unless at least one of the following three conditions holds:

(a) There is an Activation element in the AMT such that the media_time of the frame is in the time interval beginning at time span M before the startTime of the Activation element and ending at the endTime of the Activation element. (If an Activation has no endTime, the endTime is considered equal to the startTime.)

(b) A dynamic Activation Trigger was received by the Ingest Module before the time interval of time span M immediately preceding the activation time of the Trigger ("t=<event_time>"), and the frame lies within that interval.

(c) A dynamic Activation Trigger was received by the Ingest Module later than the beginning of the interval of time span M immediately preceding the activation time of the Trigger, and the media_time of the frame is in the interval of time span L1 immediately following the receipt of the Trigger.

If any of the conditions (a), (b) or (c) holds, then an Activation Trigger can be included in the record, with an "e=" term to identify the Event to be activated, and a "t=" term to indicate the startTime of the Activation element in the AMT (for condition (a)) or the event_time of the dynamic Trigger (for condition (b)). The Trigger can also contain a version ("v=") term.

The reason for continuing to associate Activation Triggers with frames throughout the interval from the startTime to the endTime in case (a), is to accommodate receivers that join the channel partway through the interval.

Note that this approach requires no extra intelligence on the part of the ACR Server. It simply returns to the ACR Client the information it finds in the Database. All the intelligence can reside in the ACR Ingest Module. Moreover, the computations the ACR Ingest Module needs to do can be very simple.

With this scheme it is possible that a receiver can get more than one Activation Trigger (associated with different frames) for the same event activation. However, a receiver can easily see from the "t=" values that they all have the same activation time, so the receiver can determine that they are duplicates and activate the event only once.

In two of the situations above the "t=" term in the Activation Trigger can have an event_time earlier than the media_time of the frame with which it is associated. In situation (a), if the endTime of the Activation element is significantly later than the startTime, then a receiver can typically get multiple Activation Triggers throughout the interval between the startTime and the endTime, and they can all have the startTime as activation times. In situation (c), the Activation Triggers for the activation can get inserted into frame records so late that the Activation Trigger a receiver gets can come in response to a request with a signature for a frame that has media_time after the activation time. When a receiver gets an Activation Trigger with an event_time earlier than the media_time of the frame with which it is associated, it can be expected to activate the event immediately, unless it recognizes it as a duplicate of an Activation Trigger it has already seen and used to activate the event.

The purpose of using event_time values in the past, rather than "do it now" Triggers, for the situation when the frame media_time is later than the event_activation time is because a receiver can get more than one of these "after the fact" Activation Triggers. The "t=" values allow the receiver to determine that they all have the same activation time, and to activate the event only once.

FIG. 29 illustrates situation (b) and situation (a) when the Activation element in the AMT has no endTime attribute.

FIG. 29 shows an example of situation (a) in action (4) above, in the case when the Activation element in the AMT does not have an endTime. This can be also an example of situation (b) in step (4) above, where the ACR Ingest Module is sent a dynamic Activation Trigger at least M time units before its activation time.

FIG. 29 shows an event activation time above the time line, with an interval of length M preceding it, encompassing intervals of lengths L1, L2, and L3. The vertical arrows below the time line show the times of individual frames. Each frame preceding the beginning of the interval of length M, or following the event activation time, would have associated with it in the Database a Time Base Trigger. Each frame inside the interval of length M would have associated with it in the Database an Activation Trigger, such as the two examples (f1, f2) at the bottom of the figure. The "t=" term for each frame would indicate the event activation time relative to media_time (indicated by circled f1 and f2).

Four circled vertical arrows may represent an example when a typical receiver sends a request. In this example the receiver would get two Activation Triggers for the same event activation, but they would have the same event activation times, so the receiver would recognize them as duplicates and only apply the first one. Because the interval between receiver requests is less than L1, the receiver is guaranteed to make at least one request with a signature for a frame in the L1 interval shown in the diagram. This gives it time to compute the signature, send the request to the ACR server, and get the Activation Trigger back in response, all before the activation time. In this example, the first Activation Trigger the receiver gets would be delivered well ahead of time; the second Activation Trigger the receiver gets would barely arrive in time (it is a duplicate).

Figure 30:
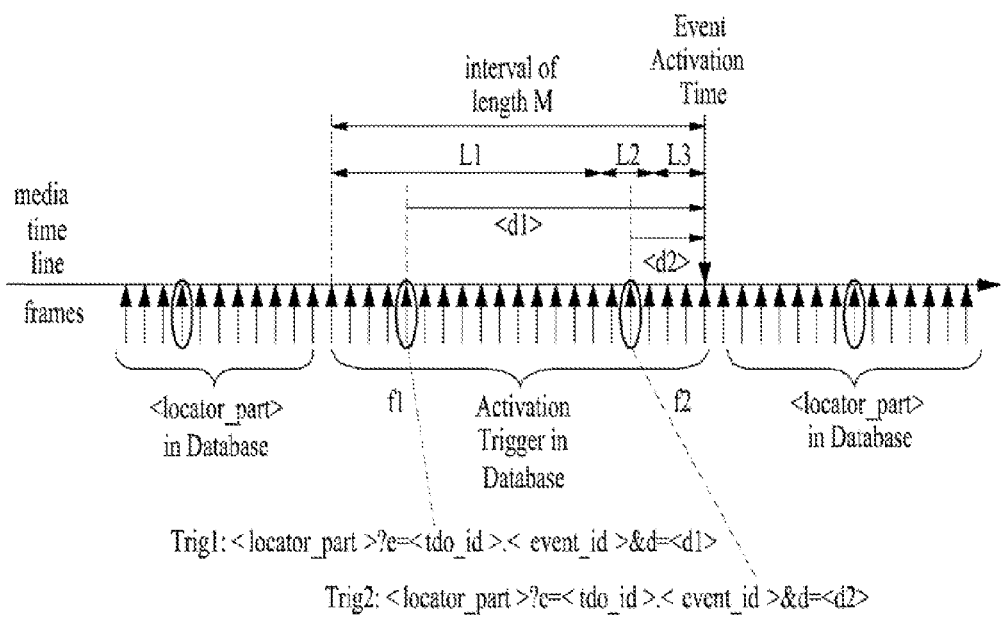
FIG. 30 is a diagram showing an embodiment of activation triggers in case (b) and case (a) without EndTime.

FIG. 30 is a diagram showing an embodiment of activation triggers in case (b) and case (a) without EndTime.

A description will be given of activation triggers in case (b) and case (a) without EndTime.

FIG. 30 shows an example of situation (a) in action (4) above, in the case when the Activation element in the AMT does not have an endTime. This is also an example of situation (b) in step (4) above, where the ACR Ingest Module is sent a dynamic Activation Trigger at least M time units before its activation time.

FIG. 30 shows an event activation time above the time line, with a preceding interval of length M, encompassing intervals of lengths L1, L2, and L3. The arrows below the time line show the times of individual frames. Each frame preceding the beginning of the interval of length M, or following the event activation time, would have associated with it in the Database a Trigger with no <media_time> or <event_time> terms. Each frame inside the interval of length M would have associated with it in the Database an Activation Trigger, such as the two examples at the bottom of the figure. The "d=" term for each frame would indicate the length of time between that frame and the event activation time (indicated by circled f1 and f2).

Four circled vertical arrows may represent an example when a typical receiver sends a request. In this example the receiver would get two Activation Triggers for the same event activation, but the activation times computed by adding the value <d1> to the receiver's local time for frame f1 or adding the value <d2> to the receiver's local time of frame f2 both give the same result, so the receiver would recognize them as duplicates and only apply the first one. Because the interval between receiver requests is less than L1, the receiver is guaranteed to make at least one request with a signature for a frame in the L1 interval shown in the diagram. This gives it time to compute the signature, send the request to the ACR server, and get the Activation Trigger in response, all before the activation time. In this example, the second Activation Trigger received by the receiver would arrive after the activation time.

Figure 31:
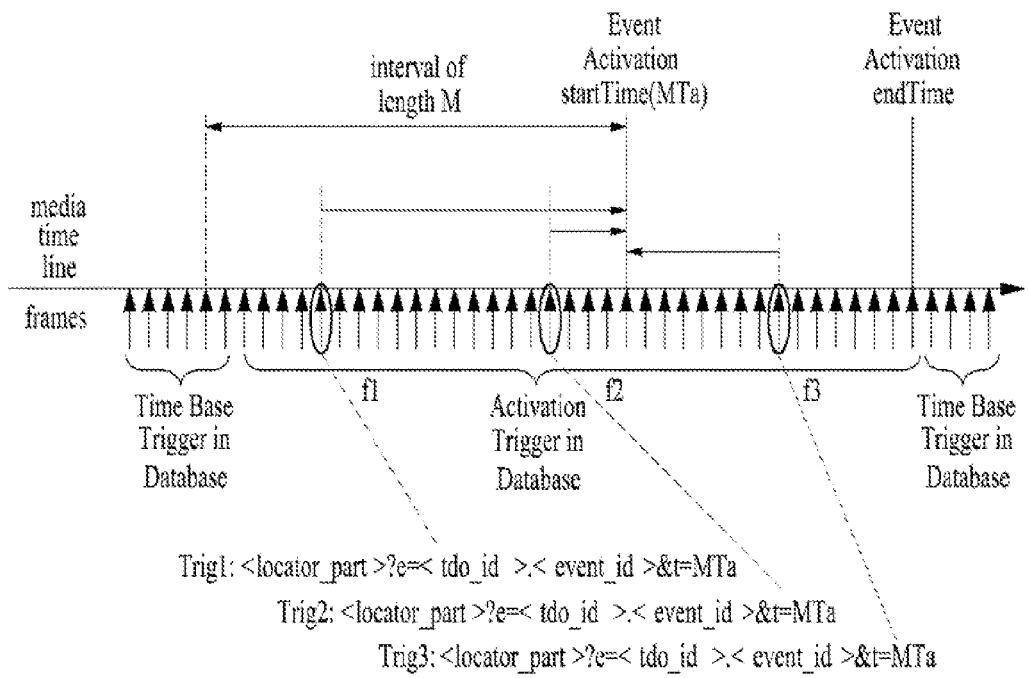
FIG. 31 is a diagram showing an embodiment of activation triggers in case (a) with EndTime.

FIG. 31 is a diagram showing an embodiment of activation triggers in case (a) with EndTime.

FIG. 31 illustrates situation (a) in action (4) above, in the case when the Activation element in the AMT has an endTime, as well as a startTime.

The figure shows an event activation startTime and endTime above the time line, with an interval of length M preceding the startTime. The arrows below the time line show the times of individual frames. Each frame preceding the beginning of the interval of length M, or following the event activation endTime, would have associated with it in the Database a Time Base Trigger. Each frame inside the interval of length M or between the startTime and endTime of the event activation would have an Activation Trigger associated with it in the Database, in the form shown by the three examples at the bottom of the figure. The "t=" term for each frame would indicate the event activation time, relative to the media_time line (indicated by circled f1, f2 and f3).

Three circled vertical arrows may represent an example when a typical receiver sends a request. In this case the receiver would get three Activation Triggers for the same event activation, but the activation times would all be the same, so the receiver would recognize the same as duplicates and only apply the first one.

Of course, the first two Activation Triggers shown in the diagram would not be seen at all by a receiver that joins the channel after the startTime and sends the signature of frame f3 with its first request.

Figure 32:
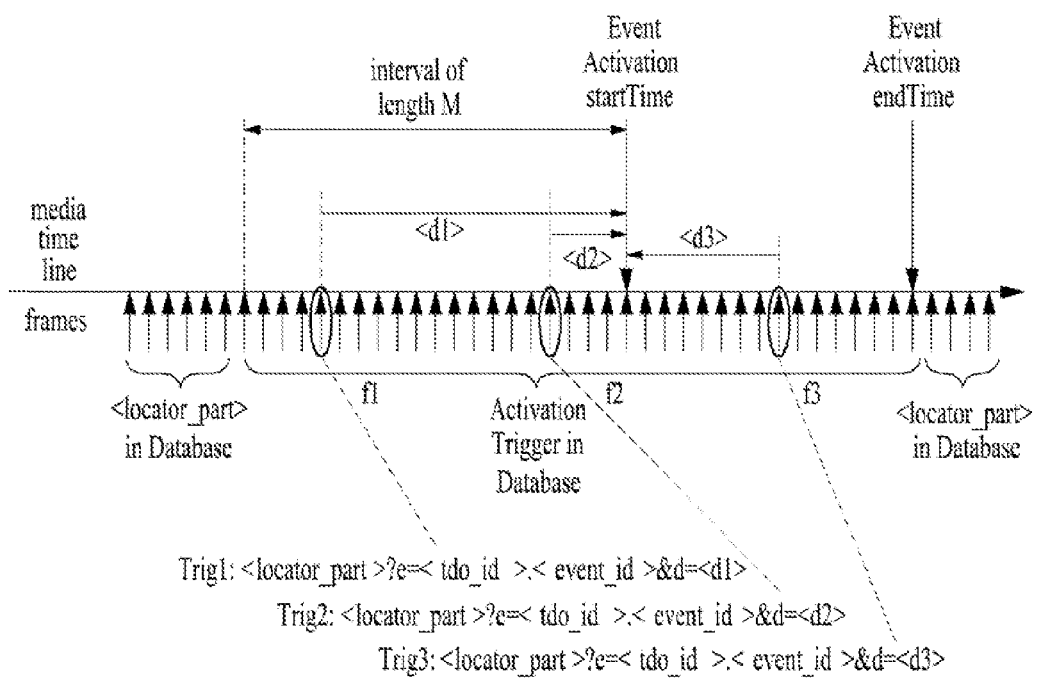
FIG. 32 is a diagram showing an embodiment of activation triggers in case (a) with EndTime.

FIG. 32 is a diagram showing an embodiment of activation triggers in case (a) with EndTime.

A description will be given of activation triggers in case (a) with EndTime.

FIG. 32 illustrates situation (a) in action (4) above, in the case when the Activation element in the AMT has an endTime, as well as a startTime.

The figure shows an event activation startTime and endTime above the time line, with an interval of length M preceding the startTime. The arrows below the time line show the times of individual frames. Each frame preceding the beginning of the interval of length M, or following the event activation endTime, would have associated with it in the Database a Trigger with no <media_time> or <event_time> terms. Each frame inside the interval of length M would have an Activation Trigger in the Database, in the form shown by the two examples at the bottom of the figure. The "d=" term for each frame would indicate the length of time between that frame and the event activation time (indicated by circled vertical arrows).

Circled vertical arrows may represent an example when a typical receiver sends a request. In this case the receiver would get three Activation Triggers for the same event activation, but the activation times computed by adding the value <d1> to the receiver's local time for frame f1 or adding the value <d2> to the receiver's local time of frame f2 or adding the (negative) value <d3> to the receiver's local time of frame f3 all give the same result, such that the receiver would recognize the same as duplicates and only apply the first one.

Of course, the first two Activation Triggers shown in the diagram would not be seen at all by a receiver that joins the channel after the startTime and sends the signature of frame f3 with its first request.

Figure 33:
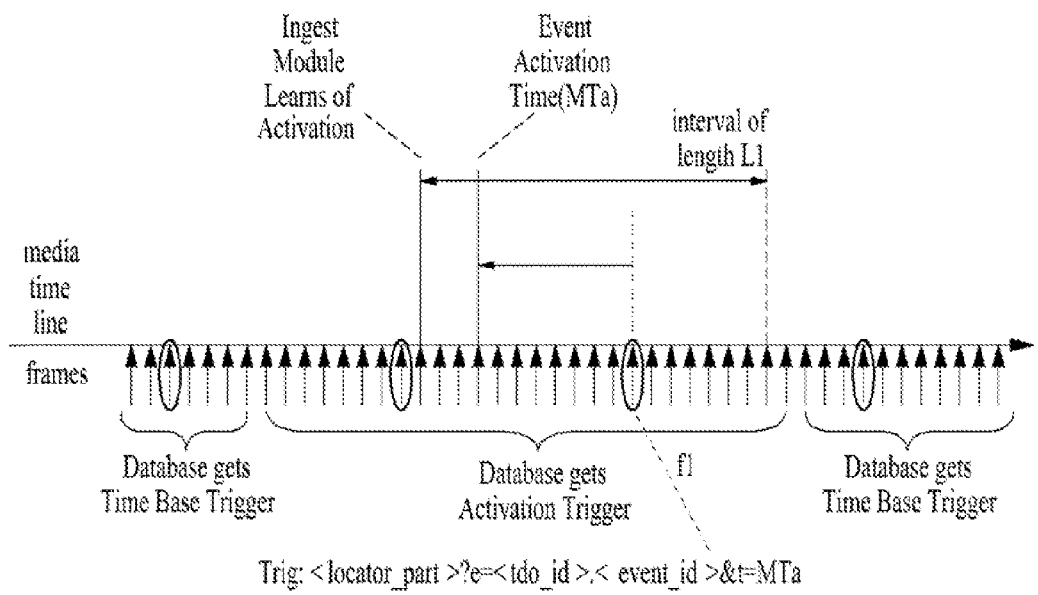
FIG. 33 is a diagram showing an embodiment of activation triggers for case (c)

FIG. 33 is a diagram showing an embodiment of activation triggers for case (c).

FIG. 33 illustrates situation (c) in action (4) above, where a dynamic Activation Trigger is sent to the ACR Ingest Module later than M time units before the Activation Time.

FIG. 33 shows a dynamic event activation time above the time line, and a time shortly preceding the event activation time when the ACR Ingest Module learns of the event actuation, with an interval of length L1 following the time when the ACR Ingest Module learns of the event activation. The vertical arrows below the time line show the times of individual frames. Each frame preceding the beginning of the interval of length L1, or following the end of the interval of length L1, would have a Time Base Trigger associated with it in the Database. Each frame inside the interval of length L1 would have an Activation Trigger in the Database, such as the one in the example at the bottom of the figure. The "t=" term for each frame would indicate the event activation time, relative to the media time line (indicated by circled vertical arrows). Circled vertical arrows may represent an example when a typical receiver sends a request. In this case the receiver would just one Activation Trigger for the event activation. Since the activation time of the Activation Trigger precedes the time it was received, the receiver would apply the Trigger immediately upon reception.

Figure 34:
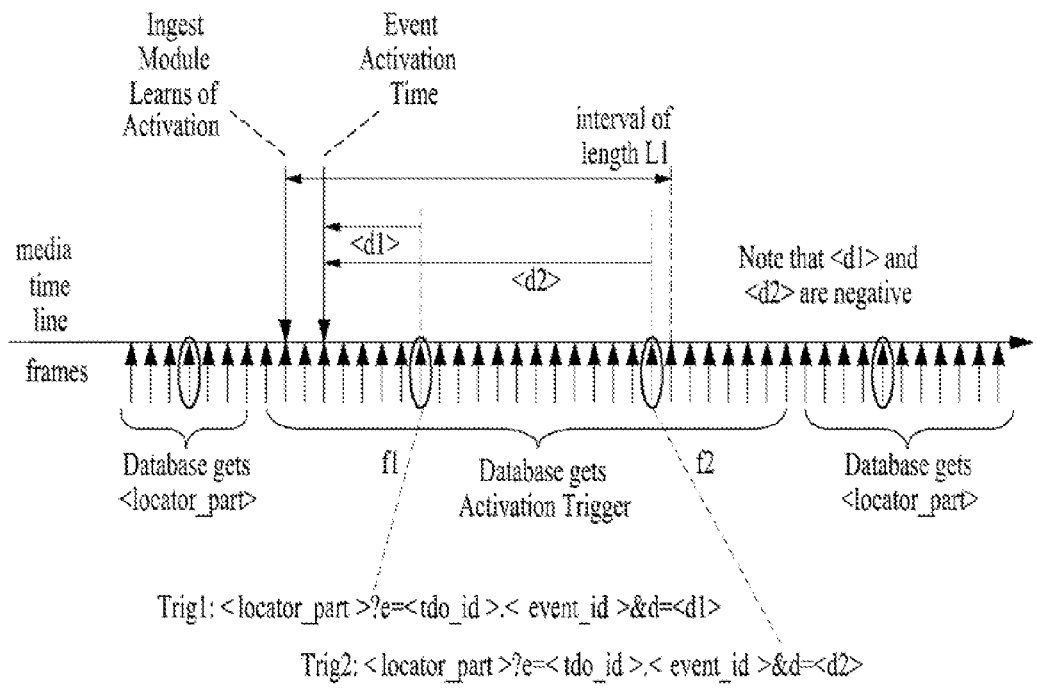
FIG. 34 is a diagram showing an embodiment of activation triggers for case (c)

FIG. 34 is a diagram showing an embodiment of activation triggers for case (c).

A description will be given of activation triggers for case (c).

FIG. 34 illustrates situation (c) in action (4) above, where a dynamic Activation Trigger is sent to the ACR Ingest Module later than M time units before the Activation Time.

FIG. 34 shows a dynamic event activation time above the time line, and a time shortly preceding the event activation time when the ACR Ingest Module learns of the event actuation, with an interval of length M following the time when the ACR Ingest Module learns of the event activation. The arrows below the time line show the times of individual frames. Each frame preceding the beginning of the interval of length M, or following the end of the interval of length M, would have a Trigger in the Database with no <media_time> or <event_time> terms. Each frame inside the interval of length M would have an Activation Trigger in the Database, such as those in the two examples at the bottom of the figure. The "d=" term for each frame would indicate the length of time between that frame and the event activation time (indicated by circled vertical arrows). Circled vertical arrows may represent an example when a typical receiver sends a request. In this case the receiver would get two Activation Triggers for the same event activation, but the activation times computed by adding the (negative) value <d1> to the receiver's local time for frame f1 and adding the (negative) value <d2> to the receiver's local time of frame f2 both give the same result, so the receiver would recognize them as duplicates, and only apply the first one it received. Since the activation time of the first Trigger is before the time it was received, the receiver would apply the Trigger immediately when it is received.

FIG. 35 is a diagram showing an embodiment of dynamic activation triggers delivered at Last Minute.

In the event driven ACR model the receiver can be expected to initiate a persistent connection to the ACR server, generate signatures associated with frames at regular intervals (e.g., every 5 seconds), and submit the signatures over the connection. The ACR server does not respond to each signature. It can send a message to the receiver when a new segment is detected or when an event activation needs to be communicated to the receiver. In this model, it is possible for the ACR server to initiate messages to the client at any time over the persistent connection.

Moreover, it is straightforward for the server to maintain a certain amount of information about each receiver, such as the segment ID (<locator_part> of a Trigger) corresponding to the most recent submission from the receiver and the recent Activation Triggers sent to the receiver.

For an ACR server that is using this event driven model and is delivering activations to receivers, the following rules can apply for messages from the ACR server.

First of all, when the ACR server receives a signature from a receiver that corresponds to a frame in a new segment, the ACR server can send a message to the receiver with a Time Base Trigger immediately, to enable the receiver to obtain the associated TPT.

Second, when the ACR server receives a signature from a receiver that corresponds to a frame in a part of a segment that has a new version number for the TPT (different from the most recent version the receiver has seen), the ACR server can send a message immediately to the receiver with a Time Base Trigger that has a "v=" term to enable the receiver to obtain the new version of the associated TPT.

Third, when an event is due to be activated, the ACR server can send an Activation Trigger to the receiver. If possible, it can send the Activation Trigger slightly ahead of the time when the receiver needs to apply it, with a "t=" term in the Activation Trigger to indicate the activation time relative to the media time line. (This is very similar to the behavior in the request/response model.) If the ACR server learns of the activation so late that it cannot send an Activation Trigger as far ahead of time as usual, it can send an Activation Trigger as soon as it does learn of the activation. (In this latter case, the receiver could get the Activation Trigger after its activation time, in which case it can be expected to activate the event as soon as it gets the Activation Trigger.)

The architecture for the Request/Response case shown in FIG. 28 is also suitable for this Event Driven case, with one difference. The difference is that for the Event Driven case there can be a new action (2a). If there are any dynamic Activation Triggers, then connections can be set up between the ACR Ingest Module and all ACR Servers that use the Database populated by the ACR Ingest Module, so that the ACR Ingest Module can send selected dynamic Activation Triggers to the ACR Servers.

The numbered actions for the Event Driven case can be similar to those for the Request/Response case. Besides the new action (2a), action (4) is a little different, action (13) is a little different, and a new action (14) is added.

In action (4) the ACR Ingest Module can extract signatures from the frames (in the case of a fingerprint ACR system) or insert codes into the frames (in the case of a watermark ACR system), for all frames contained in segments that have an interactive service associated with them. (The ACR Ingest Module can determine whether a frame is in such a segment by using a GPS clock and the start times and end times of segments in the broadcast schedule.) For each such frame the ACR Ingest Module can insert a record in the Database that can include the signature or code associated with the frame and a Trigger. The Trigger included in the record by the ACR Ingest Module can be a Time Base Trigger unless at least one of the following two conditions holds:

(a) There is an Activation element in the AMT such that the media_time of the frame is in the time interval beginning at time span M before the startTime of the Activation element and ending at the endTime of the Activation element. (If an activation has no endTime, the endTime is considered equal to the startTime.) (Same as condition (a) for the Request/Response ACR model)

(b) A dynamic Activation Trigger was received by the Ingest Module before the time interval of time span M immediately preceding the activation time of the Trigger ("t=<event_time>"), and the frame lies within that interval. (Same as condition (b) for the Request/Response ACR model)

If either of the conditions (a) or (b) holds, then an Activation Trigger can be included in the record, with an "e=" term to identify the Event to be activated, and a "t=" term to indicate the startTime of the Activation element in the AMT (for condition (a)) or the event_time of the dynamic Trigger (for condition (b)).

If a dynamic Activation Trigger is received by the Ingest Module during the interval of time span M immediately preceding the activation time of the Trigger (where M has the same meaning as in the request/response server case), then the Ingest Module can pass the Activation Trigger on to all the ACR Servers that are using the Database into which the Ingest Module can be inserting records, without putting anything in the Database concerning that dynamic Activation Trigger. (Variations on this architecture are possible in which dynamic Activation Triggers are passed directly from the dynamic Activation Trigger sources to the ACR servers without going through the Ingest Model, but the ACR servers get the dynamic Activation Triggers that arrive later than M time units ahead of the activation time, so that it can send a message to the relevant receivers immediately. It might be too late if it waits until the next receiver submissions.)

In action (13), if the ACR Server gets back a "no match" indicator from the Database after not receiving one for the immediately preceding submission, it can send a NULL message to the receiver. If it gets back a Trigger with a <locator_part> that is different from the <locator_part> it got back for the immediately preceding submission, it can send the Trigger to the receiver, In both cases this can tell the receiver that either the channel being viewed has been changed, or the segment being viewed has come to an end, so the receiver can terminate any TDO that is currently executing, and if necessary download a new TPT. If the ACR Server gets back one or more Activation Triggers, it can send them to the receiver, discarding any that are duplicates of Activation Triggers it has already sent to the receiver. Otherwise the ACR Server may do nothing.

In a new action (14), if an ACR Server receives a dynamic Activation Trigger, it can compare the <locator_part> of the dynamic Activation Trigger with the current <locator_part> for each of its ACR clients (where the current <locator_part> for a client is the <locator_part> of the Trigger that the ACR Server got from the Database for the most recent submission from the ACR client. For each client where the <locator_part> matches, the ACR Server can send the Activation Trigger to the client.

FIGS. 29 and 31 show the handling of Triggers for static activations and for dynamic activations that are delivered to the ACR Ingest Module at least M time units before their activation time. The difference is that the ACR Server can discard duplicate Activation Triggers, rather than sending them on to receivers.

FIG. 35 shows an example of the handling of a dynamic Activation Trigger received on short notice (less than M time units before its activation time).

FIG. 35 shows a dynamic event activation time above the time line, and a time shortly preceding the event activation time when the ACR Ingest Module learns of the event actuation. The vertical arrows below the time line show the times of individual frames. As soon as the ACR Server receives the Activation Trigger from the ACR Ingest Module, it can send the Activation Trigger to all receivers that are currently viewing the segment associated with the Activation Trigger (as identified by the <locator_part> of the Trigger).

FIG. 36 is a diagram showing an embodiment of dynamic activation triggers delivered at Last Minute.

A description will be given of dynamic activation triggers delivered at Last Minute.

FIG. 36 shows an example of the handling of a dynamic Activation Trigger received on short notice (less than M time units before its activation time).

The figure, Dynamic Activation Triggers Delivered at Last Minute, shows a dynamic event activation time above the time line, and a time shortly preceding the event activation time when the ACR Ingest Module learns of the event actuation. The arrows below the time line show the times of individual frames. As soon as the ACR Server receives the Activation Trigger from the ACR Ingest Module, it can send the Activation Trigger to all receivers that are currently viewing the segment associated with the Activation Trigger (as identified by the <locator_part> of the Trigger). For each receiver it adjusts the event_time of the Trigger to a <delay_time> relative to the frame corresponding to the most recently submitted signature from the receiver.

FIG. 37 shows a sequence diagram between an ACR client and other servers in a request/response ACR case.

FIG. 37 shows a sequence diagram according to an embodiment of effectively transmitting a trigger and a TPT according to the operation protocol of the ACR server and the receiver (ACR client) in the request/response model.

An exemplary operation of the request/response model in the order of request and response will now be described.

The sequence diagram between the ACR client and other servers in a request/response ACR case may include ACR request 1 (S37010), ACR response 1 (S37020), ACR request 2 (S37030), ACR response 2 (S37040), HTTP request 1 (S37050), HTTP response 1 (S37060), HTTP request 2 (S37070), HTTP response 2 (S37080), ACR request 3 (S37090), ACR response 3 (S37100), ACR request 4 (S37110) and/or ACR response 4 (S37120).

ACR request 1 (S37010) is a step in which the receiver transmits the signature of a currently viewed program to a server. The server may be the above-described ACR server. The signature may be a fingerprint signature or a watermark.

ACR response 1 (S37020) is a step in which the ACR server returns NULL when the signature is not recognized or a related interactive service is not present. This may be a case corresponding to the above-mentioned case in which a NULL response is returned.

ACR request 2 (S37030) is a step in which, when the channel or program is changed, the receiver transmits the signature of the changed program to the ACR server.

ACR response 2 (S37040) is a step in which the ACR server returns a trigger (e.g. xbc.com/tpt504) including an address by which an interactive service related to the corresponding program can be obtained. This step may correspond to a case in which the signature is recognized and a related interactive service is present, unlink ACR response 1 (S37020). That is, a trigger is available in this step. In this case, the returned trigger may be a time based trigger having no information about media_time.

HTTP request 1 (S37050) is a step in which the receiver requests the TPT server (e.g. http://xbc.com/tpt504) to provide a corresponding TPT using the address received in ACR response 2 (S37040) through the http protocol.

HTTP response 1 (s37060) is a step in which the TPT server transmits the TPT represented in XML at the request of the receiver.

HTTP request 2 (S37070) is a step in which the receiver requests the content server to provide an application such as TDO using the http protocol. The receiver can parse TDO related information included in the TPT. The TDO related information may be the URL of the content server through which a TDO can be downloaded. A request can be sent using the URL of the content server.

HTTP response 2 (S37080) is a step in which the content server transmits the corresponding TDO at the request of the receiver.

ACR request 3 (S37090) is a step in which the receiver sends the signature of a frame of the currently viewed program to the ACR server.

ACR response 3 (S37100) is a step in which the ACR server returns a trigger (e.g. xbc.com/tpt504) including an address through which an interactive service related to the corresponding program can be obtained. In this case, the signature is recognized and the related interactive service is present, unlike ACR response 1 (S37020). That is, a trigger is available in this step.

ACR request 4 (S37110) is a step in which the receiver transmits the signature of a frame of the currently viewed program to the ACR server.

ACR response 4 (S37120) is a step in which the ACR server transmits an activation trigger related to the interactive service related to the signature transmitted from the receiver. A specific event can be activated at a specific time according to the activation trigger.

Figure 38:
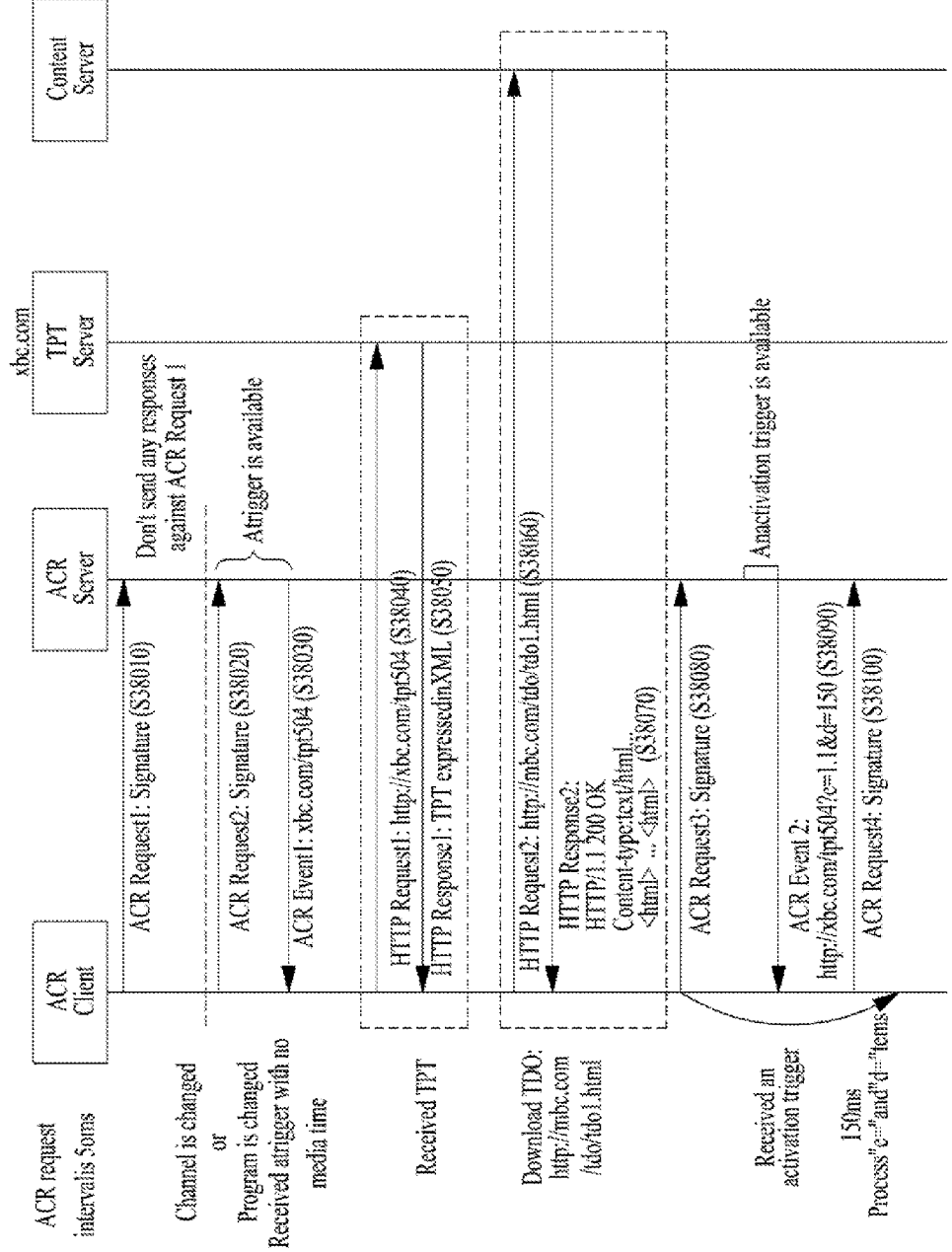
FIG. 38 is a sequence diagram between an ACR client and other servers in an event-driven ACR case.

FIG. 38 shows a sequence diagram between the ACR client and other servers in an event-driven ACR case.

FIG. 38 shows a sequence diagram according to an embodiment of effectively transmitting a trigger and a TPT according to the operation protocol of the ACR server and the receiver (ACR client) in an event-driven model.

An exemplary operation of the event-driven model in the order of request, response to the request and event will now be described.

The sequence diagram between the ACR client and other servers in an event-driven ACR case may include ACR request 1 (S38010), ACR request 2 (S38020), ACR event 1 (S37030), HTTP request 1 (S38040), HTTP response 1 (S38050), HTTP request 2 (S38060), HTTP response 2 (S38070), ACR request 3 (S38080), ACR event 2 (S38090) and/or ACR response 4 (S38100).

ACR request 1 (S38010) is a step in which the receiver transmits the signature of a currently viewed program to a server. The server may be the above-described ACR server. The signature may be a fingerprint signature or a watermark. Here, when the signature is not recognized or a related interactive service is not present, the ACR server may send no response to ACR request 1 without returning NULL, unlike the sequence of FIG. 37.

ACR request 2 (S38020) is a step in which, when the channel or program is changed, the receiver transmits the signature of the changed program to the ACR server.

ACR event 1 (S38030) is a step in which the ACR server returns a trigger (e.g. xbc.com/tpt504) including an address by which an interactive service related to the corresponding program can be obtained. This step may correspond to a case in which the signature is recognized and a related interactive service is present. That is, a trigger is available in this step. In this case, the returned trigger may be a time based trigger having no information about media_time.

HTTP request 1 (S38040) is a step in which the receiver requests the TPT server (e.g. http://xbc.com/tpt504) to provide a corresponding TPT using the address received in ACR event 1 (S38030) through the http protocol.

HTTP response 1 (s38050) is a step in which the TPT server transmits the TPT represented in XML at the request of the receiver.

HTTP request 2 (S38060) is a step in which the receiver requests the content server to provide an application such as TDO using the http protocol. The receiver can parse TDO related information included in the TPT. The TDO related information may be the URL of the content server through which a TDO can be downloaded. A request can be sent using the URL of the content server.

HTTP response 2 (S38070) is a step in which the content server transmits the corresponding TDO at the request of the receiver.

ACR request 3 (S38080) is a step in which the receiver sends the signature of a frame of the currently viewed program to the ACR server.

ACR event 2 (S38090) is a step in which the ACR server transmits an activation trigger related to the interactive service related to the signature transmitted from the receiver. A specific event can be activated at a specific time according to the activation trigger.

ACR request 4 (S38100) is a step in which the receiver transmits the signature of a frame of the currently viewed program to the ACR server.

FIG. 39 is a diagram showing an embodiment of an Action List of a UPnP RemoteUI Client Service.

Second screen support relates to a method of, at a receiver, providing a service of a broadcaster or supplementary service suitable for a program provided by the broadcaster to a second screen device. Supplementary content may be provided via an application and the application may be displayed on a TV screen such that a user utilizes the supplementary content by manipulating a remote controller. However, recently, via personalized information instruments (smartphones, smart pads and downsized laptops), supplementary services may be displayed on the second screen device while displaying content played back on the TV screen. Therefore, the user can personally utilize the supplementary services without interrupting broadcast content. If such supplementary data or information is displayed and processed on the second screen device, when several persons watch TV together, only a person interested in a supplementary service may obtain the supplementary content without interrupting TV viewing of the other persons. Second screen support may be variously used in addition to the above-described effects.

For connection and control of one device to other devices, first, which devices are included in a home network should be determined. Accordingly, one or more devices periodically transmit messages to the home network so as to notify that the devices are present in the home network. If one device is newly connected to the home network, the device may ask which devices are present in the home network before notifying that the device is newly connected. Such connection methods may aid in easily and rapidly recognizing the presence of the devices. UPnP device discovery is one method of achieving this. If a device is detected, other devices interesting in the detected device may require information about which services may be provided to that device. Electronic apparatuses in which a UPnP framework is installed may confirm mutual functions and supported function ranges. This information may be defined in a UPnP Device Profile such that the devices confirm attributes of mutually provided services. A device for providing a specific service may be always waited for. If the device for providing the specific service is detected, it is possible to ask which services are included in the detected device. If a desired service is present in the detected device, the detected device may be immediately connected to perform communication. As defined in the UPnP Service Descriptor, services may be defined and exchanged.

Since one device has a single service or a plurality of services, the service(s) may be controlled and utilized by other devices. If the device has one or more functions, a plurality of services corresponding to the functions are included and controlled by other devices. Definition of the device may have unique information about the device. For example, the unique information about the device may include information such as Model Name, Serial Number, Model Number, CE Manufacturer Name and Web Site. This information may have a unique value for each device and may not be generally changed. The service is an operation performed by a device, which is referred to as an action, and each device may have one or more actions. The action has a parameter value such as a function and may have one or more parameter values. The action is performed by a service of a device and a return value defined as necessary may be returned after performing the action.

As an example of an action, FIG. 39 shows types of actions of a UPnP RemoteUI Client service and a description thereof. Connection/disconnection may be an action for returning current connection states. GetCurrentConnection may be an action for returning a current connection list. GetDeviceProfile may be an action for returning a device profile as expressed in XML. GetUIListing may be an action for returning a compatible UI list as expressed in XML. AddUIListing/RemoveUIListing may be an action for adding a URL of a remote UI to a UI list or removing the URL of the remote UI from the UI list. ProcessInput may be an action for sending data to a RemoteUI Client service. DisplayMessage may be an action for displaying a message on a device including a RemoteUI Client service.

Figure 40:
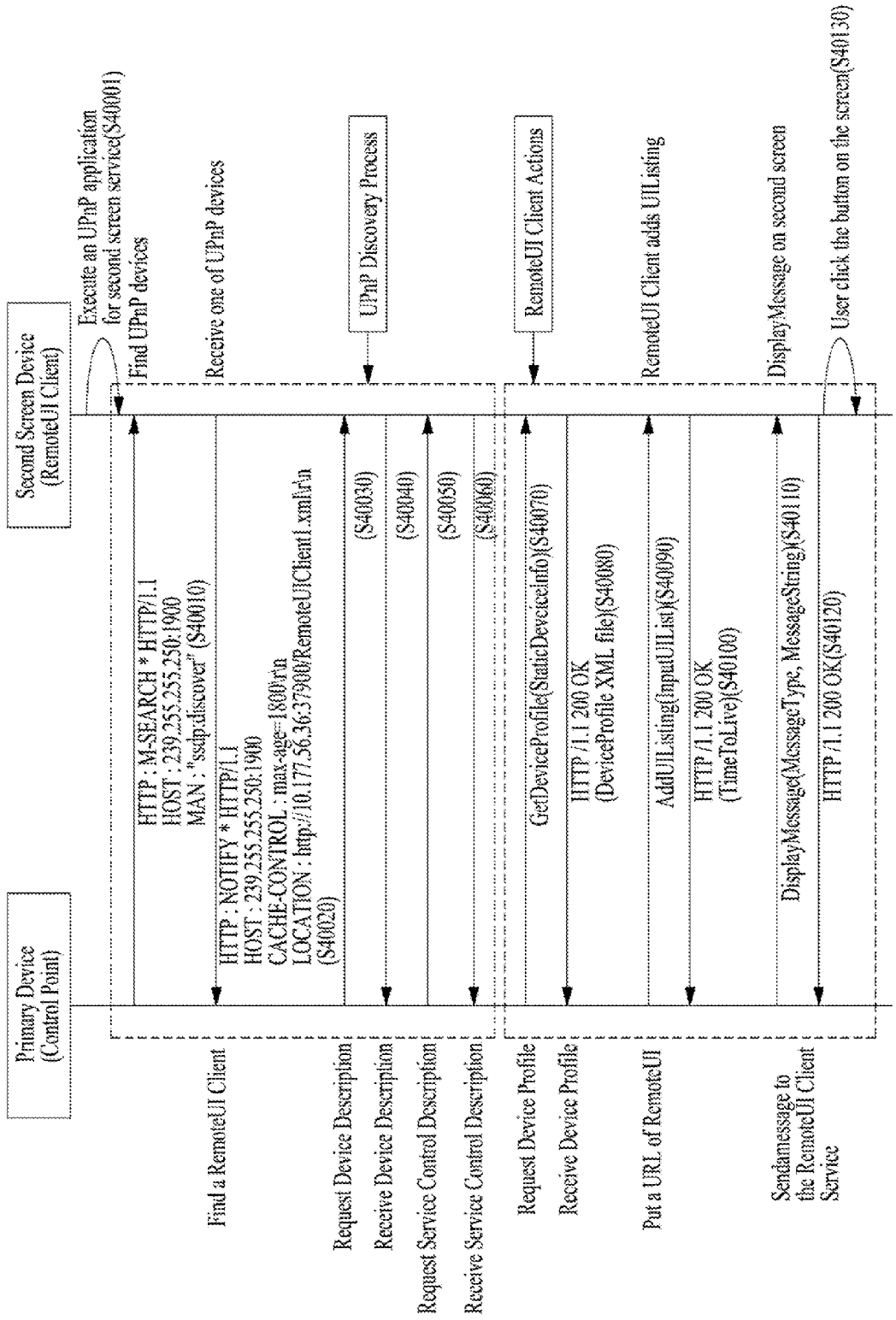
FIG. 40 is a diagram showing an embodiment of a UPnP RemoteUI Client Service.

FIG. 40 is a diagram showing an embodiment of a UPnP RemoteUI Client Service.

In UPnP, an XML message format such as SOAP may be used to transmit the above-described actions and necessary parameter values and SOAP may be used to remotely perform a remote procedure. These messages may be transmitted using a HTTP.

The actions of the above-described RemoteUI Client may be performed as shown in FIG. 40. The actions shown in FIG. 40 are only examples of the above-described actions.

One embodiment of the UPnP RemoteUI Client Service may be divided into a UPnP Discovery Process and RemoteUI Client Actions.

The UPnP Discovery Process may include executing a UPnP application for a second screen service (s40001), finding UPnP devices (s40010), finding a RemoteUIClient (s40020), requesting a device description (s40030), receiving a device description (s40040), requesting a service control description (s40050) and/or receiving a service control description (s40060).

RemoteUI Client Actions may include requesting a device profile (s40070), receiving a device profile (s40080), putting a URL of a Remote UI (s40090), sending a response1 (s40100), sending a message to the RemoteUI Client Service (s40110), sending a response2 (s40120) and/or user clicking the button on the screen (s40130).

Executing a UPnP application for a second screen service (s40001) may include executing a UPnP application in a second screen device (RemoteUI Client).

Finding UPnP devices (s40010) may include a primary device multicasting a discovery message to applications which are being executed in the second screen device. By this step, the second screen device in the network may be found. The primary device may indicate a second screen support service provided thereby via the discovery message.

Finding a RemoteUIClient (s40020) may include the second screen device receiving the discovery message and sending a notification message to the primary device.

Requesting a Device Description (s40030) may include the primary device requesting a device description for the second screen device from the second screen device.

Receiving a device description (s40040) may include the primary device receiving the device profile of the second screen device when the second screen device transmits the device profile of the second screen device in response to requesting the Device Description (s40030).

Requesting a service control description (s40050) may include the primary device requesting a service control description from the second screen device.

Receiving a service control description (s40060) may include the primary device receiving the requested service control description from the second screen device.

The primary device and the second screen device present on the network may find and recognize each other via the UPnP Discovery Process. In addition, the primary device and the second screen device may be connected to each other.

Requesting a device profile (s40070) may include requesting the device profile of the second screen device. The above-described GetDeviceProfile action may be utilized.

Receiving a device profile (s40080) may include the primary device receiving the requested device profile of the second screen device. A device (second screen device and RemoteUI Client) having the "RemoteUI Client Service" may be responsible for finding and displaying a URL address of a UI on the screen if a remote device (primary device) sends the URL address of the UI. In addition, the device having the "RemoteUI Server Service" may multicast the URL address of the UI to notify interested devices of the URL address. However, in this case, since the remote UIs are made for a specific device, the remote UI suitable for the specific device should be provided. Accordingly, device profile information also needs to be transmitted and requesting the device profile (s40070) and receiving the device profile (s40080) may be necessary.

Putting a URL of a Remote UI (s40090) may include notifying the second screen device of the URL address of the Remote UI. The above-described AddUIListing action may be utilized. The second screen device may add the URL address of the remote UI to UIListing.

Sending a response1 (s40100) may include sending the result of putting the URL of the Remote UI (s40090). According to circumstance, a response such as HTTP/1.1 200 OK (the request is successfully processed), HTTP/1.1 501 Method Not Implemented (A function necessary to process the request is not implemented), and HTTP/1.1 400 Not Found (The requested files/resources are not present) may be sent.

Sending a message to the RemoteUI Client Service (s40110) may include the primary device transmitting a display message to the second screen device. The display message may include information such as a message type. The above-described DispalyMessage action may be utilized. The second screen device may display the message on the second screen according to the display message.

Sending a response2 (s40120) may include sending a result of sending the message to the RemoteUI Client Service (s40110). Similarly to sending the response1 (s40100), a response such as HTTP/1.1 200 OK may be sent.

User clicking the button on the screen (s40130) may include the user performing selection according to the message displayed on the second screen.

RemoteUI Client Actions describe the process of operating the RemoteUI Client service via the above-described actions.

In the description of the remote user interface, functions which may be used in an existing PC system may be simplified in consideration of resources of an electronic apparatus, the function of which is added or restricted such that an HTML based application may be used in the electronic apparatus. This description largely includes two viewpoints: applying an HTML displayed on a screen to consumer electronics and defining a browser API which is applicable to consumer electronics. The browser API may be called and used from JavaScript, which is a widely used scripting language. As a result, the API called from the JavaScript calls a function of a receiver.

Among others, the above-described UPnP device and services may be executed by JavaScript executed in the browser. There is a need for a new API for delivering other parameters to UPnP devices in browser.

Figure 41:
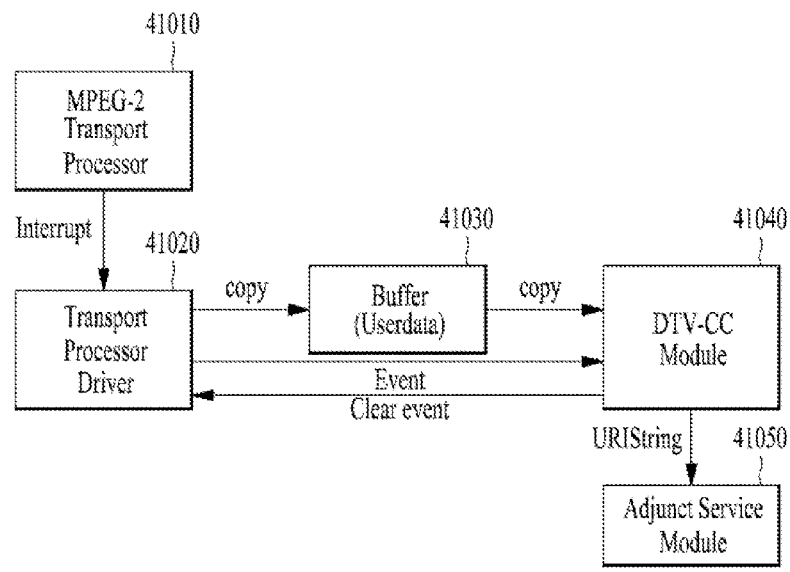
FIG. 41 is a diagram showing an embodiment of a Trigger in DTVCC Service Number 6.

FIG. 41 is a diagram showing an embodiment of a Trigger in DTVCC Service Number 6.

As described above, the above-described trigger may be transmitted using a digital TV closed caption service (DTVCC). The trigger may have one URL string value and may be received as DTVCC service series #6. An MPEG-2 Transport processor 41010 may receive the trigger as DTVCC Service Series #6 and transmit the trigger to a DTV-CC module 41040 via a transport processor driver 41020. At this time, user data may pass through a buffer 41030. The DTV-CC module 41040 may serve as a DTVCC Decoder. The DTV-CC module 41040 may send the trigger having a URI String value to an adjunct service module 41050. The adjunct service module 41050 is a trigger module which may detect a URI String value so as to acquire the above-described TPT (TDO Parameters Table). As described above, it is possible to provide an adjunct service using the trigger, TPT and TDO.

Figure 42:
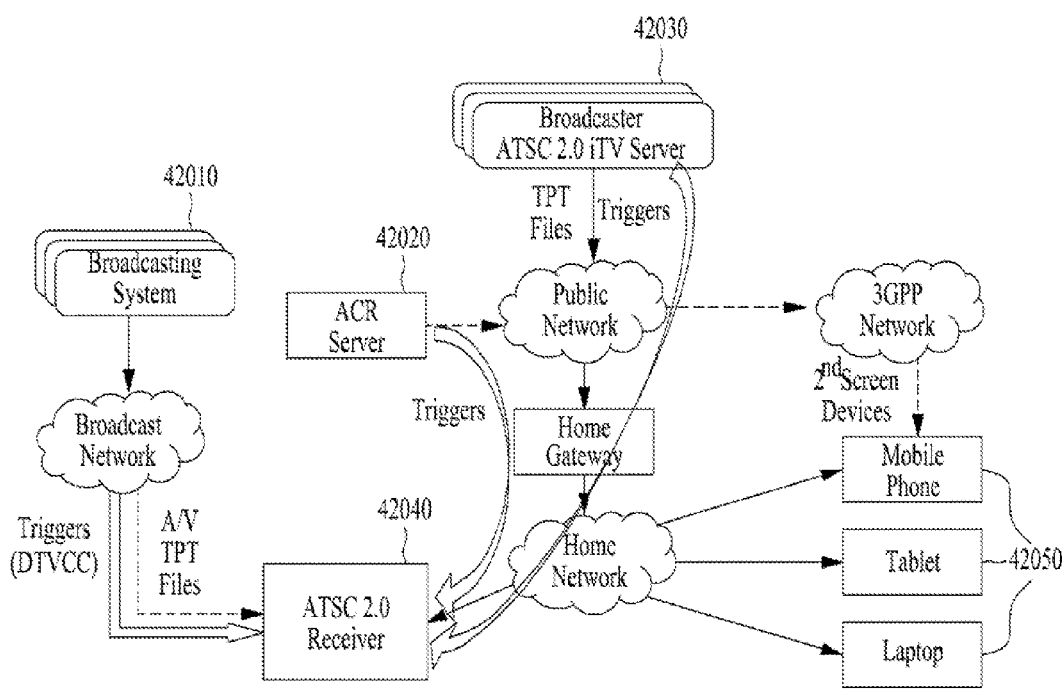
FIG. 42 is a diagram showing an embodiment of a system architecture for a second screen scenario.

FIG. 42 is a diagram showing an embodiment of a system architecture for a second screen scenario.

For second screen support, there may be several requirements. 1) The receiver may be connected to one or more second screen devices. 2) The second screen device may be a portable device such as a laptop, tablet, smartphone, or PDA. 3) The primary content of the second screen may be HTML, Text, Video, Audio, etc. 4) The content played back on the second screen may be designed so as not to interrupt a broadcast program of the primary device (receiver). 5) The second screen may be connected to an ATSC 2.0 receiver directly or indirectly via a 3GPP network. 6) The provider may signal specific content to be displayed only on the second screen. 7) According to circumstance, content played back by the receiver may be designed for playback by the second screen. 8) The second screen subjected to authentication and authorization may use a second screen service. 9) Audience usage of second screen content may be measured. (In this case, in order to obtain such information, user consent must be obtained and a function for such information may be necessary) and 10) This may be provided via a device capable of enhancing secondary language or content.

This specification may describe services that can be provided by a Receiver to support the display of content related to an A/V broadcast by applications running on second screen devices (smart phones, tablets, laptops, etc.), including content synchronized with the programming being broadcast. The service is described based on the UPnP Device Architecture.

In this specification, the ATSC 2.0 Receiver may be a TV receiver or a normal receiver. In addition, the ATSC 2.0 Receiver may be a receiver in DVB, ATSC, etc.

The UPnP Device Architecture defines protocols for communication in an IP network between "controlled devices" that provide services and "control points" that utilize those services. In the "second screen" scenario, a TV receiver can play the role of a "controlled device," and a second screen device can play the role of a "control point" and vice versa.

The UPnP Device Architecture specifies, "discovery" protocols for control points to discover controlled devices of interest, "description" protocols for control points to learn details about controlled devices and services, "control" protocols for control points to invoke "actions" (methods) on controlled devices, and "eventing" protocols for controlled devices to deliver asynchronous notifications to control points. The actions and events may be provided by the device services.

When an UPnP controlled device joins a network, it can multicast discovery messages to a "well-known" IP multicast address and port. These messages can identify the device type and the service types offered by the device, and they can give URLs where descriptions of the device and services can be obtained.

When an UPnP control point joins a network, it can multicast a search message asking controlled devices to announce themselves. The search message can specify the device types and/or service types of interest. Relevant devices can respond by sending unicast discovery messages to the control point.

Once a control point gets discovery messages about devices and services of interest, it can use the URLs in the messages to request descriptions of the devices and services. These descriptions can include the URLs that can be used to invoke actions and subscribe to events for the services.

Typical Second Screen Discovery Scenarios may be largely divided into Scenario A and scenario B. In case of Scenario A, the user has a second screen app running in his/her second screen device when the TV receiver joins the network (which perhaps happens when the TV receiver is turned on, or perhaps when its network interface is enabled). In case of Scenario B, the user does not have a second screen app running in his/her second screen device when the TV receiver joins the network.

Scenario A may be as follows. 1) A TV receiver that provides second screen support joins the network. 2) The TV receiver multicasts its discovery messages that advertise its second screen support services. 3) The second screen app running in the second screen device receives the multicast discovery messages and sends the TV receiver a request for descriptions of its services. 4) The TV receiver responds with descriptions of its services. 5) The second screen app uses the information given in the descriptions to access the appropriate services and provide an interactive experience synchronized with the TV programming.

Scenario B may be as follows. 1) The TV programming being viewed on the TV receiver enters a program segment that offers second screen support. (This could be as soon as the TV set is turned on, or when a channel change goes from a channel that does not offer an interactive data service with second screen support to one that does offer it, or when the channel being viewed goes from a program segment that does not offer an interactive data service with second screen support to a segment that does offer it.) 2) This causes the TV receiver to inform viewers in some way that second screen support is available—for example, by a small icon in a corner of the screen. 3) The viewer decides to take advantage of the second screen support and activate a second screen app on his/her second screen device. The second screen app then multicasts a message searching for devices that offer second screen support. The TV receiver responds to this message with its discovery messages. 4) When the second screen app receives the discovery messages, it sends the TV receiver a request for descriptions of its services. 5) The TV receiver responds with descriptions of its services. 6) The second screen app uses the information given in the descriptions to access the appropriate services and provide an interactive experience synchronized with the TV programming.

Scenario A may be also as follows. 1) A TV set that provides second screen support joins the network. (This could be when the TV set is turned on, or when its network interface is enabled.) 2) This causes the TV receiver to multicast its discovery messages that advertise itself and its second screen support services. 3) If a user has a Second Screen App running is his/her second screen device at this time, the app receives the multicast discovery messages and proceeds to step (7). 4) The TV programming being viewed on the TV receiver enters a program segment that offers second screen support. (This could be as soon as the TV set is turned on, or when a channel change goes from a channel that does not offer an interactive data service with second screen support to one that does offer it, or when the channel being viewed goes from a program segment that does not offer an interactive data service with second screen support to a segment that does offer it.). 5) This causes the TV receiver to inform viewers in some way that second screen support is available—for example, by a small icon in a corner of the screen. 6) If a viewer does not already have an Second Screen App running in his/her second screen device, the viewer can decide to take advantage of the second screen support and activate an Second Screen App on his/her second screen device. The Second Screen App then multicasts a message searching for devices that offer second screen support. The TV receiver responds to this message with its discovery messages. 7) When the Second Screen App receives the discovery messages, it sends the TV receiver a request for descriptions of its services. 8) The TV receiver responds with descriptions of its services. These will be a Trigger service and optionally an HTTP Proxy Server service. 9) The Second Screen App will subscribe to the "eventing" feature of the Trigger service. If the interaction model of the interactive data service being offered is the Direct Execution model, the Trigger service will send all Triggers to the second screen device as they are received by the TV receiver. If the interaction model of the interactive data service is the TDO model, the Trigger service will send an Activation Trigger to the Second Screen App whenever the activation time of a new Activation Trigger arrives. 10) The Second Screen App will act on the Triggers, downloading TDOs and other files as needed, either from an Internet link or from the HTTP Proxy Server service offered by the TV receiver, and providing the interactive service to the second screen device user. 11) Whenever the TV programming on the TV receiver goes to a segment that does not offer an interactive data service with second screen support, the Trigger service will send a "null Trigger" to the Second Screen App to notify it that an interactive data service for the second screen device is no longer available. 12) The user of the second screen device can then close the Second Screen App or leave it running to resume the interactivity whenever the programming on the TV receiver enters another segment that offers second screen support.

In either scenario it can be possible that the household has more than one TV receiver on the home network. It this case the second screen app would receive discovery messages from multiple different receivers. If that happens, the second screen app can ask the user which one to interact with (displaying information from the description messages to help the user decide).

A TV receiver that provides second screen support can offer several UPnP services for the use of second screen apps. The UPnP services can be "Trigger delivery service" from the receiver to a second screen app, "Two-way communications service" between Declarative Objects (DOs) running in the receiver and a second screen app and "HTTP proxy server service". These services can be optional depends on configuration.

These services can be designed to support a wide variety of different types of second screen applications, obtained from a wide variety of different sources, running in a wide variety of different operating environments in a wide variety of different types of second screen devices.

A typical second screen packaged apps scenario is as follows. 1) A control point on a second screen device subscribes to a Packaged Apps service on a first screen device. 2) A consumer starts a Packaged App on the first screen device. 3) The Packaged App makes the name of a second screen app and the URL of the second screen app available to the Packaged App service. 4) The control point on the second screen device receives the companion app name and URL. 5) The control point sets a marker on the second screen indicating consumer action needed. 6) The consumer reviews the second screen app name and selects it. 7) The control point launches indicated second screen app.

A first screen device that provides second screen support can offer several UPnP service for the use of second screen apps. One of the UPnP service is "Application URL service" which is providing the name and URL of the companion second screen app to be executed on the second screen device.

The system architecture for the second screen scenario will be described.

The system architecture for second screen scenario may include a broadcasting system 42010, an ACR server 42020, a broadcaster ATSC 2.0 iTV server 42030, an ATSC 2.0 receiver 42040 and/or second screen devices 42050.

The broadcasting system 42010 may be a normal broadcast system and may deliver triggers, A/V, TPTs and/or other data files via a broadcast network. The trigger may be transmitted via the DTVCC as described above.

The ACR server 42020 is a server for managing ACR related data of broadcast content, and may transmit a trigger to the ATSC 2.0 receiver 42040 such that the ATSC 2.0 receiver 42040 acquires an interactive service as requested or necessary. This may be equal to the above-described ACR server.

The broadcaster ATSC 2.0 iTV server 42030 is a server for generating and managing an interactive service, and may manage associated TDO/files and generate and manage a TDO parameter table (TPT) including information about the associated TDO/files.

The ATSC 2.0 Receiver 42040 may receive the trigger related to broadcast A/V and interactive service and acquire and provide the interactive service on the screen using the trigger. This may be equal to the above-described receiver.

The second screen devices 42050 may include a mobile phone, a tablet, a laptop, etc. which are the second screen devices. This may be equal to the above-described second screen device.

Triggers can be delivered to the ATSC 2.0 receiver (42040) via the DTVCC channel or via an ACR process or from a Broadcaster interactive TV (iTV) Server (42030). In all cases Triggers are passed from the ATSC 2.0 receiver (42040) to the second screen devices (42050) at the appropriate times. This specification describes mechanisms for Triggers to be passed to second screen devices (42050). It also describes mechanisms for DOs running on an ATSC 2.0 receiver (42040) to establish two-way communications with second screen devices (42050).

Apps and other files that are available via Internet can be retrieved by second screen devices (42050) via the home network, via a separate 3GPP network, or via an HTTP Proxy Server (not shown) on the ATSC 2.0 receiver (42040) if it offers that service. Apps executing on first screen devices may be Packaged Apps downloaded from the Internet or apps transmitted through the broadcast.

Apps and other files that are only available via FLUTE sessions in the broadcast can be retrieved by second screen devices (42050) only if ATSC 2.0 receiver (42040) offers an HTTP Proxy Server that will deliver the FLUTE files when requested (assuming the second screen device (42050) does not include a TV receiver).

This specification also describes a mechanism for Packaged Apps running on an ATSC 2.0 receiver (42040) to support launching of applications on second screen devices (42050).

Figure 43:
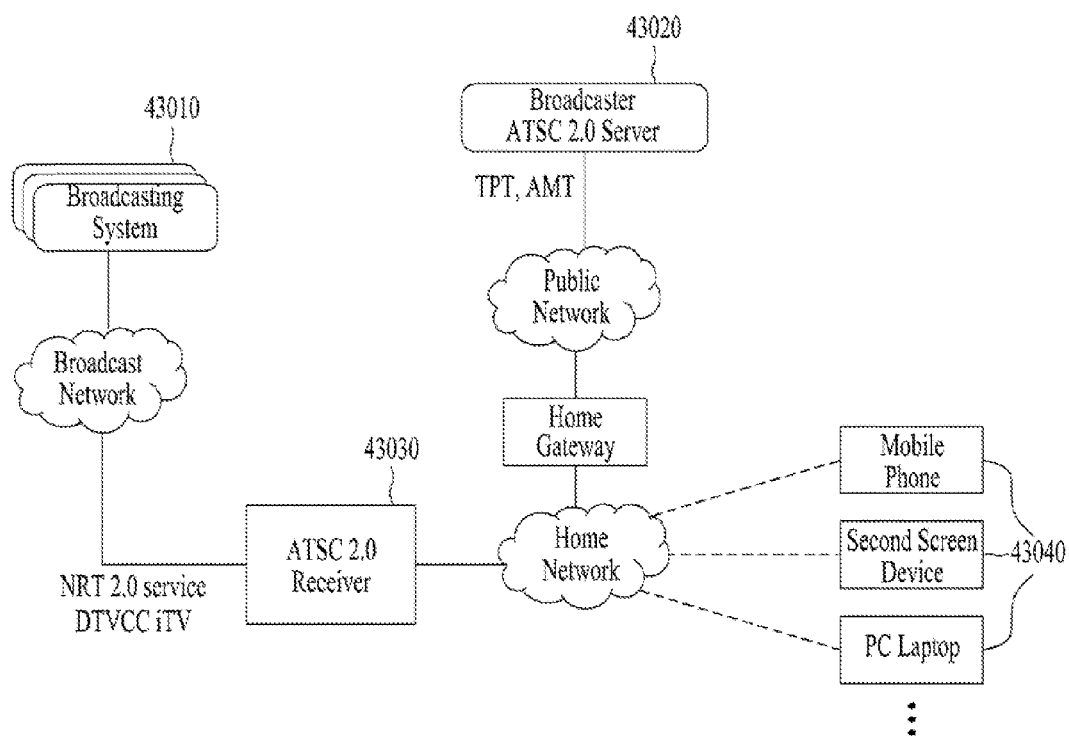
FIG. 43 is a diagram showing an embodiment of topology between an ATSC 2.0 Receiver and a second screen (Direct Connection)

FIG. 43 is a diagram showing an embodiment of Topology between an ATSC 2.0 Receiver and a second screen (Direct Connection).

FIG. 43 illustrates direct connection between the ATSC 2.0 receiver and the second screen device.

The embodiment of topology between the ATSC 2.0 receiver and the second screen (Direct Connection) may include a broadcasting system 43010, a broadcaster ATSC 2.0 server 43020, an ATSC 2.0 receiver 43030 and/or second screen devices 43040.

The broadcasting system 43010 may be equal to the broadcasting system 42010.

The broadcaster ATSC 2.0 server 43020 may be equal to the broadcaster ATSC 2.0 iTV server 42030.

The ATSC 2.0 receiver 43030 may be equal to the ATSC 2.0 receiver 42040.

The second screen devices 43040 may be equal to the second screen devices 42050.

The ATSC 2.0 receiver 43030 may be connected to a broadcast network to directly receive a terrestrial broadcast. Accordingly, the ATSC 2.0 receiver 43030 may extract the URL string of the iTV message transmitted via the DTVCC from DTVCC Service Number 6. In addition, the ATSC 2.0 receiver 43030 may be connected to a home gateway to access the Internet as necessary. The ATSC 2.0 receiver 43030 may communicate with devices connected in other home networks using home networking technology (UPnP).

The second screen devices 43040 are all connected to the home gateway to communicate with the devices and to freely access the Internet. The home gateway may include all functions for supporting Ethernet and Wi-Fi.

A broadcaster may provide a supplementary service via an Internet server for an interactive service. The ATSC 2.0 receiver 43030 or the second screen devices 43040 may access the server to download a TDO or web page for a mobile device. In case of the ATSC 2.0 receiver 43030, a web page may be rendered to the resolution of a TV and, in case of the second screen devices 43040, a web page may be rendered to resolution and APIs different from those of the TV.

Figure 44:
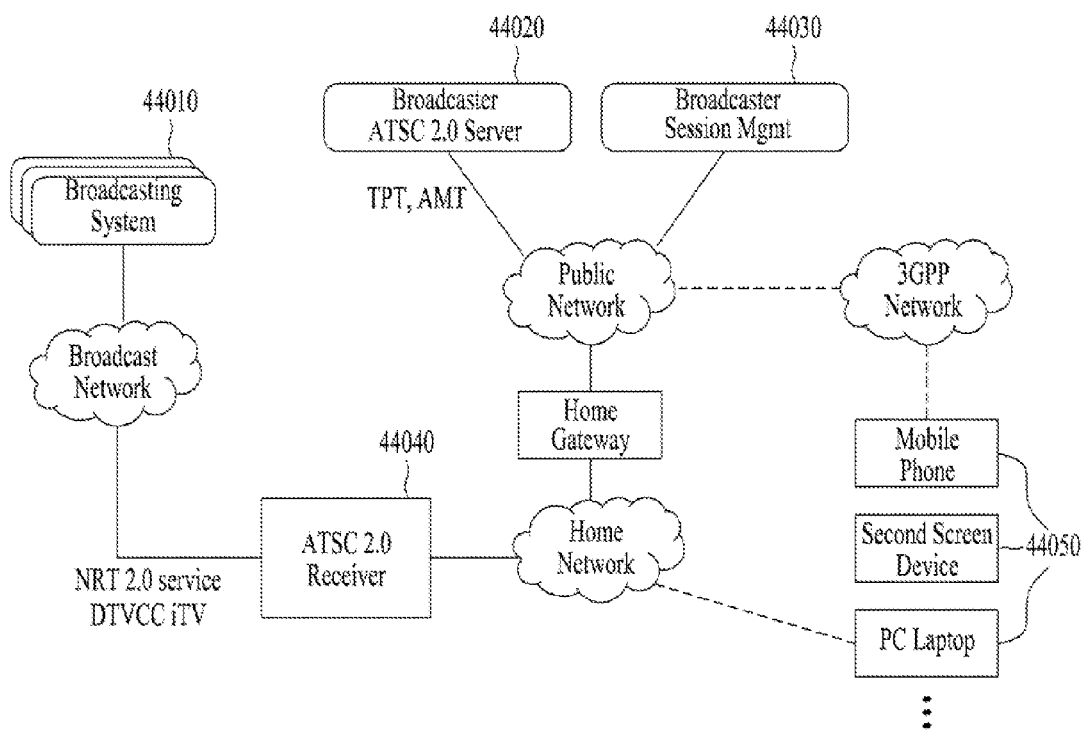
FIG. 44 is a diagram showing an embodiment of topology between an ATSC 2.0 Receiver and a second screen (Indirect Connection)

FIG. 44 is a diagram showing an embodiment of topology between an ATSC 2.0 Receiver and a second screen (Indirect Connection).

FIG. 44 shows an embodiment of topology between an ATSC 2.0 receiver and a second screen (Indirect Connection).

FIG. 44 illustrates indirect connection between the ATSC 2.0 receiver and the second screen device.

The embodiment of topology between the ATSC 2.0 receiver and the second screen (Indirect Connection) may include a broadcasting system 44010, a broadcaster ATSC 2.0 server 44020, a broadcaster session management device 44030, an ATSC 2.0 receiver 44040 and/or second screen devices 44050.

The broadcasting system 44010 may be equal to the broadcasting system 42010.

The broadcaster ATSC 2.0 server 44020 may be equal to the broadcaster ATSC 2.0 iTV server 42030.

The broadcaster session management device 44030 may serve to manage indirect connection between the second screen device 44050 and the ATSC 2.0 receiver 44040.

The ATSC 2.0 receiver 44040 may be equal to the ATSC 2.0 receiver 42040.

The second screen devices 44050 may be equal to the second screen devices 42050.

Indirect connection of FIG. 44 does not indicate that the second screen devices 44050 are connected to the ATSC 2.0 receiver 44040 via the home gateway but indicates that the second screen devices 44050 are directly connected to the 3GPP network to be connected to the ATSC 2.0 receiver 44040 over the home network. In this case, it is difficult to connect the second screen devices 44050 to the home network or a network interface supporting the home network may not be present.

In this case, the second screen devices 44050 may require information about the ATSC 2.0 receiver 44040 stored on an external Internet server. In addition, the ATSC 2.0 receiver 44040 reports the access address to the external Internet server upon operation.

Figure 45:
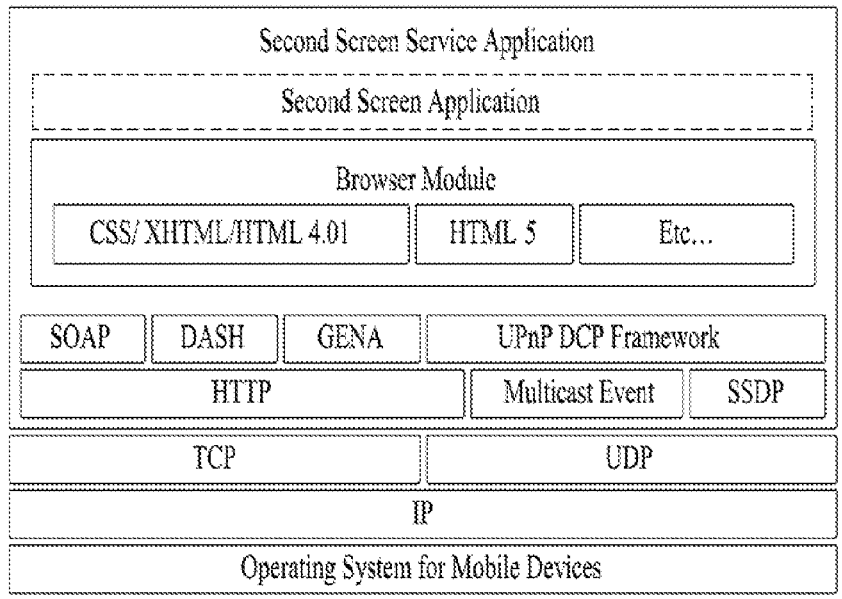
FIG. 45 is a diagram showing an embodiment of a Software Layer of a Second Screen Service Application.

FIG. 45 is a diagram showing an embodiment of a Software Layer of a Second Screen Service Application.

The second screen devices generally execute applications using OSs. In general, some functions of OSs for mobile devices may not be included, for the purpose of lightweight. Accordingly, the functions, which are not supported by the OSs, need to be included in the applications.

The software layer of FIG. 45 shows the software structure of a second screen service application necessary for the second screen service. FIG. 45 may show the case in which the receiver manages the lifecycle of the second screen application.

Since the second screen device may play Internet content back, the OS may provide an environment, in which a web application may be executed, to programmers using a platform SDK. The environment may be provided in the form of the SDK such that the application executed by the OS directly displays the Internet content.

In FIG. 45, Second Screen Service Application can be running on Second Screen Device. This application can be downloaded from an AppStore (or some kind of application market). Second Screen Service Application can include ACR Client and use the microphone and camera to capture the video and audio data from TV set. Moreover, the ACR client can sample video and audio data and send a media signature to the ACR server. Second Screen Service Application may run on the OS and include a protocol such as HTTP, SSDP or Multicast Event, according to which a UPnP Framework may operate, and a browser module may be included in order to perform and display a web application.

The browser module can be a module to render Internet web pages. The browser module is a core part of the web browser engine to render the Web application (e.g., ECMAScript, HTML and XHTML). In addition, the browser module may mean a software module for providing a function equal or similar to a browser provided by the OS. The method of utilizing the browser and the controllable functions differ between OSs.

Second Screen Application can be a web application that is designed for Second Screen devices. Second Screen Application may be a web application for calling functions according to ECMAScript or a web application, the size of which is controlled to be executed in the browser module provided by a mobile OS. This web application may be executed in the Second Screen Service Application.

The operating system for the mobile device may be composed of drivers supporting hardware and include drivers for a kernel-specific service. Fundamentally, it is possible to support only IP, TCP and UDP protocols. A network protocol stack is present above the OS. In case of UPnP, a HTTP may be transmitted using a UDP.

A UPnP DCP Framework may mean device control points defined in UPnP Forum.

An SSDP (Simple Service Discovery Protocol) may search for one or more services according to the device connected to the network in the home network.

Figure 46:
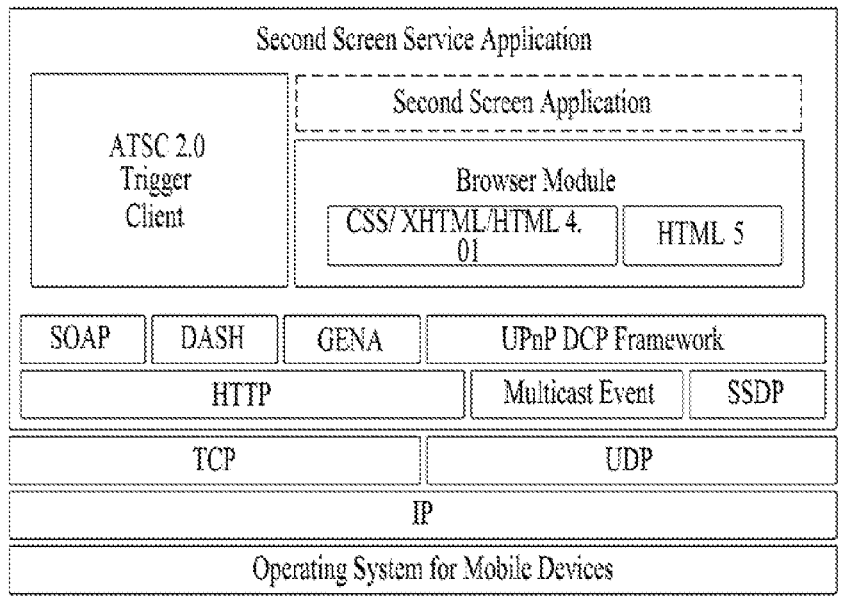
FIG. 46 is a diagram showing a Software Layer of a Second Screen Service Application.

FIG. 46 is a diagram showing a Software Layer of a Second Screen Service Application.

The software layer of FIG. 46 shows the software structure of the second screen service application necessary for the second screen service. FIG. 46 may show the case in which the second screen service application manages the lifecycle of the second screen application.

The description of each entity of FIG. 46 may be equal to that of FIG. 45 in terms of role and function.

The ATSC 2.0 Trigger Client may mean a module for receiving and processing the above-described trigger, TPT, AMT, etc. This module may be included in the second screen device according to circumstance. If this module is included in the second screen device, this module may directly process the TPT and AMT to directly check the lifecycle of the application.

FIG. 47 is a diagram showing a table showing a difference between a transmission order according to Second Screen Application Lifecycle management and transmitted data.

The receiver may directly receive the TPT and the AMT using the DTVCC over the broadcast network or download the TPT and the AMT over the Internet network and process the TPT and the AMT. As described above, the TPT includes event information and the event information may include EventId, Action, Destination and Data information. "Event@Destination" may indicate for which device this event information is generated. For example, the destination may be a receiver or a second screen device. If the destination is set to the second screen device, the receiver should deliver the event information to the second screen device.

Accordingly, there is a need for a method of delivering this information to the second screen device. The lifecycle of the second screen application may be managed by the receiver or the second screen service application.

The table of FIG. 47 shows summary of information delivery methods depending on which entity manages the lifecycle of the second screen application.

The first row may be a summary of a description of the below-described case of FIG. 51 and a detailed description thereof will be given below.

A second row may be a summary of a description of the case in which the receiver manages the lifecycle of the second screen application and a detailed description thereof will be given below.

A third row may be a summary of a description of the case in which the receiver filters (augments) and delivers trigger information necessary for the second screen device and a detailed description thereof will be given below.

A fourth row may be a summary of a description of the below-described case of FIG. 58 and a detailed description thereof will be given below.

A fifth row may be a summary of a description of the below-described case of FIG. 57 and a detailed description thereof will be given below.

Figure 48:
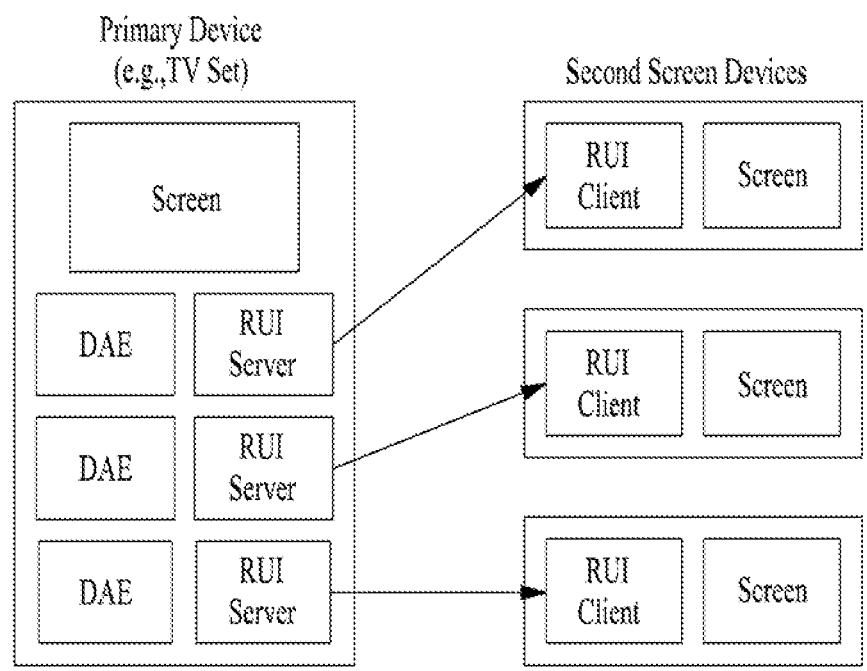
FIG. 48 is a diagram showing the operational concept of a Centralized Execution model.

FIG. 48 is a diagram showing the operational concept of a Centralized Execution model.

A method of efficiently delivering an interactive service to a second screen device may include a centralized execution model and a distributed execution model.

As shown in the diagram showing the operational concept of the centralized execution model, a TV set may generate and update an RUI to be displayed on each second screen device using an RUI mechanism of UPnP and transmit the RUI over a network. Each second screen device may receive the RUI via an RUI client in real time and display the RUI on a screen. Unlike the distributed execution model, a DAE may be present in the primary device.

Figure 49:
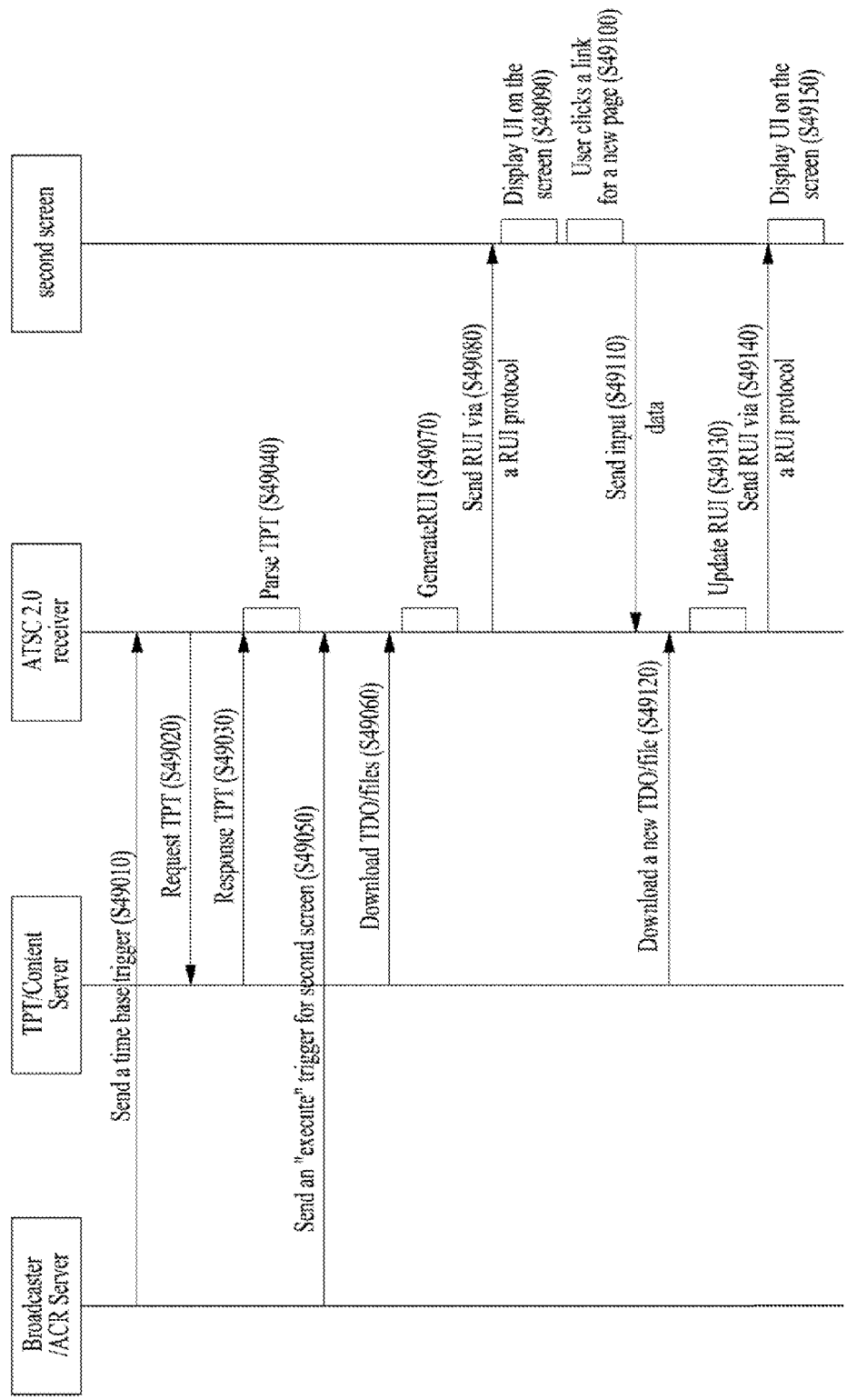
FIG. 49 is a diagram showing the flow of interworking between a Centralized Execution model based receiver and a second screen.

FIG. 49 is a diagram showing the flow of interworking between a Centralized Execution model based receiver and a second screen.

The flow of FIG. 49 may be an operation when a centralized execution model mechanism is applied in an environment in which a receiver is capable of acquiring an interactive service via a broadcast network and interworks with a second screen device in the embodiment of the operational concept of the centralized execution model.

The embodiment of the flow of interworking between the centralized execution model based receiver and the second screen may include sending a time base trigger (s49010), requesting a TPT (s49020), transmitting a TPT as a response (s49030), parsing a TPT (s49040), sending an execute trigger for the second screen (s49050), downloading TDOs/Files (s49060), generating an RUI (s49070), sending an RUI via a RUI protocol (s49080), displaying a UI on the screen (s49090), user clicking a link for a new page (s49100), sending input data (s49110), downloading a new TDO/file (s49120), updating an RUI (s49130), sending an RUI via a RUI protocol (s49140) and/or displaying a UI on the screen (s49150).

Sending a time base trigger (s49010) may include the receiver receiving the time base trigger via a DTVCC or ACR server. The time base trigger was described above.

Requesting a TPT (s49020) may include the receiver interpreting the received trigger, acquiring a URL of a server capable of acquiring the TPT, and requesting the TPT.

Transmitting a TPT as a response (s49030) may include transmitting the TPT in response to the request in requesting TPT (S49020).

Parsing a TPT (s49040) may include the receiver parsing the requested TPT.

Sending an execute trigger for a second screen (s49050) may include the receiver receiving the execute trigger for the second screen via the DTVCC or ACR server. The execute trigger may be equal to the above-described activation trigger.

Downloading TDOs/Files (s49060) may include the receiver acquiring the information about the TDOs and files associated with the time base trigger or the execute trigger from the received TPT and downloading the TDOs and files indicated by the trigger from a content server.

Generating an RUI (s49070) may include generating the RUI for the downloaded TDOs and files.

Sending RUI via a RUI protocol (s49080) may include the receiver transmitting the RUI generated on the second screen using the RUI protocol.

Displaying a UI on the screen (s49090) may include displaying the received RUI on the second screen.

User clicking a link for a new page (s49100) may include clicking a specific link on the RUI by selection of the user on the second screen.

Sending input data (s49110) may include delivering input information of the user to the receiver if a clicked specific link is connected to another page.

Downloading a new TDO/file (s49120) may include the receiver downloading TDOs and files associated with user input.

Updating an RUI (s49130) may include updating the RUI according to the downloaded TDOs and files.

Sending an RUI via a RUI protocol (s49140) may include the receiver transmitting the updated RUI to the second screen using the RUI protocol.

Displaying an UI on the screen (s49150) may include displaying the updated RUI on the second screen.

Figure 50:
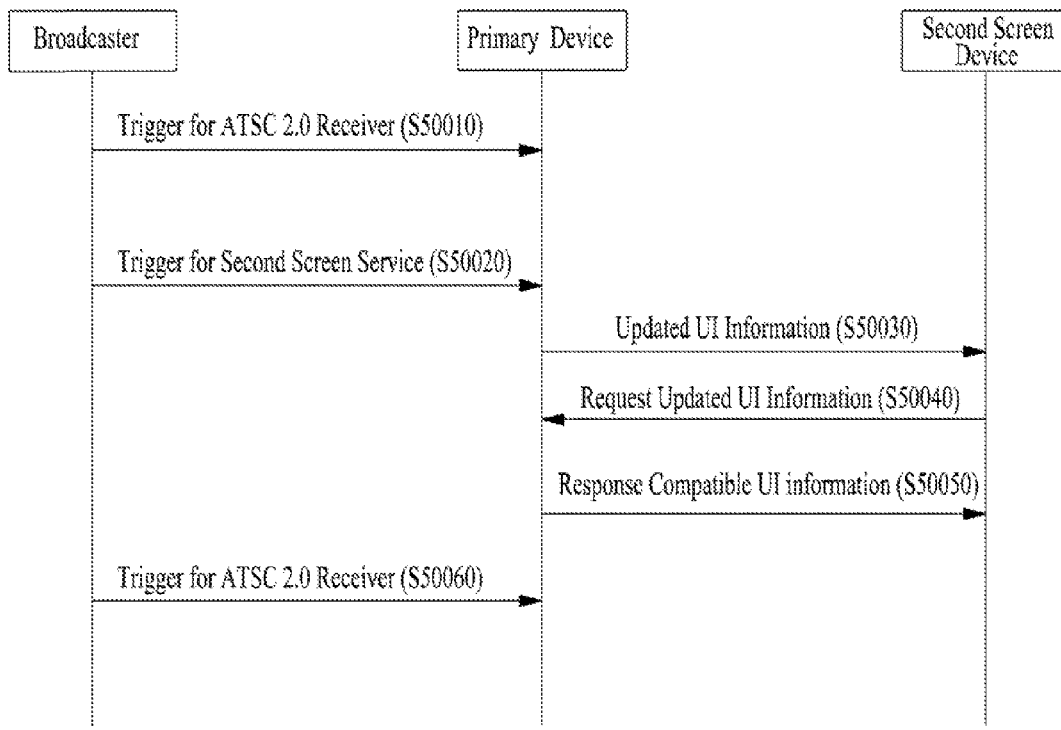
FIG. 50 is a diagram showing an embodiment of a method of, at a receiver, notifying a second screen device of UI information.

FIG. 50 is a diagram showing an embodiment of a method of, at a receiver, notifying a second screen device of UI information.

FIG. 50 shows a logical order in which the receiver receives the trigger from the broadcaster and delivers the trigger to the second screen device.

This process may include receiving a trigger for a receiver (s50010), receiving a trigger for a second screen service (s50020), sending notification about updated UI information (s50030), requesting updated UI information (s50040), transmitting compatible UI information as a response (s50050) and receiving another trigger for the receiver (s50060).

Receiving a trigger for a receiver (s50010) may include the primary device receiving the trigger for the receiver, that is, the primary device, from the broadcaster via the broadcast stream.

Receiving a trigger for a second screen service (s50020) may include the primary device receiving the trigger for the second screen service from the broadcaster via the broadcast stream.

Sending notification about updated UI information (s50030) may include notifying about updated UI. As described above, if the trigger is received while viewing a broadcast program, the receiver may check whether the trigger is for the second screen device or the primary device. At this time, if the trigger is for the second screen device, all UPnP devices or only a specific UPnP device may be notified of new UI information update. This may correspond to the case in which the second screen device subscribes using the UPnP protocol.

Requesting updated UI information (s50040) may include the second screen device requesting updated UI information from the primary device.

Transmitting compatible UI information as a response (s50050) may include the primary device transmitting compatible UI information to the second screen device.

Receiving another trigger for the receiver (s50060) may be equal to receiving a trigger for the receiver (s50010). That is, the above-described operation may be performed again.

Since the receiver may include a trigger module, the receiver may receive an XML file such as TPT and AMT over a broadcast network or an Internet network, parse the XML file, and perform an appropriate operation. If the second screen device is found, Action, TDO URL and Data delivered to the second screen device may be recognized using an Event@Destination field. The second screen device may not directly receive the XML file such as TPT or AMT and thus may not include the trigger module. If a RemoteUI Client Service is included, the receiver may manage the lifecycles of all second screen applications. In contrast, if several second screen devices are connected, data for controlling the second screen application should be transmitted several times.

Figure 51:
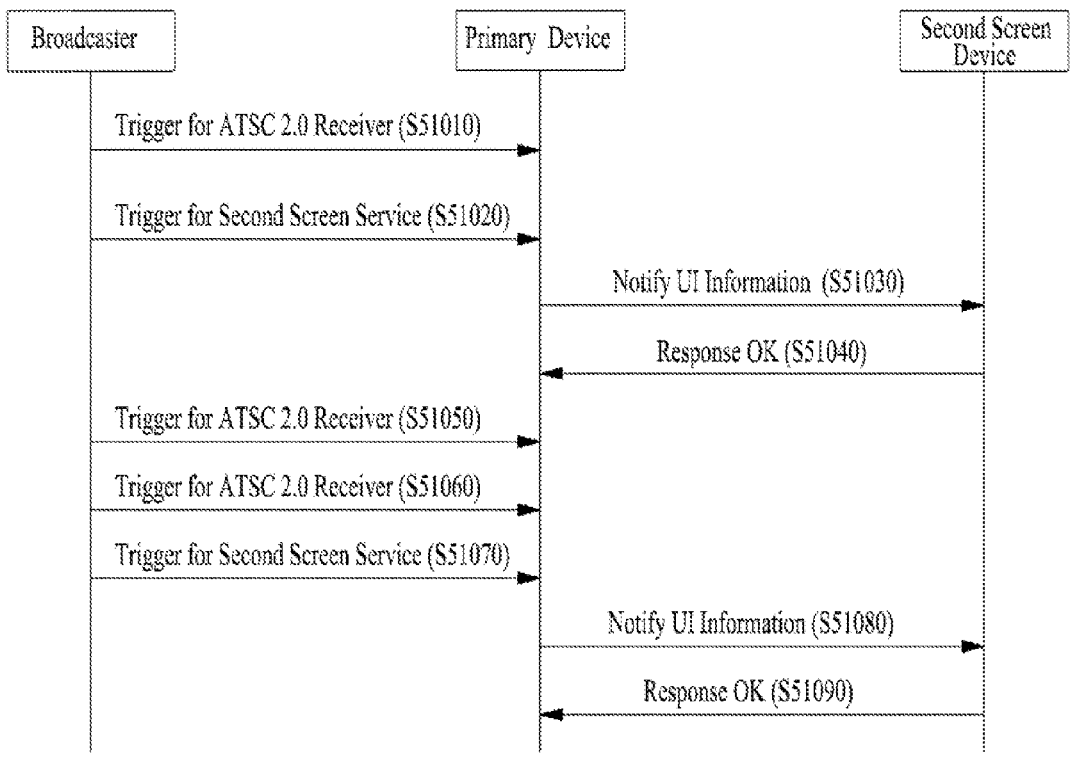
FIG. 51 is a diagram showing an embodiment of a method of, at a receiver, notifying a second screen device of UI information.

FIG. 51 is a diagram showing an embodiment of a method of, at a receiver, notifying a second screen device of UI information.

Unlike FIG. 50, FIG. 51 shows the case in which all UI information for the second screen device, which is determined to be suitably used for the second screen device, is directly delivered. That is, TDO URLs for the second screen device may be transmitted.

This process may include receiving a trigger for the receiver (s51010), receiving a trigger for the second screen service (s51020), notifying about UI information (s51030), sending a response "ok" (s51040), receiving a trigger for the receiver (s51050), receiving a trigger for the receiver (s51060), receiving a trigger for the second screen service (s51070), notifying about UI information (s51080) and/or sending a response "ok" (s51090).

Receiving a trigger for the receiver (s51010) may be equal to receiving a trigger for the receiver (s50010).

Receiving a trigger for the second screen service (s51020) may be equal to receiving a trigger for the second screen service (s50020).

Notifying about UI information (s51030) may include notifying about UI information update.

Sending a response "ok" (s51040) may include transmitting a message indicating that UI notification has been received.

Receiving a trigger for the receiver (s51050) and receiving a trigger for the receiver (s51060) may be equal to receiving a trigger for the receiver (s50010). That is, the above-described operation may be performed again.

Receiving a trigger for the second screen service (s51070) may be equal to receiving a trigger for the second screen service (s50020). That is, the above-described operation may be performed again.

Notifying about UI information (s51080) may be equal to notifying about UI information (s51030). That is, the above-described operation may be performed again.

Sending a response "ok" (s51090) may be equal to sending a response "ok" (s51040). That is, the above-described operation may be performed again.

In the method of FIG. 51, the receiver should know which UPnP device is a second screen device and which device profile is included. In particular, the receiver should know whether the second screen device supports the second screen service.

The method (the case of FIG. 50) of notifying about UI information after determining whether the trigger is for the second screen device or the primary device and the method (the case of FIG. 51) of delivering all UI information for the second screen device, which is determined to be suitably used for the second screen device, may be equal in that the receiver processes the TPT and the trigger and delivers only the TDO URL to the second screen device. These two methods may differ in that the receiver indirectly delivers the TDO to the second screen device or the receiver directly records the device profile of each device and notifies only the second screen device of the location of the second screen application.

Figure 52:
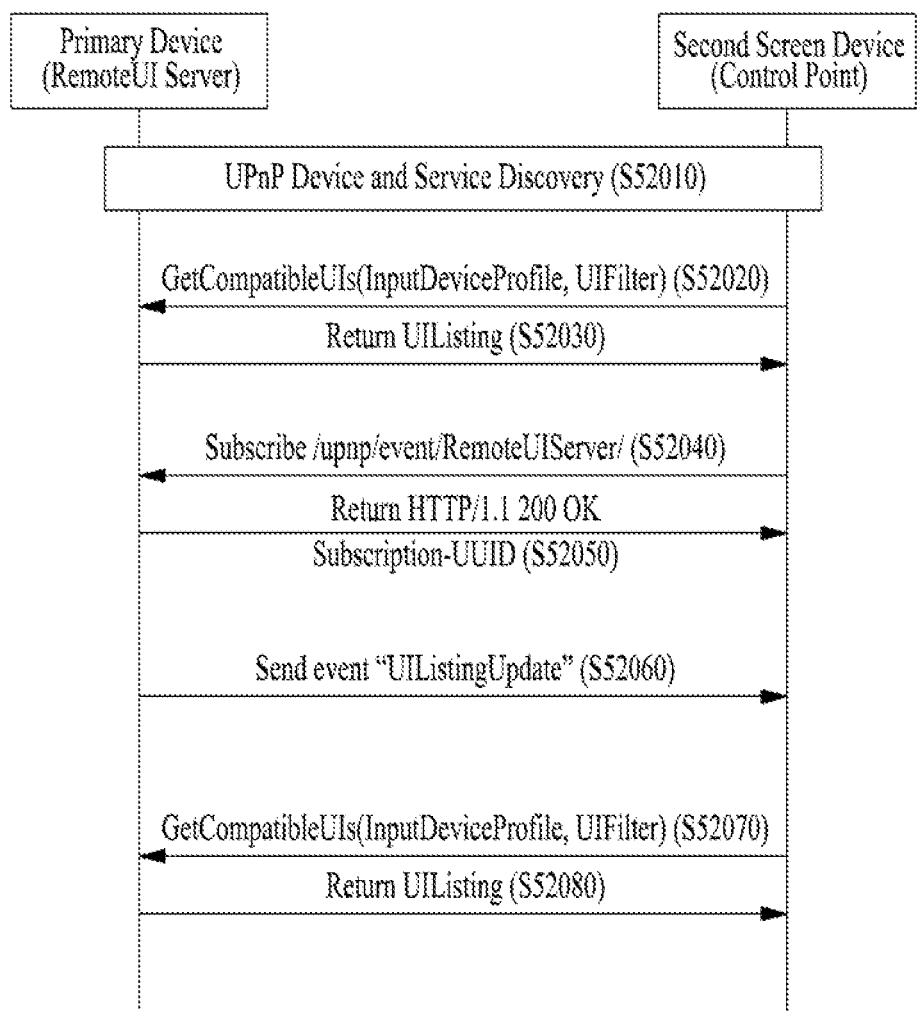
FIG. 52 is a diagram showing an embodiment of Broadcast Signaling for a RemoteUI Server Service.

FIG. 52 is a diagram showing an embodiment of Broadcast Signaling for a RemoteUI Server Service.

One embodiment of broadcast signaling for RemoteUI Server Service may include UPnP device and service discovery (s52010), requesting UIListing (s52020), sending UIListing (s52030), subscribing to an event (s52040), returning an HTTP message (s52050), sending a UIListingUpdate message (s52060), requesting UIListing (s52070) and/or returning UIListing (s52080).

UPnP device and service discovery (s52010) may include discovering the receiver and the second screen device. A device newly connected to the home network or a device already connected to the home network (the receiver or the second screen device) may multicast a message for discovery. At this time, a desired service may be searched for using multicasting and all services may be searched for with respect to a plurality of unspecific UPnP devices. This may be changed depending on which service is provided by the device. In this step, the second screen device may be aware of the device profile of the primary device. The primary device can process the device profile and build the appropriate UIListing. The RemoteUI Server can give the second screen device the CompatibleUIs XSD schema. This schema can include the URL of Application, unique id for this UI ("uiID"), name, protocolInfo and so on.

Requesting UIListing (s52020) may include the second screen device transmitting the device profile thereof and requesting UIListing. A GetCompatibleUIs action capable of obtaining a compatible UI may be used. (The UIFilter can be optional) A detailed description thereof will be given below.

Sending UIListing (s52030) may include the primary device transmitting appropriate UI listing to the second screen device according to the request. A detailed description thereof will be given below.

Subscribing to an event (s52040) can include subscribing to a proper exposed Event of the primary device. Subscribing to an event (s52040) may be selectively performed in order to receive "UIListingUpdate" which is event information provided by the RemoteUI Server Service. In returning UIListing (s52080), the second screen device may be notified that the address of RemoteUI has been changed or the UI has been changed. That is, since the second screen device is notified only that the UI has been changed, if detailed location or additional information is required, the "GetCompatibleUIs" Action should be transmitted to the receiver to obtain the "UIListing" value.

Returning an HTTP message (s52050) may include sending a result of subscribing to an event (s52040). Similarly to sending a response1 (s40100), a response such as HTTP/1.1 200 OK may be sent according to circumstance.

Sending a UIListingUpdate message (s52060) may include transmitting a "UIListingUpdate" message to subscribers.

Requesting UIListing (s52070) may include the second screen device transmitting the device profile thereof and requesting UIListing. A GetCompatibleUIs action capable of obtaining a compatible UI may be used. Sending a UIListingUpdate message (s52060) and requesting UIListing (s52070) may include performing time setting such that the second screen application is not changed and are selectively possible only when supported by the server. This step is optional. This method may be a method of, at the receiver, notifying all second screen devices that the second screen service is present using the UPnP event. That is, all second screen devices in the home network may be notified that the UI has been changed in association with the second screen service. If all second screen devices are notified of a "UIListingUpdate" variable using the UPnP event, the second screen devices may confirm that the UI has been newly updated. Thereafter, the second screen device may perform the "GetCompatibleUIs" Action, select a UI suitable for the hardware device, and execute the UI by referring to the device profile.

Returning UIListing (s52080) may include the primary device transmitting appropriate UI listing to the second screen device according to the request. As described above, returning UIListing (s52080) may include notifying the subscribing second screen device that the address of RemoteUI has been changed or the UI has been changed. That is, since the second screen device is notified only that the UI has been changed, if detailed location or additional information is required, a "GetCompatibleUIs" Action should be transmitted to the receiver to obtain the "UIListing" value.

When the RemoteUI Server Service operates, the receiver should provide remote UI information according to the device profile of the requesting device. From the viewpoint of backward compatibility, the device profile "DeviceInfo" is exchanged and the URL sent by the RemoteUI Server Service may be changed according to the profile of the requesting client when requesting "GetCompatibleUIs" action from the receiver later. If the legacy UPnP device requests the "GetCompatibleUIs" action from the RemoteUI Server, a UI suitable for DeviceInfo of the legacy UPnP device should be provided. However, if the device supporting the second screen service requests the "GetCompatibleUIs" action, the RemoteUI Server Service device should also transmit URL information.

The receiver may obtain trigger information via the DTVCC and obtain media time and event time information from the trigger information. At this time, "appID", "URL" (TDO_URL), "eventID", "action" and, optionally, "Data" for TDO or an execution time may be confirmed using the "t=media_time" syntax. If the receiver manages the lifecycle of the second screen application, the amount of information to be processed by the second screen service application may be reduced. In contrast, if the second screen service application directly manages the lifecycle of the second screen application, necessary information may be increased.

Figure 53:
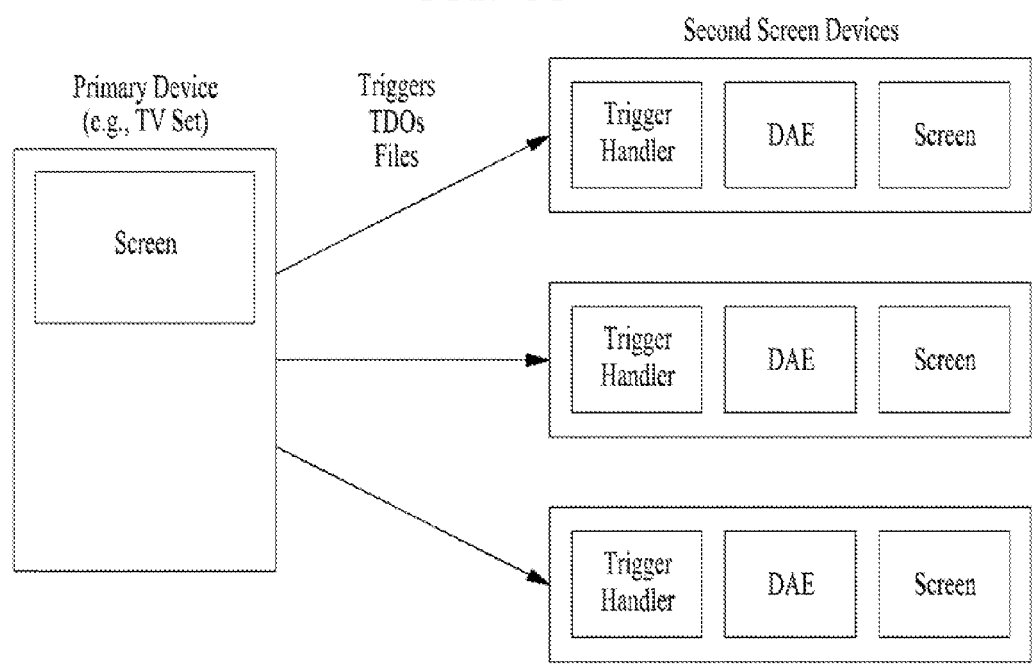
FIG. 53 is a diagram showing the operational concept of a Distributed Execution model.

FIG. 53 is a diagram showing the operational concept of a Distributed Execution model.

As a method of efficiently delivering the interactive service to the second screen device, the distributed execution model will be described.

As shown in the diagram showing the operational concept of the Distributed Execution model, a TV set may deliver information such as a trigger to the second screen device using UPnP, etc. Each second screen device has a trigger handler and may process information such as a trigger received via the trigger handler in real time. The browser may execute an interactive service associated therewith.

Unlike the Centralized Execution model, a DAE may be present in each second screen device.

A process of delivering an interactive service to a second screen device based on Distributed Execution model may be performed in the following order. 1. Receiver is presenting segment with 2nd screen support. 2. Receiver displays some indication that 2nd screen support is available. 3. User launches 2nd Screen app on 2nd screen device. 4. Receiver and 2nd Screen device discover each other via UPnP mechanisms (performed by native code on receiver and 2nd Screen app on device). 5. TV set gets Trigger (from DTVCC stream or ACR) to launch TDO on 2nd Screen device. 6. TV set combines Trigger with info from TPT and sends to 2nd Screen device at activation time. 7. 2nd screen device downloads TDO (one or more files) and executes it in browser. 8. User interacts with TDO, which may cause TDO to download additional files. 9. Receiver gets Trigger to generate Event for TDO on 2nd Screen device. 10. Receiver combines Trigger with info from TPT and sends to 2nd screen device at activation time. 11. 2nd screen device generates TriggerEvent (like DVB StreamEvent) for TDO in browser. 12. TDO carries out action requested by TriggerEvent, which may cause it to download data file(s)

Figure 54:
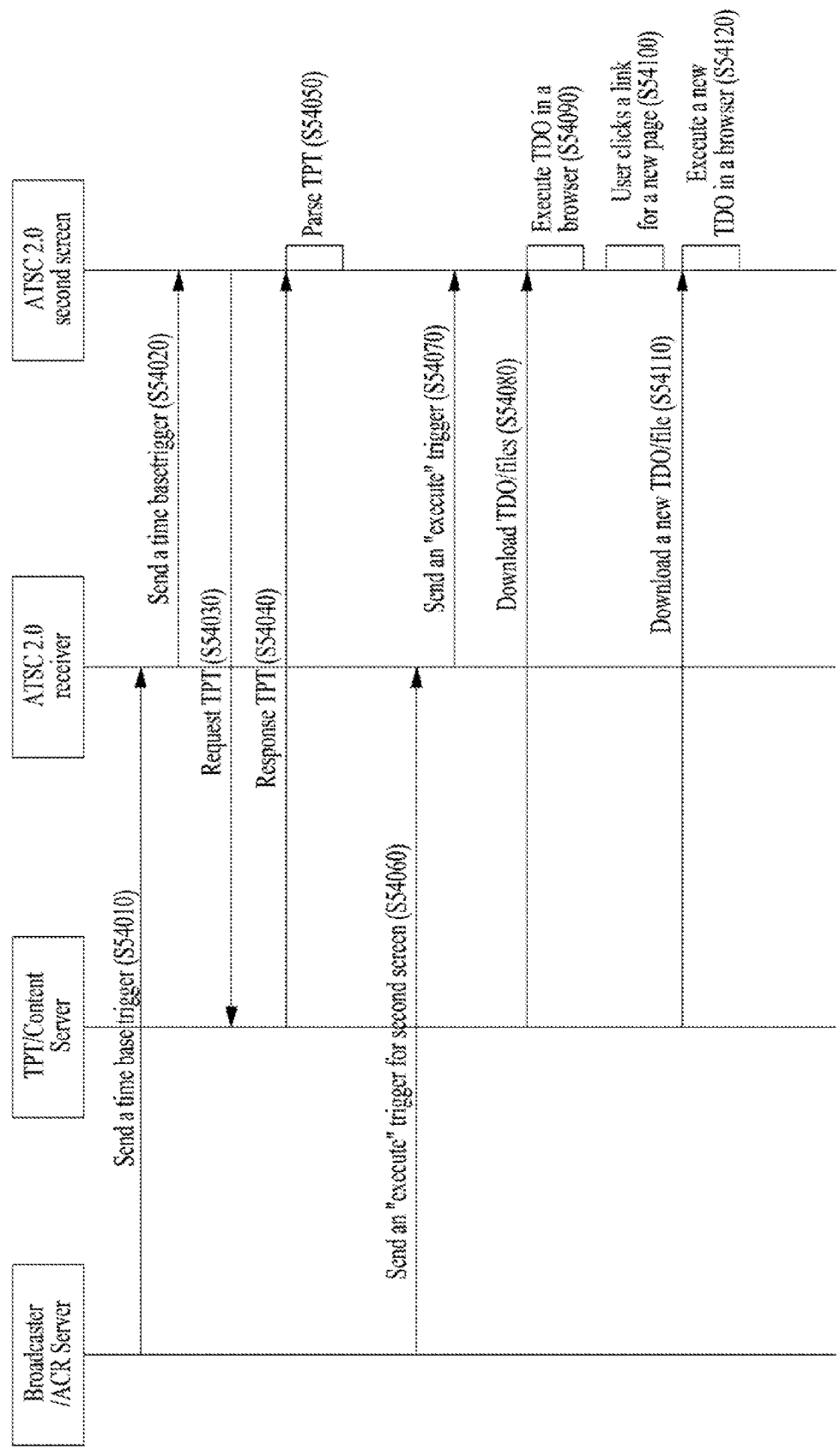
FIG. 54 is a diagram showing the flow of interworking between a Distributed Execution model based receiver and a second screen.

FIG. 54 is a diagram showing the flow of interworking between a Distributed Execution model based receiver and a second screen.

The flow of the distributed execution model may be a data flow in the case in which the receiver transmits the information received via the DTVCC or ACR server to the second screen without change. The detailed flow will now be described.

The embodiment of the flow for interworking between the distributed execution model based receiver and the second screen may include sending a time base trigger (s54010), sending a time base trigger (s54020), requesting a TPT (s54030), transmitting a TPT as a response (s54040), parsing a TPT (s54050), sending an execute trigger for a second screen (s54060), sending an execute trigger (s54070), downloading TDOs/Files (s54080), executing a TDO in browser (s54090), user clicking a link for a new page (s54100), downloading a new TDO/file (s54110) and/or executing a new TDO in browser (s54120).

Sending a time base trigger (s54010) may be equal to sending a time base trigger (s49010).

Sending a time base trigger (s54020) may include the receiver transmitting the received trigger to the second screen without change.

Requesting TPT (s54030) may include the second screen interpreting the received trigger, acquiring a URL of a service capable of acquiring a TPT and requesting the TPT.

Transmitting a TPT as a response (s54040) may include transmitting the TPT in response to the request in requesting TPT (s54030).

Parsing a TPT (s54050) may include parsing the requested TPT.

Sending an execute trigger for a second screen (s54060) may be equal to sending an execute trigger for a second screen (s49050).

Sending an execute trigger (s54070) may include the receiver transmitting the received trigger to the second screen without change.

Downloading TDOs/files (s54080) may include the second screen acquiring TDOs/files associated with the trigger from the TPT and downloading the TDOs/files from the content server.

Executing a TDO in browser (s54090) may include executing the downloaded TDOs and files on browser.

User clicking a link for a new page (s54100) may include the user clicking a specific link on the executed TDO.

Downloading a new TDO/file (s54110) may include downloading the associated TDO/file if a specific link to another TDO is established.

Executing a new TDO in browser (s54120) may include executing the associated TDO and file on the browser.

Figure 55:
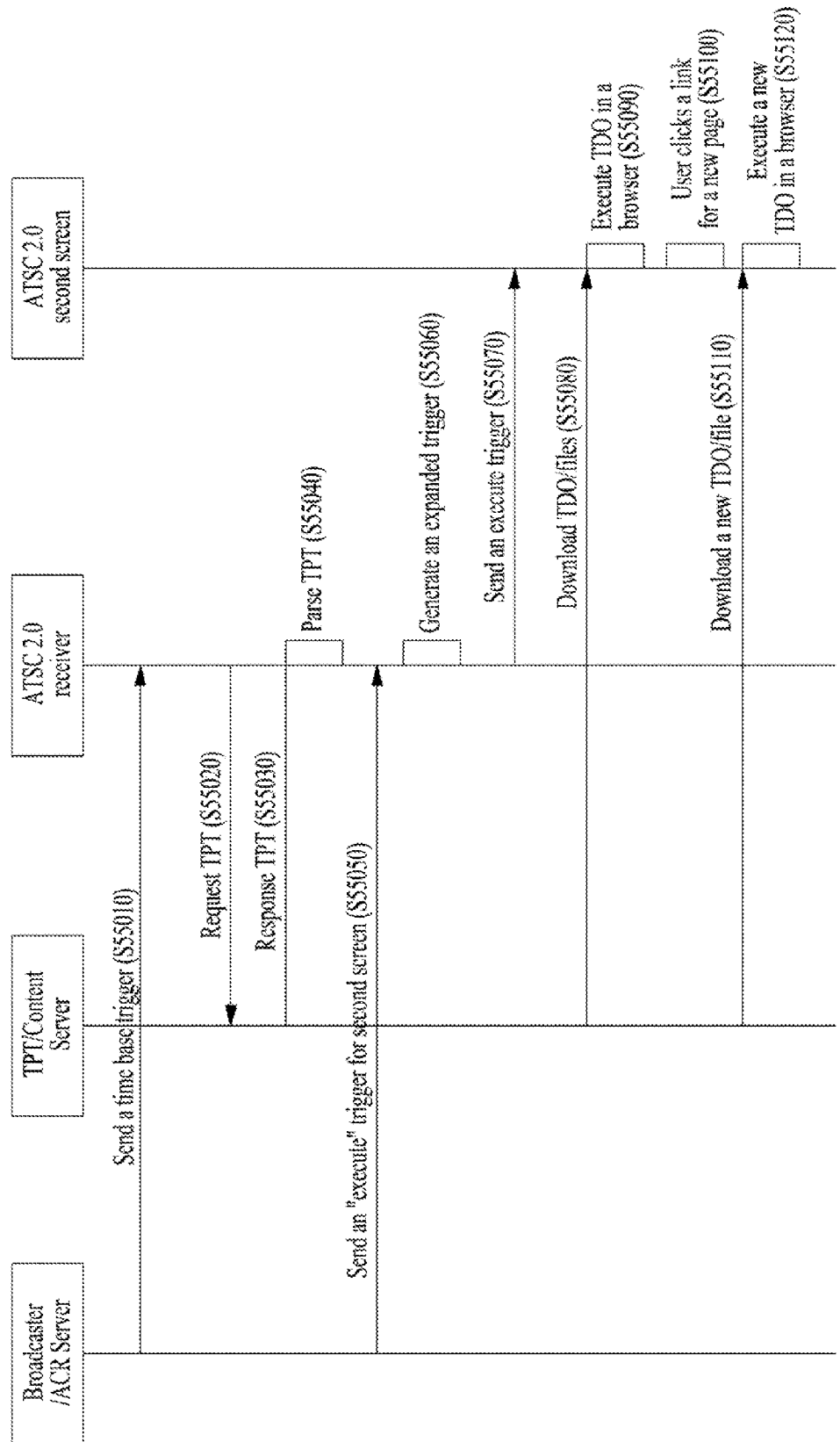
FIG. 55 is a diagram showing the flow of interworking between a Distributed Execution model based receiver and a second screen.

FIG. 55 is a diagram showing the flow of interworking between a Distributed Execution model based receiver and a second screen.

The flow of the distributed execution model may be a data flow in the case in which the receiver does not transmit the information received via the DTVCC or ACR server to the second screen without change but inserts necessary information according to a trigger suitable for the second screen, changes the information to an expanded trigger, and transmits the information to the second screen. The detailed flow will now be described.

The embodiment of the flow for interworking between the distributed execution model based receiver and the second screen may include sending a time base trigger (s55010), requesting a TPT (s55020), transmitting a TPT as a response (s55030), parsing TPT (s55040), sending an execute trigger for a second screen (s55050), generating an expanded trigger (s55060), sending an expanded trigger (s55070), downloading TDOs/Files (s55080), executing a TDO in browser (s55090), user clicking a link for a new page (s55100), downloading a new TDO/File (s55110) and/or executing a new TDO in browser (s55120).

Sending a time base trigger (s55010) may be equal to sending a time base trigger (s54010).

Requesting a TPT (s55020) may be equal to requesting a TPT (s54030).

Transmitting a TPT as a response (s55030) may be equal to transmitting a TPT as a response (s54040).

Parsing a TPT (s55040) may be equal to parsing a TPT (s54050).

Sending an execute trigger for a second screen (s55050) may be equal to sending an execute trigger for a second screen (s54060).

Generating an expanded trigger (s55060) may include the receiver acquiring information about TDOs and files associated with the trigger from the TPT and generating an expanded trigger including the same.

Sending an expanded trigger (s55070) may include the receiver transmitting the generated expanded trigger to the second screen.

Downloading TDOs/Files (s55080) may be equal to downloading TDOs/Files (s54080).

Executing TDO in browser (s55090) may be equal to executing TDO in browser (s54090).

User clicking a link for a new page (s55100) may be equal to user clicking a link for a new page (s54100).

Downloading a new TDO/file (s55110) may be equal to downloading a new TDO/file (s54110).

Executing a new TDO in browser (s55120) may be equal to executing a new TDO in browser (s54120).

Figure 56:
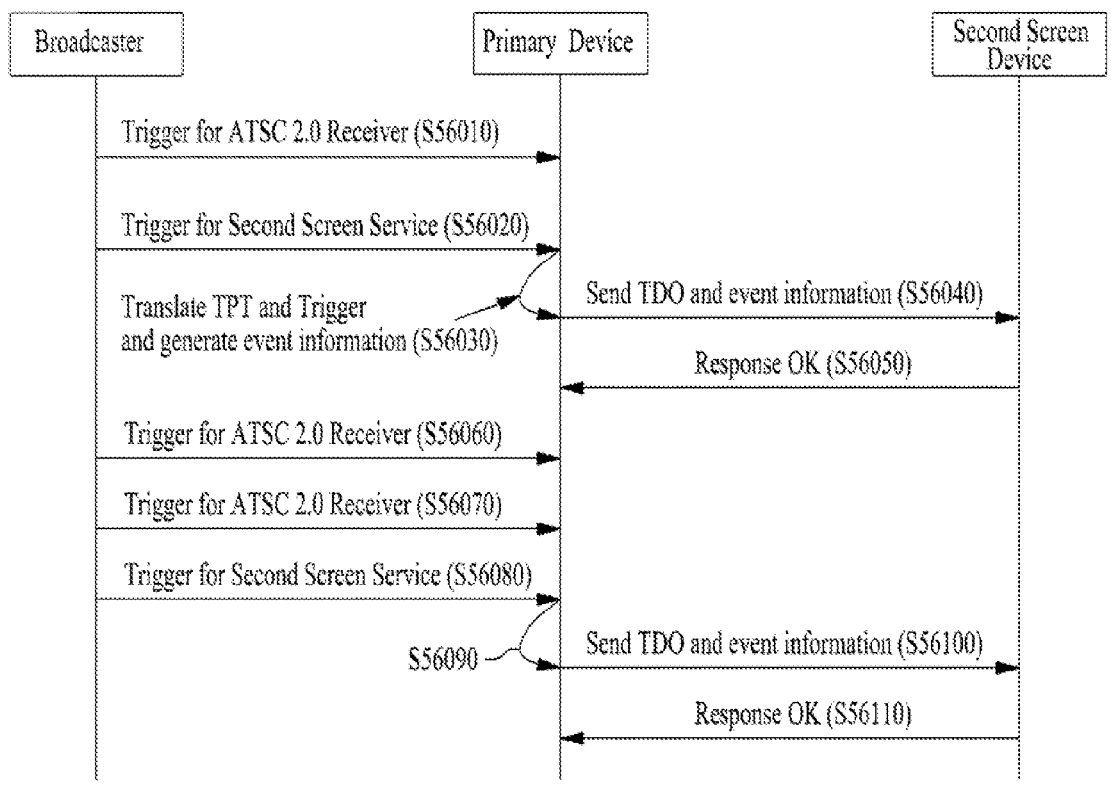
FIG. 56 is a diagram showing an embodiment of a method of, at a receiver, notifying a second screen device of TDO and Event information.

FIG. 56 is a diagram showing an embodiment of a method of, at a receiver, notifying a second screen device of TDO and Event information.

FIG. 56 shows a method of, at the receiver, receiving the trigger and the TPT, performing processing according to the trigger, comparing the trigger with the TPT when the trigger for the second screen device has arrived, extracting and configuring information, which needs to be recognized by the second screen device, in the form of an XML file, and transmitting the information to the second screen device. This method may be advantageous in that the second screen device may actively operate and perform a prediction.

This process may include receiving a trigger for the receiver (s56010), receiving a trigger for the second screen service (s56020), translating a TPT and a trigger and generating event information (s56030), sending TDO and event information (s56040), sending a response "ok" (s56050), receiving a trigger for the receiver (s56060), receiving a trigger for the receiver (s56070), receiving a trigger for the second screen service (s56080), translating a TPT and a trigger and generating event information (s56090), sending TDO and event information (s56100) and/or sending a response "ok" (s56110).

Receiving a trigger for the receiver (s56010) may be equal to receiving a trigger for the receiver (s50010).

Receiving a trigger for the second screen service (s56020) may be equal to receiving a trigger for the second screen service (s50020).

Translating a TPT and a trigger and generating event information (s56030) may include interpreting the TPT and the trigger and generating event information. The generated information may be used to combine the information included in the TPT and trigger for generation of a new data structure and may include information about which TDO was generated or when the TDO was generated. This data structure will be described below. If the new data structure is decided, a variety of necessary information may be transmitted in addition to the TDO URL.

Sending TDO and event information (s56040) may include transmitting the generated event information and TDO to the second screen device.

Sending a response "ok" (s56050) may include transmitting a message indicating that the received TDO and event information have been received.

Receiving a trigger for the receiver (s56060) and receiving a trigger for the receiver (s56070) may be equal to receiving a trigger for the receiver (s50010).

Receiving a trigger for the second screen service (s56080) may be equal to receiving a trigger for the second screen service (s50020).

Translating a TPT and a trigger and generating event information (s56090) may be equal to translating a TPT and a trigger and generating event information (s56030).

Sending TDO and event information (s56100) may be equal to sending TDO and event information (s56040).

Sending a response "ok" (s56110) may be equal to sending a response "ok" (s56050).

Receiving a trigger for the receiver (s56060), receiving a trigger for the receiver (s56070), receiving a trigger for the second screen service (s56080), translating a TPT and a trigger and generating event information (s56090), sending TDO and event information (s56100) and sending a response "ok" (s56110) may be equal to the above-described operations.

FIG. 57 is a diagram showing an embodiment of a method of, at a second screen device, accessing a TPT and Second Screen Application.

The second screen device is an independent device, which may directly execute the second screen application if the receiver receives the XML file such as TPT and AMT or knows the TPT and AMT server address via the Internet. In this case, the trigger module is included in the second screen device. The second screen device may receive the URI string for an iTV message received by the receiver. This message is applicable to both 1) the method of transmitting the URI string for the iTV message (trigger) in case of RemoteUI Server Service and 2) the method of transmitting the URI string for the iTV message (trigger) in case of RemoteUI Client Service.

First, the method of transmitting the URI string for the iTV message (trigger) in case of RemoteUI Server Service will be described.

This process may include receiving a trigger for the receiver (s57010), receiving a trigger for the second screen service (s57020), sending notification about updated UI information (s57030), requesting updated UI information (s57040), transmitting UI information as a response (s57050), requesting a TPT XML file (s57060), returning a TPT XML file (s57070), receiving a trigger for the second screen service (s57080), sending notification about updated UI information (s57090), requesting updated UI information (s57100), transmitting UI information as a response (s57110), receiving a trigger for the second screen service (s57120), sending notification about updated UI information (s57130), requesting updated UI information (s57140), transmitting UI information as a response (s57150), requesting a second screen application s57160) and/or returning a second screen application (s57170).

Receiving a trigger for the receiver (s57010) may be equal to receiving a trigger for the receiver (s50010). Since the first trigger is not for the second screen device, the receiver does not deliver the trigger to the second screen device.

Receiving a trigger for the second screen service (s57020) may be equal to receiving a trigger for the second screen service (s50020). The trigger may have information about a media time for the second screen service. The second trigger may serve as the above-described pre-load trigger.

Sending notification about updated UI information (s57030) may include notifying about updated UI information. The receiver may transmit the received URIString to the second screen device because the second trigger is for the second screen service. At this time, the second screen device may be informed that new information is present and may be enabled to directly read this information.

Requesting updated UI information (s57040) may be equal to requesting Updated UI information (s50040).

Transmitting UI information as a response (s57050) may include the primary device transmitting UI information to the second screen device. At this time, the second trigger may be transmitted.

Requesting a TPT XML file (s57060) may include the second screen device parsing the information (second trigger) received from the primary device and requesting a TPT XML file from the TPT server.

Returning a TPT XML file (s57070) may include the second screen device downloading the requested TPT XML file from the TPT server.

Receiving a trigger for the second screen service (s57080) may be equal to receiving a trigger for the second screen service (s50020). The third Trigger is associated with the second screen device and may have information regarding a media time. The third trigger is a media time trigger, which may perform the same function as the above-described time base trigger.

Sending notification about updated UI information (s57090) may include notifying about updated UI information. Since it is determined that the third trigger is associated with the second screen device, the receiver may notify the second screen device about the third trigger.

Requesting updated UI information (s57100) may be equal to requesting Updated UI information (s50040).

Transmitting UI information as a response (s57110) may include the primary device transmitting UI information to the second screen device. At this time, the third trigger may be transmitted. However, since the third trigger is a media time trigger, it is possible to control only the media time of the second screen device. Therefore, it is possible to perform media time synchronization between the second screen device and the receiver.

Receiving a trigger for the second screen service (s57120) may be equal to receiving a trigger for the second screen service (s50020). The fourth trigger is associated with the second screen device and may have information about an event time. The fourth trigger is an event time trigger, which may perform the same function as the above-described activation trigger.

Sending notification about updated UI information (s57130) may include notifying updated UI. Since it is determined that the fourth trigger is associated with the second screen device, the receiver may notify the second screen device of the fourth trigger.

Requesting updated UI information (s57140) may be equal to requesting Updated UI information (s50040).

Transmitting UI information as a response (s57150) may include the primary device transmitting UI information to the second screen device. At this time, the fourth trigger may be transmitted.

Requesting a second screen application (s57160) may include the second screen device checking information about the fourth trigger and requesting the second screen application from the application server in order to download the second screen application of the location of the TDO URL.

Returning a second screen application (s57170) may include downloading the second screen application according to the request. The second screen application may be downloaded to perform Event@Action. At this time, since the application server is informed of the information about the browser of the second screen device, the application server may easily check which second screen device is connected. Accordingly, the application may be automatically selected and downloaded from the server.

In summary, if the URI string for the iTV message is received via the DTVCC, the receiver may transmit, to the found second screen device, an event indicating that a new UI has been updated. The second screen devices may check the event information and send a "GetCompatibleUIs" Action in order to obtain new UI information. The receiver may send the received URI information of the TPT server. By this method, the second screen device may receive the URI information, directly process the TPT and AMT information, and directly control the second screen application.

This process is possible if the ATSC 2.0 Trigger Client is included in the second screen service application.

FIG. 58 is a diagram showing an embodiment of a method of, at a second screen device, accessing a TPT and Second Screen Application.

Between the above-described two methods, the method of transmitting the URI string for the iTV message (Trigger) in case of RemoteUI Client Service will be described.

This process may include receiving a trigger for the receiver (s58010), receiving a trigger for the second screen service (s58020), notifying about a trigger (s58030), sending a response "ok" (s58040), requesting a TPT XML file (s58050), returning a TPT XML file (s58060), receiving a trigger for the second screen service (s58070), notifying about a trigger (s58080), sending a response "ok" (s58090), receiving a trigger for the second screen service (s58100), notifying a trigger (s58110), sending a response "ok" (s58120), requesting a second screen application (s58130) and/or returning a second screen application (s58140).

Receiving a trigger for the receiver (s58010) may include the primary device receiving the trigger for the receiver, that is, the primary device, from the broadcaster via the broadcast stream. Since the first trigger is for the receiver, the first trigger is not delivered to the second screen device.

Receiving a trigger for the second screen service (s58020) may be equal to receiving a trigger for the second screen service (s50020). The second trigger is a trigger for the second screen service and may have information about a media time. The second trigger may serve as the above-described pre-load trigger.

Notifying about a trigger (s58030) may include the receiver immediately transmitting the trigger to the second screen device unlike FIG. 57. If URI string for the iTV message is received via the DTVCC, the receiver may deliver the URI value received by the receiver to the second screen device using the "AddUIListing" Action.

Sending a response "ok" (s58040) may include transmitting a message indicating that the trigger has been received.

Requesting a TPT XML file (s58050) may be equal to requesting a TPT XML file (s57060). The trigger module included in the second screen device may access the TPT server using the received URI value, download the TPT and AMT file, and directly control the second screen application.

Returning a TPT XML file (s58060) may be equal to returning a TPT XML file (s57070).

Receiving a trigger for the second screen service (s58070) may be equal to receiving a trigger for the second screen service (s50020). The third trigger is associated with the second screen device and may have information about a media time. The third trigger is a media time trigger, which may perform the same function as the above-described time base trigger.

Notifying about a trigger (s58080) may include delivering the trigger similarly to notifying about a trigger (s58030).

Sending a response "ok" (s58090) may be equal to sending a response "ok" (s58040).

Receiving a trigger for the second screen service (s58100) may be equal to receiving a trigger for the second screen service (s50020). The fourth trigger is associated with the second screen device and may have information about an event time. The fourth trigger is an event time trigger, which may perform the same function as the above-described activation trigger.

Notifying about a trigger (s58110) may include delivering the trigger similarly to notifying about a trigger (s58030).

Sending a response "ok" (s58120) may be equal to sending a response "ok" (s58040).

Requesting a second screen application (s58130) may be equal to requesting a second screen application (s57160).

Returning a second screen application (s58140) may be equal to returning a second screen application (s57170).

That is, the receiver may always deliver the trigger having the event information associated with the second screen service to the second screen device and the second screen device may immediately operate using the downloaded TPT information. Since the media time trigger is periodically delivered using the DTVCC, the receiver should continuously deliver this information.

Since the primary device or the second screen device has the TPT XML, the AMT may also be received when the event trigger is received from the Live Trigger server in real time.

The above-described two methods may be differently performed depending on which URL value is applied and the operation of the receiver or the structure and operation of the second screen service application may be changed.

The signaling mechanisms of the second screen service will be described.

The second screen service may be signaled using two methods: a first method of, at the receiver, notifying that the second screen service is present and a second method of searching for a device and service in order to detect an electronic apparatus for providing the second screen service when the second screen device is connected to the home network. Alternatively, the receiver may confirm a device descriptor of a new electronic apparatus and request a service descriptor.

Broadcast Signaling and Unicast Signaling will be described hereinafter.

In case of Broadcast Signaling, the second screen device detects the RemoteUI server service, confirms the device descriptor and requests a DeviceInfo profile compatible with the second screen service. An event may be received and a URL of a TDO (interactive application) changed according to a program viewed via the receiver may be received.

In contrast, in case of Unicast Signaling, the receiver may confirm whether DeviceInfo of the second screen device is compatible and transmit a compatible TDO URL. The RemoveUIListing Action may be transmitted to terminate the currently executed second screen application so as to support actions such as display message and to terminate a currently executed UI. Supplementary Event@data parsed and processed by the receiver may be delivered to the second screen service application by the ProcessInput Action.

Broadcast Signaling and Unicast Signaling will be described below.

FIG. 59 is a diagram showing another embodiment of Broadcast Signaling for a RemoteUI server service.

In broadcast signaling, if the receiver is first connected to the home network, the receiver may notify all electronic apparatuses of the device descriptor and service descriptor thereof or receive a request from another control point and transmit the device descriptor and service descriptor thereof.

Another embodiment of the broadcast Signaling for the RemoteUI Server Service may include UPnP device and service discovery (s59010), sending UIListing (s59020), sending UIListing (s59030), requesting UIListing (s59040) and/or returning UIListing (s59050).

UPnP device and service discovery (s59010) may be equal to UPnP device and service discovery (s52010).

Sending UIListing (s59020) may include transmitting a "UIListingUpdate" message to all UPnP devices. The primary device can send announcement of the UIListingUpdate to UPnP Devices on a unique "uiID" list. The second screen device may receive this message and check uiID. However, due to mismatching with a specific uiID, the second screen device may not perform UI update.

Sending UIListing (s59030) may include transmitting a "UIListingUpdate" message to all UPnP devices. Unlike sending UIListing (s59020), matching uiID may be present.

Requesting UIListing (s59040) may include the second screen device transmitting the device profile thereof and requesting UIListing, because the matching uiID is present in sending UIListing (s59030). The GetCompatibleUIs action capable of obtaining a compatible UI may be used.

Returning UIListing (s59050) may include the primary device transmitting appropriate UI Listing to the second screen device according to the request.

FIG. 60 is a diagram showing an embodiment of Device Discovery and Device Capability Exchange for a Second Screen Service.

As described above, if the receiver is first connected to the home network, the receiver may notify all electronic apparatuses of the device descriptor and service descriptor thereof or receive a request from another control point and transmit the device descriptor and service descriptor thereof.

Each UPnP devices connected to the home network, which receive the device descriptor and service descriptor of the receiver, may send the location of the device descriptor thereof using the "LOCATION" header of the HTTP. That is, the UPnP device may transmit the location of the UPnP device descriptor. If an HTTP GET request is made using "LOCATION", an XML file including information about the device may be received.

In the UPnP device and service discovery, a method of, at the primary device, detecting the second screen device capable of providing the second screen service will be introduced. This method may be largely divided into two methods. As a first method, the second screen device prepares two device profiles and notifies about an XML file of the device profiles using an HTTP header. Assume that an incompatible primary device ignores an uncomprehended HTT header. As a second method, in the device profile, information called the second screen device for providing the second screen service may be included in "Protocol Info".

FIG. 60 shows a first method.

One embodiment of device discovery and device capability exchange for the second screen service may include executing a UPnP application for the second screen service (s60001), finding UPnP devices (s60010), finding a RemoteUIClient (s60020), requesting a device description (s60030), receiving a device description (s60040), requesting a service control description (s60050), receiving a service control description (s60060), requesting a device profile (s60070), receiving a device profile (s60080), putting a URL of a remote UI (s60090), sending a response1 (s60100), sending a message to the RemoteUI Client Service (s60110), sending a response2 (s60120) and/or user clicking the button on the screen (s60130).

Executing a UPnP application for the second screen service (s60001), finding UPnP devices (s60010), finding a RemoteUIClient (s60020), requesting a device description (s60030), receiving a device description (s60040), requesting a service control description (s60050), receiving a service control description (s60060), requesting a device profile (s60070), receiving a device profile (s60080), putting a URL of a remote UI (s60090), sending a response1 (s60100), sending a message to the RemoteUI client service (s60110), sending a response2 (s60120) and user clicking the button on the screen (s60130) may be equal to executing a UPnP application for the second screen service (s40001), finding UPnP devices (s40010), finding a RemoteUIClient (s40020), requesting a device description (s40030), receiving a device description (s40040), requesting a service control description (s40050) receiving a service control description (s40060), requesting a device profile (s40070), receiving a device profile (s40080), putting a URL of a remote UI (s40090), sending a response1 (s40100), sending a message to the RemoteUI Client Service (s40110), sending a response2 (s40120) and user clicking the button on the screen (s40130), respectively.

In the first method, as shown in FIG. 60, after finding UPnP devices (s60010), notification about the location of the device profile supporting the second screen service using "X-ATSC-COMPANION-LOCATION" obtained from the HTTP Header may be performed. The part represented by X-ATSC-COMPANION-LOCATION: http://10.177.56.36:37900/ATSC2ndScreenRemoteUIClient1.xml\r\n is an "X-ATSC-COMPANION-LOCATION". The receiver may ignore the "LOCATION" header and instead obtain the device profile of the second screen device which is desired by the receiver.

Among the method of, the primary device, detecting the second screen device capable of providing the second screen service, in the above-described second method, the device profile may be obtained at the location of the "LOCATION" header and the value of the "Protocol Info" of the second screen device may be parsed and processed within the device profile. This may be performed in requesting UIListing (s52020) of the embodiment of broadcast signaling for RemoteUI Server Service #1.

In the device descriptor of a specific UPnP device, a list of providable services is present and one or a plurality of services may be provided. Each service of the UPnP device may be controlled by another remote UPnP device and an event may be received. The event may be received only when notifying about the provided service using the event. It is possible to notify about the URL such that the services provided by the UPnP device are controlled and an event is generated.

FIG. 61 is a diagram showing an embodiment of the DeviceProfile XML Schema of the UPnP Forum.

In the embodiment of broadcast signaling for RemoteUI Server Service #1, requesting UIListing (s52020) will be additionally described. This step may include the second screen device asking the receiver having the RemoteUI server service whether a UI suitable for the second screen device is present. The "InputDeviceProfile" should be in the format of an XSD file shown in FIG. 61.

Accordingly, the second screen device should transmit information about the device profile thereof to the receiver in the format of FIG. 61.

FIG. 62 is a diagram showing an embodiment of Device Profile of a Second Screen device In the embodiment of broadcast signaling for RemoteUI Server Service #1, requesting UIListing (s52020) will be additionally described. FIG. 62 shows an example of a device profile. In requesting UIListing (s52020), the information such as the shown device profile may be sent to the receiver.

By determining whether the second screen service of the device profile, which is desired to be detected by the second screen device, is present in the receiver, the shown information may be stored in the "InputDeviceProfile" variable and may be transmitted. The receiver may confirm the "InputDeviceProfile" information so as to define service type to be provided, version, resolution of the second screen device, a receivable image encoding method, etc.

FIG. 63 is a diagram showing an embodiment of a description of ProtocoInfo for a Second Screen Service.

In the embodiment of broadcast signaling for RemoteUI Server Service #1, requesting UIListing (s52020) and Sending UIListing (s52030) will be additionally described.

As described above, the receiver may confirm the "InputDeviceProfile" information so as to define service type to be provided, version, resolution of the second screen device, a receivable image encoding method, etc. One embodiment of "A description of Protocolnfo for Second Screen Service" may be one embodiment of "InputDeviceProfile" information.

When the shown information is delivered to the receiver (requesting UIListing (s52020)), UILising information in XML is transmitted to the second screen device (sending UIListing (s52030)).

If the RemoteUI server service does not support the desired second screen device, in sending UIListing (s52030), error information may be returned to indicate that the RemoteUI server service cannot support the second screen service.

FIG. 64 is a diagram showing an embodiment of UIListing while an AddUIListing and RemoteUIListing action are being executed in a second screen device.

In the embodiment of broadcast signaling for RemoteUI Server Service #1, requesting UIListing (s52020) and Sending UIListing (s52030) will be additionally described.

After requesting UIListing (s52020), the receiver may detect and deliver compatible RemoteUI information to the requesting second screen device (sending UIListing (s52030)). The information received in sending UIListing (s52030) is shown in FIG. 64.

When the received information may be transmitted from the receiver to the second screen, the TPT and the AMP may be processed to insert the TDO URL. Accordingly, the second screen device may obtain only the information about the remote UI from the receiver and the second screen application may be downloaded and executed from the Internet application server outside the home network. At this time, the application may be executed by the second screen service application.

The broadcaster may transmit the second screen application for the second screen device to the receiver over the broadcast network. In this case, the receiver may store the application for the second screen service and directly provide the application. In this case, the web server may operate in the receiver and associated image and data may be downloaded from an external application server instead of the receiver or the home network. If the DO is an NDO, NDO and associated resource files may be transmitted over the broadcast network in ATSC-NRT and the second screen service may be provided.

In case of broadcast signaling, the lifecycle of the second screen application may be managed by the receiver or the second screen service application.

First, the method of, at the receiver, managing the lifecycle of the second screen application will be described.

The receiver may process information about the media time trigger transmitted using the DTVCC and then immediately notify all devices in the home network of the "UIListingUpdate" variable when the event associated with the second screen is present and this event is executed. The devices that subscribe to the event may check that UI information has been updated and perform the "GetCompatibleUIs" action in order to obtain necessary information. At this time, the RemoteUI server of the receiver may immediately deliver the TDO address.

Second, the method of, at the second screen service application, managing the lifecycle of the second screen application will be described.

In this case, the receiver may deliver the received information to the second screen device and the second screen service application may be executed. In case of broadcasting, if the client for the second screen service requests the "GetComaptibleUIs" action, the receiver may directly return the URIString of an iTV message (Trigger) received via the DTVCC and the second screen device may download the TPT file using the received URIString and interpret the TPT to operate similarly to the receiver. The receiver may immediately change the "UIListingUpdate" variable and transmit the changed variable to all devices whenever the media time trigger or the event time trigger is received using the DTVCC, such that the devices perform the "GetCompatibleUIs" action so as to receive the new URIString of the iTV message (Trigger).

Figure 65:
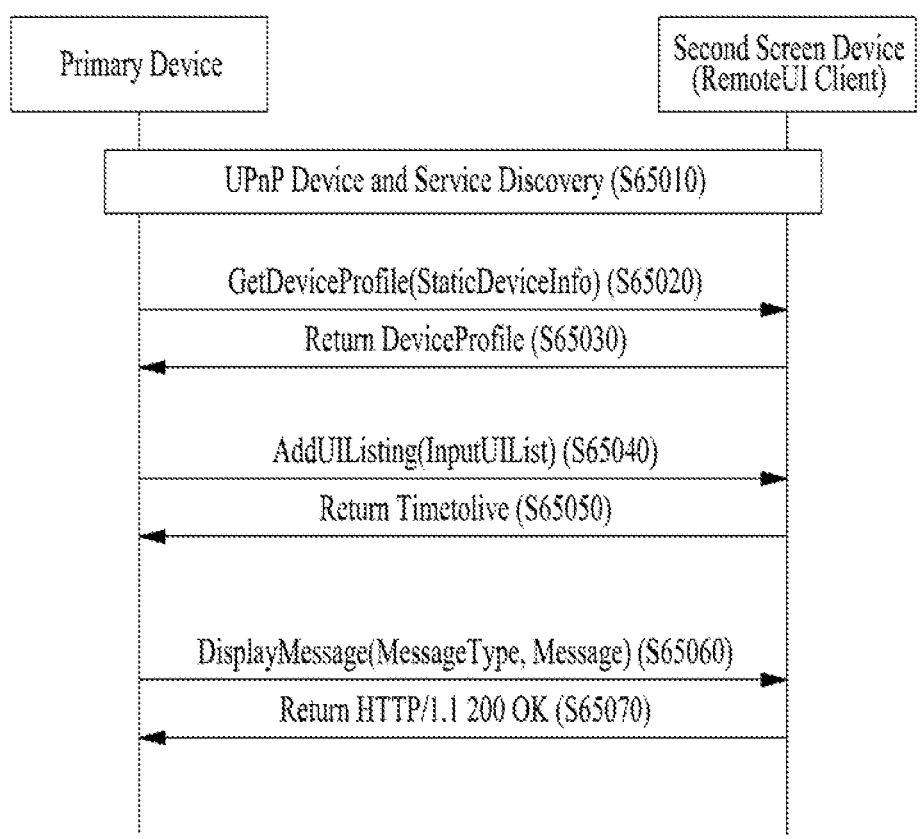
FIG. 65 is a diagram showing an embodiment of unicast signaling for a RemoteUI client service.

FIG. 65 is a diagram showing an embodiment of unicast signaling for a RemoteUI client service.

Unicast signaling will be described.

In this method, RemoteUIClient service is included in the second screen device. If the UPnP device is first connected to the home network, the UPnP device notifies the other devices that the new device has been connected to the home network. As another method, if a message requesting periodic notification about a new device is delivered to all devices connected to the home network, all the devices connected to the home network may send a NOTIFY message to all the devices in response to this information. First, whether the second screen device supports the second screen service should be determined.

One embodiment of unicast Signaling for the RemoteUI client service may include UPnP device and service discovery (s65010), requesting a device profile (s65020), returning a device profile (s65030), sending TDO URL information (s65040), returning an HTTP message (s65050), sending a display message (s65060) and/or returning an HTTP message (s65070).

UPnP device and service discovery (s65010) may be equal to UPnP device and service discovery (s52010).

Requesting a device profile (s65020) may include the receiver transmitting "StaticDeviceInfo" information to the newly detected second screen device in order to determine whether the second screen device supports the second screen service.

Returning a device profile (s65030) is a response to requesting a device profile (s65020), which obtains the device profile of the second screen device. If it is determined that the device profile sent by the newly detected second screen device does not match "Static DeviceInfo" or the newly detected second screen device does not support the second screen service, the second screen service may not start. "StaticDeviceInfo" may be equal to the above-defined "DeviceInfo". The receiver may determine whether "StaticDeviceInfo" matches DeviceInfo. If the number of second screen devices newly detected in the home network is one or more, this process is repeated. Even when the detected second screen device does not support the second screen service, this process is continuously performed. One or more pieces of software may be installed in or deleted from the second screen device and the result value of this process may be changed depending on whether the user executes software. If the second screen service application has been performed, sending TDO URL information (s65040) may be performed.

Sending TDO URL information (s65040) may include the receiver transmitting TDO URL information, which is the result of parsing the TPT and AMT. "AddUIString" defined in the UPnP RemoteUI client service may be used. "AddUIString" may be an action executed if the second screen device satisfies DeviceInfo of the second screen service. The TDO URL may include one or more URLs. In case of one or more URLs, the URL for immediate execution may be transmitted. At this time, sending a display message (s65060) may be selectively performed.

Returning an HTTP message (s65050) may include sending the result of sending TDO URL information (s65040). Similarly to sending a response1 (s40100), a response such as HTTP/1.1 200 OK may be sent according to circumstance.

Sending a display message (s65060) may include transmitting the display message to the second screen device. Since the RemoteUI client service has a DisplayMessage Action capable of displaying a message on the screen of the second screen device, the TDO URL may be transmitted to the second screen device and a message indicating that the second screen application associated with the currently viewed broadcast program is present may be displayed using the DisplayMessage Action. If the user confirms this message, the second screen application may be immediately executed.

Returning an HTTP message (s65070) may include transmitting the result of sending a display message (s65060). Similarly to sending a response1 (s40100), a response such as HTTP/1.1 200 OK may be sent according to circumstance.

Figure 66:
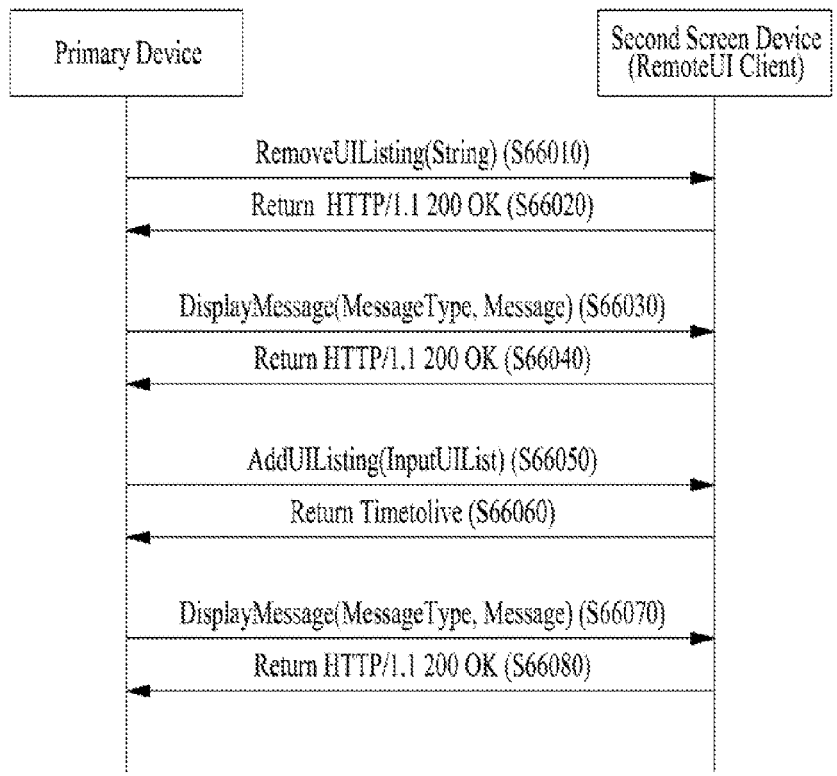
FIG. 66 is a diagram showing an embodiment of Unicast Signaling for a RemoteUI Client Service.

FIG. 66 is a diagram showing an embodiment of Unicast Signaling for a RemoteUI Client Service.

Whenever the URL of a new UI is added to UIListing of the second screen device, the second screen service application may provide an environment in which the new second screen application is executed.

One embodiment of unicast Signaling for the RemoteUI client service of FIG. 66 shows the process of terminating the executed second screen application and executing the new second screen application.

One embodiment of unicast Signaling for the RemoteUI client service may include sending a RemoveUIListing action (s66010), returning an HTTP message (s66020), sending a display message (s66030), returning an HTTP message (s66040), sending TDO URL information (s66050), returning an HTTP message (s66060), sending a display message (s66070) and/or returning an HTTP message (s66080).

Sending a RemoveUIListing action (s66010) may include terminating the second screen application which is being executed in the second screen service application using the "RemoveUIListing" action defined in the RemoteUI client service. The second screen service application may be aware that the RemoveUIListing action is sent when the receiver terminates use of the currently executed application of the UI. Accordingly, the second screen service application should immediately terminate the currently executed second screen application if the second screen device receives the RemoveUIListing action.

Returning an HTTP message (s66020) may include sending the result of sending a RemoveUIListing action (s66010). Similarly to sending a response1 (s40100), a response such as HTTP/1.1 200 OK may be sent according to circumstance.

Sending a display message (s66030) may include sending a display message to the second screen device. After sending a RemoveUIListing action (s66010), a message indicating execution termination may be displayed on the screen of the second screen device. In this case, an appropriate message may be displayed on the screen using the DisplayMessage Action.

Returning an HTTP message (s66040) may include sending the result of sending a display message (s66030). Similarly to sending a response1 (s40100), a response such as HTTP/1.1 200 OK may be sent according to circumstance.

Sending TDO URL information (s66050) may include performing the AddUIListing action such that the receiver transmits the TDO URL of the UI to be newly performed. When the new second screen application is executed, the second screen service application may be executed as soon as the TDO URL is added to UIListing. For reference, the TDO URL relates to the second screen application which may be directly downloaded and executed from the receiver or only some resource data may be downloaded from the Internet server. In addition, the TDO URL may indicate an external Internet server address. If the TDO URL indicates the external Internet server address, the second screen application and all data necessary for execution may be downloaded from the Internet server.

Returning an HTTP message (s66060) may include sending the result of sending TDO URL information (s66050). Similarly to sending a response1 (s40100), a response such as HTTP/1.1 200 OK may be sent according to circumstance.

Sending a display message (s66070) may include sending the display message to the second screen device. After sending TDO URL information (s66050), a message indicating that a new second screen service is provided may be displayed on the screen of the second screen device. Similarly to sending a display message (s66030), an appropriate message may be displayed on the screen using the DisplayMessage Action.

Returning an HTTP message (s66080) may include sending the result of sending display message (s66070). Similarly to sending a response1 (s40100), a response such as HTTP/1.1 200 OK may be sent according to circumstance.

In case of unicast signaling, the lifecycle of the second screen application may be managed by the receiver or the second screen service application.

First, the method of, at the receiver, managing the lifecycle of the second screen application will be described.

The second screen service application may be aware of only "URL" (TDO_URL) information. Accordingly, the receiver may perform the "AddUIListing" action with respect to the RemoteUI client service in the second screen device and execute the second screen application in the second screen device at a predetermined time. If the second screen application is terminated, the "RemoveUIListing" action may be performed to terminate the second screen application within a predetermined time.

If media time information for performing a TDO is provided in addition to a URL for detailed timing, the second screen service application may be executed at a predetermined time. However, since the media time is a relative time of media which is currently being played back by the receiver, this time needs to be changed to an absolute time understood by each device. Network time protocol (NTP) or other time information may be used and a time when the action is performed may be obtained by adding the media time having future time information to the NTP or the other time information. In the second screen device, since the action includes execution and termination, this may be changed according to implementation of the AddUIListing and RemoveUIListing action.

Second, the method of, at the second screen service application, managing the lifecycle of the second screen application will be described.

The second screen service application should be aware of information regarding an event or a time when the second screen application is executed and terminated in the second screen device. Therefore, as described above, the second screen service application includes the trigger client and the receiver may transmit the URIString of the iTV message (Trigger) information received using the DTVCC according to DeviceInfo (Device Profile) of the receiver.

The transmission method may be largely divided into two methods: a first method of transmitting a trigger message transmitted using the DTVCC and processed by the receiver without change and a second method of, at the receiver, collecting only information necessary for the second screen device and delivering only necessary information and data in XML.

First, the method of, at the receiver, delivering the trigger to the second screen device without change will be described.

This method may be finished by performing the "AddUIListing" action with respect to the received trigger. The RemoteUI Client Service may deliver this information to the trigger client and the trigger client may download and process a TPT as in the receiver. The receiver should deliver the media time trigger to the second screen device whenever the media time trigger is received using the DTVCC. The receiver may confirm "appID", "eventID" and "event@destination" and may not deliver the trigger to the second screen device if the second screen device does not need to receive the trigger.

Second, the method of, at the receiver, filtering and delivering the trigger information necessary for the second screen device will be described.

In this method, the receiver may process the TPT file and the trigger and generate and deliver data to be processed by the second screen device. This method may be performed even when the trigger client does not operate in the second screen service application and the XML file may be transmitted and processed via the "ProgressInput" action. That is, the second screen service application does not process the overall TPT and process only data necessary for current or future processing, which is filtered by the receiver. This method is advantageous in that the "Event@Data" field may also be delivered.

Figure 67:
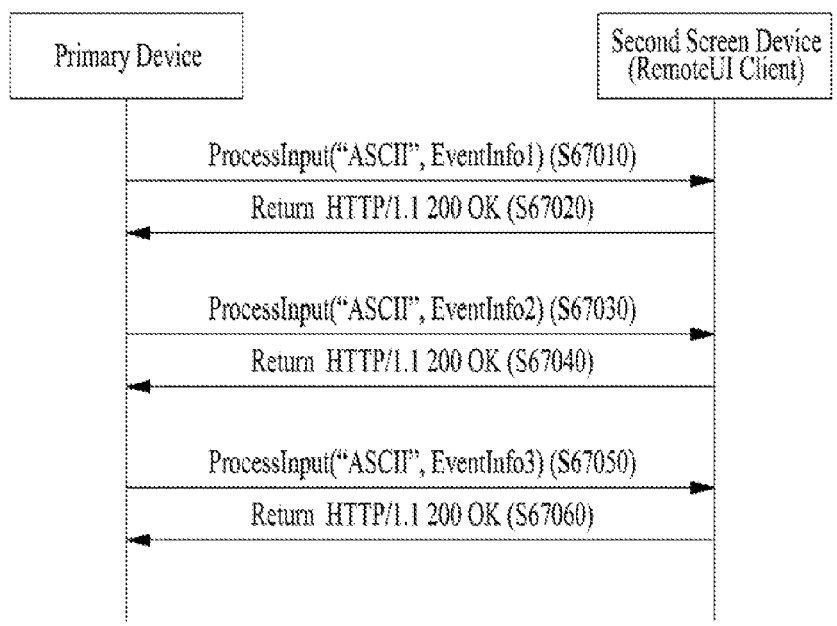
FIG. 67 is a diagram showing an embodiment of Unicast Signaling for a RemoteUI Client Service.

FIG. 67 is a diagram showing an embodiment of Unicast Signaling for a RemoteUI Client Service.

FIG. 67 shows the above-described second method, that is, the method of, at the receiver, filtering and delivering the trigger information necessary for the second screen device.

One embodiment of unicast signaling for the RemoteUI client service may include sending event 1 information (s67010), returning an HTTP message (s67020), sending event 2 information (s67030), returning an HTTP message (s67040), sending event 3 information (s67050) and/or returning an HTTP message (s67060).

Sending event 1 information (s67010) may include the receiver sending the received event information to the second screen. As described above, the receiver may process the TPT file and the trigger and generate and deliver data to be processed by the second screen device. In the second screen service application, the trigger client may not operate and the XML file may be received and processed via the "ProgressInput" action.

Returning an HTTP message (s67020) may include sending the result of sending event 1 information (s67010). Similarly to sending a response1 (s40100), a response such as HTTP/1.1 200 OK may be sent according to circumstance.

Sending event 2 information (s67030) may include sending information about the event similarly to sending event 1 information (s67010). As in TPT XML, data may be delivered to the TDO according to event. In this step, information about event 2 may be delivered.

Returning an HTTP message (s67040) may include sending the result of sending event 2 information (s67030). Similarly to sending a response1 (s40100), a response such as HTTP/1.1 200 OK may be sent according to circumstance.

Similarly, sending event 3 information (s67050) may include sending information about event 3.

Returning an HTTP message (s67060) may include sending the result of sending event 3 information (s67050). Similarly to sending a response1 (s40100), a response such as HTTP/1.1 200 OK may be sent according to circumstance.

In the above-described second method, the receiver may manage the lifecycle of the second screen application. The lifecycle of the second screen application may mean the process of parsing and processing the TPT and the AMT information of the second screen device.

FIG. 68 is a diagram showing an embodiment of "EventInfo" information delivered to a second screen device by a ProcessInput action.

FIG. 68 shows an example of an XML data structure of event information when the receiver processes the TPT file and the trigger and generates and delivers the data to be processed by the second screen device in the above-described method of, at the receiver, filtering and delivering the trigger information necessary for the second screen device.

That is, if the receiver manages the lifecycle of the second screen application, the event information may be delivered to the RemoteUI client via the XML file having the data structure of FIG. 68 using the processInput action. Even when the receiver receives the live trigger, similarly, the live trigger may be processed and only information about an execution time and a TDO URL may be delivered to the second screen device.

In the table of FIG. 68, @appID, URL, Event, @eventID, @action and Data may be equal to the information about the trigger or AMT received by the receiver. However, "@mediaTime", "@startTime" and "@endTime" should be specially processed by the receiver. According to "@mediaTime", the information of "time=" syntax (or "@beginMT" information of the AMT) of the trigger transmitted using the DTVCC may be processed to determine "@startTime" and "@endTime" again. Since the receiver and the second screen device may not use the same absolute time information (wall clock time), the second screen device may operate according to the media time of the content. That is, if it is assumed that the time information such as an execution start time and end time of the action are set between the receiver and the second screen device according to the actual NTP, a conversion operation may be performed by the receiver before transmission.

Transmission delay and media time estimation will be described.

As described above, since @startTime and @endTime are relatively created and transmitted based on a current media-Time value when being transmitted from the receiver to the second screen device, time loss generated upon transmission may be the "Date" value of the HTTP header and the HTTP response. Using a difference in arrival time value, the second screen device may find a more accurate time value. Since the difference between the current media time and @mediaTime is a transmission delay time, the current media time may be obtained by the following equation.

$$\text{current media time} = \text{transmission delay time(time value upon reception} - \text{HTTP header ``Date'' value)} + \text{@mediaTime}$$

Therefore, it is possible to estimate the current media time value of the current receiver.

FIG. 69 is a diagram showing the configuration between a receiver and a second screen device.

The configuration between the receiver and the second screen device is shown. The receiver can be a Controlled Device (Server). A second Screen Device can be a Control Point (Client).

In the discovery step, the receiver may multicast a service list and join a network, and the second screen app may multicast a request for the service list and start up.

In the description step, the second screen app may request the service description of the receiver.

In the present invention, a new UPnP device and service may be defined in order to, via the second screen device, acquire an interactive service associated with A/V broadcast content received via a TV set, that is, a receiver, based on UPnP.

FIG. 70 is a diagram showing an embodiment of Service Types and Service IDs of Services.

A Receiver can support a Trigger service, a Two-Way Communication service, and an AppURL service. It may also support an HTTP Proxy Server service. Service types and service IDs are shown in FIG. 70.

The two-way communication service can allow second screen devices to determine whether there is a DO being executed by the primary device that is prepared to engage in two-way communication with applications in second screen devices.

A Trigger service, an AppURL service and an HTTP Proxy Server service will be described below.

FIG. 71 is a diagram showing the operational concept of a trigger delivery service.

The trigger delivery service may mean a service for, via the second screen device, acquiring the interactive service associated with the A/V broadcast content received via the TV receiver based on UPnP.

FIG. 71 shows a process of, at the receiver, acquiring the trigger from the DTVCC or ACR server and transmitting the trigger to the second screen device without change or in a state of changing (expanding) the trigger to the format suitable for the second screen device.

Whenever the trigger is changed, the trigger or the expanded trigger should be transmitted from the receiver to the second screen device in real time.

FIG. 72 is a diagram showing an embodiment of a process of generating an expanded activation trigger.

The expanded trigger (expanded activation trigger) may be generated by combining the trigger acquired from the DTVCC stream or the ACR Server and the information in the TPT. The expanded trigger may be generated by combining the TDO ID and Event ID, Data ID and Activation time included in the trigger and TDO URL, TDO attributes, Event, Action, Diffusion and data in the TPT. The information in the TDO may be information about TDO and event associated with the information in the trigger.

Here, the expanded trigger may be referred to as an augmented trigger.

FIG. 73 is a diagram showing an embodiment of an XML Schema Description for an Augmented Activation Trigger.

Specification of Trigger Service will be described.

The Trigger service can deliver Triggers. Triggers can be acquired by the TV set from (a) ACR process, (b) DTV CC service #6 of the channel currently being viewed, (c) Remote "live trigger" server or (d) Activation Messages Table (AMT). It can depend on the circumstances.

The Trigger Service can also deliver a special "channel change" Trigger whenever the channel is changed. The channel change trigger will be described below. There can be basically four types of Triggers to be delivered, 1) Time Base Triggers for TDO interactive service model, 2) Activation Triggers for TDO interactive service model, 3) Triggers for Direct Execution interactive service model and 4) Special "channel change" Triggers.

For maximum flexibility, it can be desirable to have the option of delivering all types of Triggers to second screen devices, and to deliver them as soon as they arrive at the Receiver.

However, for second screen applications that are designed to provide interaction in much the same way as receivers provide interaction, it can be desirable to omit the Time Base Triggers for the TDO interaction model and to deliver each Activation Trigger for the TDO interaction model at its activation time, This can save these second screen applications from the need to maintain time bases and calculate activation times. It can be also desirable to augment each Activation Trigger by combining information from the Trigger with information from the TPT about the TDO element and its Event child element referenced in the Trigger, thereby saving these second screen applications from the need to deal with the TPT.

Therefore, the Trigger service can offer two options for Trigger delivery. One of them can be a "Unfiltered stream" option that receiver delivers all Triggers (with no augmentation). And the other can be "Filtered stream" option that delivers only Augmented Activation Triggers for the TDO interaction model, All triggers for interaction models other than the TDO interaction model and Special channel change Triggers.

The target delivery time for each Augmented Activation Trigger for the TDO interaction model can be its activation time. The target delivery time for all other Triggers (including Activation Triggers delivered without augmentation in the unfiltered stream option) can be the time they are received by the Receiver. The target delivery time of each special channel change Trigger can be the time of the channel change.

The trigger delivery format of the trigger service may be divided into the delivery format for an Augmented Activation Trigger and the delivery format for all other Triggers.

FIG. 73 shows the delivery format for an Augmented Activation Trigger. The delivery format for all other Triggers will be described below.

The delivery format for an Augmented Activation Trigger may include @interactionModel, @appURL, and/or @cookieSpace attributes and Capabilities and/or Event element.

Event element may include @action, @destination, @diffusion and/or @data attributes.

Semantics of the fields are as follows.

The value of the @interactionModel attribute can be the numerical code for the interaction model associated with the Trigger, using the same coding as for the cmdID field in the SDOPrivateData command in Service #6 of the DTVCC channel used to deliver the Trigger.

The value of the @appURL attribute can be the value of first URL child element of the TPT TDO element that is identified by the event ("e=") term in the Trigger.

The @cookieSpace attribute can be present whenever the TPT TDO element that is identified by the event ("e=") term in the Trigger contains a @cookieSpace attribute, and it can have the same value as that attribute.

The Capabilities element can be present whenever the TPT TDO element that is identified by the event ("e=") term in the Trigger contains a Capabilities element, and it can be identical to that element.

The Event element can represent the Event element identified by the event ("e=") term in the Trigger. (Strictly speaking, the event term in the Trigger identifies a TDO element in the TPT and an Event child element of that TDO element. This is referred to here as the Event element identified by the event term in the Trigger.)

The value of the @action attribute can be the same as the value of the action attribute of the Event element identified by the event ("e=") term in the Trigger.

The @destination can be present whenever the Event element that is identified by the event ("e=") term in the Trigger contains a destination attribute, and it can have the same value as that attribute.

The @diffusion attribute can be present whenever the Event element that is identified by the event ("e=") term in the Trigger contains a diffusion attribute, and it can have the same value as that attribute.

The @data attribute can be present whenever a Data child element of the Event element is identified by the ("e=") term in the Trigger, and it can have the same value as that element.

As described above, the augmented trigger may be generated by combining the information in the TPT and the trigger acquired from the DTVCC stream or the ACR Server.

As described above, the expanded trigger may also be called an augmented trigger.

FIG. 74 is a diagram showing an embodiment of an XML Schema Description for Triggers that are not augmented.

This may be an XML format of the trigger which is not augmented. The above-described special "channel change" Trigger may also follow this format.

One embodiment of XML Schema Description for Triggers that are not augmented may include @interactionModel attribute and/or @triggerString attributes.

Semantics of the fields are as follows.

The @interactionModel attribute cannot be present for a special "channel change" trigger. For other Triggers, the interactionModel can be present, and its value can be the numerical code for the interaction model associated with the Trigger, using the same coding as for the cmdID field in the SDOPrivateData command in the DTVCC channel. The @interactionModel for a Trigger acquired from a live trigger server or derived from an AMT can be deemed to be the TDO model.

The value of @triggerString attribute can be the string representation of the Trigger. The string representation of the Trigger was described in the trigger syntax. However, special "channel change" trigger may be different. The @triggerString attribute for a special "channel change" trigger can have value "**<major_num>.<minor_num>", where the <major_num> can be the original major channel number of the new channel (as it was broadcast by the TV station), and <minor_num> can be the original minor channel number of the new channel (as it was broadcast by the TV station). If the channel number is not known, then the <major_num> and <minor_num> values can both be "0".

FIG. 75 is a diagram showing an embodiment of a format of an Augmented Activation Trigger.

This may be another embodiment of the format of the above-described augmented trigger.

@cookieSpace, Capabilities, Event, @action, @destination, @diffusion and @data were described above.

@activationTime can be activation time, on media time scale.

@tdoURL may be equal to the above-described @appURL.

FIG. 76 is a diagram showing an embodiment of a format of an Augmented Activation Trigger.

This may be another embodiment of the format of the above-described augmented trigger.

@activationTime, @tdoURL, @cookieSpace, Capabilities, Event, @action, @destination, @diffusion and @data were described above.

@availInternet and @availBroadcast can be from TPT. @availInternet and @availBroadcast were described above.

FIG. 77 is a diagram showing an embodiment of a format of an Augmented Activation Trigger.

This may be another embodiment of the format of the above-described augmented trigger.

@activationTime, @tdoURL, @cookieSpace, Capabilities, Event, @action, @destination, @diffusion and @data ware described above.

ContentItem element, @updatesAvail, @pollPeriod, @size, @availInternet, and @availBroadcast attributes may be equal to the elements and attributes of the TPT when generating the augmented trigger. ContentItem element, @updatesAvail, @pollPeriod, @size, @availInternet and @availBroadcast were described above.

FIG. 78 is a diagram showing an embodiment of a format of an Augmented Activation Trigger.

This may be another embodiment of the format of the above-described augmented trigger.

@cookieSpace, @availInternet, @availBroadcast Capabilities, ContentItem, @updatesAvail, @pollPeriod, @size, @availInternet, @availBroadcast, Event, @action, @destination and @data were described above.

@appID, @appType, @appName, @globalId, @appVersion, @frequencyOfUse, @expireDate, @testTDO, URTL in the TDO element and the URL in the ContentItem element may be equal to the elements and attributes of the TPT when generating the augmented trigger. @appID, @appType, @appName, @globalId, @appVersion, @frequencyOfUse, @expireDate, @testTDO, the URL in the TDO element and the URL in the ContentItem element will be described below.

FIG. 79 is a diagram showing an embodiment of trigger service state variables.

One embodiment of trigger service state variables may define the shown trigger service state variables. The Trigger service can have the state variables listed in FIG. 79.

The value of the LatestUnfilteredTrigger state variable can represent the Trigger in the unfiltered stream with the most recent target delivery time. The format of this state variable can be an XML document conforming to the schema described in FIG. 74.

The value of the LatestFilteredTrigger state variable can represent the Trigger in the filtered stream with the most recent target delivery time. When it is an Activation Trigger, it can be augmented by combining information in the Activation Trigger with information in the TPT to produce an XML document conforming to the XML schema represented by Table described in FIG. 73. When it is a Trigger with interaction model other than TDO, it can have the form of an XML document conforming to the schema described in FIG. 74. When it is a special channel change Trigger, the format can be "**<major_num>.<minor_num>", as described before.

The value of the UnfilteredTriggerDeliveryTime state variable can be the delivery time of the Trigger in the unfiltered stream with the most recent target delivery time.

The value of the FilteredTriggerDeliveryTime state variable can be the delivery time of the Trigger in the filtered stream with the most recent target delivery time.

FIG. 80 is a diagram showing an embodiment of trigger service state variables.

Another embodiment of the trigger service state variables may have the same state variables as FIG. 80.

The value of the CurrentTrigger state variable can depend on which of the following three situations is in effect. 1) There is no interactive adjunct data service associated with the programming currently being viewed on the primary screen. 2) There is an interactive adjunct data service associated with the programming currently being viewed on the primary screen, and it has the Direct Execution interaction model. 3) There is an interactive adjunct data service associated with the programming currently being viewed on the primary screen, and it has the TDO interaction model.

In case (1), the value of the CurrentTrigger state variable can be a null string.

In case (2), the value of the CurrentTrigger state variable can be the most recent Trigger that has been received by the TV set for the programming currently being viewed on the primary screen.

In case (3), the value of the CurrentTrigger state variable can be an augmented form of the most recently activated Activation Trigger among the Activation Triggers that have been received by the TV set for the programming currently being viewed on the primary screen. (i.e., an Activation Trigger can become the basis for the CurrentTrigger state variable when its activation time arrives, and it can remain the basis until another Activation Trigger reaches its activation time.) The augmented form of the Activation Trigger can be obtained by combining information in the Activation Trigger with information in the TPT. The augmented form may be equal to one of the above-described augmented trigger formats.

The definition of the CurrentTrigger state variable can imply that for the TDO interaction model Activation Triggers are delivered to UPnP clients at the Trigger activation times.

In another embodiment of the trigger service state variables, whenever the trigger is changed, in order to transmit the trigger or the expanded trigger from the receiver to the second screen device in real time, ATSCTrigger and ATSCExpandedTrigger may be defined as the state variable.

ATSCTrigger state variable can contain a reference, in the form of a URI, to the trigger received from DTVCC stream or ACR server. This variable can include a URL for TPT (TDO parameters table), TDO ID, Event ID, Data ID, media time, content ID, an activation time for the targeted event, and so on.

ATSCExpandedTrigger state variable can contain the metadata, in the form of an XML Fragment, associated with TDO for the second screen device. This metadata could have been extracted from both TPT and trigger received from DTVCC stream or ACR server. This variable may have the same XML schema as the embodiment of FIG. 78.

The changed value of the above-defined ATSCTrigger and ATSCExpandedTrigger may be acquired in real time when the receiver changes the state variable based on the Eventing mechanism of UPnP.

FIG. 81 is a diagram showing an embodiment of Trigger Service Actions.

The actions may be defined such that the second screen device or the receiver arbitrarily reads the value of the trigger service state variable.

One embodiment of the trigger service actions may define the GetLatestUnfilteredTrigger and GetLatestFilteredTrigger action.

FIG. 82 is a diagram showing an embodiment of argument of a GetLatestUnfilteredTrigger Action.

The value of the LatestUnfilteredTrigger output argument can be the value of the LatestUnfilteredTrigger state variable.

The second screen application may obtain the value of the LatestUnfilteredTrigger state variable, that is, the trigger in the unfiltered stream with the most recent target delivery time, using the GetLatestUnfilteredTrigger Action.

FIG. 83 is a diagram showing an embodiment of argument of a GetLatestFilteredTrigger Action.

The value of the LatestFilteredTrigger output argument can be the value of the LatestFilteredTrigger state variable.

The second screen application may obtain the value of the LatestFilteredTrigger state variable, that is, the Trigger in the filtered stream with the most recent target delivery time, using the GetLatestFilteredTrigger Action.

FIG. 84 is a diagram showing an embodiment of Trigger Service Actions.

In another embodiment of the above-described trigger service state variables, in which the ATSCTrigger and ATSCExpandedTrigger are defined as the state variable, trigger service actions will be described.

Even in this embodiment, the action may be defined such that the second screen device or the receiver arbitrarily writes or reads the value of ATSCTrigger and ATSCExpandedTrigger.

SetTrigger( ) action may enable use of the value of ATSCTrigger. CurrentTrigger may be argument.

SetExpandedTrigger( ) action may enable use of the value of ATSCExpandedTrigger. CurrentTrigger may be augmented.

GetTrigger( ) action may enable reading of the value of ATSCTrigger. CurrentTrigger may be argument.

GetExpandedTrigger( ) may enable reading of the value of ATSCExpandedTrigger. CurrentTrigger may be argument.

FIG. 85 is a diagram showing an embodiment of an operation on a second screen when acquiring a trigger via a trigger delivery service.

How the second screen device operates according to action information included in the trigger or expanded activation trigger received from the second screen device via the trigger delivery service may be shown.

The trigger of the execution/termination action may be acquired via the trigger delivery service.

The second screen device may acquire the trigger of the execution/termination action via the trigger delivery service and deliver the URL of the target TDO and associated information from the acquired trigger to the DAE/browser. The browser may perform the action included in the trigger, such as execution or termination.

Figures 86, 87, 88, 89:
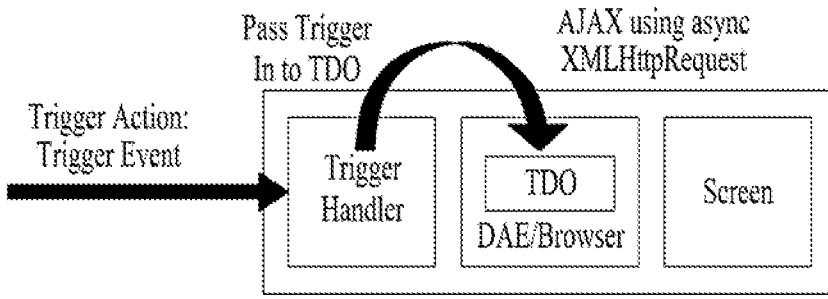
FIG. 86 is a diagram showing the operational concept of a trigger delivery service.
FIG. 87 is a diagram showing AppURL Service State Variables.
FIG. 88 is a diagram showing an AppURL Service Action.
FIG. 89 is a diagram showing Arguments of a GetAppURL Action.

FIG. 86 is a diagram showing the operational concept of a trigger delivery service.

How the second screen device operates according to action information included in the trigger or expanded activation trigger received from the second screen device via the trigger delivery service may be shown.

The second screen device may acquire the trigger of the trigger event action via the trigger delivery service and then extract information such as Data ID from the acquired trigger. Thereafter, the data may be delivered to the currently executed TDO using AJAX. The TDO may perform an appropriate operation according to the received data.

In another embodiment of the above-described trigger service state variables, in which ATSCTrigger and ATSCExpandedTrigger are defined as the state variable, the operational concept of the trigger delivery service will be described.

In this embodiment, in case of Direct Execution Model, if the content id, that is, "c=", is included in the trigger received via the DTVCC stream or the ACR server, the receiver may set the received time base trigger value to the value of the ATSCTrigger state variable. When the time base trigger arrives at the receiver, the value of the state variable may be immediately changed or may be delivered to the second screen device via the SetTrigger action.

In the present embodiment, in case of TDO Model, if the content id, that is, "c=", is not included in the trigger received via the DTVCC stream or the ACR server, the receiver receives the activation trigger and then extract and combine associated information from the TPT and the trigger information to generate the expanded trigger. Thereafter, at (or before) the activation time of the expanded trigger, the value of the ATSCExpandedTrigger state variable may be set or delivered to the second screen device via the SetExpandedTrigger action.

FIG. 87 is a diagram showing AppURL Service State Variables.

The AppURL service can allow second screen devices to determine the base URL and the name of the second screen application associated with the currently executing DO.

The UPnP AppURL service can have two state variables, AppURL and AppName.

The value of the AppURL state variable can be the base URL of the second screen application associated with the currently executing DO. When there is no DO with associated second screen application executing on the first screen device, the value of the AppURL state variable can be the null string.

The value of the AppName state variable can be the name of the second screen application associated with the currently executing DO. When there is no DO with associated second screen application executing on the first screen device, the value of the AppName state variable can be the null string.

FIG. 88 is a diagram showing an AppURL Service Action.

The AppURL service can have one Action, GetAppURL.

FIG. 89 is a diagram showing Arguments of a GetAppURL Action.

The GetAppURL Action can have two arguments, AppURL and AppName.

The AppURL output argument can be the current value of the AppURL state variable. And the AppName output argument can be the current value of the AppName state variable.

Accordingly, it is possible to obtain the current value of the AppURL state variable and the current value of the AppName state variable via the GetAppURL action.

Figures 90, 91, 92, 93:
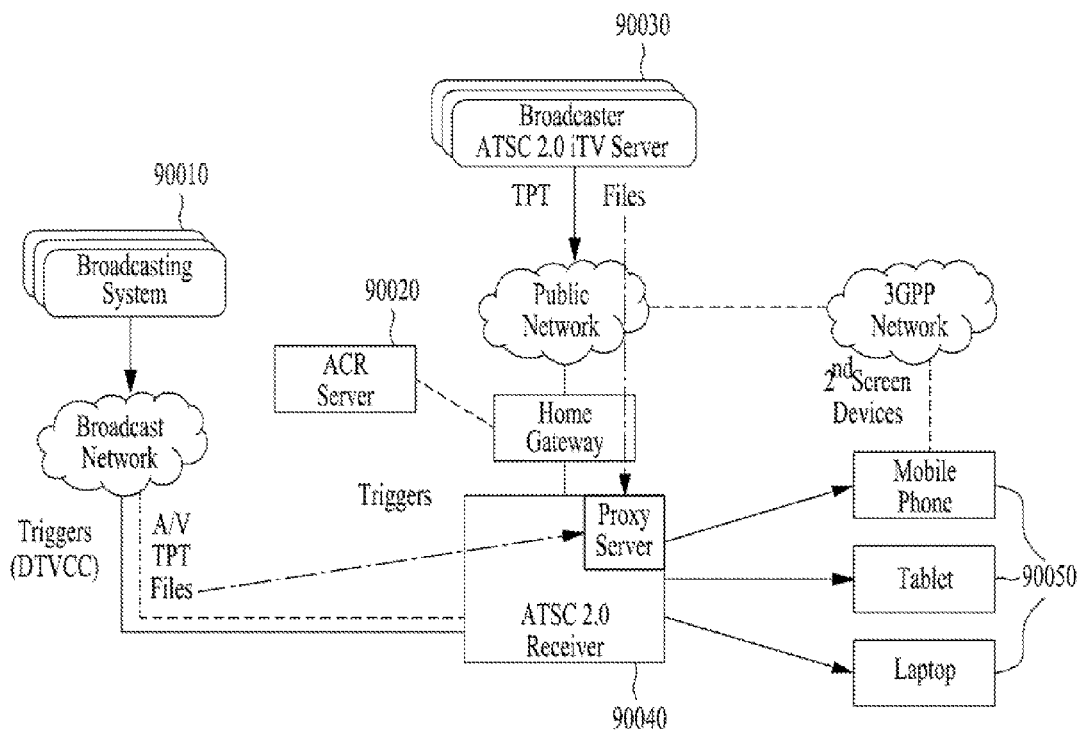
FIG. 90 is a diagram showing the operational concept of a Proxy HTTP Server service.
FIG. 91 is a diagram showing an embodiment of a Proxy Server Service State Variable.
FIG. 92 is a diagram showing an embodiment of a Proxy Server Service Action.
FIG. 93 is a diagram showing an embodiment of Arguments of a GetProxyURL Action.

FIG. 90 is a diagram showing the operational concept of a Proxy HTTP Server service.

A Receiver can support Proxy HTTP Server service. The proxy HTTP server service may mean a service for acquiring TDOs/files via a TV receiver if the second screen device transmits the TDOs/files via a broadcast network.

The diagram showing the operational concept of the proxy HTTP Server service may include a broadcasting system 90010, an ACR server 90020, a broadcaster ATSC 2.0 iTV server 90030, an ATSC 2.0 receiver 90040 and/or second screen Devices 90050.

The broadcasting system 90010 may be equal to the broadcasting system 42010.

The ACR server 90020 may be equal to the ACR server 42020.

The broadcaster ATSC 2.0 iTV server 90030 may be equal to the broadcaster ATSC 2.0 iTV server 42030.

The ATSC 2.0 receiver 90040 may receive the trigger associated with the broadcast A/V and the interactive service, acquire the interactive service using the trigger, and provide the interactive service on the screen. This may be equal to the above-described receiver. The proxy HTTP server service may enable the ATSC 2.0 receiver 90040 to perform the function similar to that of the proxy server, in order to efficiently provide the file requested by the second screen device to the second screen device.

The second screen devices 90050 may be equal to the second screen devices 42050.

The proxy HTTP server service may enable the receiver to access the broadcast stream or the file over the Internet via the second screen device and enable the second screen device to access the content transmitted via the broadcast stream. If a plurality of second screen devices accesses the same file over the Internet, it is possible to minimize access of the second screen devices to the same file.

FIG. 91 is a diagram showing an embodiment of a Proxy Server Service State Variable.

The UPnP Proxy Server service can provide an HTTP proxy server, to allow second screen devices to access files that are delivered to the TV receiver in the broadcast via FLUTE sessions, and to make the retrieval of files from Internet servers by second screen devices more efficient in cases when multiple second screen devices in a household are retrieving the same files simultaneously.

The state variable and action may be defined in order to achieve this.

The UPnP HTTP Proxy Server service can have a single state variable, ProxyServerURL.

The value of the ProxyServerURL state variable can be the URL of the HTTP Proxy Server—i.e., the URL to which HTTP requests are to be directed in order to route the requests through the proxy server.

FIG. 92 is a diagram showing an embodiment of a Proxy Server Service Action.

The UPnP Proxy Server service can have a single Action, GetProxyURL.

FIG. 93 is a diagram showing an embodiment of Arguments of a GetProxyURL Action.

The GetProxyURL Action can have a single argument, ProxyURL.

The ProxyURL output argument can be the current value of the ProxyServerURL state variable.

Accordingly, it is possible to obtain the current value of the ProxyServerURL state variable via the GetProxyURL action.

Figures 94, 95:
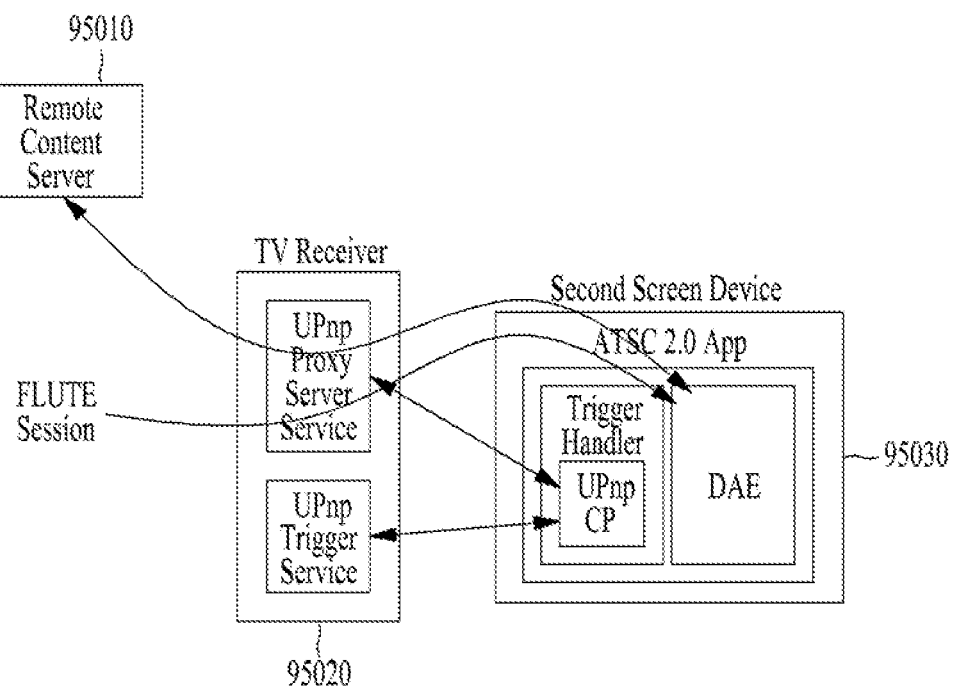
FIG. 94 is a diagram showing an embodiment of RequestFiles( )
FIG. 95 is a diagram showing an embodiment of a Second Screen Device Architecture.

FIG. 94 is a diagram showing an embodiment of RequestFiles( ).

In another embodiment of the UPnP HTTP Proxy Server service state variable, the UPnP HTTP Proxy Server service State Variable called ATSCProxySeverURL may be defined. In addition, in this embodiment, the action called GetProxyServerURL( ) may be defined.

ATSCProxySeverURL state variable can contain a reference, in the form of a URI, to the proxy server in receiver. The proxy server gets the HTTP request for a file from a second screen device and retrieves the file from FLUTE sessions in the broadcast stream or the Internet. Then, the proxy server sends the retrieved file to the second screen device as HTTP response.

GetProxyServerURL( ) may be an action enabling reading of the value of ProxySeverURL. ProxySeverURL may be included as an argument.

In another embodiment of the UPnP HTTP proxy server service state variable, UPnP HTTP proxy server service state variable called ATSCFileList may be defined. In addition, in this embodiment, the action called RequestFiles( ) may be defined.

The file included in the broadcast stream may be acquired only by the receiver capable of receiving broadcast content. Therefore, in order to enable the second screen device, which cannot receive the broadcast content, to access the file included in the broadcast content, necessary UPnP state variables and actions may be defined. That is, ATSCFileList which is a file list to be downloaded via a FLUTE session is set as the UPnP state variable or the second screen device may be enabled to acquire a specific file or a plurality of files via the RequestFiles( ) action requesting the files from the receiver.

The ATSCFileList state variable can contain the CSV list of requested files to the proxy server in receiver.

RequestFiles( ) may be an action requesting to download a specific file included in the broadcast stream over the Internet. In particular, in case of a file included in the broadcast stream, the requested file may be downloaded via FLUTE session.

FIG. 95 is a diagram showing an embodiment of a Second Screen Device Architecture.

Theory of operation will be described.

There can be two modes of operation: one where a triggered application (TDO) executes on the TV receiver, and the other where a non-triggered application (Packaged App) executes on the TV receiver.

In the case of the triggered application executing on the TV receiver, when the programming currently being viewed on a TV receiver has an associated interactive data service with second screen support, a user of a second screen device can activate an appropriate application on the device. This application can go through the UPnP discovery and description process to discover the Trigger service, Two-Way Communications service, and Proxy Server service on the TV receiver.

The second screen application can then subscribe to UPnP "eventing" for the Trigger service to get notifications of Triggers ready for delivery, and it can use the GetLatestUnfilteredTrigger or GetLatestFilteredTrigger Action to get the Triggers it is designed to use. The result of this is that the second screen application can obtain the appropriate Triggers at the appropriate times. The application can then act on these Triggers in whatever manner it is designed to use.

The second screen application can also subscribe to UPnP "eventing" for the Two-Way Communications service to get notification of the TCP/IP address and port to use to request a connection for two-way communications, and notifications of when there is a DO executing in the primary device that is prepared to communicate. The application can then engage in two-way communications with any DO that supports such communications.

The actions caused by Triggers and/or two-way communications can often require the second screen application to download files. These files might be available from HTTP servers on the Internet, or they might be available from a d session in the TV broadcast (or both).

If all the desired files are available via the Internet, and if the second screen device has good connectivity to the network, the application can simply retrieve the files directly.

If some or all of the desired files are available only via the TV broadcast, and if the Receiver offers an HTTP Proxy Server service, then the application can get the proxy server URL with the GetProxyURL Action and retrieve the desired files via the proxy server. The application could also choose to use the proxy server in other situations where it might be more convenient to retrieve the files that way rather than directly.

In the case of the non-triggered application executing on the TV receiver, Regardless of the programming currently being viewed, a user can activate a DO on the TV receiver which, among other things, makes available the name and location of a companion application to be launched on a second screen device through the AppURL service.

A control point on the second screen device can subscribe to UPnP "eventing" associated with the AppURL service to get notification of changes to the AppURL and AppName variables. The control point would then indicate to the user of the second screen device that an available service is pending. Subsequently, the user would view the AppName and select the service, resulting in the companion second screen application being launched on the second screen device.

Second screen applications may be associated with a DO executing on the ATSC 2.0 receiver, even when that DO is a broadcaster-provided Packaged App previously downloaded to the receiver whose life cycle is controlled by the consumer instead of by the broadcaster. In the absence of triggers to identify a companion second screen application, the receiver offers an AppURL service that allows a control point on the second screen device to use a GetAppURL action to access a published second screen application URL and launch it on the second screen device.

One embodiment of the second screen device architecture shows the second screen application and the second screen device interworking with the receiver.

One embodiment of the second screen device architecture may include a remote content server 95010, a TV receiver 95020 and/or a second screen device 95030.

The remote content server 95010 may provide content. The content may be provided to the receiver 95020 or the second screen device 95030.

The TV receiver 95020 may provide the UPnP trigger service and the UPnP proxy server service. This receiver may be equal to the above-described receiver.

The second screen device 95030 may have a second screen application (ATSC 2.0 App) and the second screen application may have a UPnP Control Point (CP) module in the trigger handler. The UPnP Control Point (CP) module handles all UPnP communications between the Second Screen Application (ATSC 2.0 App) and the Trigger service and Proxy Server service on the TV Receiver (95020). It can manage the discovery process, obtain the proxy server URL, and subscribe to the Trigger service eventing.

Triggers that arrive from the UPnP Trigger service can be turned over to the Trigger Handler. If a Trigger indicates that a new Declarative Object (DO) is to be downloaded and executed in the DAE (Declarative Application Environment—i.e., browser), the Trigger Handler can take care of that. If a Trigger indicates that the DO already executing in the browser should take some action, the Trigger Handler can pass the Trigger in to the DO. The user of the second screen device can interact with the DOs. The Trigger Handler can be invisible to the user.

The Second Screen App can perform the following functions as needed. 1) Use the UPnP discovery and description protocols to find the Trigger service and, if available, the Proxy Server service on the TV receiver. 2) Use the UPnP SUBSCRIBE protocol to subscribe to the Trigger service eventing. 3) Invoke the GetProxyURL Action of the Proxy Server service to get the URL of the HTTP proxy server (if available). 4) Receive Triggers delivered via the Trigger service events. 5) If a Direct Execution Trigger is received, and the DO identified in the Trigger is not already running in the DAE, start it running in the DAE (downloading if first if needed). 6) Pass each received Direct Execution Trigger in to the DO identified in the Trigger (after downloading and starting the DO if needed). 7) If a TDO Trigger is received, and if the Action attribute of the Trigger is anything other than "TriggerEvent", perform the Action (e.g., prepare to run a TDO, run a TDO, terminate a TDO, etc.). 8) If a TDO Trigger is received, and if the Action attribute of the Trigger is "TriggerEvent", pass the Trigger in to the TDO identified as the target of the Trigger. If the TDO is not already running in the DAE, discard the Trigger. 9) Download files (including TDOs) as needed, either via a direct Internet connection or via the Proxy Server service on the TV receiver.

Direct Execution Triggers and TDO Trigger can be acted on immediately when received unless they contain a "spread" or "diffusion" attribute. When a Trigger contains a "spread" or "diffusion" attribute, the action can be delayed for a random interval.

Figure 96:
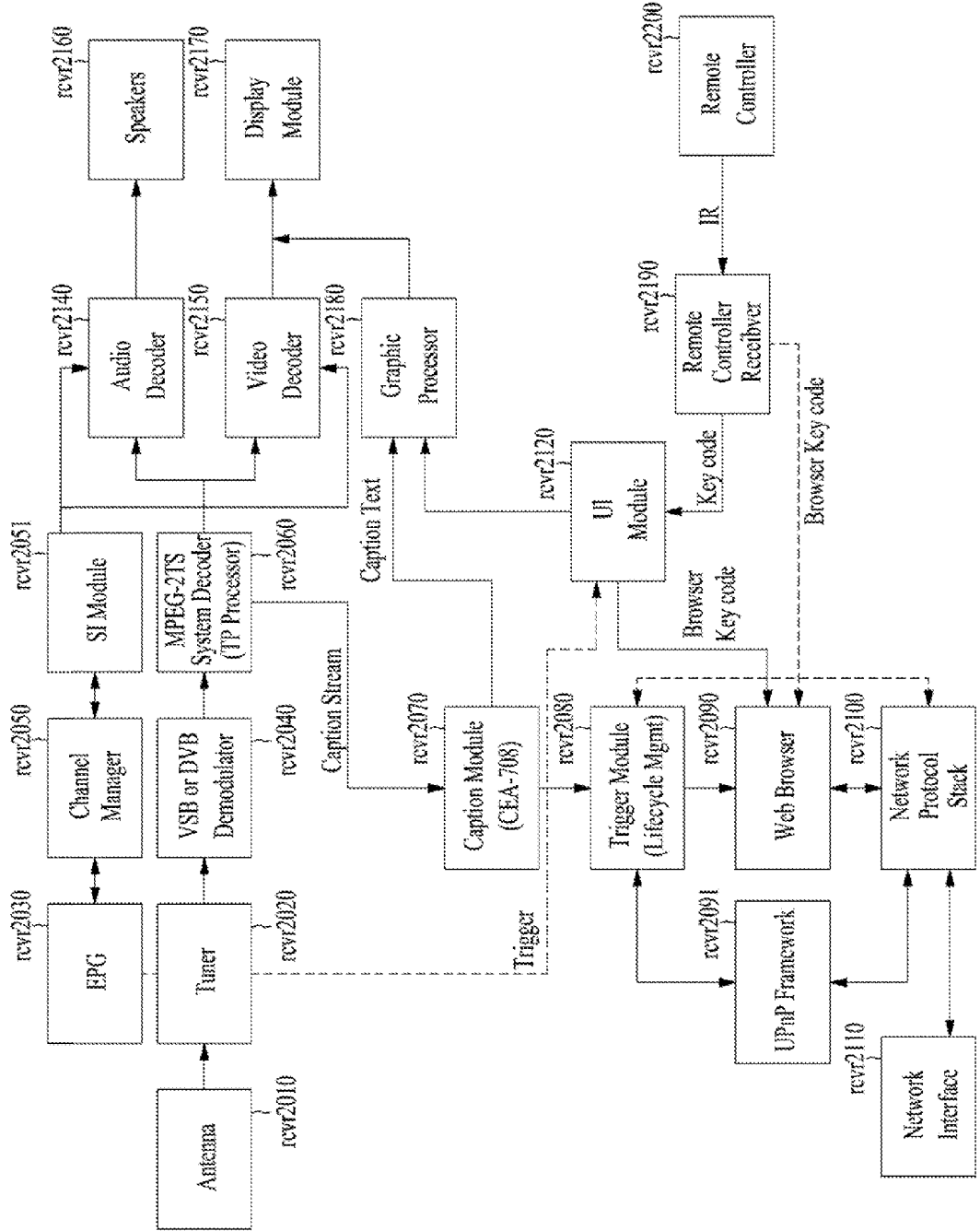
FIG. 96 is a diagram showing an embodiment of the simplified structure of a receiver.

FIG. 96 is a diagram showing an embodiment of the simplified structure of a receiver.

The diagram showing the simplified structure of the receiver may include an antenna (rcvr2010), a tuner (rcvr2020), an EPG (rcvr2030), a VSB or DVB Demodulator (rcvr2040), a channel manager (rcvr2050), an SI module (rcvr2051), a MPEG-2 TS system decoder (rcvr2060), a caption module (rcvr2070), a trigger module (rcvr2080), a web browser (rcvr2090), a UPnP framework (rcvr2091), a network protocol stack (rcvr2100), a network interface (rcvr2110), a UI module (rcvr2120), an audio decoder (rcvr2140), a video decoder (rcvr2150), speakers (rcvr2160), a display module (rcvr2170), a graphic processor (rcvr2180), a remote controller receiver (rcvr2190) and/or a remote controller (rcvr2200).

Antenna (rcvr2010) may receive a broadcast signal according to a broadcast stream. Here, the antenna (rcvr2010) may be one generally used in the technical field.

Tuner (rcvr2020) may seek or tune to a channel of the receiver and may include a radio frequency amplifier, a local oscillator, a frequency conversion and input circuit, a seeker, etc. The Tuner (rcvr2020) may be one generally used in the technical field.

The EPG (rcvr2030) may be a broadcast program guide service for providing a TV program broadcast time, content, and actor information using an empty frequency of a TV broadcast or supplementary channel (Electronic program guide). The received EPG data is stored and the viewer manipulates the EPG using the remote controller to select and reserve a program, thereby performing pay per view program order, program search per subject or type, video recording, etc. The received EPG may also be delivered to the UI module.

VSB or DVB Demodulator (rcvr2040) may modulate a VSB signal or a DVB signal. VSB or DVB Demodulator (rcvr2040) may restore the modulated VSB or DVB (e.g., OFDM-modulated signal) to an original signal. The demodulation process of VSB or DVB Demodulator (rcvr2040) may be one generally used in the technical field.

The channel manager (rcvr2050) may perform channel management using the received EPG. The EPG processed by the SI module may be delivered. The channel manager may serve as a general channel manager.

The SI module (rcvr2051) may confirm program specific information if the broadcast stream is received via the MPEG-2 TS System Decoder (rcvr2060). Using the confirmed information, how many captions are present in the broadcast program and presence of the trigger in service #6 may be determined.

MPEG-2 TS System Decoder (rcvr2060) can decode the transport stream (TS) of the demodulated signal. The MPEG-2TS System Decoder rcvr2060 may obtain and deliver a caption stream from the transport stream to the caption module rcvr2070. The MPEG-2TS System Decoder rcvr2060 may send the decoded audio and video signal to the audio/video decoder.

Caption Module (rcvr2070) may receive the caption stream. The caption module rcvr2070 may monitor service #6 or other services and determine whether service #6 or services for transmitting the trigger is selected and sent to the trigger module rcvr2080 or whether caption text is processed and displayed on a screen. Trigger data may be delivered to the trigger module rcvr2080. Other caption services may be subjected to caption text processing and sent to the graphic processor rcvr2180. The caption module (rcvr2070) delivers the trigger to the trigger module (rcvr2080) via the confirmed information if the trigger is included in the currently received digital caption.

Trigger Module (rcvr2080) may parse trigger, TPT and/or AMT information and process the parsed data. The trigger module rcvr2080 may access the network via the network protocol stack rcvr2100 using the URI information value of the trigger. The URI information value may be the address of the HTTP server. The trigger module rcvr2080 may analyze the TPT file content to obtain the TDO URL. In addition, the trigger module rcvr2080 may parse the AMT to process data. Other information may be obtained through parsing. After the AMT message has been received, the TDO URL corresponding to the web browser is delivered according to a predetermined time and operation or the currently operating TDO may be stopped at a predetermined time. This corresponds to a TDO action and the trigger module rcvr2080 may send a command to the web browser to operate. The operation of the trigger module rcvr2080 related to the present invention will be described in detail below. The trigger module (rcvr2080) may directly or indirectly access the Internet server via the network protocol stack (rcvr2100). The trigger module (rcvr2080) may immediately interpret the trigger received via the DTVCC and download and process the TPT file from the Internet via the network interface (rcvr2110) as necessary. The TPT file may be immediately processed after downloading, thereby performing a necessary operation. At this time, if the trigger associated with the second screen and the associated event are present, as described above, communication with the second screen device may be performed using various methods. Such communication may be performed by the below-described UPnP Framework (rcvr2091).

Web Brower (rcvr2090) may receive the command from the trigger module rcvr2080, a browser key code from the UI module rcvr2120 and a browser key code from the remote controller receiver rcvr2190 and communicate with the network protocol stack rcvr2100.

The UPnP Framework (rcvr2091) may detect the second screen device and transmit the trigger or regenerate and transmit information necessary for the second screen device. As described above, when the trigger is received via the network interface (rcvr2110), if the trigger associated with the second screen and the associated event are present, the UPnP Framework (rcvr2091) may perform communication with the second screen device.

Network Protocol Stack (rcvr2100) may communicate with the trigger module rcvr2080 and the web browser to access the server via the network interface rcvr2110.

Network Interface (rcvr2110) performs common connection of several other apparatuses or connection of a network computer and an external network. The network interface may be connected to the server to download a TDO, a TPT, an AMT, etc. Here, operation of the network interface rcvr2110 may be operation of the network interface rcvr2110 one generally used in the technical field. Operation of the network interface rcvr1090 related to the present invention will be described in detail below.

UI Module (rcvr2120) may receive information input by a viewer using the remote controller rcvr2200 through the remote controller receiver rcvr2190. If the received information is related to a service using the network, the browser key code may be delivered to the web browser. If the received information is related to currently displayed video, the signal may be delivered to the display module rcvr2170 via the graphic processor rcvr2180.

Audio Decoder (rcvr2140) may decode the audio signal received from the MPEG-2TS System Decoder rcvr2060. Thereafter, the decoded audio signal may be sent to the speaker and output to the viewer. Here, the audio decoder rcvr2140 may be one generally used in the technical field.

Video Decoder (rcvr2150) may decode the video signal received from the MPEG-2TS System Decoder rcvr2060. Thereafter, the decoded video signal may be sent to the display module rcvr2170 to be output to the viewer. Here, the video decoder rcvr2150 may be one generally used in the technical field.

Speakers (rcvr2160) may output the audio signal to the viewer. The speaker may be one generally used in the technical field.

Display Module (rcvr2170) may output the video signal to the viewer. The display module rcvr2170 may be one generally used in the technical field.

Graphic Processor (rcvr2180), may perform graphic processing with respect to the caption text received from the caption module rcvr2070 and the viewer input information received from the UI module rcvr2120. The processed information may be delivered to the display module rcvr2170. The graphic processor rcvr2180 may be one generally used in the technical field.

Remote Controller Receiver (rcvr2190) may receive information from the remote controller rcvr2200. At this time, the key code may be delivered to the UI module rcvr2120 and the browser key code may be delivered to the web browser.

Remote Controller (rcvr2200) delivers the signal input by the viewer to the remote controller receiver rcvr2190. The remote controller rcvr2200 may receive viewer input for changing a virtual channel. In addition, the remote controller may receive information selected by the viewer with respect to the application. The remote controller rcvr2200 may deliver the received information to the remote controller receiver rcvr2190. At this time, the information may be remotely delivered using infrared (IR) light at a distance out of a predetermined range.

Figure 97:
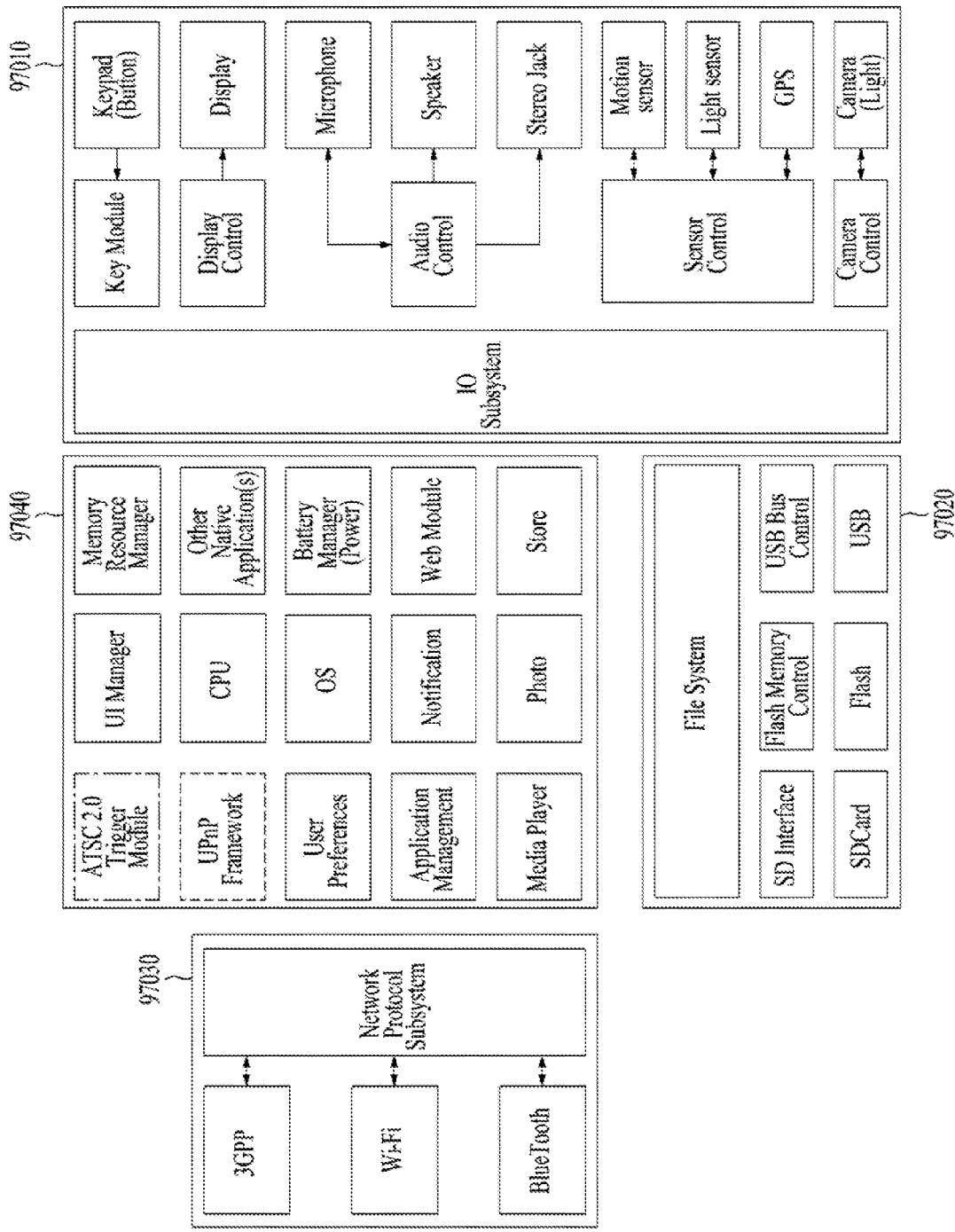
FIG. 97 is a diagram showing an embodiment of the structure of a second screen device.

FIG. 97 is a diagram showing an embodiment of the structure of a second screen device.

One embodiment of the structure of the second screen device may include an IO subsystem 97010, a file system 97020, a network protocol subsystem 97030 and basic modules 97040.

The IO subsystem 97010 may be connected with all devices which may be mounted in the second screen device for external connection. The IO subsystem 97010 may be connected with a keypad, a display, a microphone, a speaker, a stereo jack, a motion sensor, a light sensor, a GPS and a camera. Each I/O device may be controlled by a key module, a display control module, an audio control module, a sensor control module and/or a camera control module. Each I/O device is controlled by a device driver and each sensor or camera may access any program if a function is called by the IO subsystem 97010 in the form of an SDK. In some cases, a function may be restricted such that access is possible only in a native application.

The file system 97020 may read and write a file for an external SD card and may be connected to a USB to perform data communication. A device such as an SD card, a flash memory or a USB may be connected. This may be controlled by SD Interface, Flash Memory Control or USB BUS Control.

The network protocol subsystem 97030 may perform communication via 3GPP, Wi-Fi and/or Bluetooth.

The basic modules 97040 may be included in the second device. A battery manager may manage the battery amount of the second screen device and a notification module may be used when a communication provider or a manufacturer provides a notification to the second screen device. In addition, a store module may be used to purchase applications for a second screen made using an open SDK provided by the second screen device. An application manager may manage an application installed using the store module and notify about application upgrade. In addition, a web module may be included such that the second screen device performs Internet access. Various functions of the second screen may be set according to personal preference and a user preference program may be used.

The basic modules 97040 have various functions and may be programs installed in the second screen device. However, the modules denoted by dotted lines may be selectively software modules installed by the user For example, the UPnP framework module may not be supported by the second screen device or may be installed in the second screen device. If the UPnP framework module is installed, a native application is also installed to easily perform a UPnP operation. However, in the structure of the receiver, the UPnP framework may enable the user to install a second screen service application or an application supporting the UPnP framework. It is possible to find a receiver capable of receiving a terrestrial wave via the UPnP framework module.

Figure 98:
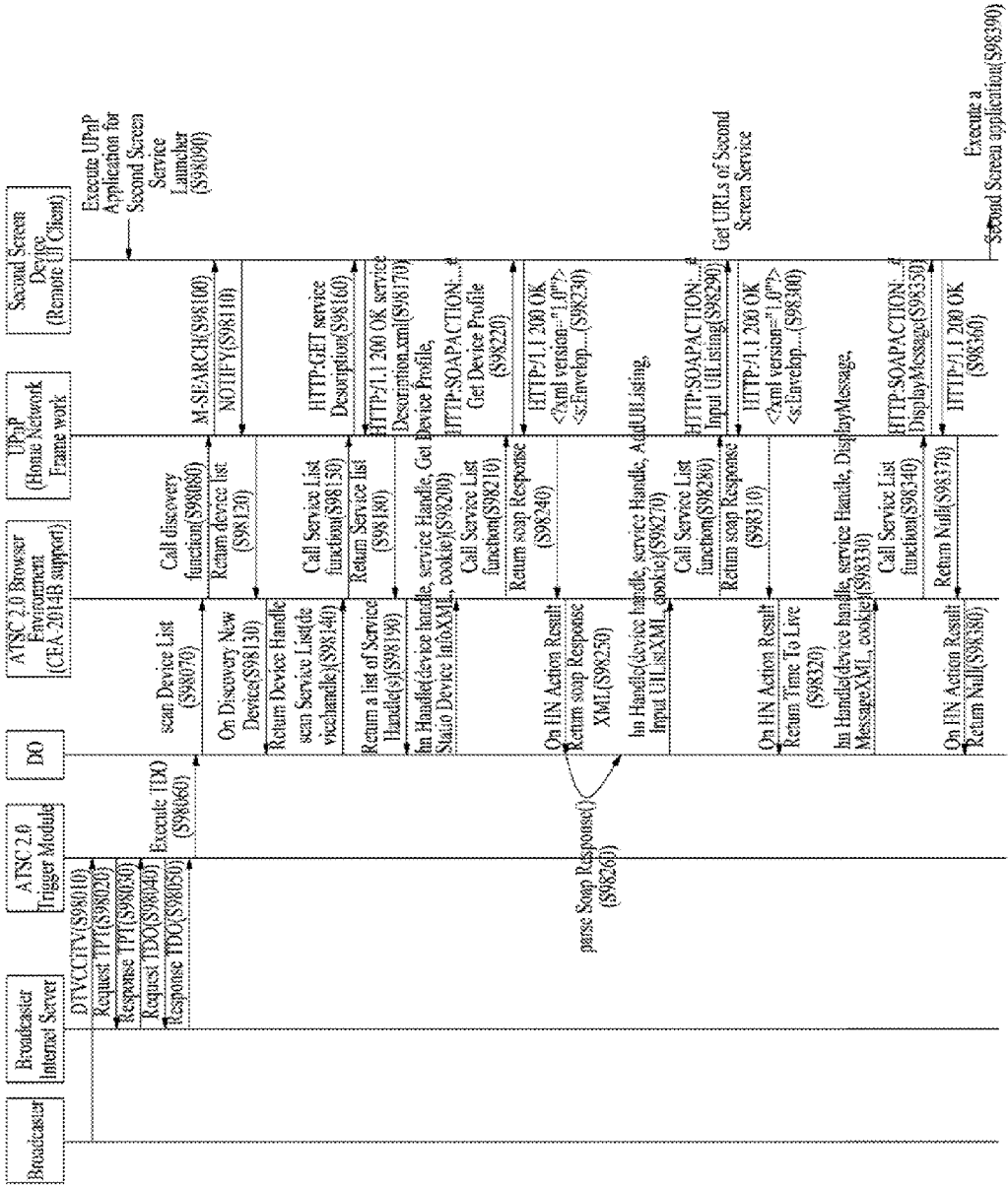
FIG. 98 is a diagram showing a second screen service scenario.

FIG. 98 is a diagram showing a second screen service scenario.

One embodiment of the second screen service Scenario will be described.

One embodiment of the second screen service scenario may include receiving a trigger (s98010), requesting a TPT (s98020), transmitting a TPT as a response (s98030), requesting a TDO (s98040), transmitting a TDO as a response (s98050), executing a TDO (s98060), sending a scanDevice- List message (s98070), calling a discovery function (s98080), executing a UPnP application (s98090), multicasting a searching message (s98100), notifying a UPnP Framework (s98110), returning a device list (s98120), returning a device handle (s98130), sending a scanServiceList message (s98140), calling a service list function (s98150), sending a GetServiceDescription message (s98160), sending an HTTP message (s98170), returning a service list (s98180), returning a list of service handle (s98190), sending a hnHandle message (s98200), calling a service list function (s98210), sending a GetDeviceProfile message (s98220), sending an HTTP message (s98230), returning a soap response (s98240), returning a soap response XML (s98250), parsing a soap response (s98260), sending a hnHandle message (s98270), calling a service List function (s98280), sending a InputUIListing message (s98290), sending an HTTP message (s98300), returning a soap response (s98310), returning TimeToLive (s98320), sending a hnHandle message (s98330), calling a service List function (s98340), sending a DisplayMessage (s98350), sending an HTTP message (s98360), returning Null (s98370), returning Null (s98380) and/or executing a second screen application (s98390).

Receiving a trigger (s98010) may include receiving the trigger from the broadcaster using a DTVCC iTV message via a broadcast stream.

Requesting a TPT (s98020) may include parsing and interpreting the received trigger and requesting the TPT related to the broadcaster Internet server.

Transmitting a TPT as a response (s98030) may include transmitting the TPT as a response.

Requesting a TDO (s98040) may include requesting the TDO from the broadcaster Internet server if the related TDO needs to be downloaded.

Transmitting a TDO as a response (s98050) may include transmitting the requested TDO.

Executing a TDO (s98060) may include the trigger module executing the TDO.

Sending a scanDeviceList message (s98070) may include the executed DO (or TDO) sending a message for requesting device list scan.

Calling a discovery function (s98080) may include calling the discovery function of the UPnP framework for device discovery.

Executing a UPnP application (s98090) may include the second screen device executing a UPnP application for a second screen service launcher. This step is independent of the primary device and may be performed before executing a UPnP application (s98090).

Multicasting a searching message (s98100) may include the UPnP framework multicasting the searching message for searching for the second screen device in the home network.

Notifying a UPnP Framework (s98110) may include the second screen device, which receives the searching message, transmitting a notifying message to the primary device. Thus, it is possible to notify about presence of the second screen device.

Returning a device list (s98120) may include the UPnP framework returning the device list after device discovery.

Returning device handle (s98130) may include delivering the received device list to the DO.

Sending a scanServiceList message (s98140) may include the executed DO (or TDO) transmitting a message for requesting service list scan.

Calling a service list function (s98150) may include calling the service list function of the UPnP framework for service discovery.

Sending a GetServiceDescription message (s98160) may include requesting the service description of the second screen device from the second screen device.

Sending an HTTP message (s98170) may include sending the result of sending a GetServiceDescription message (s98160). As described above, a message such as HTTP/1.1 200 OK (success) may be sent. The service description may be received in XML.

Returning a service list (s98180) may include returning the service list after the UPnP framework receives the service description.

Returning a list of service handle (s98190) may include returning the received service list.

Sending a hnHandle message (s98200) may include sending a message in order to obtain a device profile.

Calling a service list function (s98210) may include calling a service list function of the UPnP framework for service discovery.

Sending a GetDeviceProfile message (s98220) may include requesting the service description of the second screen device from the second screen device. Sending an HTTP message (s98230) may include sending the request result in sending a GetDeviceProfile message (s98220). As described above, a message such as HTTP/1.1 200 OK (success) may be sent. A device profile may be received.

Returning a soap response (s98240) may include returning the received device profile.

Returning a soap response XML (s98250) may include returning the received device profile in XML.

Parsing a soap response (s98260) may include the DO parsing the received SOAP message.

Sending a hnHandle message (s98270) may include sending a message in order to notify the second screen device of the URL address of the second screen service.

Calling a service List function (s98280) may include calling the service list function of the UPnP framework.

Sending a InputUIListing message (s98290) may include notifying the second screen device of the URL address of the second screen service. The above-described AddUIListing action may be used. The second screen device may add the acquired URL to UIListing.

Sending an HTTP message (s98300) may include sending the request result in sending an InputUIListing message (s98290). As described above, a message such as HTTP/1.1 200 OK (success) may be sent.

Returning a soap response (s98310) may include a returning a message indicating that the URL has been transmitted.

Returning TimeToLive (s98320) may include sending the request result in sending an InputUIListing message (s98290), similarly to sending an HTTP message (s98300).

Sending a hnHandle message (s98330) may include sending a message in order to deliver a display message to the second screen device.

Calling a service List function (s98340) may include calling the service list function of the UPnP framework.

Sending a DisplayMessage (s98350) may include transmitting the display message to the second screen device. The display message may include information such as message type. The above-described DispalyMessage action may be used. The second screen device may display the message on the second screen according to the display message.

Sending an HTTP message (s98360) may include sending the result of sending a DisplayMessage (s98350). As described above, a message such as HTTP/1.1 200 OK (success) may be sent.

Returning null (s98370) may include returning null if HTTP/1.1 200 OK is received.

Returning null (s98380) may include returning null to the DO if null is received as a response.

Executing a second screen application (s98390) may include the second screen device executing the second screen application.

Figure 99:
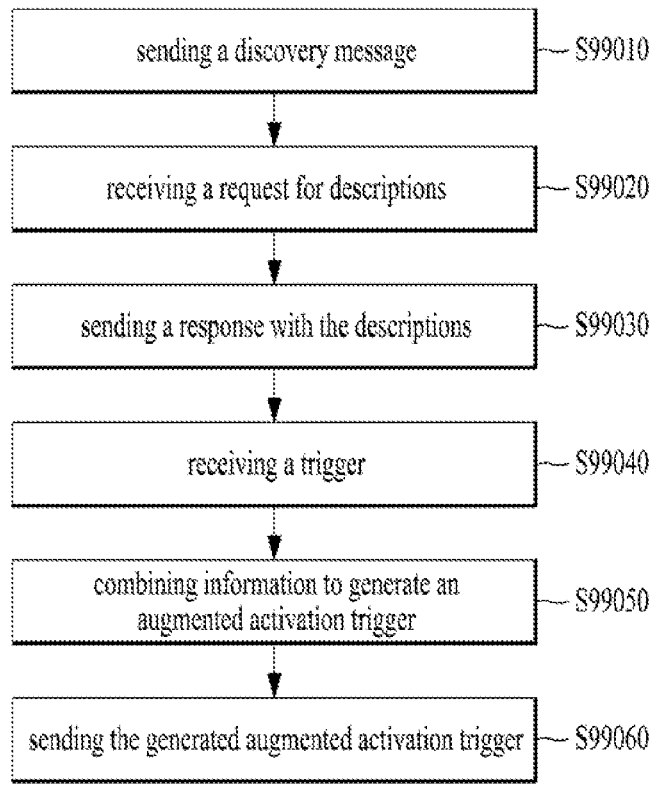
FIG. 99 is a diagram showing a method of processing an interactive service at a first device.

FIG. 99 is a diagram showing a method of processing an interactive service at a first device.

One embodiment of a method of processing an interactive service at a first device may include sending a discovery message (s99010), receiving a request for descriptions (s99020), sending a response with the descriptions (s99030), receiving a trigger (s99040), combining information to generate an augmented activation trigger (s99050) and/or sending the generated augmented activation trigger (s99060).

Sending a discovery message (s99010) may include sending the discovery message to a second screen application running in a second device. The discovery message may indicate the second screen support service provided by the first device. Here, the first device may be the above-described primary device or TV receiver. Here, the discovery message may not be transmitted to a single second screen device but may be multicasted to a plurality of second screen devices. Here, the second screen support service may be the above-described second screen service. Sending a discovery message (s99010) may be included in the above-described device discovery step.

Receiving a request for descriptions (s99020) may include receiving a request for descriptions of the second screen support service provided by the first device. The second device may be above-described second screen device. The second screen application which is being executed in the second screen device may request descriptions of the second screen support service provided by the first device from the first device. Receiving a request for descriptions (s99020) may include the first device receiving the request. This may be included in the above-described device discovery step.

Sending a response with the descriptions (s99030) may include the first device transmitting the descriptions to the second screen application in response to the request in receiving a request for descriptions (s99020). This response may include other information in addition to the descriptions. This may be included in the above-described device discovery step.

Receiving a trigger (s99040) may include the first device receiving the above-described trigger via a broadcast stream or an internet server. The broadcast stream may be received via the DTVCC as described above. If the broadcast stream is received via the Internet server, as described above, this may be received in the form of an iTV message or via an ACR process. This trigger may be delivered to the second screen application by the above-described trigger service. As described above, the trigger service may be one of second screen support services. As described above, the trigger can be a signaling element whose function is to identify signaling and establish timing of playout of interactive events targeted to applications for a segment described by an application parameter table. The received trigger may be any one of a time base trigger, an activation trigger, an interaction trigger and/or a channel change trigger. The interaction trigger may be a trigger for an interaction model other than a TDO interaction model. For example, the trigger may have a content id term in the direct execution model. The channel change trigger may be the above-described special channel change trigger, which may be received when the channel is changed.

Combining information to generate an augmented activation trigger (s99050) may include extracting and combining the information in the activation trigger and the information in the TPT among the received triggers. This may be equal to the step of generating the augmented trigger, the augmented activation trigger and the expanded trigger. The format in or after the process of generating the augmented activation trigger was described above.

Sending the generated augmented activation trigger (s99060) may include transmitting the generated augmented activation trigger to the second screen application. This may be the above-described filtered stream option among the trigger services.

In one embodiment of the present invention, the step of receiving a searching message may be performed before sending the discovery message. The searching message may be used to find a device for providing a second screen support service. The searching message may be transmitted using a unicasting or multicasting method. By this step, the second screen device may detect the first device.

In another embodiment of the present invention, a trigger service may deliver a trigger as an unfiltered stream option. The unfiltered stream option may deliver all types of triggers to the second screen device as described above.

In another embodiment of the present invention, in the unfiltered stream option, the first device may transmit all triggers to the second screen application as soon as the triggers is received.

In another embodiment of the present invention, the trigger service may provide a filtered stream option. As described above, the filtered stream option may deliver an augmented activation trigger, an interaction trigger and/or a channel change trigger.

In another embodiment of the present invention, the augmented activation trigger includes application URL information having same value with an URL element of an application element in the application parameter table. The URL element identifies a file which is part of the application, and the application element is identified by the activation trigger. The application parameter table may be the above-described TPT. The application may be a TDO. Here, the application URL information may be @appURL of the above-described augmented activation trigger. Here, the URL element may be a URL element in a TDO element of the TPT. The augmented activation trigger may be obtained from a URL element value in the TDO element of the TPT associated with the activation trigger in a generation process and the application URL information and the URL element may have the same value.

In another embodiment of the present invention, the augmented activation trigger further includes an event information representing an event element in the application parameter table, the event element identified by the activation trigger represents the event for the application, the event information includes an action information having same value with an action attribute of the event element identified by the activation trigger, and the action attribute indicates type of an action to be applied when the event is activated. The application parameter table may be the above-described TPT. The application may be a TDO. Here, the event information may be the event element of the above-described augmented activation trigger. Here, the event element may be an event element in a TDO element of the TPT. The action information may be @action of the above-described augmented activation trigger. Here, the action attribute may be @action of the event element of the TPT. The augmented activation trigger may be obtained from an event element value and @action value in the TDO element of the TPT associated with the activation trigger in a generation process and the action information and the action attribute may have the same value.

In another embodiment of the present invention, the first device delivers the augmented activation trigger at the activation time of the augmented activation trigger, the first device delivers the interaction trigger when the interaction trigger is received by the first device, and the first device delivers the channel change trigger when the channel is changed. The augmented activation trigger may be delivered at or before the activation time as described above, interaction trigger may be delivered to the second screen application as soon as being received by the first device and the channel change trigger may be delivered when the channel is changed.

Figure 100:
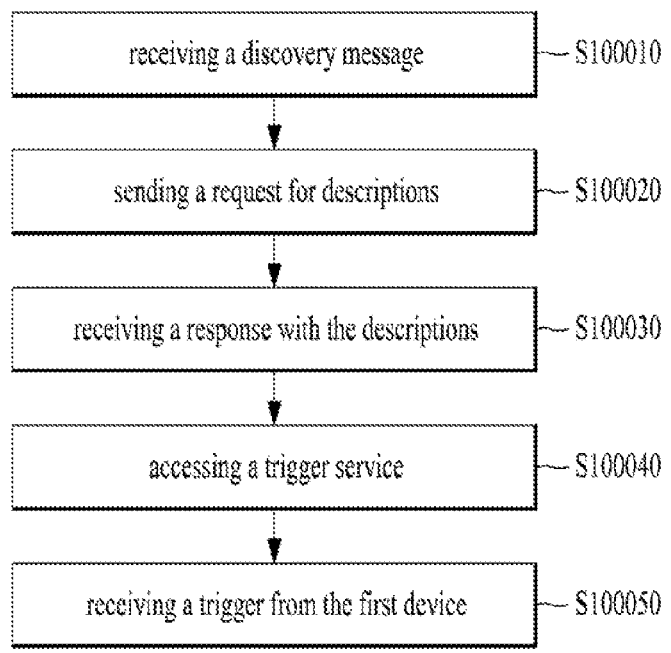
FIG. 100 is a diagram showing a method of processing an interactive service at a second screen application running in a second device.

FIG. 100 is a diagram showing an embodiment of a method of processing an interactive service at a second screen application running in a second device.

One embodiment of a method of processing an interactive service at a second screen application running in a second device may include receiving a discovery message (s10010), sending a request for descriptions (s10020), receiving a response with the descriptions (s10030), accessing a trigger service (s10040) and/or receiving a trigger from the first device (s10050).

Receiving a discovery message (s10010) may include receiving the discovery message from the first device. As described above, the first device may be a primary device or a TV receiver. The second device may be the above-described second screen device. The discovery message may serve to indicate the second screen support service provided by the first device. The first device may send the discovery message to only the second device or may multicast the discovery message to all devices in the home network. This step may be included in the above-described device discovery step. This step may be the second device receiving the discovery message from the first device. Sending a discovery message (s99010) may be described from the viewpoint of the second screen application.

Sending a request for descriptions (s10020) may include requesting descriptions of the second screen support service provided by the first device from the first device. Receiving a request for descriptions (s99020) may be described from the viewpoint of the second screen application. This step may be included in the above-described device discovery.

Receiving a response with the descriptions (s10030) may include receiving the descriptions of the service as a response to the request sent in the step of sending a request for descriptions (s10020). The first device may transmit the description of the service thereof to the second screen application. Sending a response with the descriptions (s99030) may be described from the viewpoint of the second screen application. This step may be included in the above-described device discovery step.

Accessing a trigger service (s10040) may include accessing the trigger service which is one of the second screen support services. The first device may be used to receive the trigger from the broadcast stream or the Internet server. Accessing to the trigger service may be performed based on the descriptions received in the step of receiving a response with the descriptions (s10030). Among the descriptions received in the step of receiving a response with the descriptions (s10030), the description of the trigger service may be used.

Receiving a trigger from the first device (s10050) may include receiving the trigger from the first device using the accessed trigger service. Here, the trigger service may be one of the second screen support services. The trigger can be a signaling element whose function is to identify signaling and establish timing of playout of interactive events targeted to applications for a segment described by an application parameter table. Here, the trigger may be one of a time base trigger, an activation trigger, an interaction trigger and/or a channel change trigger. The interaction trigger may be a trigger for an interaction model other than a TDO interaction model. For example, the trigger may have a content id term in the direct execution model. The channel change trigger may be the above-described special channel change trigger and may be received when the channel is changed.

In one embodiment of the present invention, a step of multicasting a searching message may be further included. This step may be performed before receiving the discovery message. The searching message may be used to detect a device for providing a second screen support service. According to the embodiment, the searching message may be unicasted. By this step, the second device may detect the first device.

In another embodiment of the present invention, the trigger service may deliver the trigger as an unfiltered stream option. The unfiltered stream option may deliver all types of triggers to the second screen application as described above.

In another embodiment of the present invention, in the unfiltered stream option, all triggers may be delivered to the second screen application as soon as being received by the first device.

In another embodiment of the present invention, receiving augmented activation trigger from the first device may be further included. The augmented activation trigger may be generated by extracting and combining the information in the activation trigger and the information in the TPT at the first device. This may be equal to a process of generating the above-described augmented trigger, augmented activation trigger and expanded trigger. The process of generating the augmented activation trigger and the format thereof after generation were described above.

In another embodiment of the present invention, the trigger service may provide a filtered stream option. As described above, the filtered stream option may deliver the augmented activation trigger, the interaction trigger and/or the channel change trigger.

In another embodiment of the present invention, the augmented activation trigger includes application URL information having same value with an URL element of an application element in the application parameter table. The URL element identifies a file which is part of the application, and the application element is identified by the activation trigger. The application parameter table may be the above-described TPT. The application may be a TDO. Here, the application URL information may be @appURL of the above-described augmented activation trigger. Here, the URL element may be a URL element in the TDO element of the TPT. The augmented activation trigger may be obtained from a URL element value in the TDO element of the TPT associated with the activation trigger in a generation process and the application URL information and the URL element may have the same value.

In another embodiment of the present invention, the augmented activation trigger further includes an event information representing an event element in the application parameter table, the event element identified by the activation trigger represents the event for the application, the event information includes an action information having same value with an action attribute of the event element identified by the activation trigger, and the action attribute indicates type of an action to be applied when the event is activated. The application parameter table may be the above-described TPT. The application may be a TDO. Here, the event information may be an event element of the above-described augmented activation trigger. Here, the event element may be an event element in the TDO element of the TPT. Here, the action information may be @action of the above-described augmented activation trigger. Here, the action attribute may be @action in the event element of the TPT. The augmented activation trigger may be obtained from an event element value and @action value in the TDO element of the TPT associated with the activation trigger in a generation process and the action information and the action attribute may have the same value.

In another embodiment of the present invention, the augmented activation trigger is delivered at the activation time of the augmented activation trigger, the interaction trigger is delivered as soon as possible, and the channel change trigger is delivered when the channel is changed. The augmented activation trigger may be delivered at or before the activation time as described above, the interaction trigger may be delivered to the second screen application as soon as being received by the first device and the channel change trigger may be delivered when the channel is changed.

Figure 101:
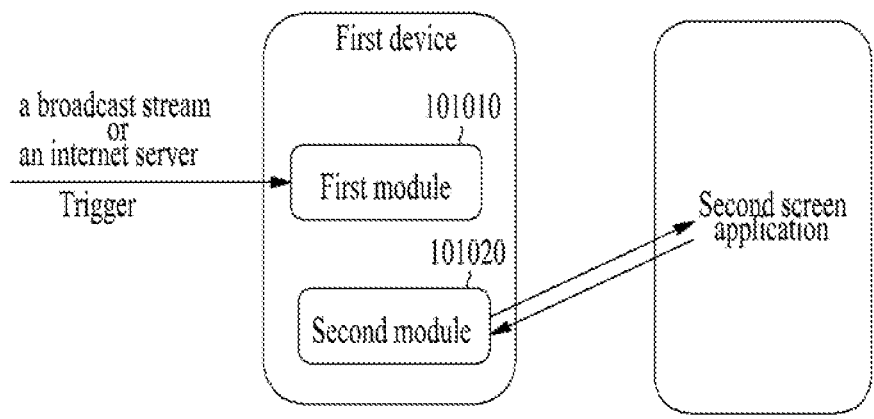
FIG. 101 is a diagram showing an embodiment of an apparatus for processing an interactive service as a first device.

FIG. 101 is a diagram showing an apparatus for processing an interactive service as a first device.

One embodiment of an apparatus for processing an interactive service as a first device may include a first module 101010 and/or a second module 101020.

Here, the first device may be the above-described primary device or TV receiver.

The first module 101010 can be configured to receive a trigger from a broadcast stream or an Internet server. Here, the first module 101010 is a trigger receiving module in the first device and may be the above-described network interface when receiving the broadcast stream from the above-described tuner or Internet server. The broadcast stream may be received via the DTVCC as described above. If the broadcast stream is received via the Internet server, as described above, the broadcast stream may be received in the form of an iTV message or via an ACR process. This trigger may be delivered to the second screen application later by the above-described trigger service. As described above, the trigger service may be one of the second screen support services. As described above, the trigger can be a signaling element whose function is to identify signaling and establish timing of playout of interactive events targeted to applications for a segment described by an application parameter table. The received trigger may be one of a time base trigger, an activation trigger, an interaction trigger and/or a channel change trigger. The interaction trigger may be a trigger for an interaction model other than a TDO interaction model. For example, the trigger may have a content id term in the direct execution model. The channel change trigger may be the above-described special channel change trigger and may be received when the channel is changed.

The second module 101020 may send the discovery message, receive a request for service descriptions and send a response thereto. In addition, the second module may send the trigger to the second device. The second module 101020 may be the above-described UPnP framework module.

The second module 101020 can be configured to send a discovery message to a second screen application running in a second device. The discovery message may serve to indicate the second screen support service provided by the first device. Here, the discovery message may not be transmitted to a single second screen device but may be multicasted to a plurality of second screen devices. Here, each of the second screen support services may be the above-described second screen service. This operation is performed for device discovery.

The second module 101020 can be configured to receive a request for descriptions of the second screen support services from the second screen application. The second module may receive the request for descriptions of the second screens support service provided by the first device. The second screen application executed by the second screen device may request the descriptions of the second screen support service provided by the first device from the first device. This request may be received. This operation may be performed for device discovery.

The second module 101020 can be configured to send a response with the descriptions to the second screen application. As a response to the received request, the descriptions may be transmitted to the second screen application. This response may include other information in addition to the descriptions. This operation may be performed for device discovery.

The second module 101020 can be configured to deliver the trigger to the second device using a trigger service. The trigger service can be one of the second screen support services.

In one embodiment of the present invention, the second module 101020 may receive the searching message. This operation may be performed before sending the discovery message. The searching message may be used to detect a device for providing the second screen support service. The searching message may be transmitted using a unicasting or multicasting method. Therefore, the second screen device may detect the first device.

In another embodiment of the present invention, the trigger service may deliver the trigger as the unfiltered stream option. The unfiltered stream option may deliver all types of triggers to the second screen device as described above.

In another embodiment of the present invention, the second module 101020 may deliver all triggers to the second screen application as soon as the first module 101010 receives the triggers in the unfiltered stream option.

In another embodiment of the present invention, the second module 101020 may generate and deliver the augmented activation trigger to the second screen application. The second module 101020 may extract and combine the information in the activation trigger and the information in the TPT among the received triggers. This may be equal to the operation for generating the above-described augmented trigger, augmented activation trigger and expanded trigger. The process of generating the augmented activation trigger and the format thereof after generation were described above.

In another embodiment of the present invention, the trigger service may provide a filtered stream option. As described above, the filtered stream option may deliver the augmented activation trigger, the interaction trigger and/or the channel change trigger.

In another embodiment of the present invention, the augmented activation trigger includes application URL information having same value with an URL element of an application element in the application parameter table. The URL element identifies a file which is part of the application, and the application element is identified by the activation trigger. The application parameter table may be the above-described TPT. The application may be a TDO. Here, the application URL information may be @appURL of the above-described augmented activation trigger. Here, the URL element may be a URL element in a TDO element of the TPT. The augmented activation trigger may be obtained from a URL element value in the TDO element of the TPT associated with the activation trigger in a generation process and the application URL information and the URL element may have the same value.

In another embodiment of the present invention, the augmented activation trigger further includes an event information representing an event element in the application parameter table, the event element identified by the activation trigger represents the event for the application, the event information includes an action information having same value with an action attribute of the event element identified by the activation trigger, and the action attribute indicates type of an action to be applied when the event is activated. The application parameter table may be the above-described TPT. The application may be a TDO. Here, the event information may be the event element of the above-described augmented activation trigger. Here, the event element may be an event element in a TDO element of the TPT. The action information may be @action of the above-described augmented activation trigger. Here, the action attribute may be @action of the event element of the TPT. The augmented activation trigger may be obtained from an event element value and @action value in the TDO element of the TPT associated with the activation trigger in a generation process and the action information and the action attribute may have the same value.

In another embodiment of the present invention, the second module 101020 delivers the augmented activation trigger at the activation time of the augmented activation trigger, the second module 101020 delivers the interaction trigger when the interaction trigger is received by the first module, and the second module 101020 delivers the channel change trigger when the channel is changed. The augmented activation trigger may be delivered at or before the activation time as described above, interaction trigger may be delivered to the second screen application as soon as being received by the first device and the channel change trigger may be delivered when the channel is changed.

Figure 102:
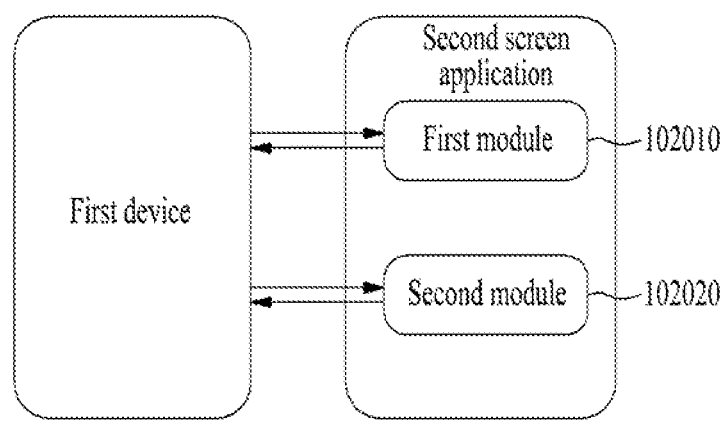
FIG. 102 is a diagram showing an embodiment of an apparatus for processing an interactive service as a second screen application running in a second device.

FIG. 102 is a diagram showing an apparatus for processing an interactive service as a second screen application running in a second device.

Here, the second device may be the above-described second screen device.

One embodiment of an apparatus for processing an interactive service as a second screen application running in a second device may include a first module 102010 and/or a second module 102020.

The first module 102010 may receive a discovery message, request service descriptions and receive a response thereto. Here, the first module 102010 may be the UPnP framework module of the above-described second screen device.

The first module (102010) can be configured to receive a discovery message from a first device. The discovery message may serve to indicate the second screen support service provided by the first device. The first device may send the discovery message to only the second device or may multicast the discovery message to all devices in the home network. This operation may be performed for device discovery.

The first module 102010 can be configured to send a request for descriptions of the second screen support services to the first device. The first module 102010 may request the descriptions of the second screen support service provided by the first device from the first device. This operation may be performed for device discovery.

The first module 102010 can be configured to receive a response with the descriptions from the first device. The first module 102010 may receive the descriptions of the service as a response to the transmitted request. The first device may transmit the descriptions of the service thereof to the second screen application. The descriptions may be received. This operation may be performed for device discovery.

The second module 102020 may access the trigger service and receive the trigger. The second module 102020 may be the above-described network protocol subsystem.

The second module 102020 can be configured to access a trigger service using information given in the descriptions. The second module 102020 may access the trigger service which is one of the second screen support services. The first device may receive the trigger from the broadcast stream or the internet server. Access to trigger service may be performed based on the descriptions received from the first device. Among the received descriptions, the description of the trigger service may be used.

The second module 102020 can be configured to receive a trigger from the first device using the trigger service. The second module 102020 may receive the trigger from the first device using the trigger service. Here, the trigger service may be one of the second screen support services. The trigger can be a signaling element whose function is to identify signaling and establish timing of playout of interactive events targeted to applications for a segment described by an application parameter table. Here, the trigger may be one of a time base trigger, an activation trigger, an interaction trigger and/or a channel change trigger. The interaction trigger may be a trigger for an interaction model other than a TDO interaction model. For example, the trigger may have a content id term in the direct execution model. The channel change trigger may be the above-described special channel change trigger and may be received when the channel is changed.

In one embodiment of the present invention, the first module 102010 may also multicast the searching message. Multicasting may be performed before receiving the discovery message. The searching message may be used to detect a device for providing a second screen support service. According to the embodiment, the searching message may be unicasted. By this step, the second device may detect the first device.

In another embodiment of the present invention, the trigger service may deliver the trigger as an unfiltered stream option. The unfiltered stream option may deliver all types of triggers to the second screen application as described above.

In another embodiment of the present invention, in the unfiltered stream option, all triggers may be delivered to the second screen application as soon as being received by the first device.

In another embodiment of the present invention, the first module 102010 may also receive the augmented activation trigger from the first device. The augmented activation trigger may be generated by extracting and combining the information in the activation trigger and the information in the TPT at the first device. This may be equal to a process of generating the above-described augmented trigger, augmented activation trigger and expanded trigger. The process of generating the augmented activation trigger and the format thereof after generation were described above.

In another embodiment of the present invention, the trigger service may provide a filtered stream option. As described above, the filtered stream option may deliver the augmented activation trigger, the interaction trigger and/or the channel change trigger.

In another embodiment of the present invention, the augmented activation trigger includes application URL information having same value with an URL element of an application element in the application parameter table. The URL element identifies a file which is part of the application, and the application element is identified by the activation trigger. The application parameter table may be the above-described TPT. The application may be a TDO. Here, the application URL information may be @appURL of the above-described augmented activation trigger. Here, the URL element may be a URL element in the TDO element of the TPT. The augmented activation trigger may be obtained from a URL element value in the TDO element of the TPT associated with the activation trigger in a generation process and the application URL information and the URL element may have the same value.

In another embodiment of the present invention, the augmented activation trigger further includes an event information representing an event element in the application parameter table, the event element identified by the activation trigger represents the event for the application, the event information includes an action information having same value with an action attribute of the event element identified by the activation trigger, and the action attribute indicates type of an action to be applied when the event is activated. The application parameter table may be the above-described TPT. The application may be a TDO. Here, the event information may be an event element of the above-described augmented activation trigger. Here, the event element may be an event element in the TDO element of the TPT. Here, the action information may be @action of the above-described augmented activation trigger. Here, the action attribute may be @action in the event element of the TPT. The augmented activation trigger may be obtained from an event element value and @action value in the TDO element of the TPT associated with the activation trigger in a generation process and the action information and the action attribute may have the same value.

In another embodiment of the present invention, the augmented activation trigger is delivered at the activation time of the augmented activation trigger, the interaction trigger is delivered as soon as possible, and the channel change trigger is delivered when the channel is changed. The augmented activation trigger may be delivered at or before the activation time as described above, the interaction trigger may be delivered to the second screen application as soon as being received by the first device and the channel change trigger may be delivered when the channel is changed.

The present invention relates to a method of interworking with a second screen device while receiving a broadcast service. If a UPnP framework is mounted in a receiver and an additional module capable of a second screen service while being compatible with the UPnP framework is mounted in the second screen device, it is possible for a broadcaster to simply to implement the service screen service.

The UPnP framework may be provided by connecting electronic apparatuses to a home network and serving functions according to electronic apparatuses. The present invention relates to extension of an existing UPnP RemoteUI Client Service and UPnP RemoteUI Server Client. Accordingly, it is possible to receive the second screen service while being compatible with existing UPnP apparatuses.

According to the present invention, it is possible to provide supplementary information related to broadcast content using a conventional broadcast system.

According to the present invention, it is possible to detect a time at which supplementary information related to broadcast content needs to be displayed and provide the supplementary information to a user at an appropriate time.

According to the present invention, it is possible to provide supplementary information related to broadcast content to a second screen device.

Various embodiments have been described in the best mode for carrying out the invention.

The present invention is available to a series of broadcast service provision fields.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of processing an interactive service at a first device, the method comprising:
    sending a discovery message to a second screen application running in a second device,
    wherein the discovery message advertises second screen support services that the first device can provide;
    receiving a request for descriptions of the second screen support services from the second screen application;
    sending a response with the descriptions to the second screen application;
    receiving a trigger from a broadcast stream or an internet server; and
    delivering the trigger to the second device using a trigger service,
    wherein the trigger service is one of the second screen support services,
    wherein the trigger service is for delivering the trigger,
    wherein the trigger is a signaling element whose function is to identify signaling and establish timing of playout of interactive events targeted to applications for a segment described by an application parameter table, wherein the application parameter table contains metadata about the applications and the interactive events targeted to the applications for the segment described by the application parameter table,
    wherein the trigger is one of a time base trigger, an activation trigger, an interaction trigger or a channel change trigger,
    wherein the time base trigger is used to establish a time base for the event,
    wherein the activation trigger sets an activation time for the event,
    wherein the interaction trigger is used for interaction models other than a Triggered Declarative Object interaction model,
    wherein the channel change trigger is delivered whenever a channel is changed,
    combining information from the activation trigger with information from the application parameter table to generate an augmented activation trigger;
    sending the generated augmented activation trigger to the second screen application,
    wherein the trigger service offers a filtered stream option,
    wherein the filtered stream option is an option that delivering the trigger which is one of the augmented activation trigger, the interaction trigger or the channel change trigger,
    wherein the augmented activation trigger includes an event information representing an event element in the application parameter table,
    wherein the event element identified by the activation trigger represents the event for the application,
    wherein the event information includes an action information having same value with an action attribute of the event element identified by the activation trigger, and
    wherein the action attribute indicates type of an action to be applied when the event is activated.

2. The method of claim 1, the method further comprising:
receiving a searching message for searching devices including the first device that offer the second screen support services before the sending the discovery message.

3. The method of claim 1,
wherein the trigger service offers an unfiltered stream option, and
wherein the unfiltered stream option is an option that delivering all types of the trigger.

4. The method of claim 3,
wherein the first device delivers the all types of the trigger as soon as the trigger is received by the first device.

5. The method of claim 1,
wherein the augmented activation trigger includes an application URL information having same value with an URL element of an application element in the application parameter table,
wherein the URL element identifies a file which is part of the application, and
wherein the application element is identified by the activation trigger.

6. The method of claim 1,
wherein the first device delivers the augmented activation trigger at the activation time of the augmented activation trigger,
wherein the first device delivers the interaction trigger when the interaction trigger is received by the first device, and
wherein the first device delivers the channel change trigger when the channel is changed.

7. A method of processing an interactive service at a second screen application running in a second device, the method comprising:
receiving a discovery message from a first device,
wherein the discovery message advertise second screen support services that the first device can provide;
sending a request for descriptions of the second screen support services to the first device;
receiving a response with the descriptions from the first device;
accessing a trigger service using information given in the descriptions; and
receiving a trigger from the first device using the trigger service,
wherein the trigger service is one of the second screen support services,
wherein the trigger is a signaling element whose function is to identify signaling and establish timing of playout of interactive events targeted to applications for a segment described by an application parameter table, wherein the application parameter table contains metadata about the applications and the interactive events targeted to the applications for the segment described by the application parameter table,
wherein the trigger is one of a time base trigger, an activation trigger, an interaction trigger or a channel change trigger,
wherein the time base trigger is used to establish a time base for the event,
wherein the activation trigger sets an activation time for the event,
wherein the interaction trigger is used for interaction models other than a Triggered Declarative Object interaction model,
wherein the channel change trigger is delivered whenever a channel is changed,
receiving an augmented activation trigger generated by combining information from the activation trigger with information from the application parameter table;
wherein the trigger service offers a filtered stream option,
wherein the filtered stream option is an option that delivering the trigger which is one of the augmented activation trigger, the interaction trigger or the channel change trigger,
wherein the augmented activation trigger includes an event information representing an event element in the application parameter table,
wherein the event element identified by the activation trigger represents the event for the application,
wherein the event information includes an action information having same value with an action attribute of the event element identified by the activation trigger, and
wherein the action attribute indicates type of an action to be applied when the event is activated.

8. The method of claim 7, the method further comprising:
multicasting a searching message for searching devices including the first device that offer the second screen support services before the receiving the discovery message.

9. The method of claim 7,
wherein the trigger service offers an unfiltered stream option, and
wherein the unfiltered stream option is an option that delivering all types of the trigger.

10. The method of claim 9,
wherein the all types of the trigger is delivered as soon as possible.

11. The method of claim 7,
wherein the augmented activation trigger includes an application URL information having same value with an URL element of an application element in the application parameter table,
wherein the URL element identifies a file which is part of the application, and
wherein the application element is identified by the activation trigger.

12. The method of claim 7,
wherein the augmented activation trigger is delivered at the activation time of the augmented activation trigger,
wherein the interaction trigger is delivered as soon as possible, and
wherein the channel change trigger is delivered when the channel is changed.

13. An apparatus for processing an interactive service as a first device, the apparatus comprising:
a first module configured to receive a trigger from a broadcast stream or an internet server; and
a second module configured to send a discovery message to a second screen application running in a second device,
wherein the discovery message advertises second screen support services that the first device can provide,
receive a request for descriptions of the second screen support services from the second screen application,
send a response with the descriptions to the second screen application, and
deliver the trigger to the second device using a trigger service,
wherein the trigger service is one of the second screen support services,
wherein the trigger service is for delivering the trigger,
wherein the trigger is a signaling element whose function is to identify signaling and establish timing of playout of interactive events targeted to applications for a segment described by an application parameter table, wherein the application parameter table contains metadata about the applications and the interactive events targeted to the applications for the segment described by the application parameter table, wherein the trigger is one of a time base trigger, an activation trigger, an interaction trigger or a channel change trigger, wherein the time base trigger is used to establish a time base for the event, wherein the activation trigger sets an activation time for the event, wherein the interaction trigger is used for interaction models other than a Triggered Declarative Object interaction model, wherein the channel change trigger is delivered whenever a channel is changed, wherein the second module is configured to combine information from the activation trigger with information from the application parameter table to generate an augmented activation trigger; and send the generated augmented activation trigger to the second screen application, wherein the trigger service offers a filtered stream option, wherein the filtered stream option is an option that delivering the trigger which is one of the augmented activation trigger, the interaction trigger or the channel change trigger, wherein the augmented activation trigger further includes an event information representing an event element in the application parameter table, wherein the event element identified by the activation trigger represents the event for the application, wherein the event information includes an action information having same value with an action attribute of the event element identified by the activation trigger, and wherein the action attribute indicates type of an action to be applied when the event is activated.

14. The apparatus of claim 13, the second module further configured to receive a searching message for searching devices including the first device that offer the second screen support services before sending the discovery message.

15. The apparatus of claim 13, wherein the trigger service offers an unfiltered stream option, and wherein the unfiltered stream option is an option that delivering all types of the trigger.

16. The apparatus of claim 15, wherein the second module delivers the all types of the trigger as soon as the trigger is received by the first module.

17. The apparatus of claim 13, wherein the augmented activation trigger includes an application URL information having same value with an URL element of an application element in the application parameter table, wherein the URL element identifies a file which is part of the application, and wherein the application element is identified by the activation trigger.

18. The apparatus of claim 13, wherein the second module delivers the augmented activation trigger at the activation time of the augmented activation trigger, wherein the second module delivers the interaction trigger when the interaction trigger is received by the first module, and wherein the second module delivers the channel change trigger when the channel is changed.

19. An apparatus for processing an interactive service as a second screen application running in a second device, the apparatus comprising:

a first module configured to receive a discovery message from a first device, wherein the discovery message advertise second screen support services that the first device can provide, send a request for descriptions of the second screen support services to the first device, and receive a response with the descriptions from the first device; and a second module configured to access a trigger service using information given in the descriptions, and receive a trigger from the first device using the trigger service, wherein the trigger service is one of the second screen support services, wherein the trigger is a signaling element whose function is to identify signaling and establish timing of playout of interactive events targeted to applications for a segment described by an application parameter table, wherein the application parameter table contains metadata about the applications and the interactive events targeted to the applications for the segment described by the application parameter table, wherein the trigger is one of a time base trigger, an activation trigger, an interaction trigger or a channel change trigger, wherein the time base trigger is used to establish a time base for the event, wherein the activation trigger sets an activation time for the event, wherein the interaction trigger is used for interaction models other than a Triggered Declarative Object interaction model, wherein the channel change trigger is delivered whenever a channel is changed, wherein the second module is configured to receive an augmented activation trigger generated by combining information from the activation trigger with information from the application parameter table, wherein the trigger service offers a filtered stream option, and wherein the filtered stream option is an option that delivering the trigger which is one of the augmented activation trigger, the interaction trigger or the channel change trigger, wherein the augmented activation trigger further includes an event information representing an event element in the application parameter table, wherein the event element identified by the activation trigger represents the event for the application, wherein the event information includes an action information having same value with an action attribute of the event element identified by the activation trigger, and wherein the action attribute indicates type of an action to be applied when the event is activated.

20. The apparatus of claim 19, the first module further configured to, multicast a searching message for searching devices including the first device that offer the second screen support services before receiving the discovery message.

21. The apparatus of claim 19, wherein the trigger service offers an unfiltered stream option, and wherein the unfiltered stream option is an option that delivering all types of the trigger.

22. The apparatus of claim 21, wherein the all types of the trigger is delivered as soon as possible.

23. The apparatus of claim 19, wherein the augmented activation trigger includes an application URL information having same value with an URL element of an application element in the application parameter table, wherein the URL element identifies a file which is part of the application, and wherein the application element is identified by the activation trigger.

24. The apparatus of claim 19, wherein the augmented activation trigger is delivered at the activation time of the augmented activation trigger, wherein the interaction trigger is delivered as soon as possible, and wherein the channel change trigger is delivered when the channel is changed.

* * * * *